United States Patent [19]
Yamamoto et al.

[11] Patent Number: 6,067,196
[45] Date of Patent: May 23, 2000

[54] ZOOM LENS SYSTEM

[75] Inventors: Yasushi Yamamoto, Kishiwada; Yuichiro Ori, Moriyama, both of Japan

[73] Assignee: Minolta Co., Ltd., Osaka, Japan

[21] Appl. No.: 08/784,177

[22] Filed: Jan. 15, 1997

[30] Foreign Application Priority Data

| Jan. 16, 1996 | [JP] | Japan | 8-005198 |
| Jan. 19, 1996 | [JP] | Japan | 8-007900 |
| Nov. 8, 1996 | [JP] | Japan | 8-296756 |
| Nov. 8, 1996 | [JP] | Japan | 8-296765 |

[51] Int. Cl.[7] ............. G02B 27/44; G02B 5/18; G02B 15/14; G02B 3/08
[52] U.S. Cl. ............. 359/565; 359/576; 359/677; 359/692; 359/742
[58] Field of Search ............. 359/558, 565, 359/576, 677, 692, 742

[56] References Cited

U.S. PATENT DOCUMENTS

| 4,936,661 | 6/1990 | Betensky et al. | 359/692 |
| 4,972,075 | 11/1990 | Hamada et al. | 250/201.5 |
| 5,268,790 | 12/1993 | Chen | 359/677 |
| 5,493,441 | 2/1996 | Chipper | 359/357 |
| 5,619,381 | 4/1997 | Anderson | 359/677 |

FOREIGN PATENT DOCUMENTS

| 544174 A1 | 6/1993 | European Pat. Off. | 359/558 |

*Primary Examiner*—Georgia Epps
*Assistant Examiner*—Evelyn A. Lester
*Attorney, Agent, or Firm*—Price Gess & Ubell

[57] ABSTRACT

A zoom lens system has the first and second lens units. During zooming from a wide-angle end to a telephoto end, the lens units are moved to decrease a distance therebetween. The first lens unit has a positive refractive power. The second lens unit has a negative refractive power. The zoom lens system is provided with at least one surface having a power to diffract light.

61 Claims, 79 Drawing Sheets

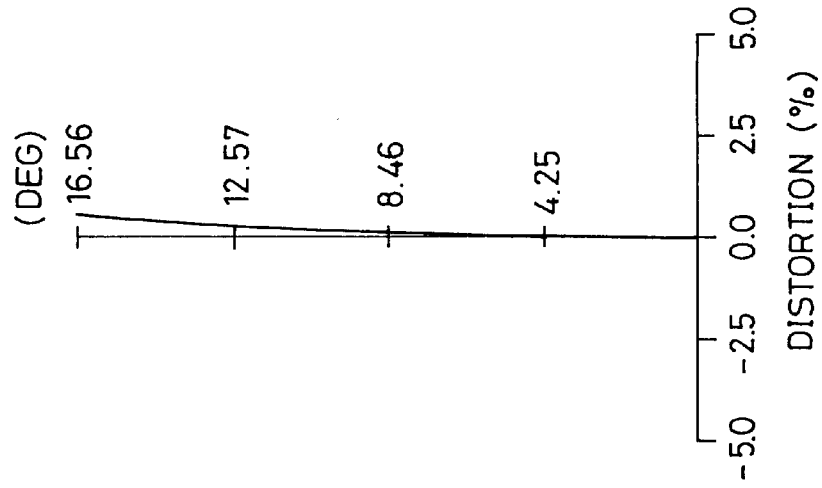
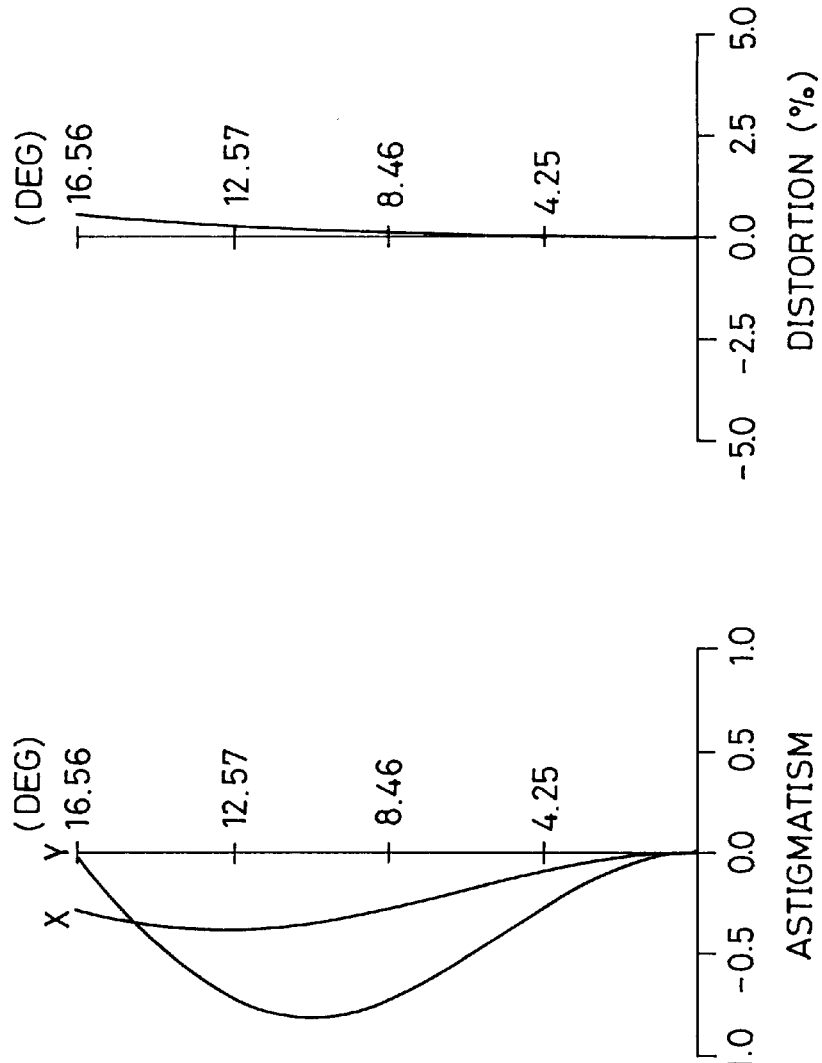
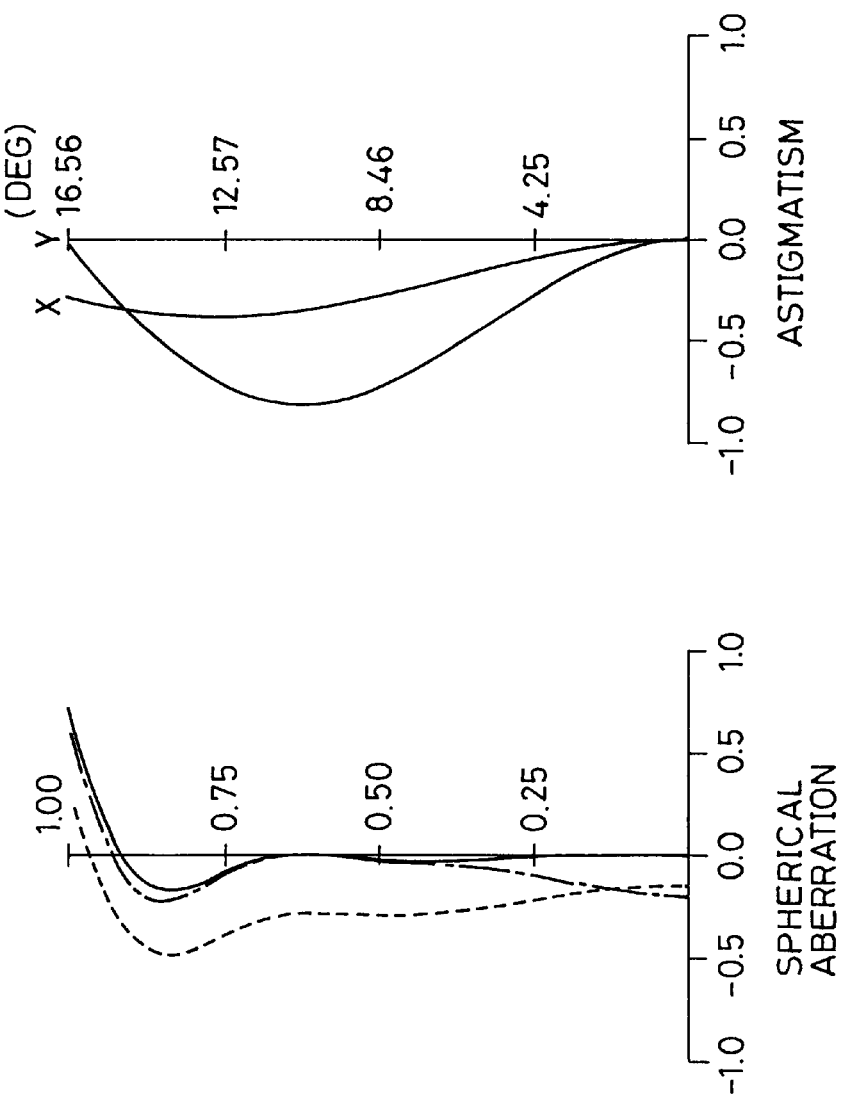

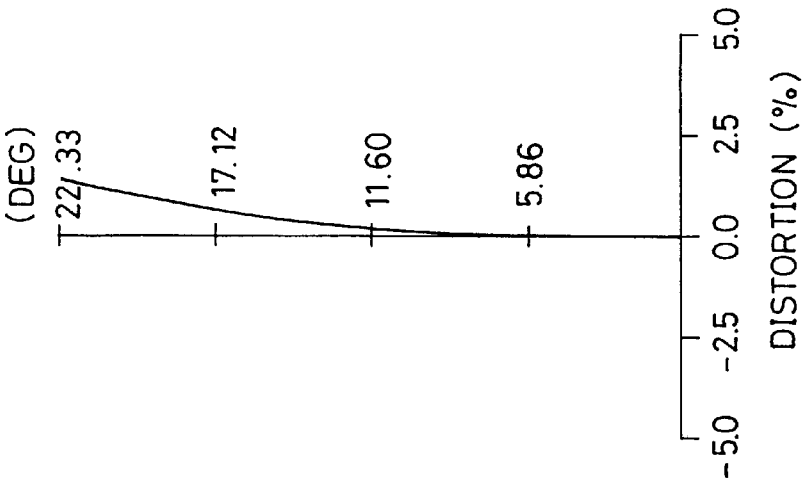
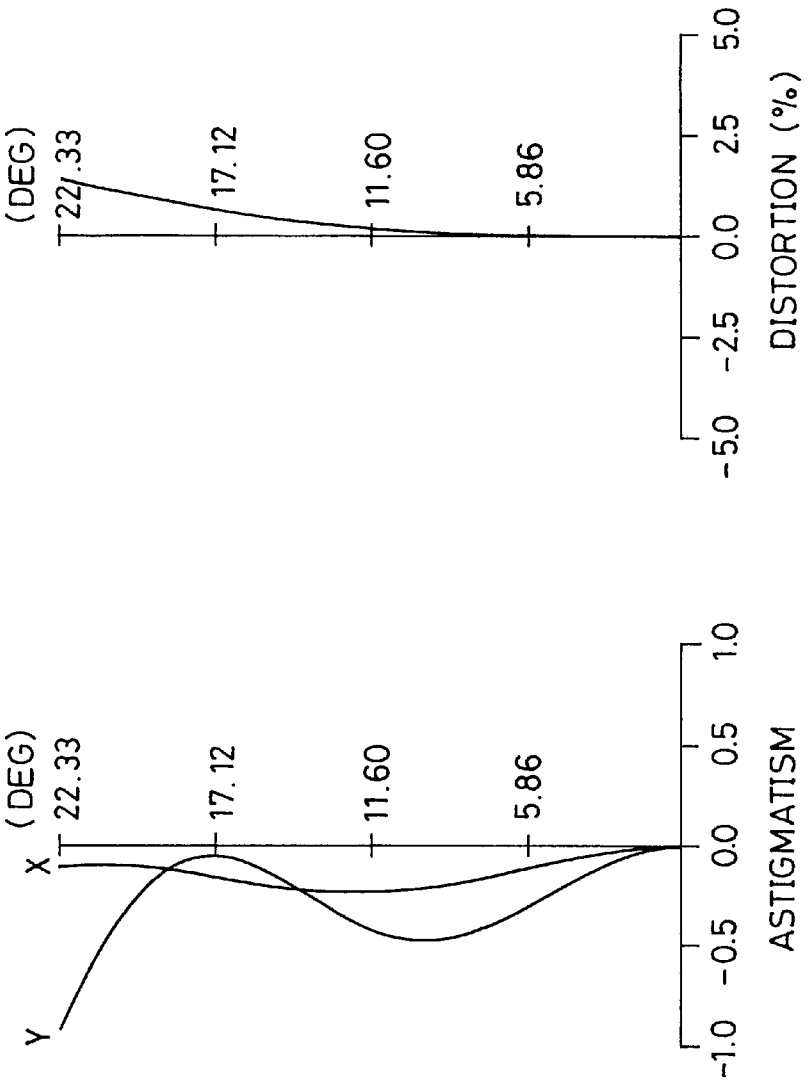
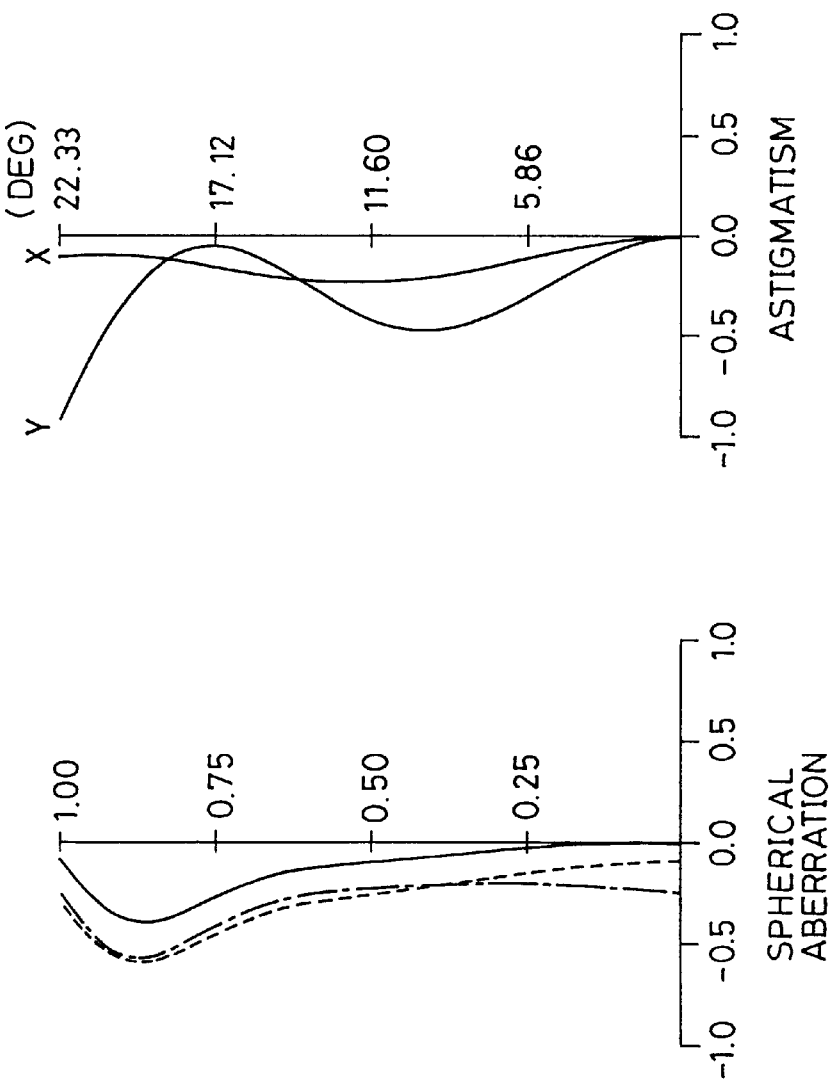

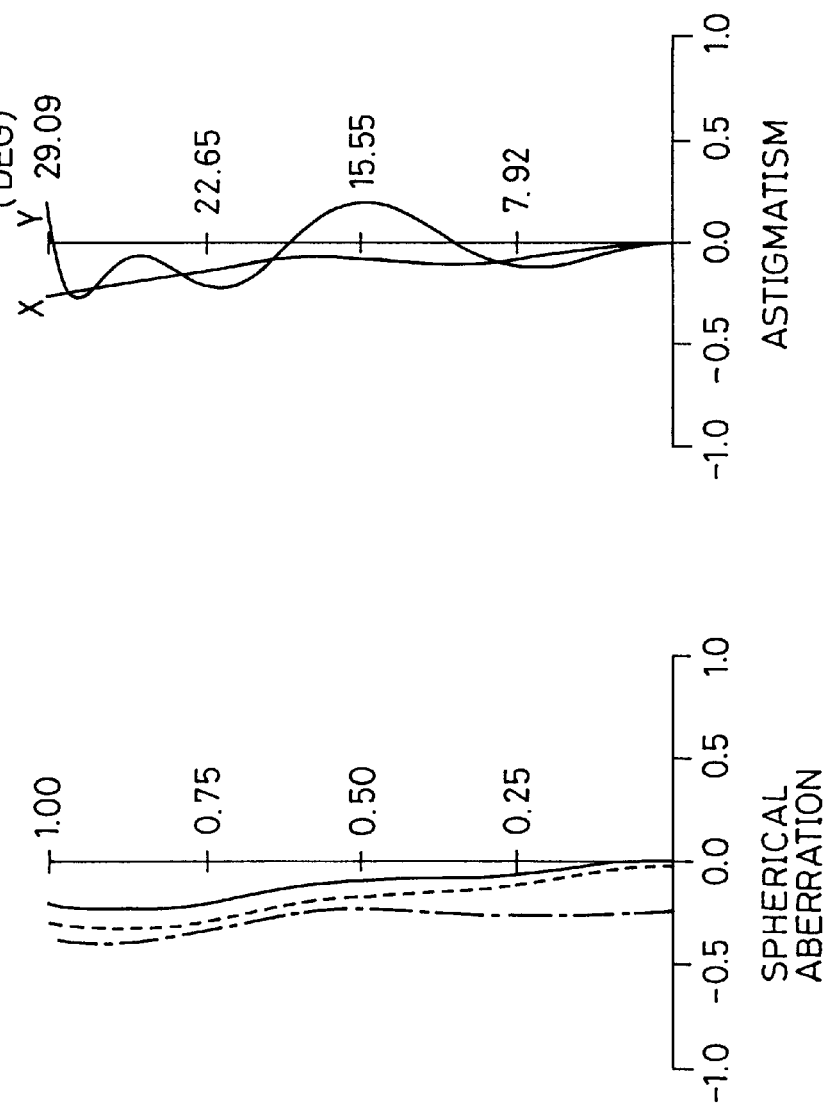
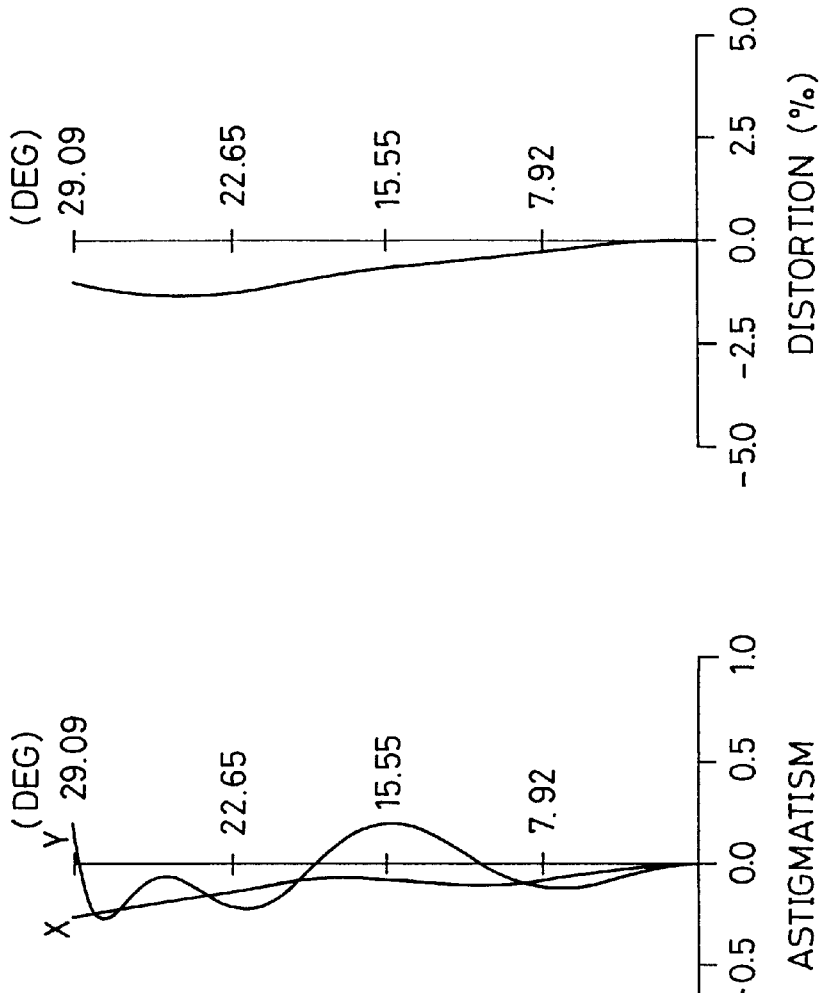
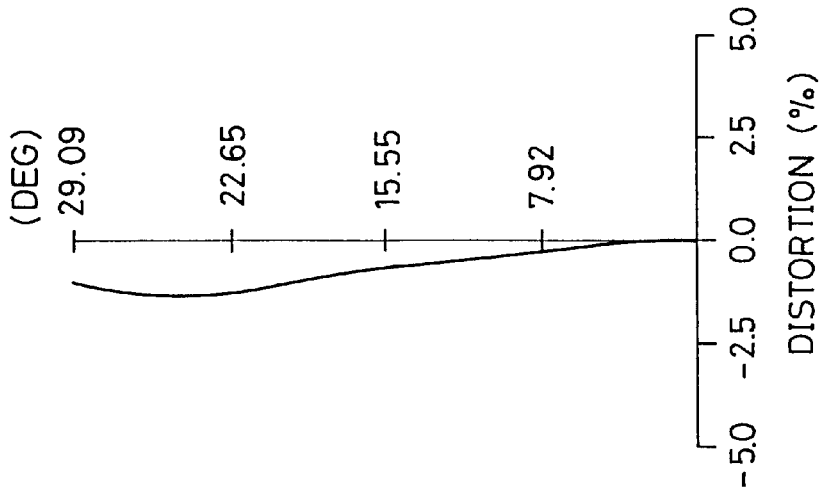

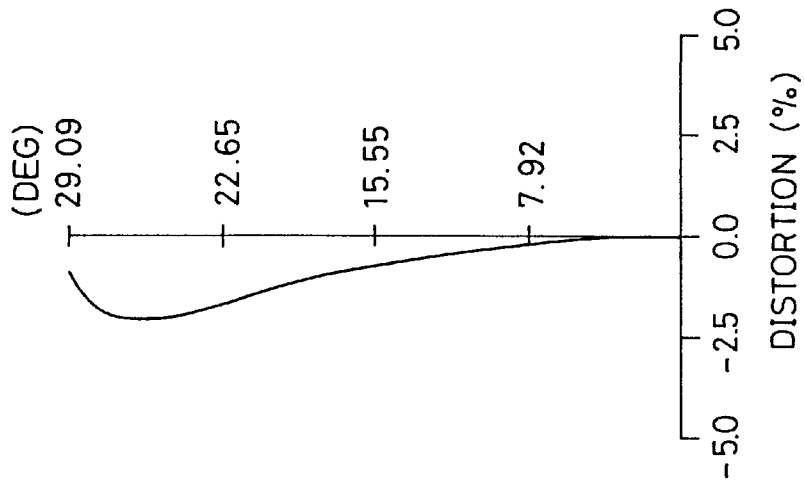
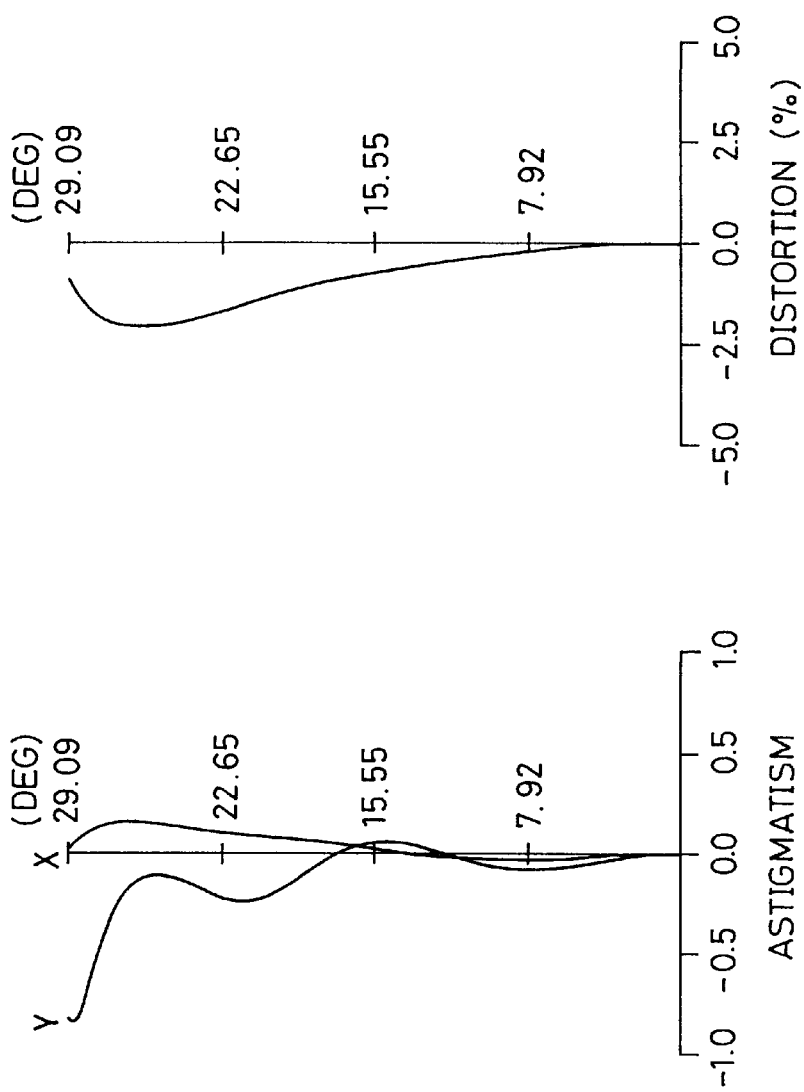
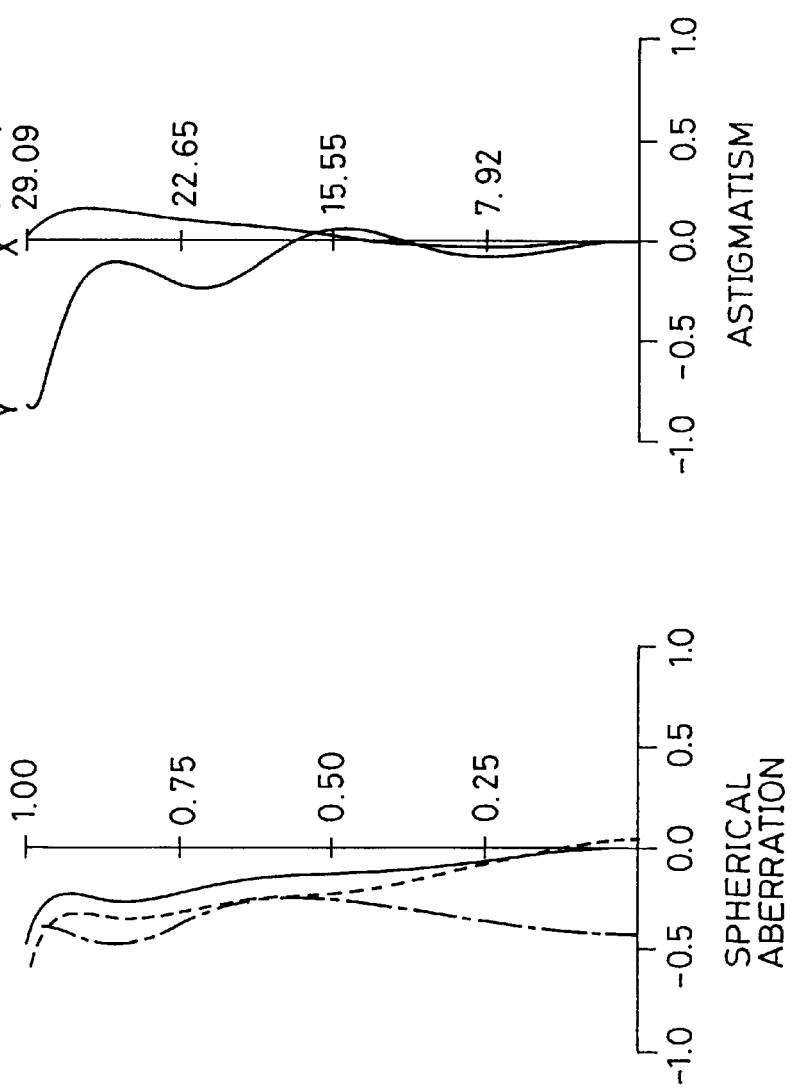

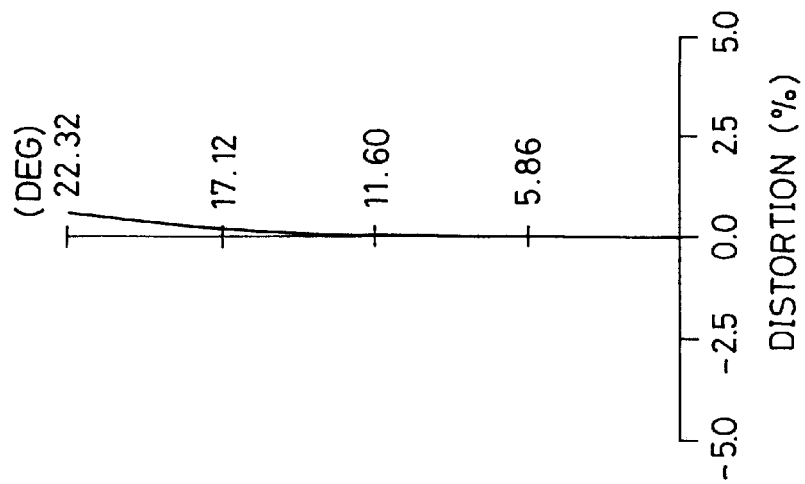
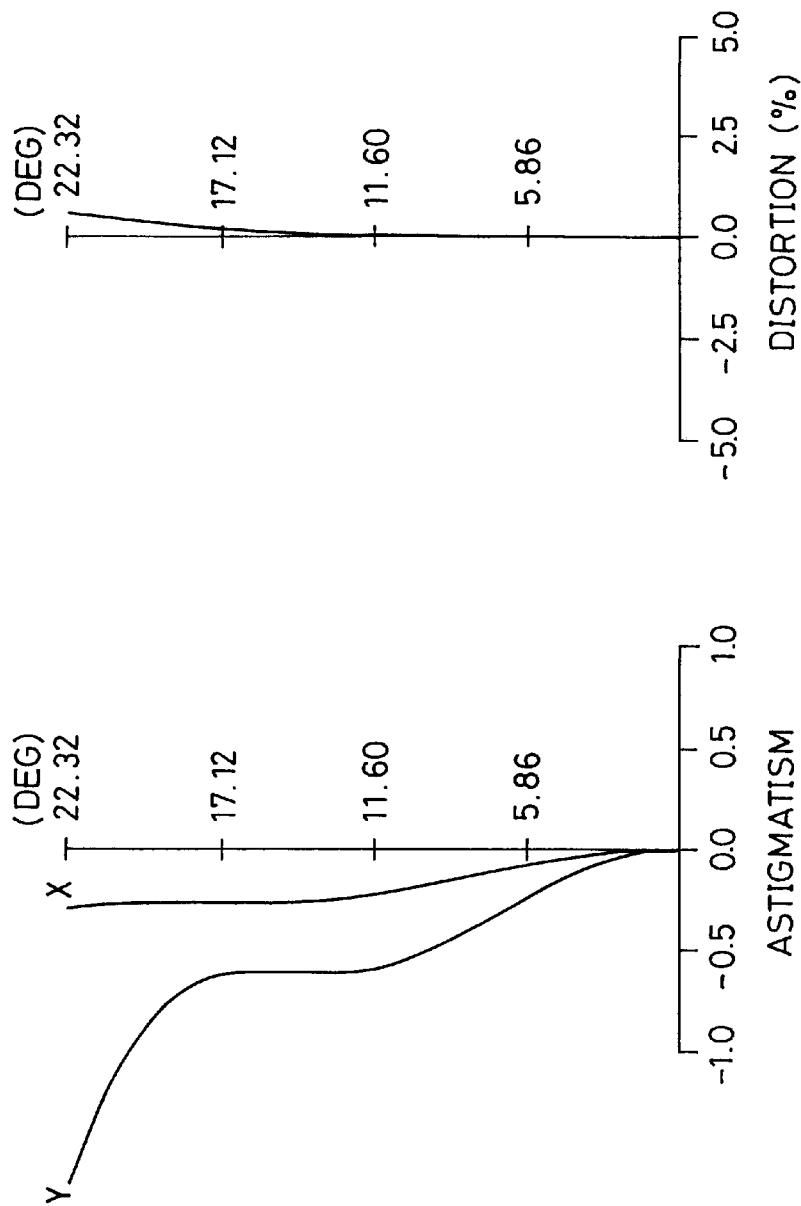
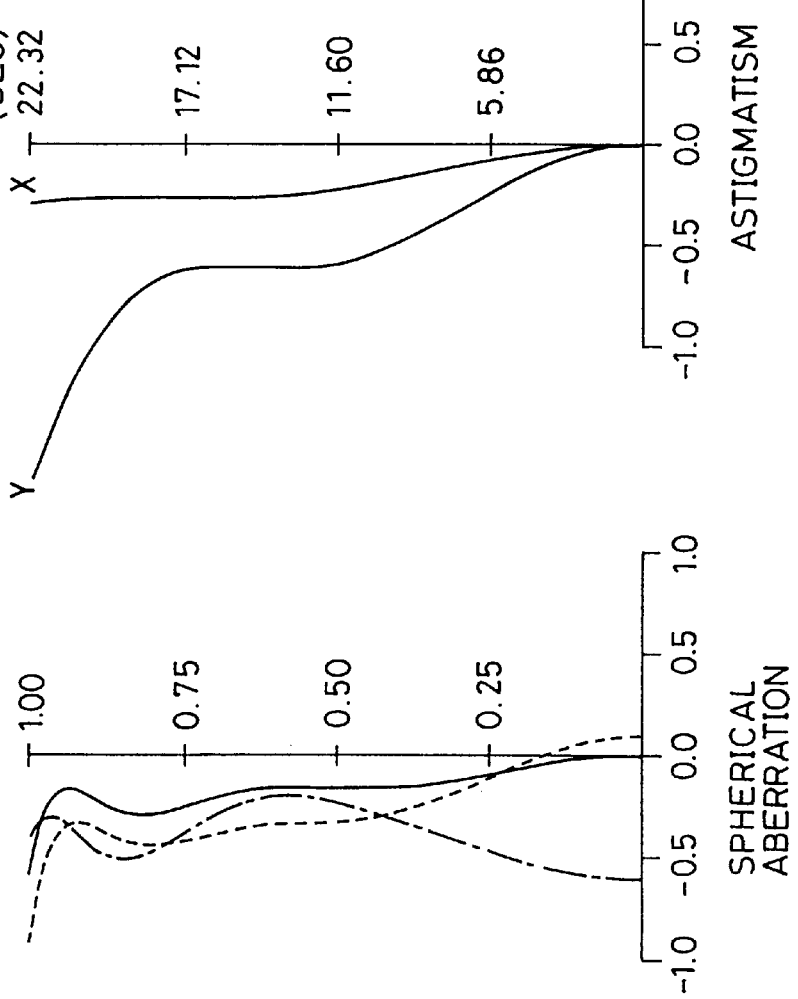

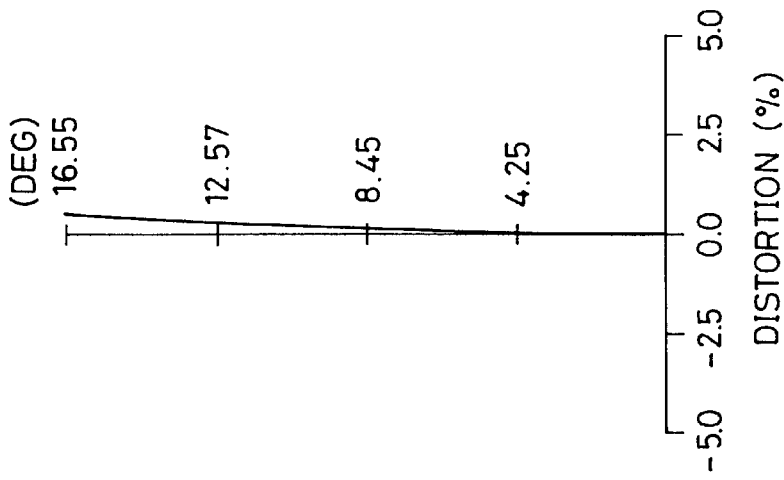
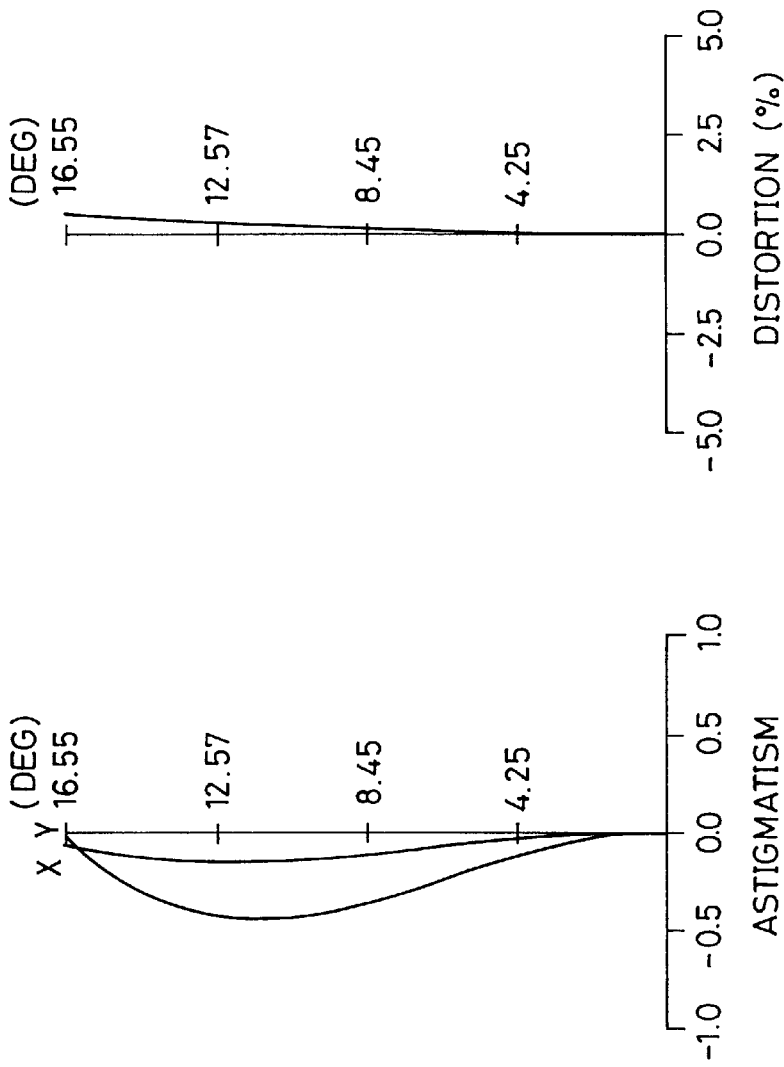
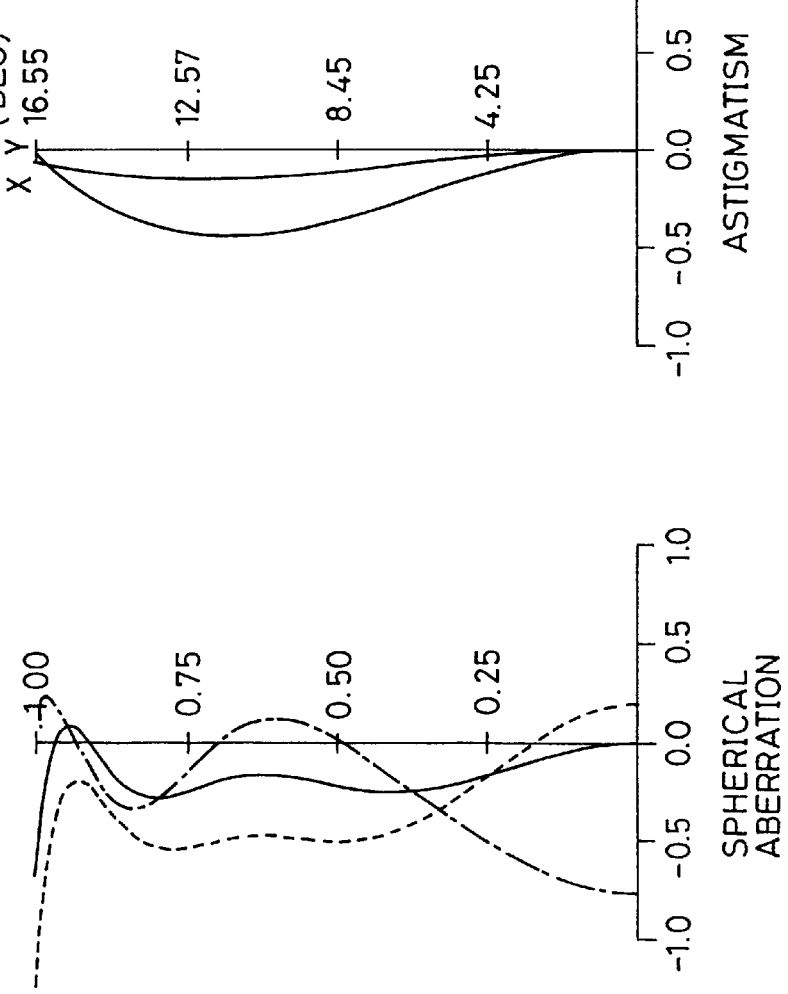

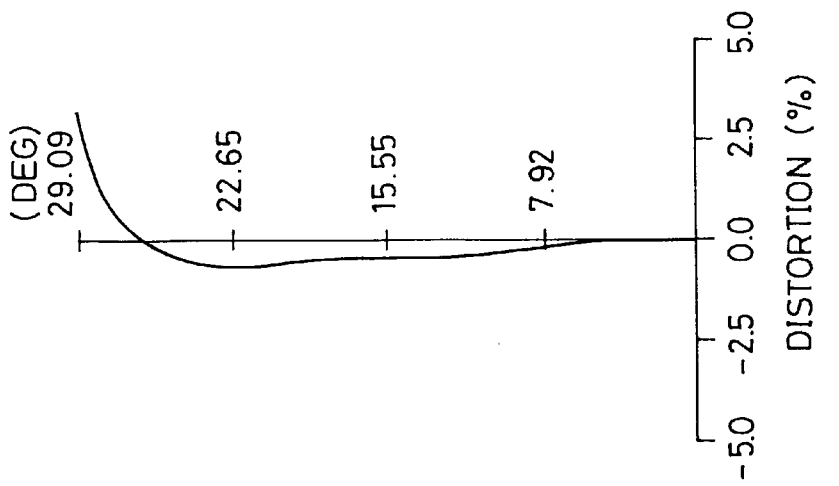
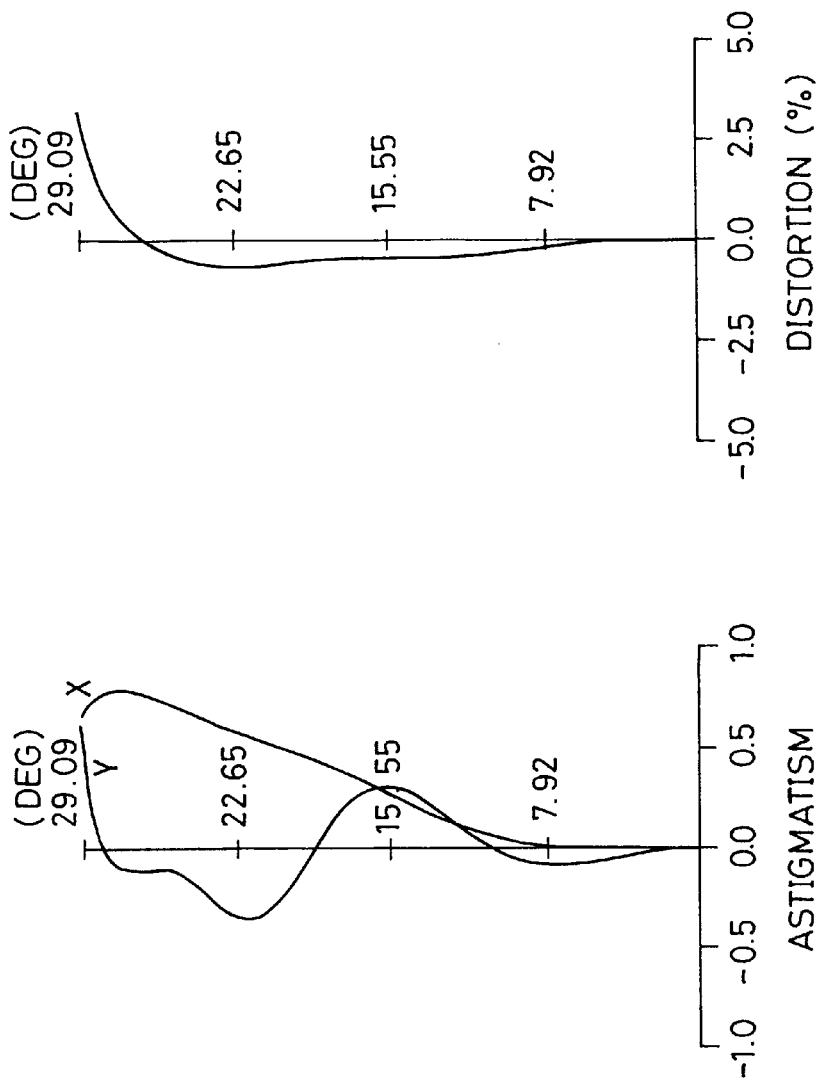
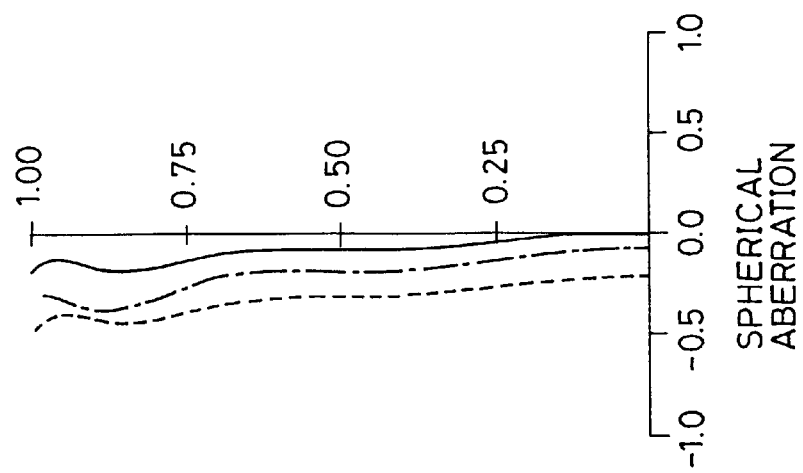

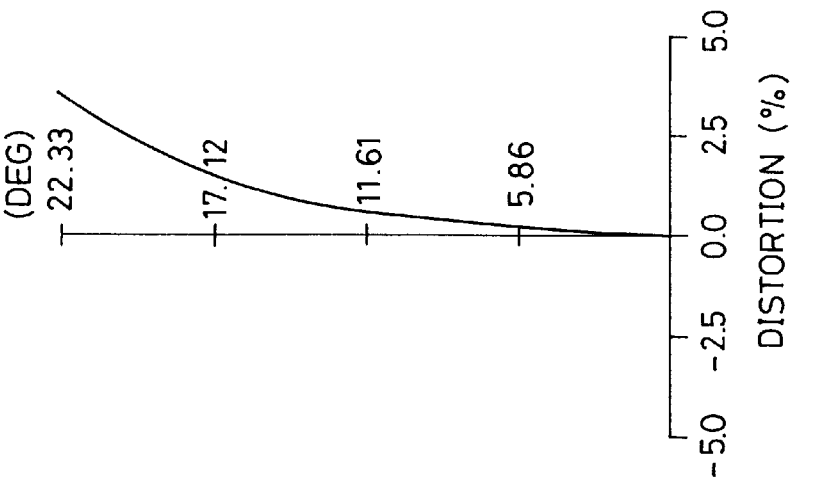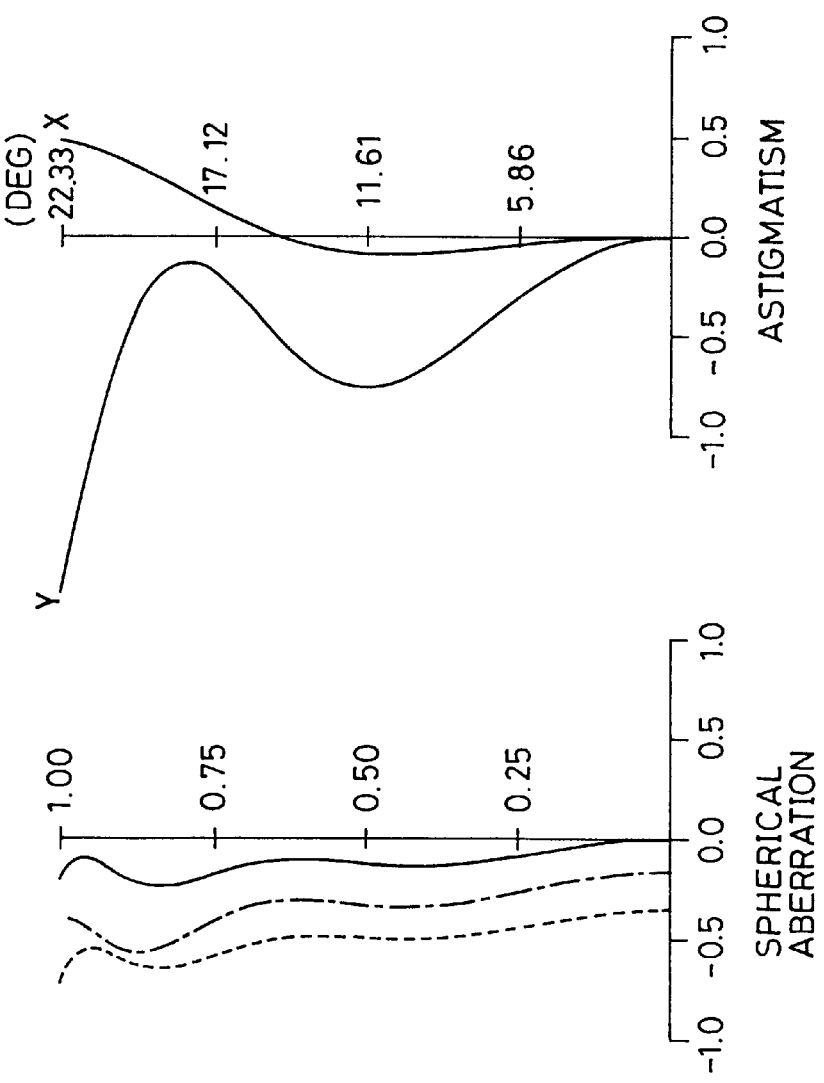

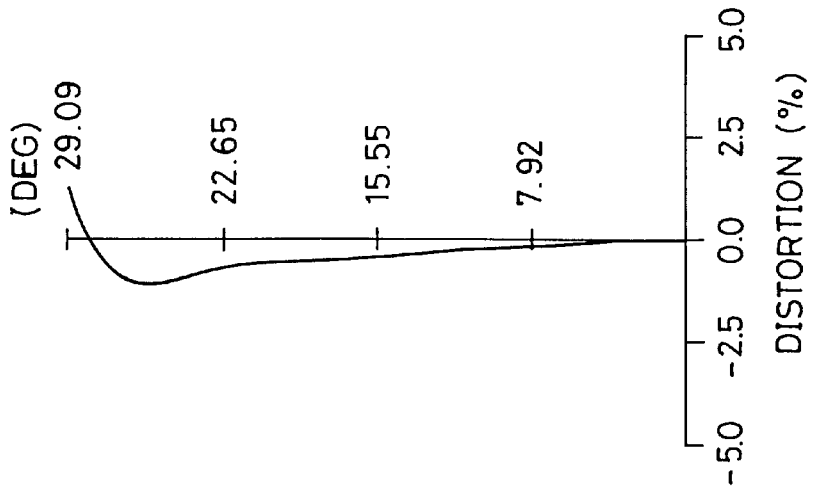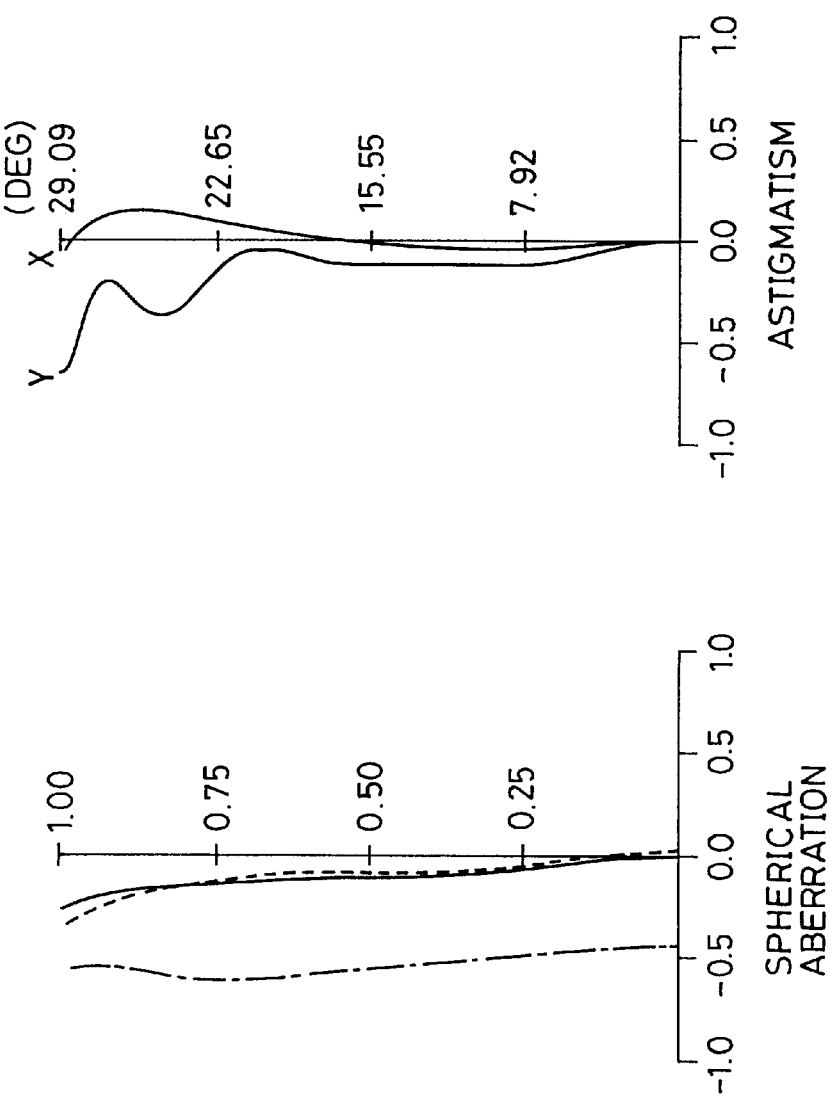

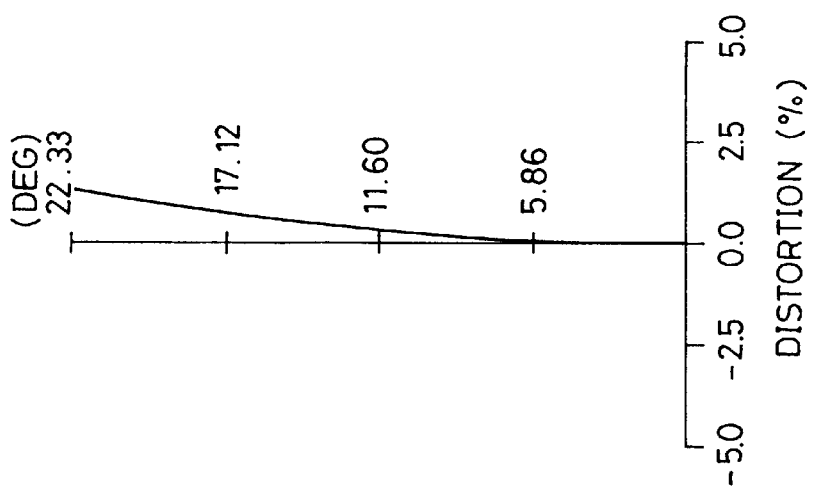
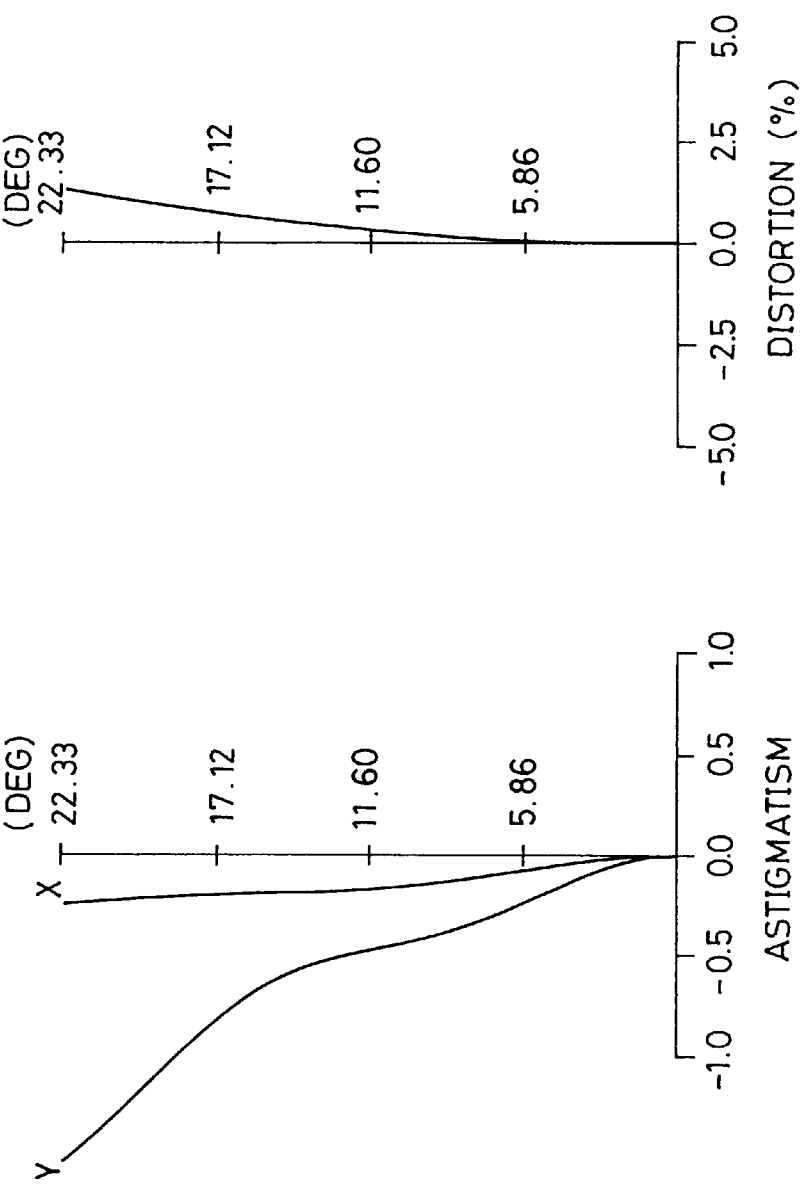
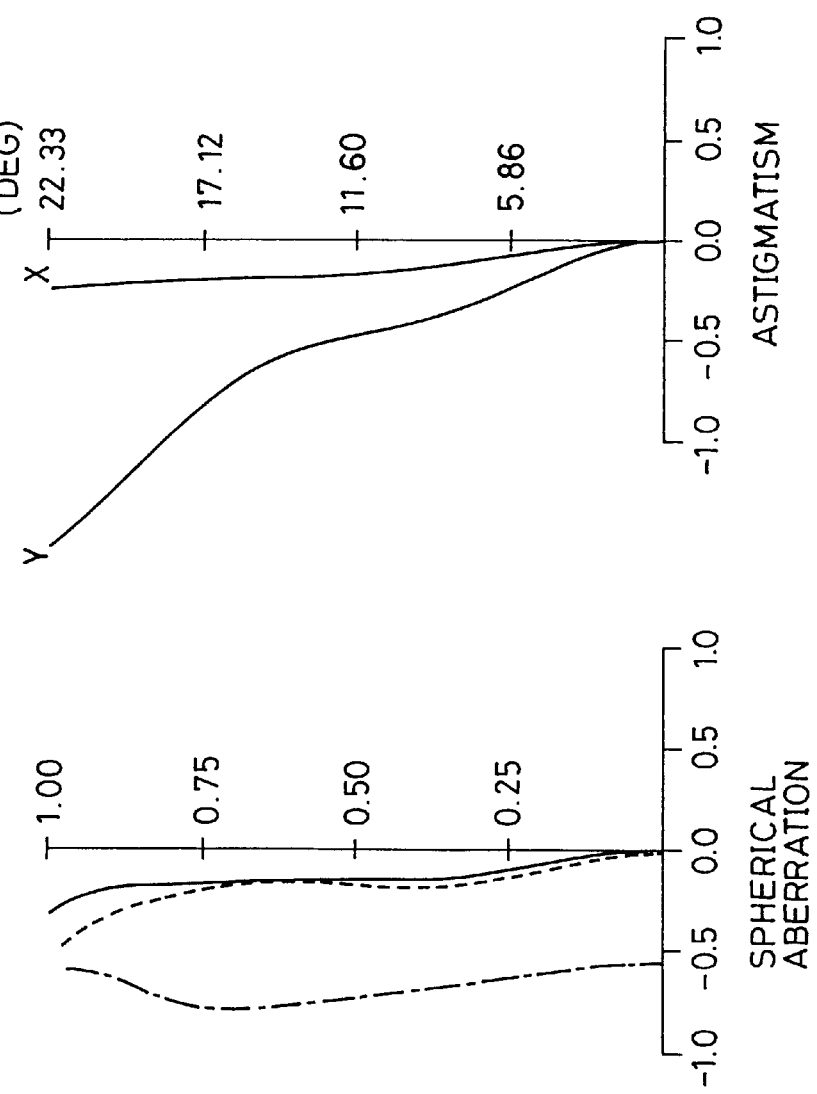

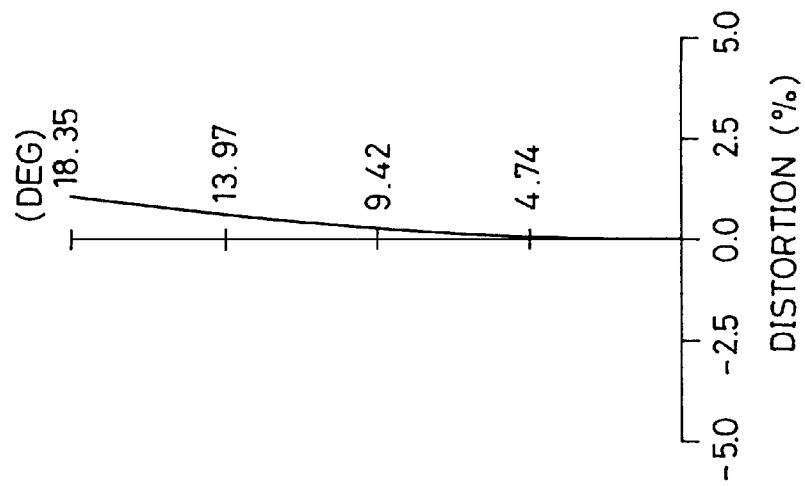
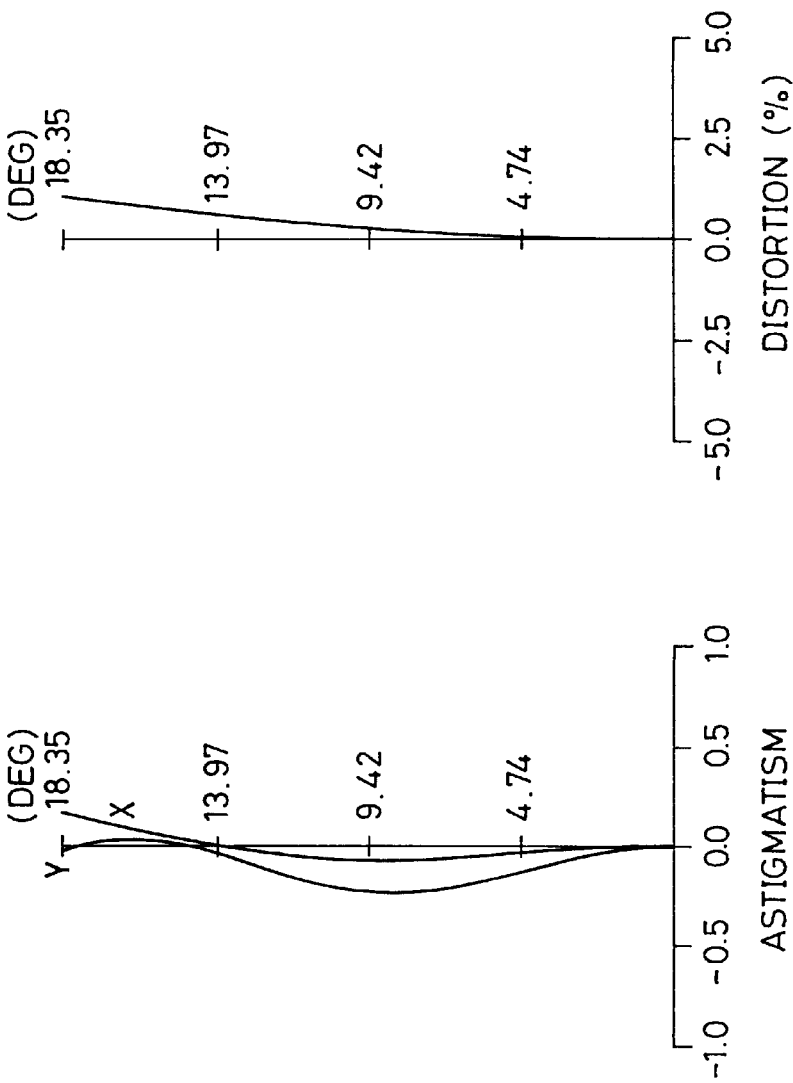
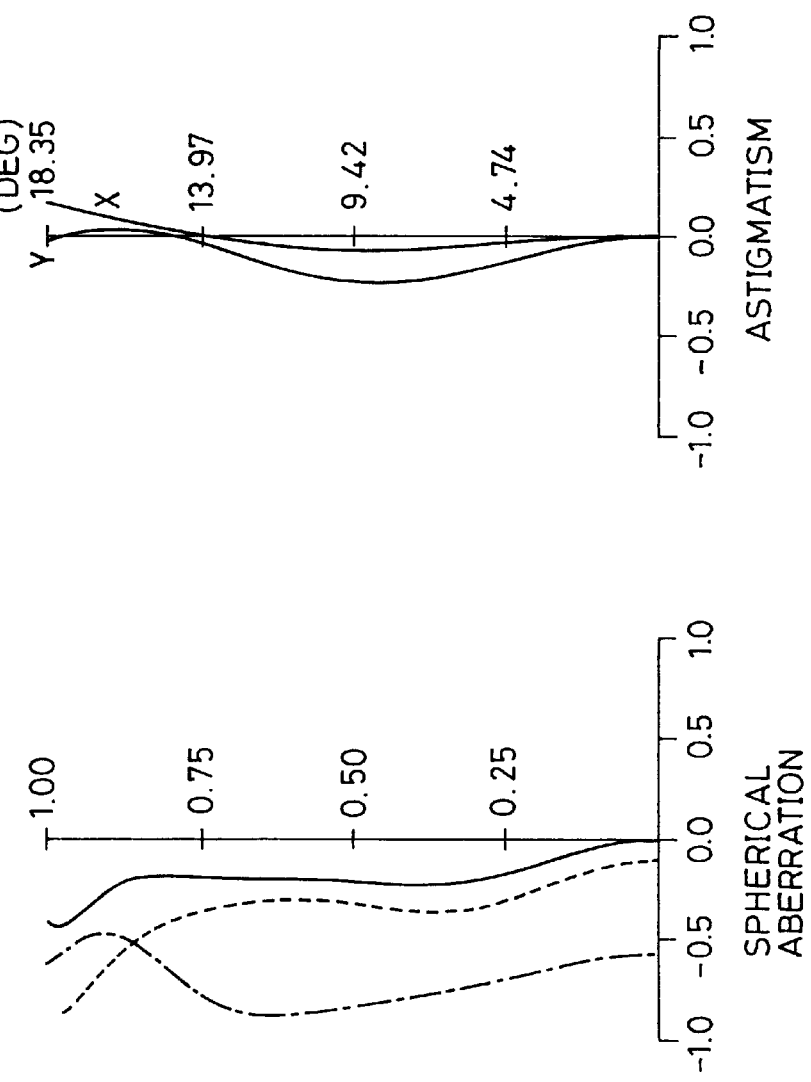

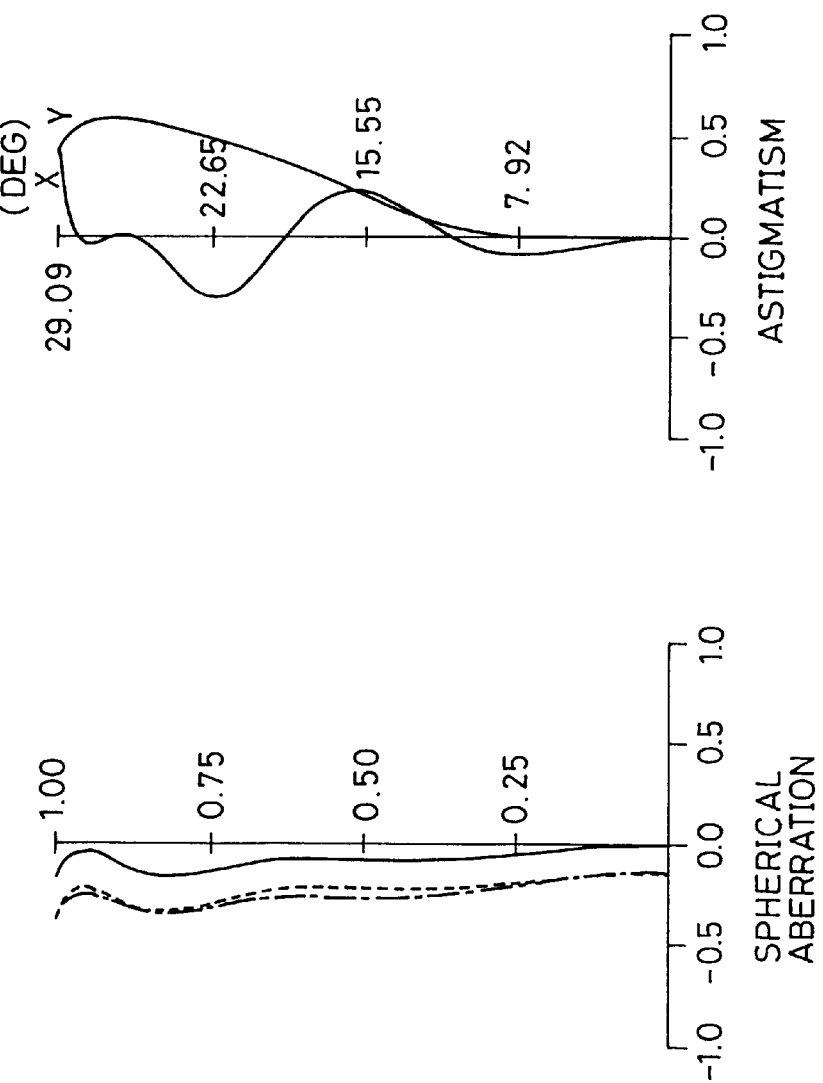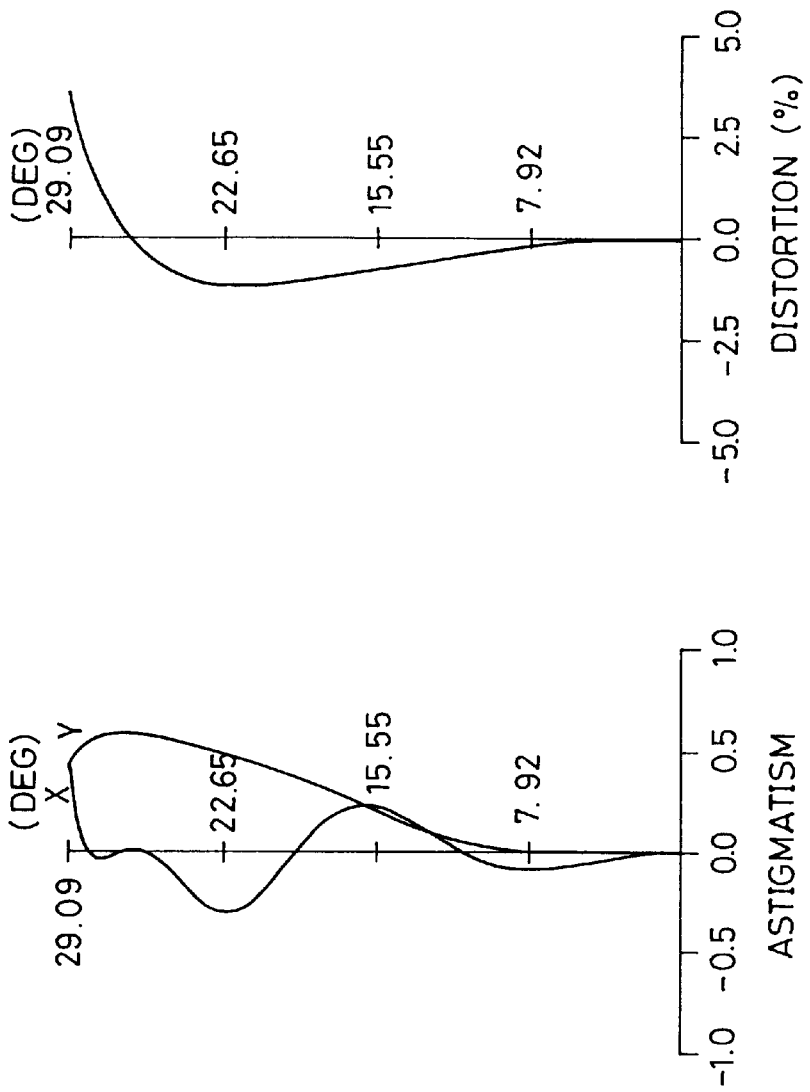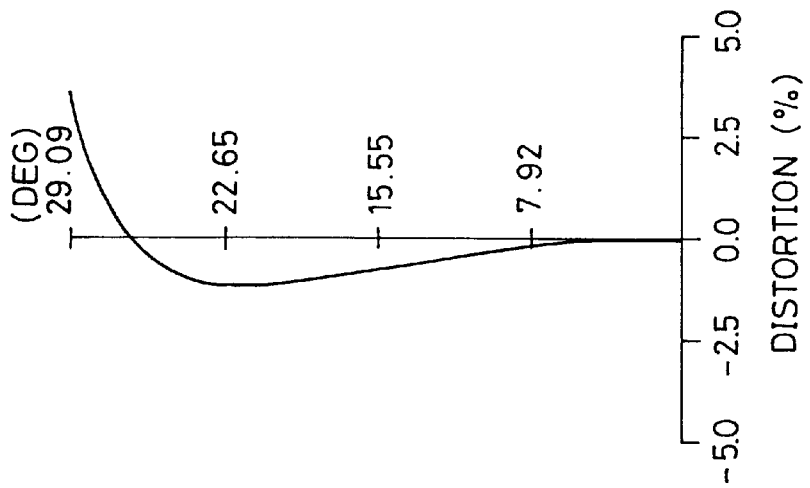

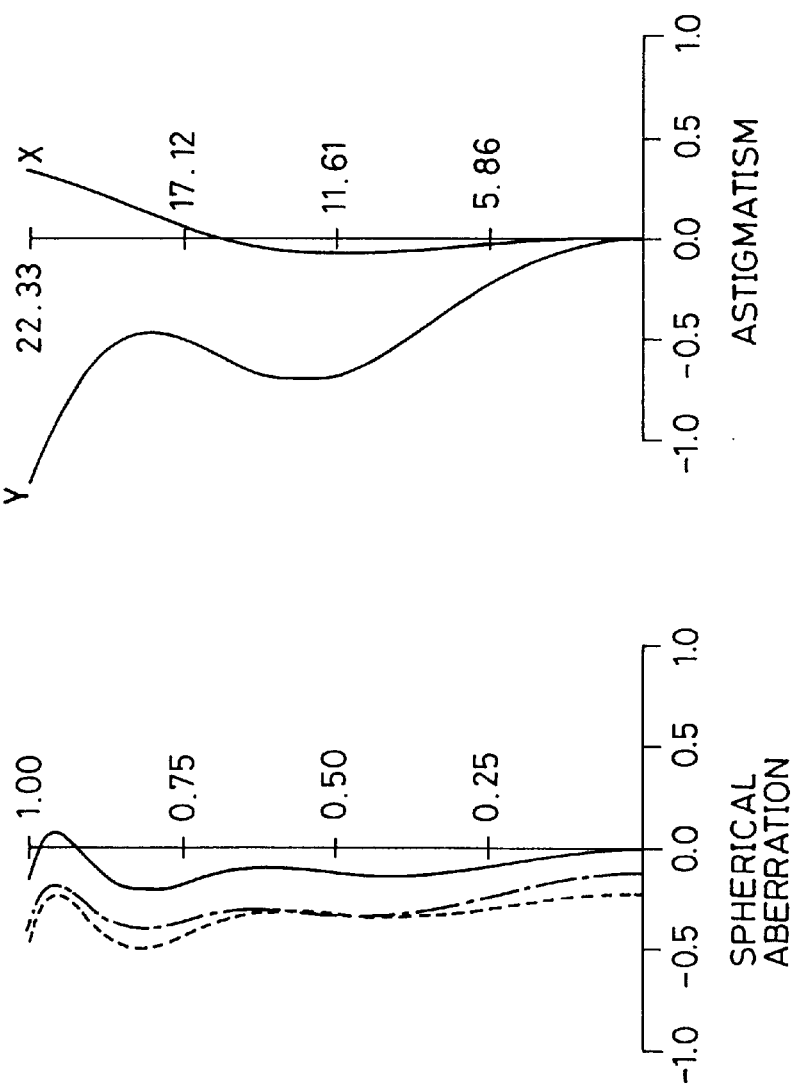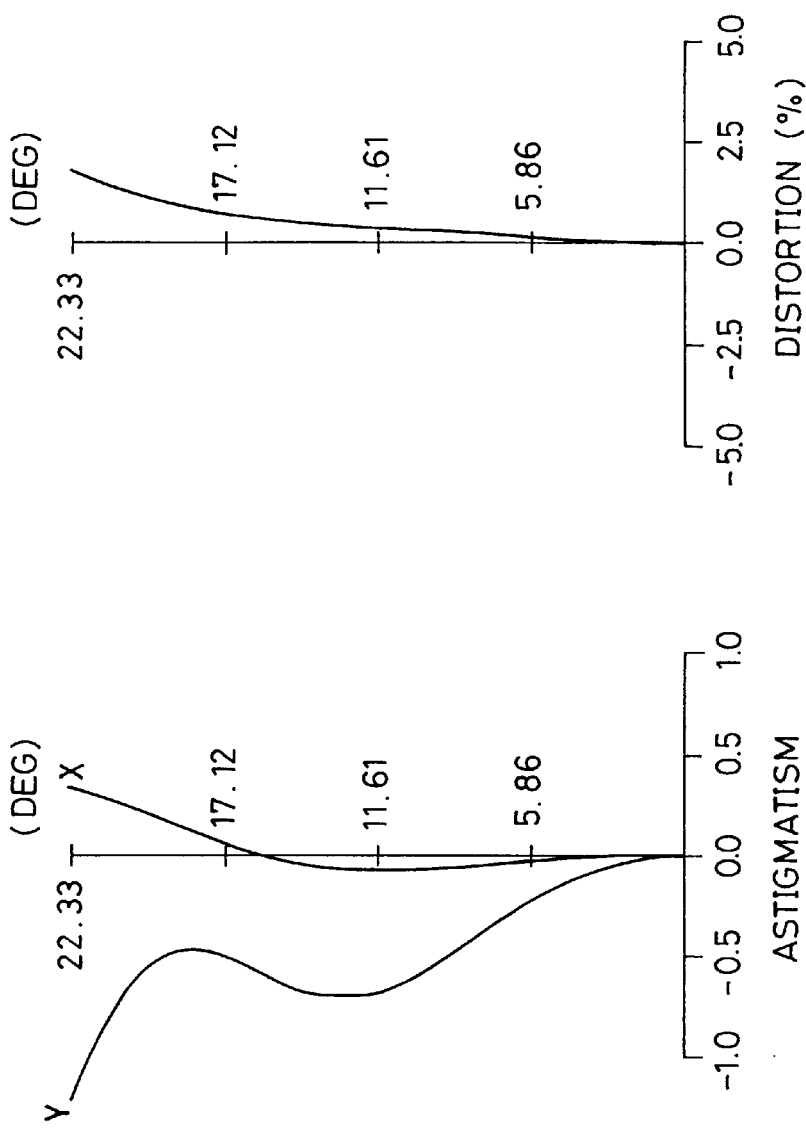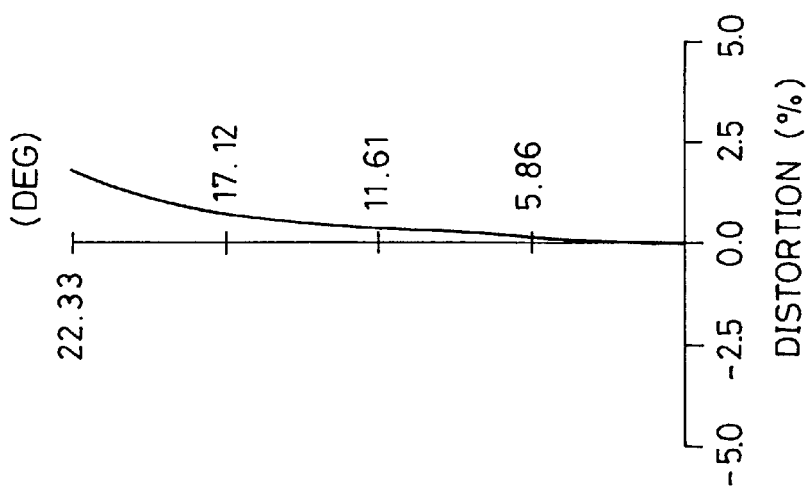

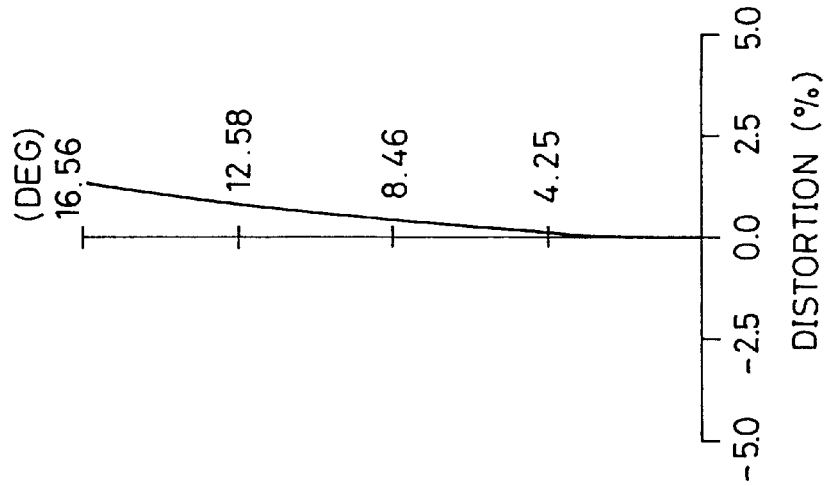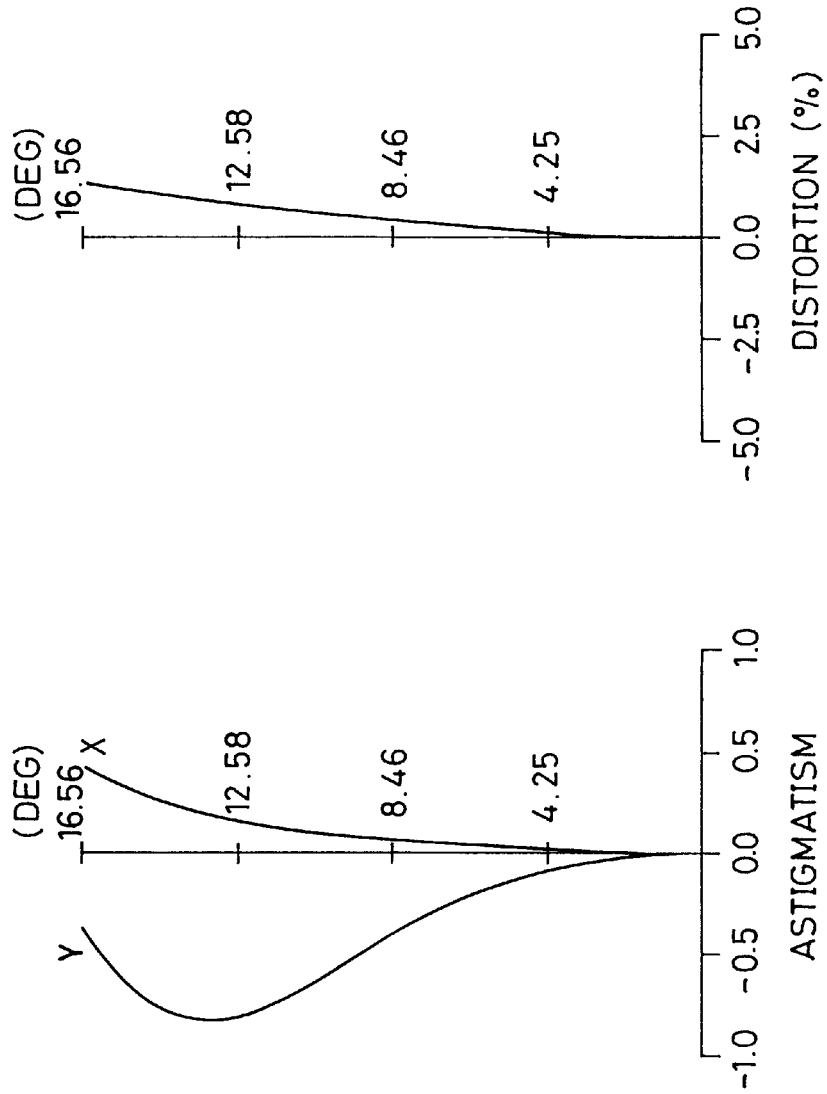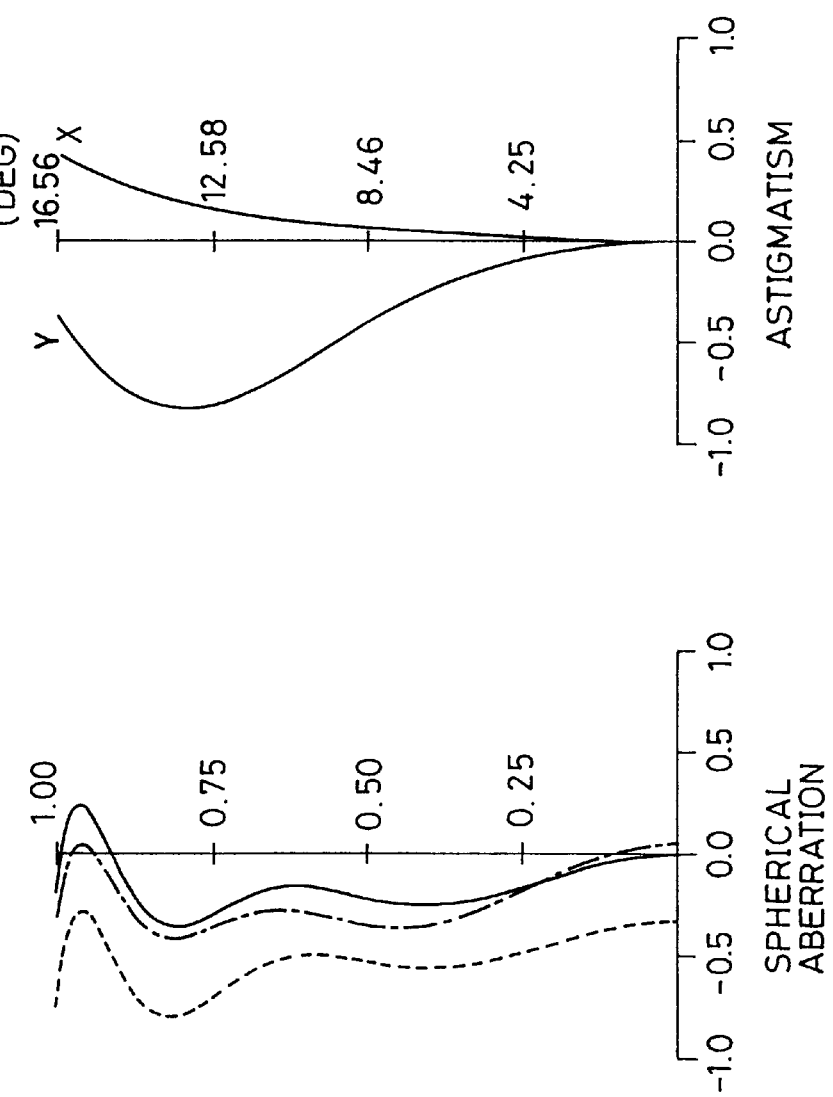

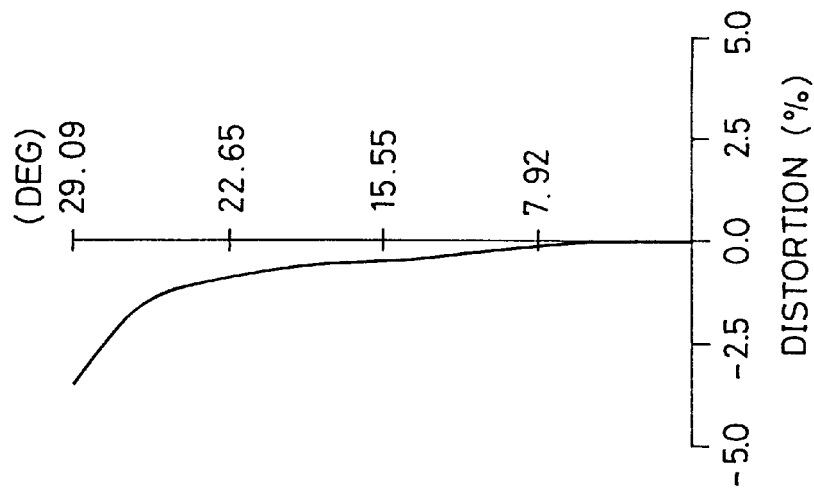
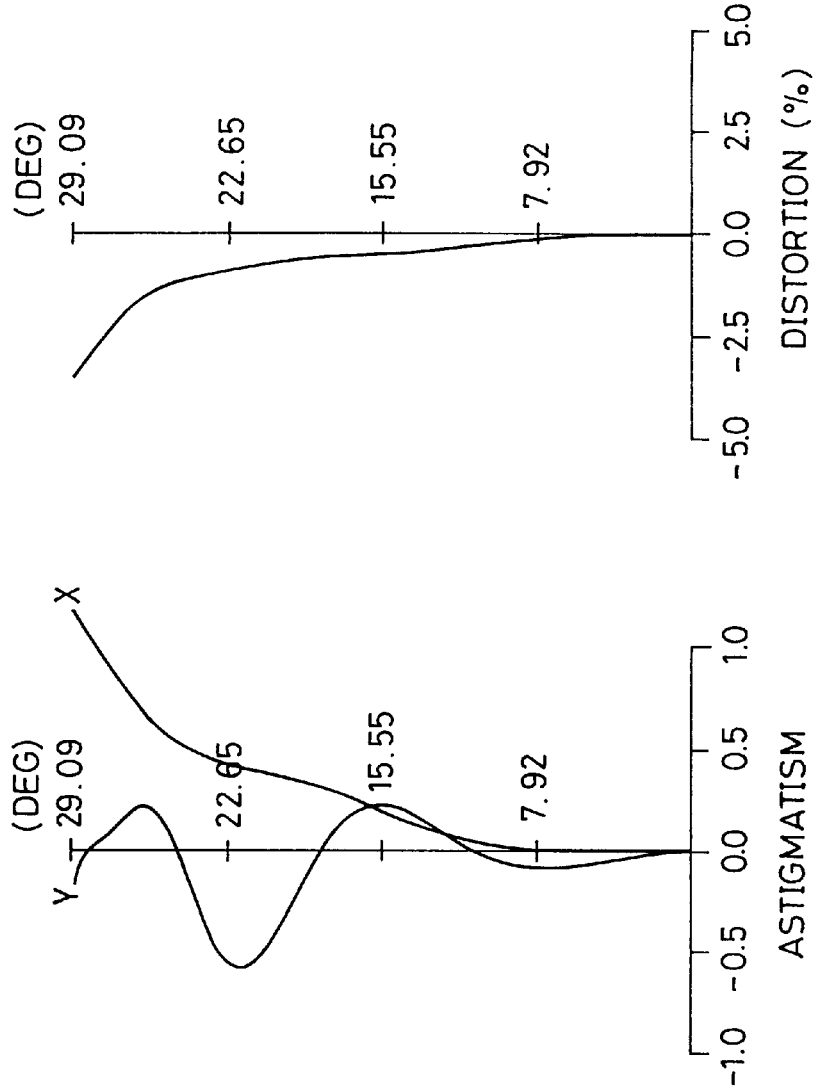
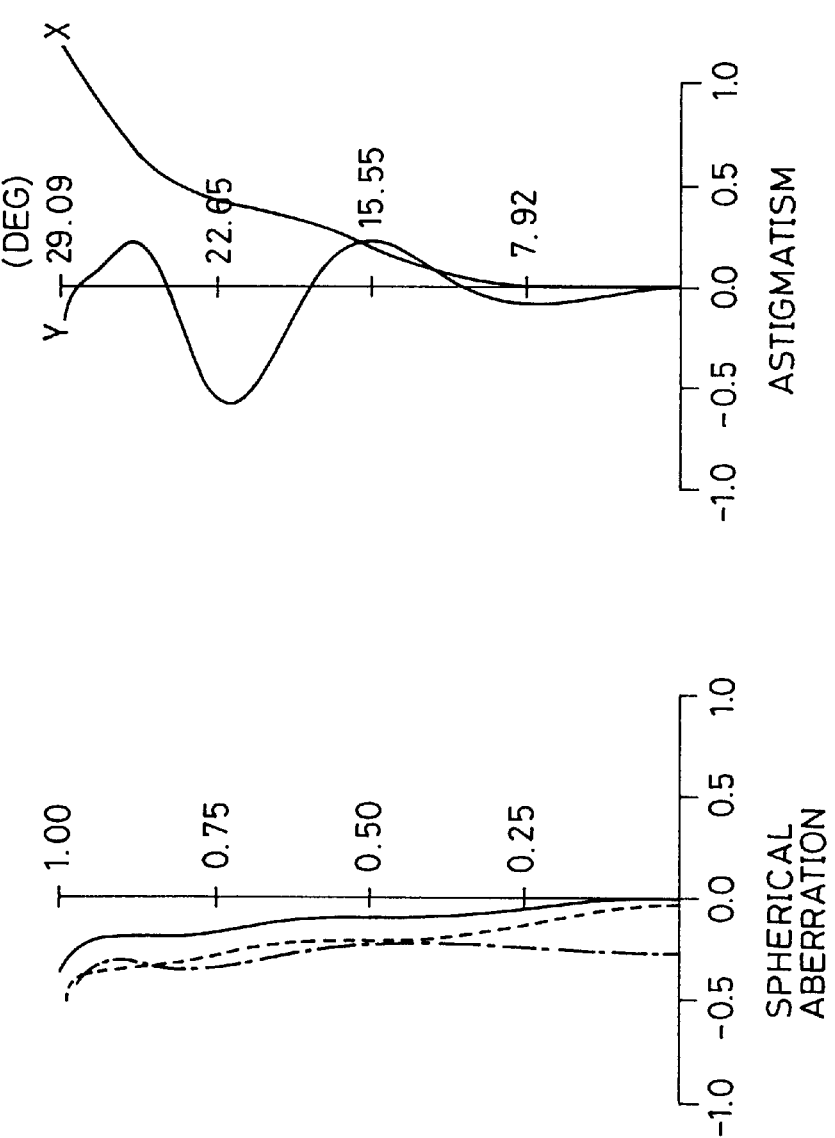

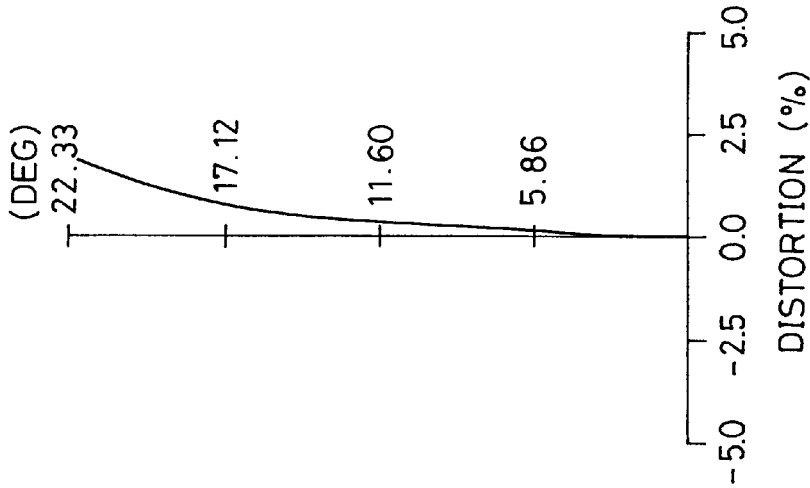
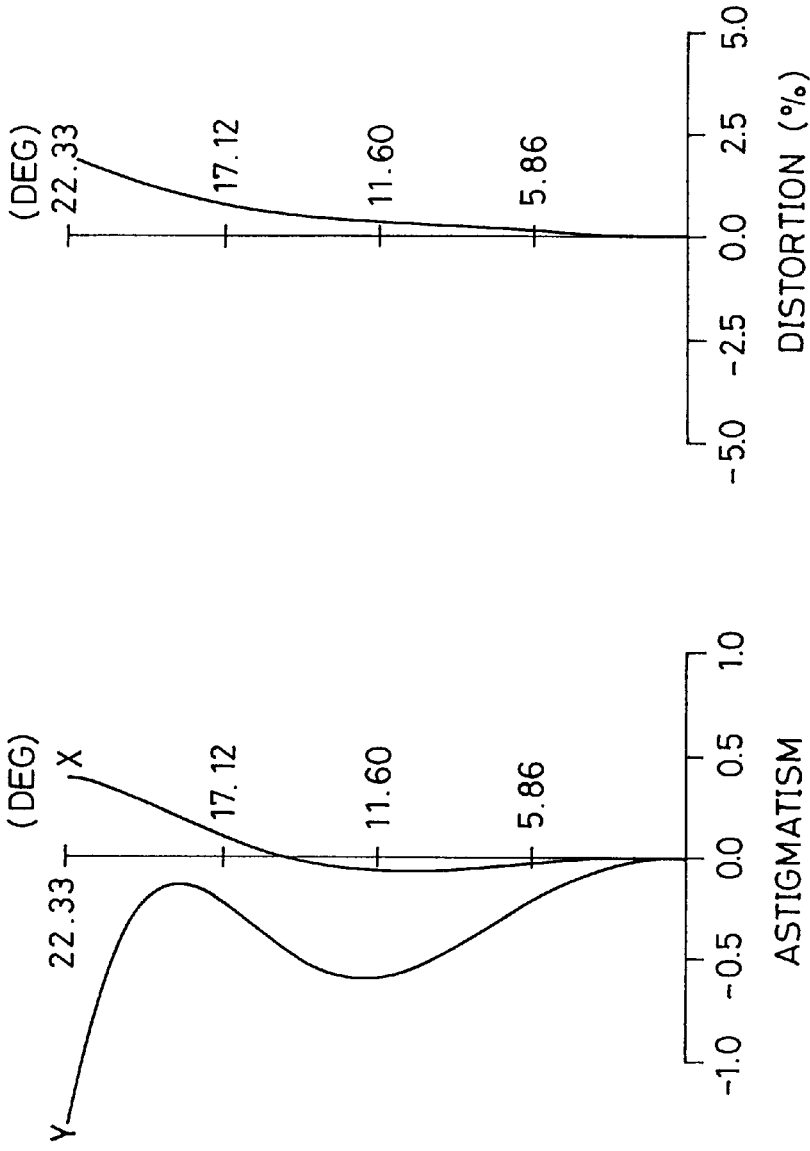
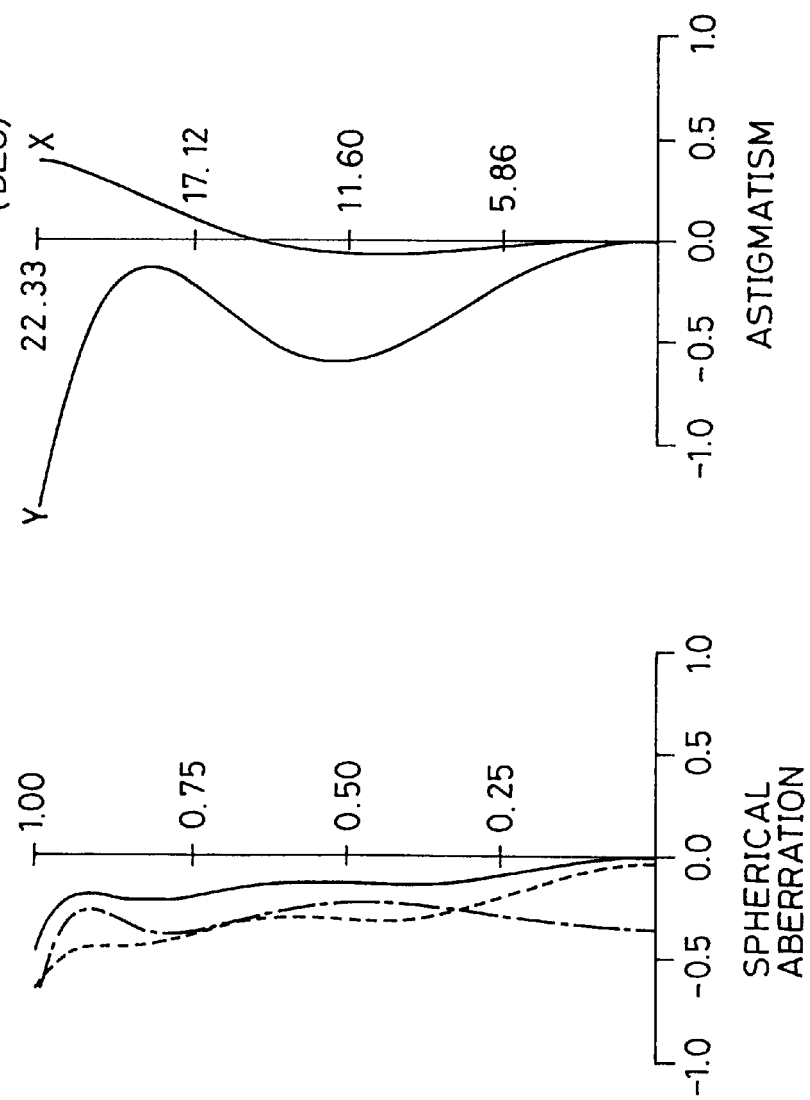

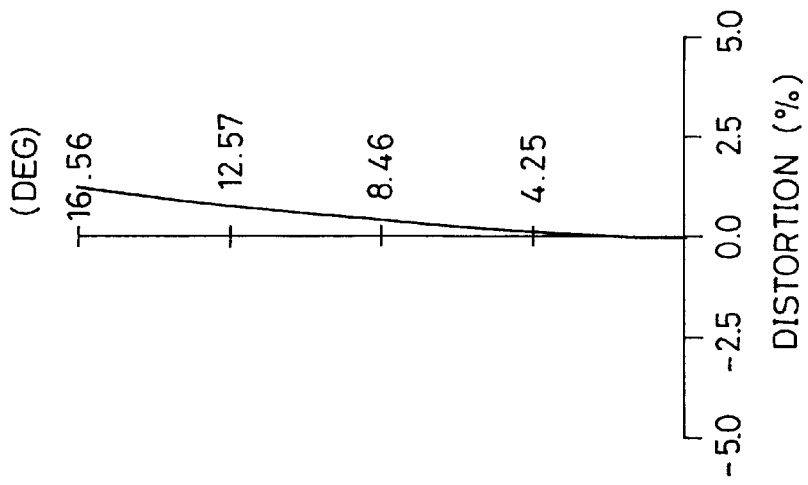
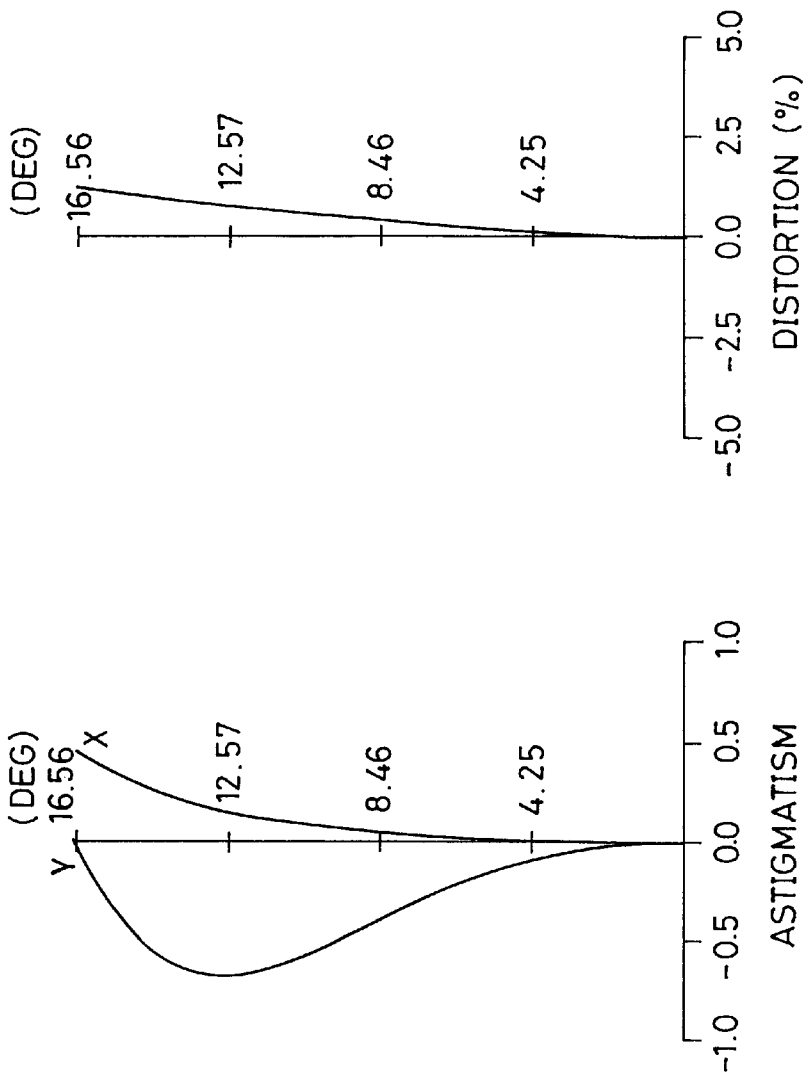
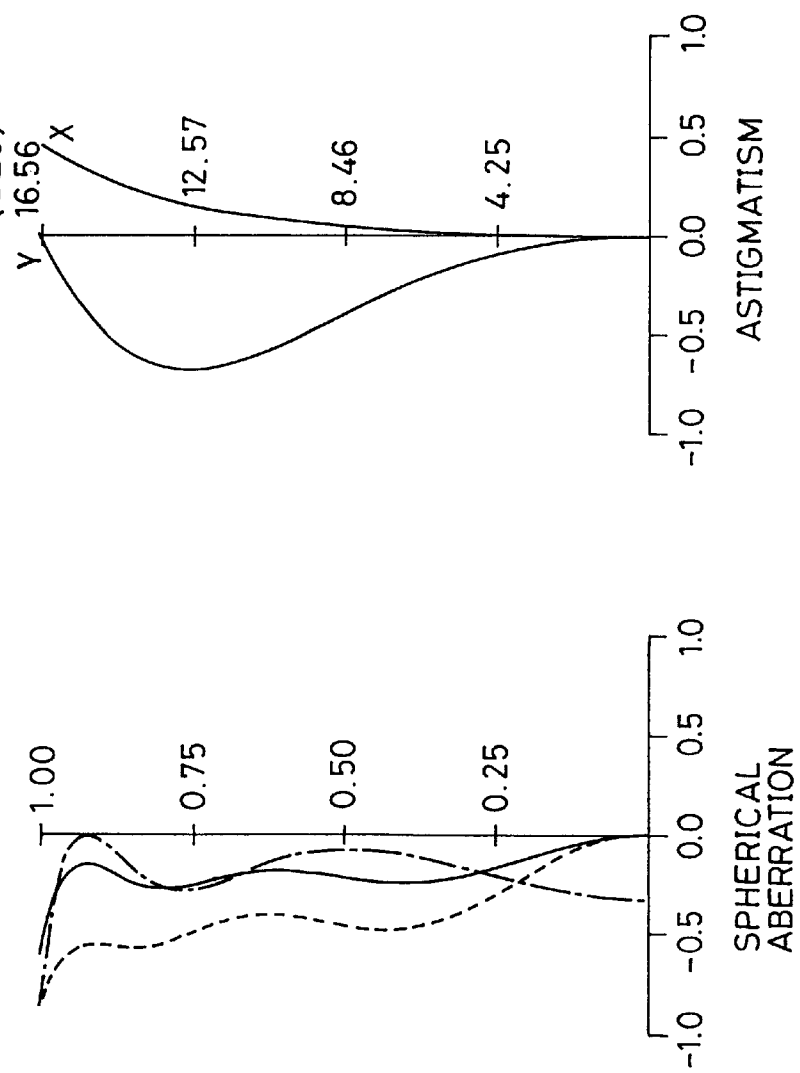

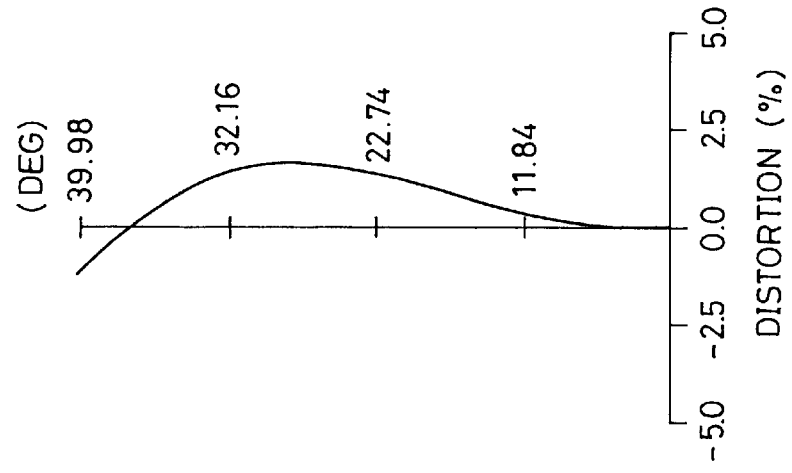
FIG. 34C
FIG. 34B
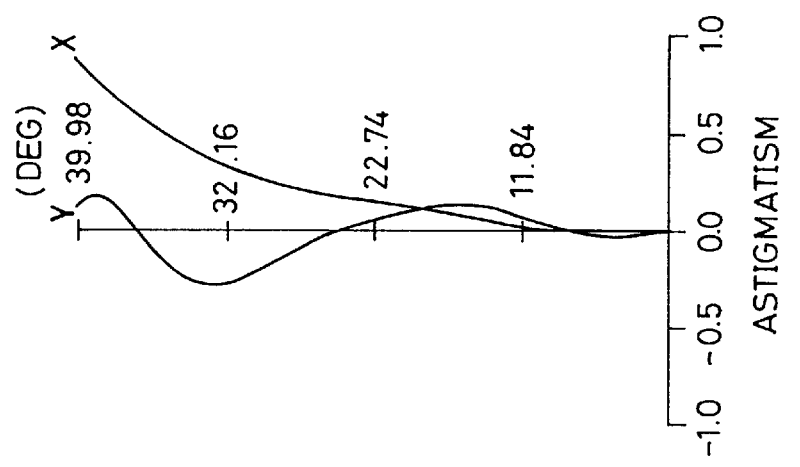
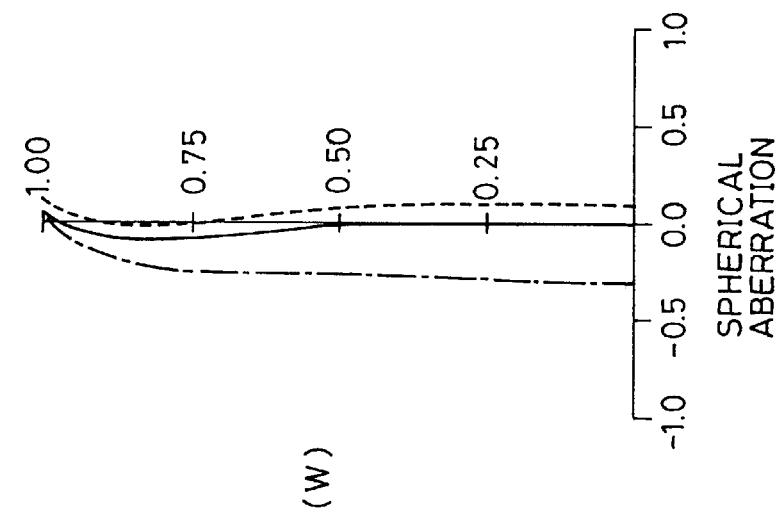
FIG. 34A

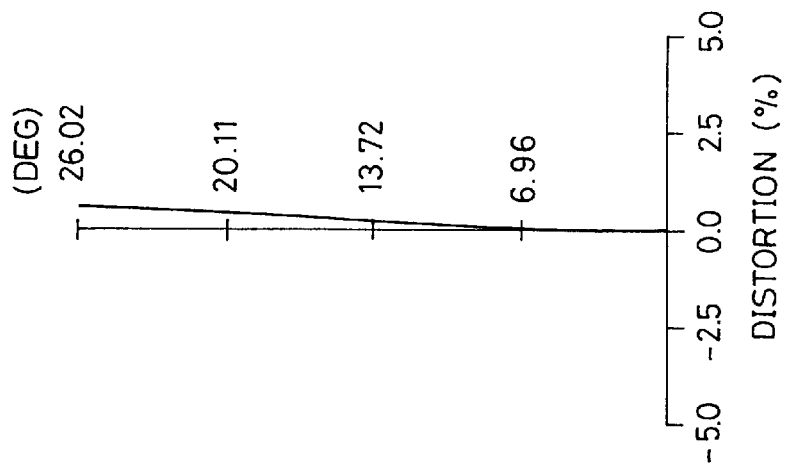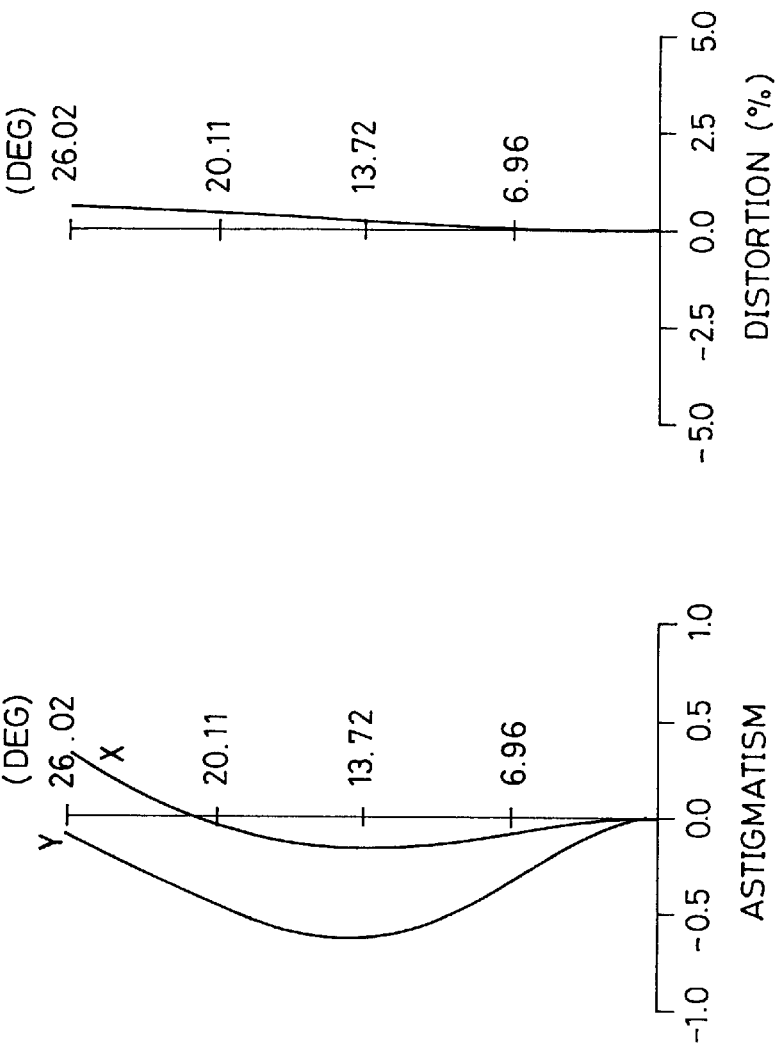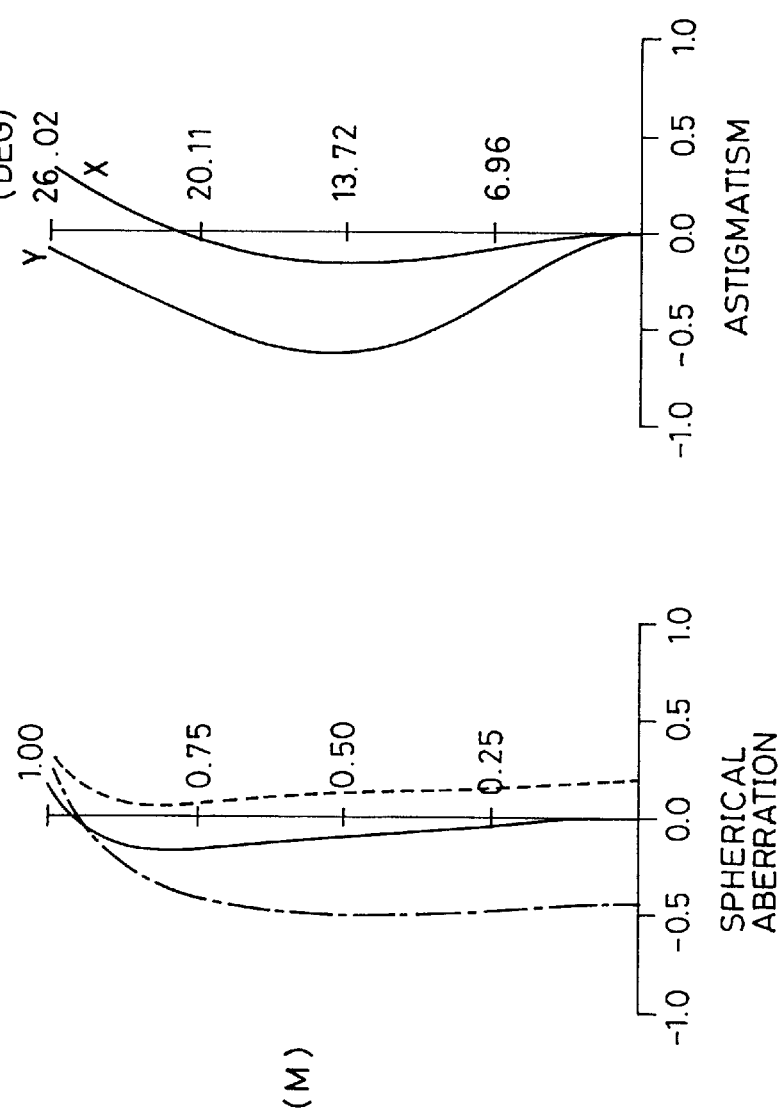

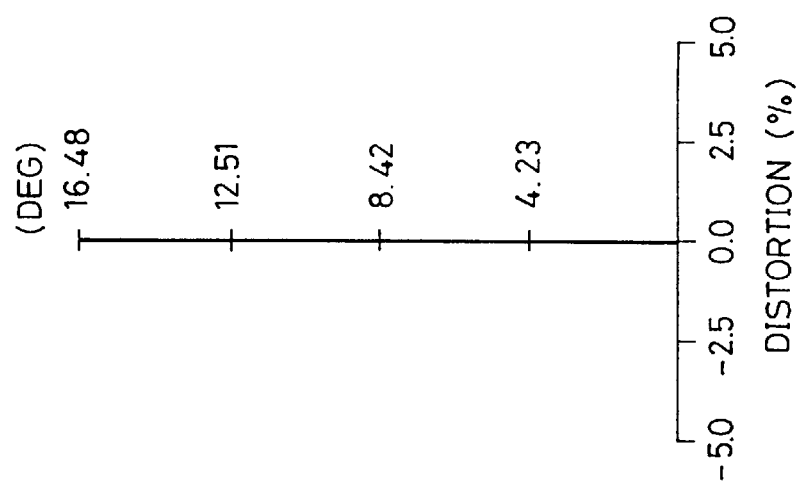
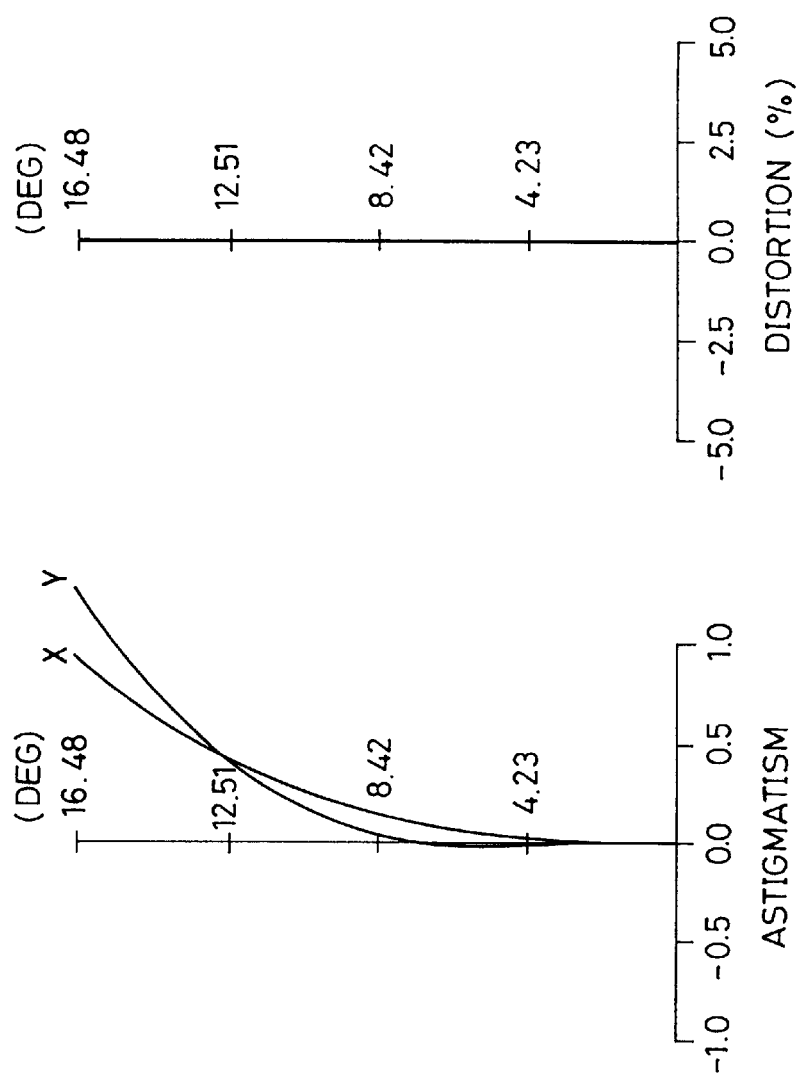
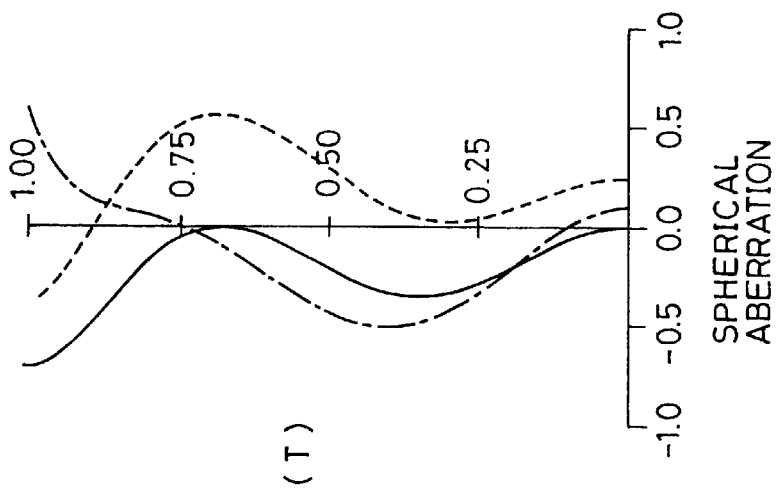

(W)

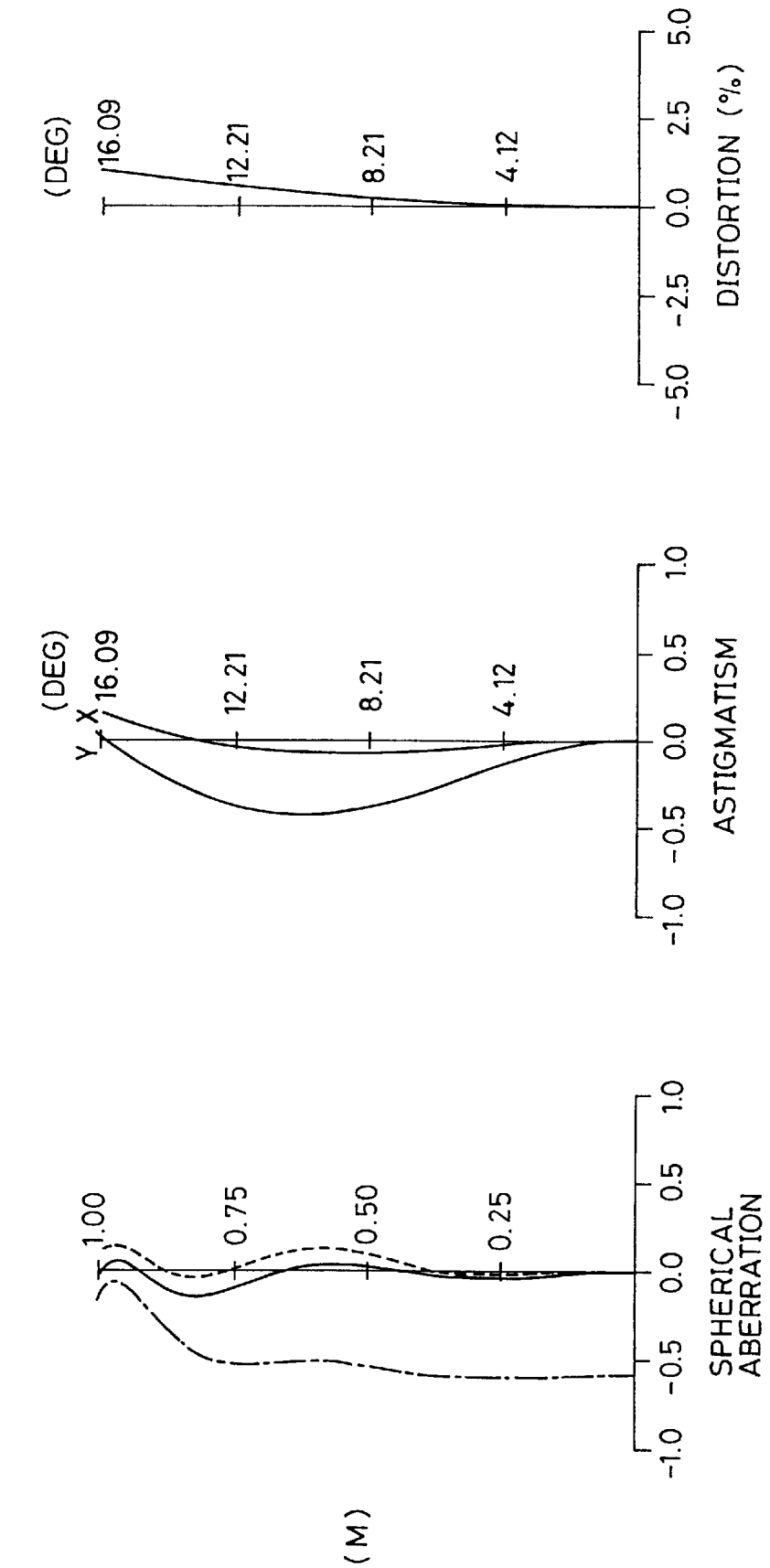

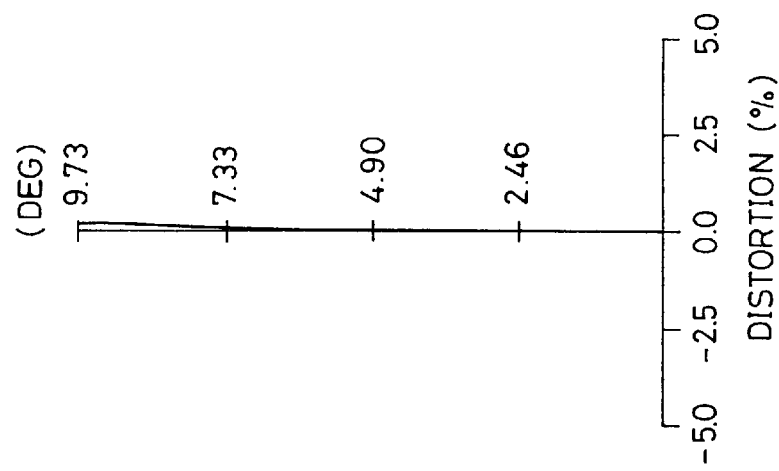
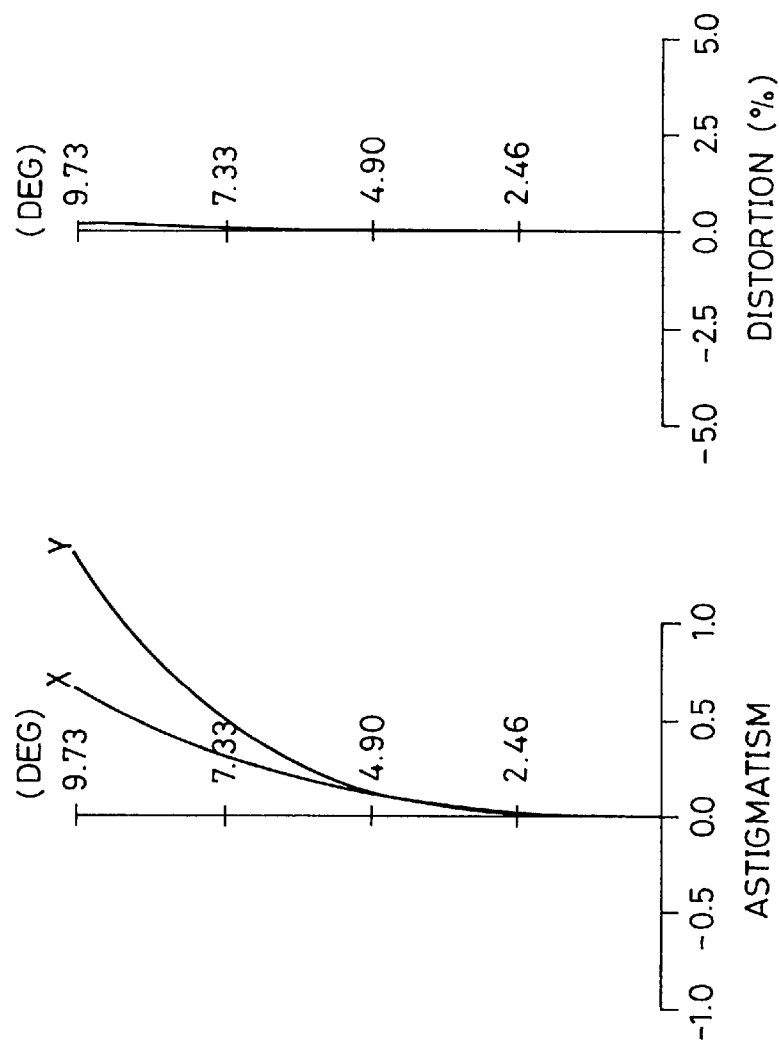
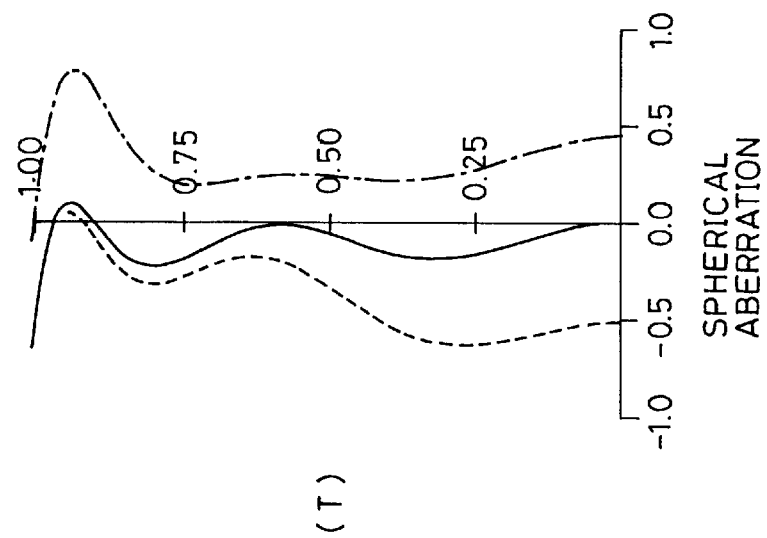

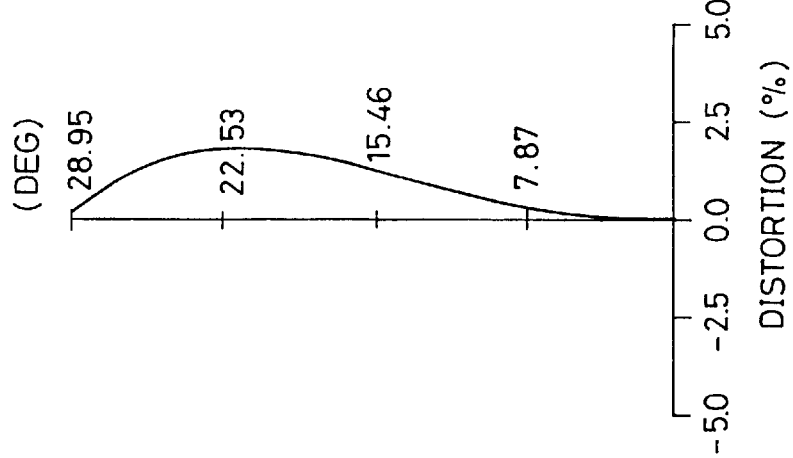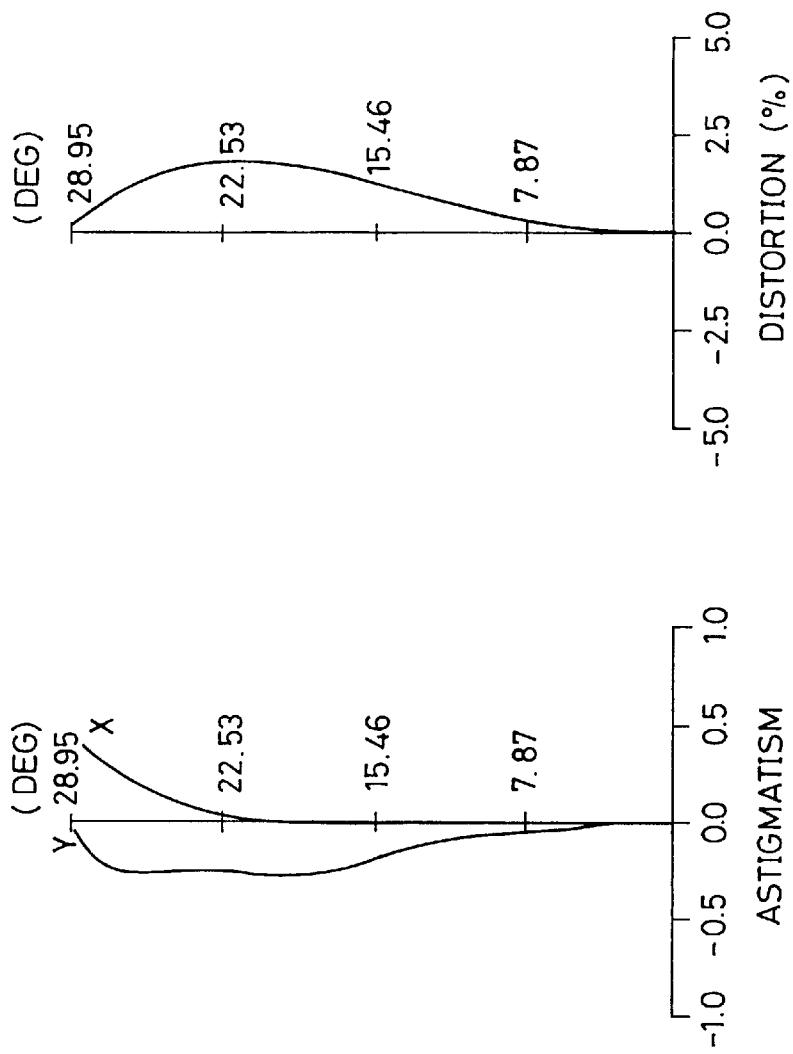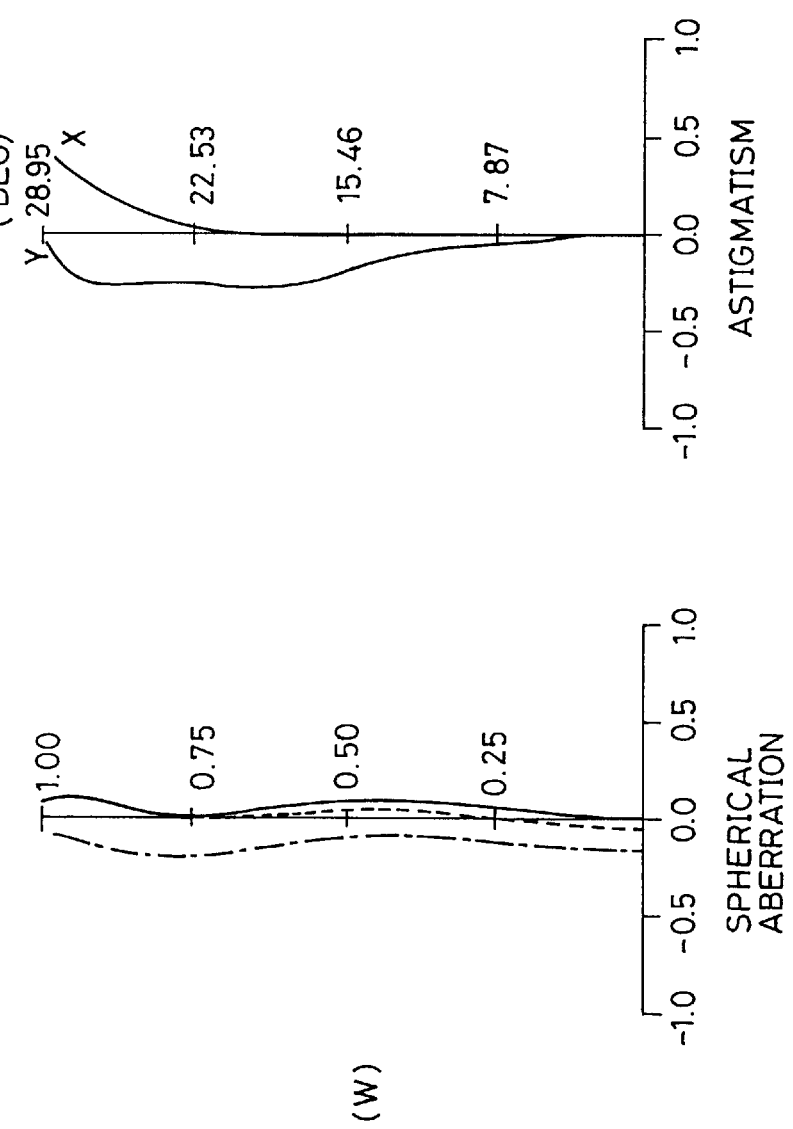

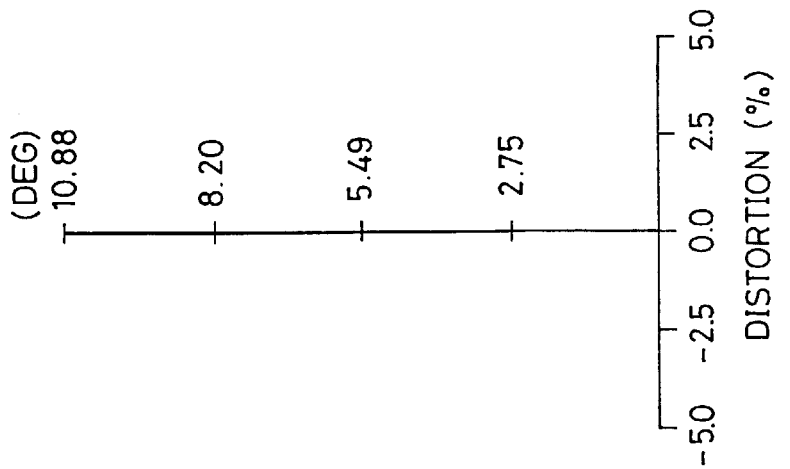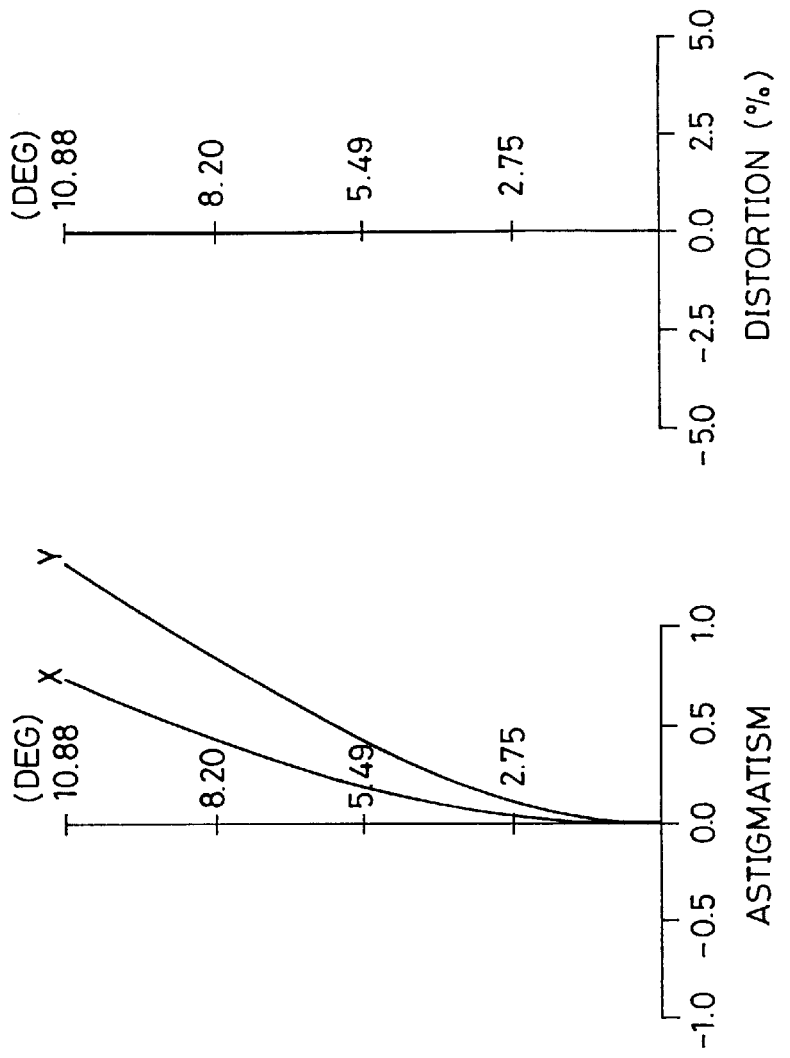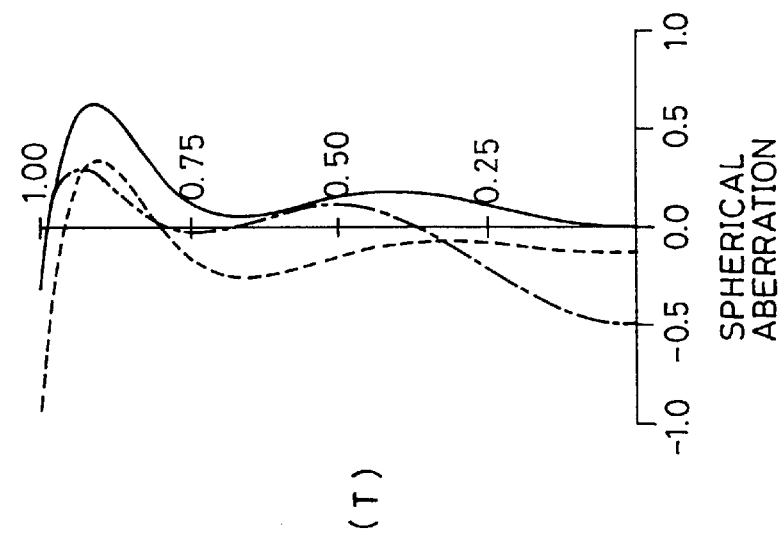

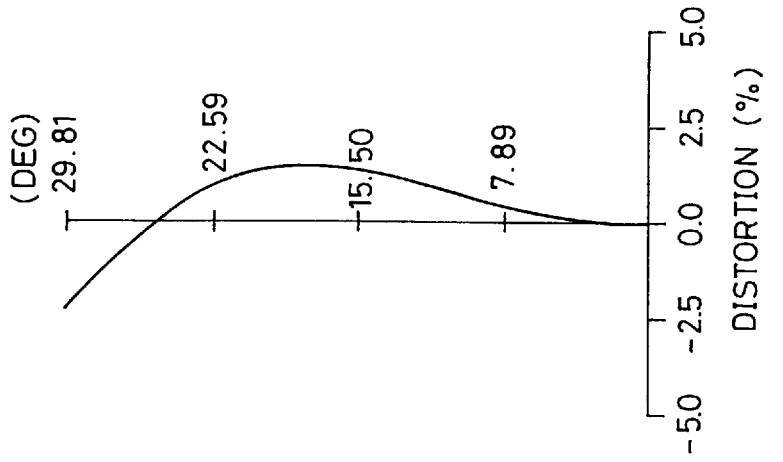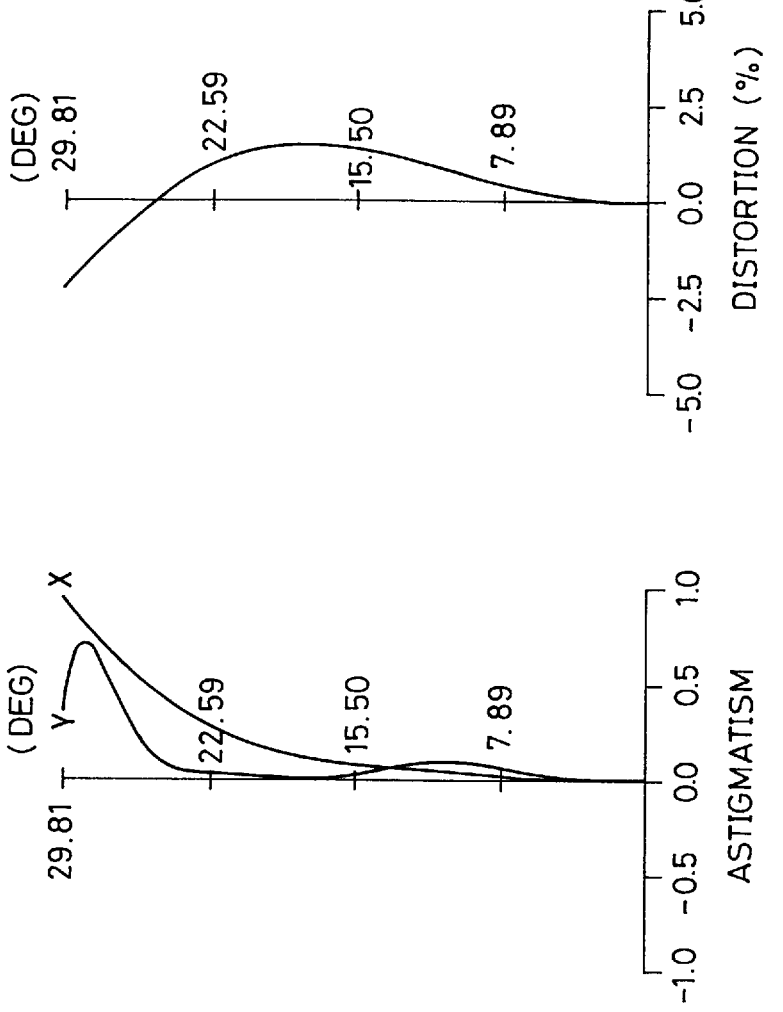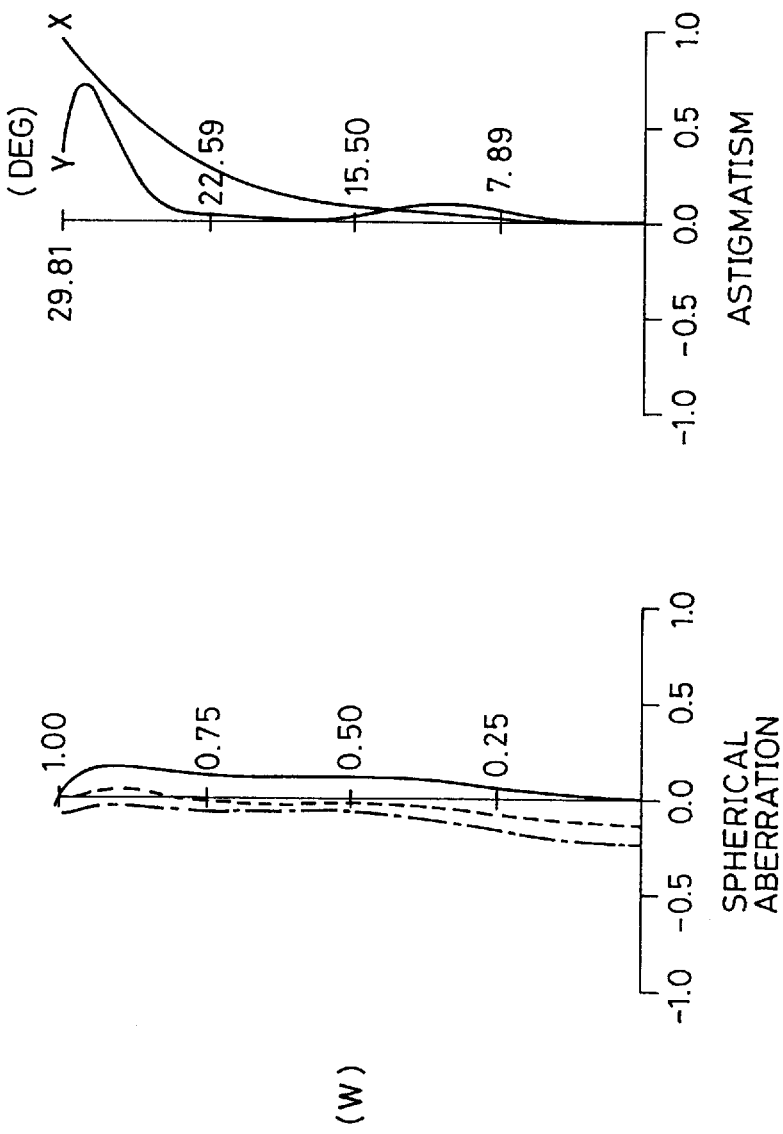

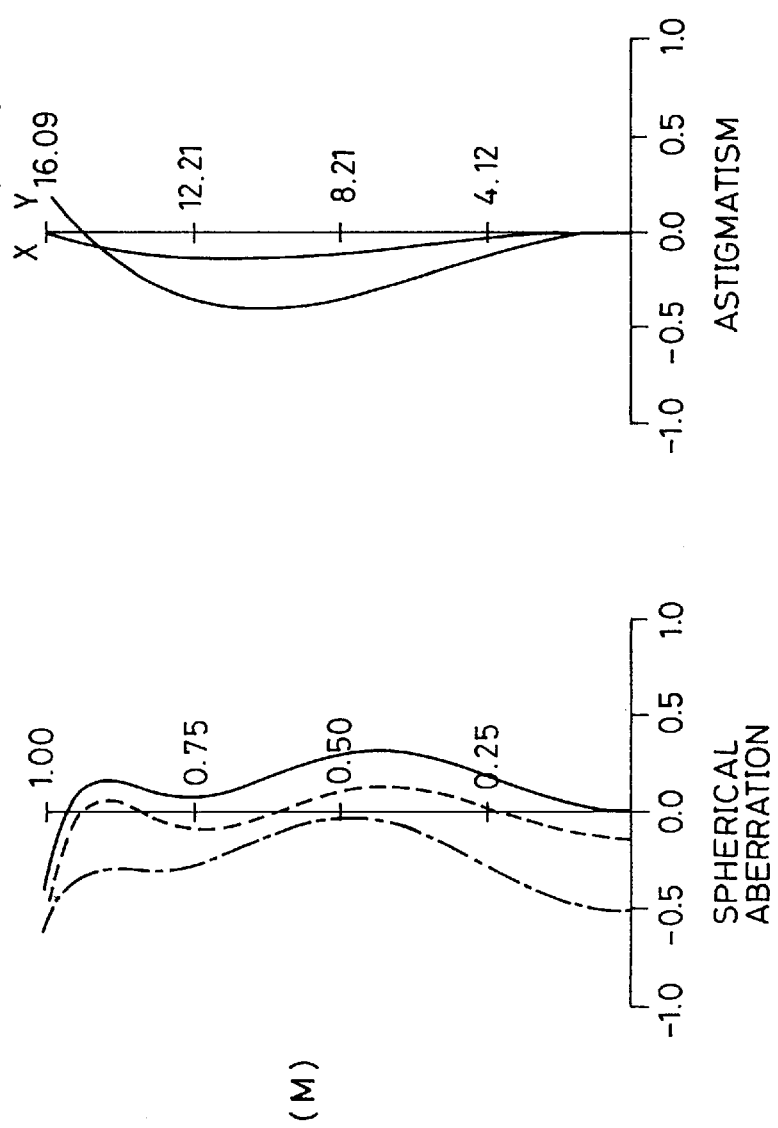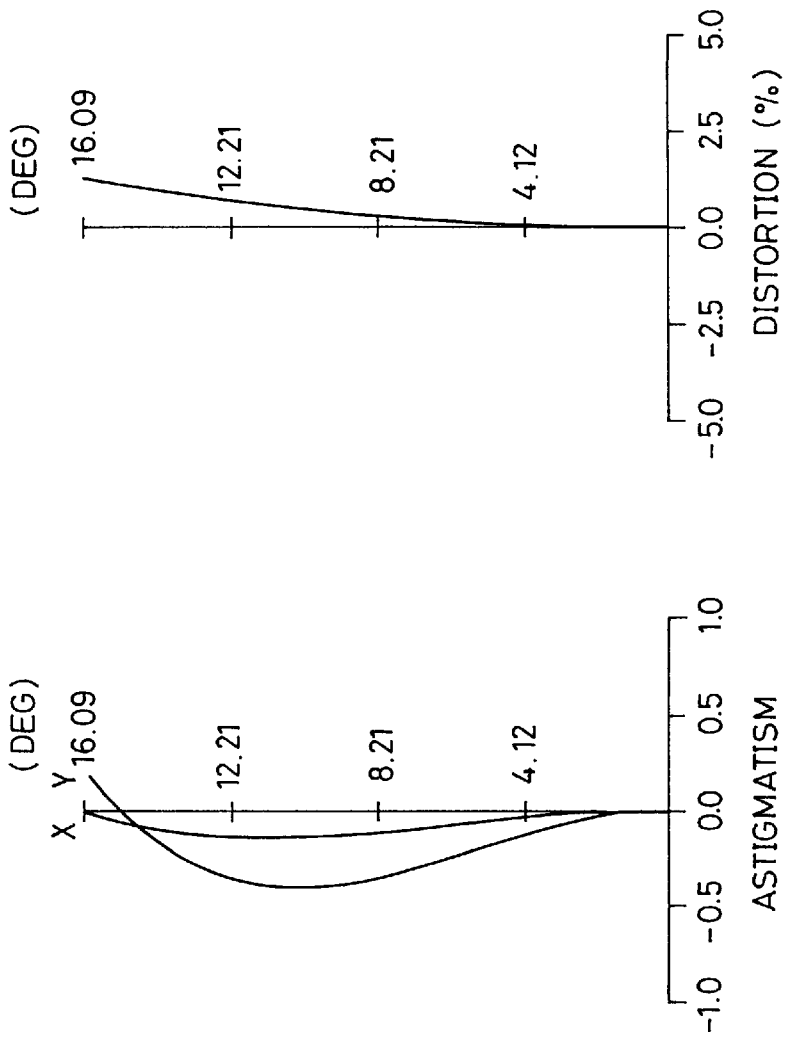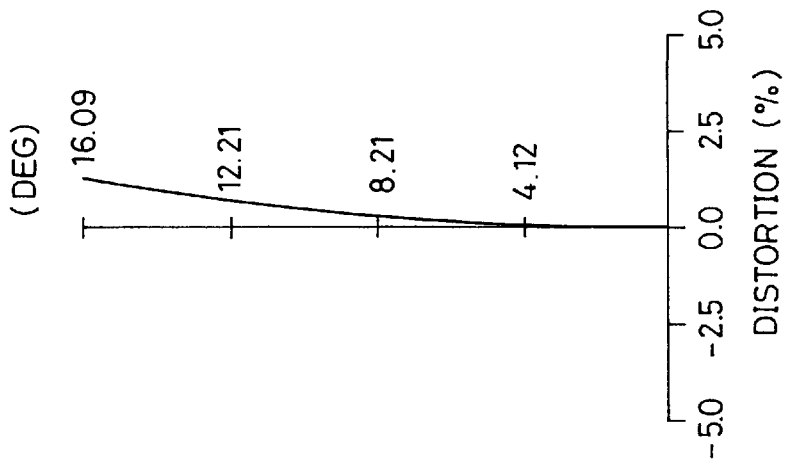

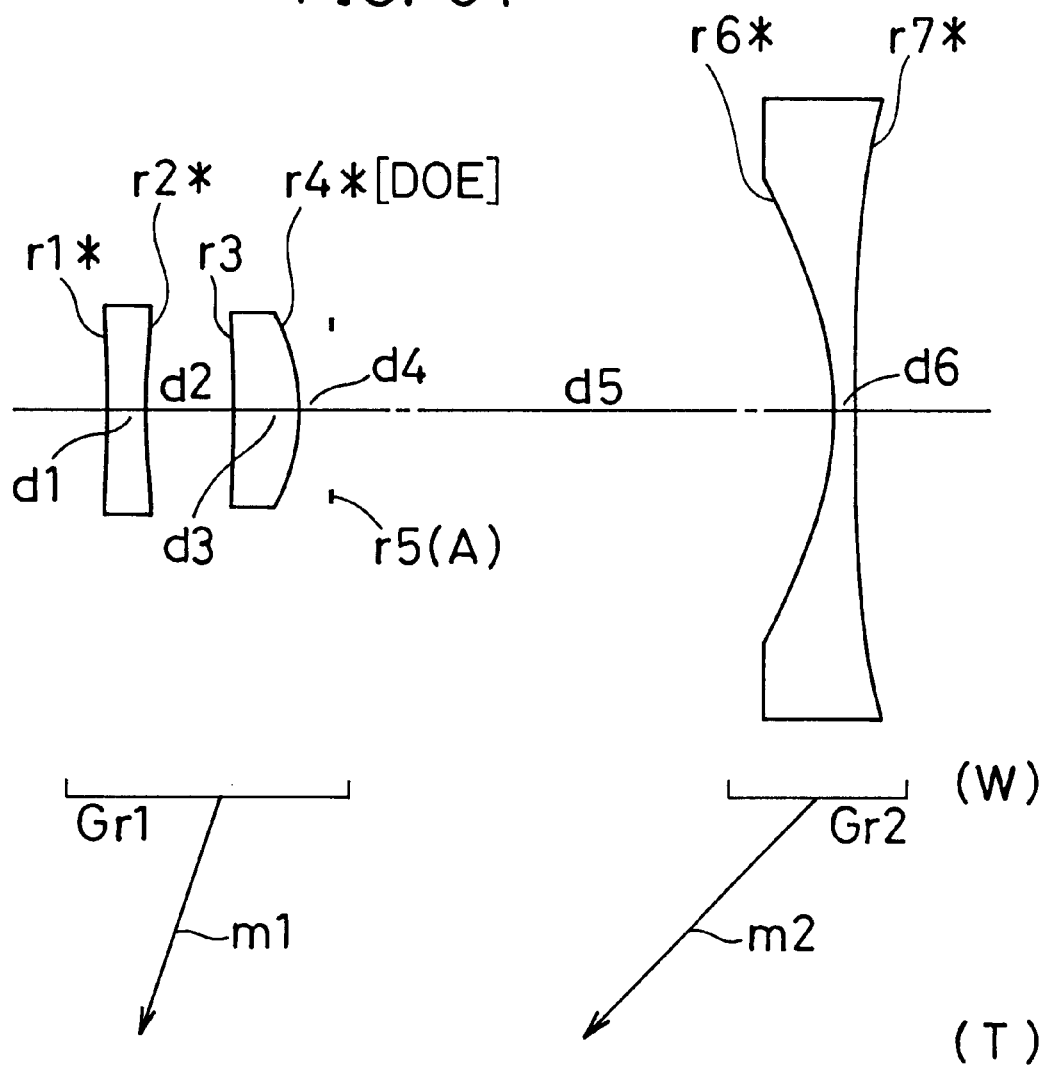

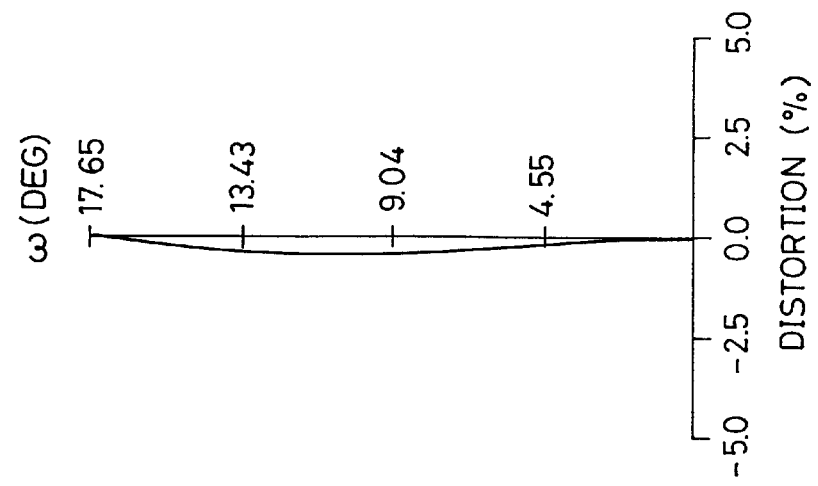
FIG. 57C
FIG. 57B
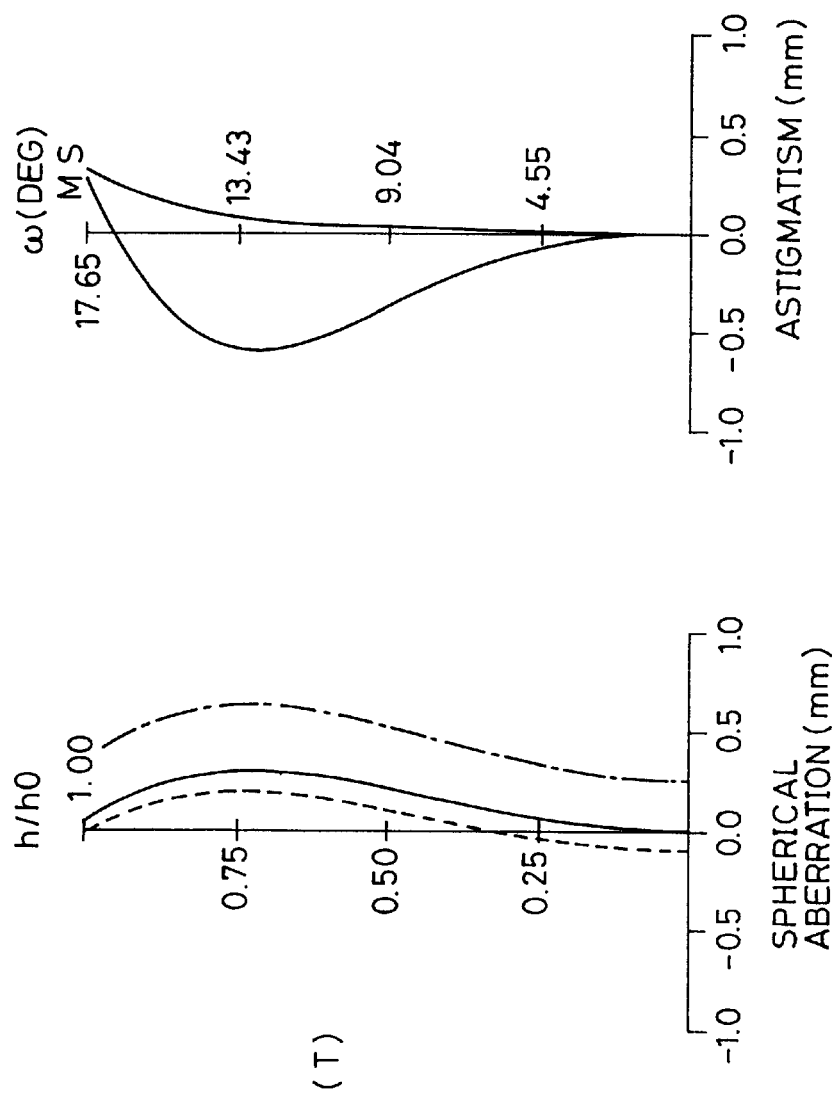
FIG. 57A

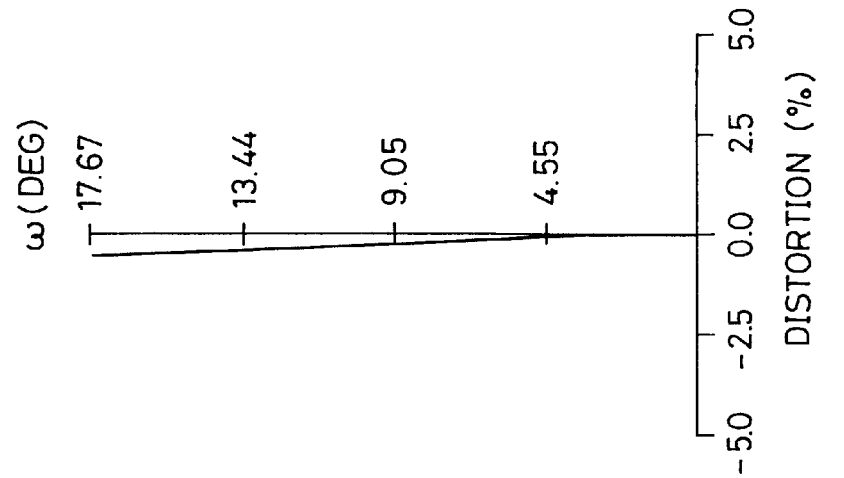
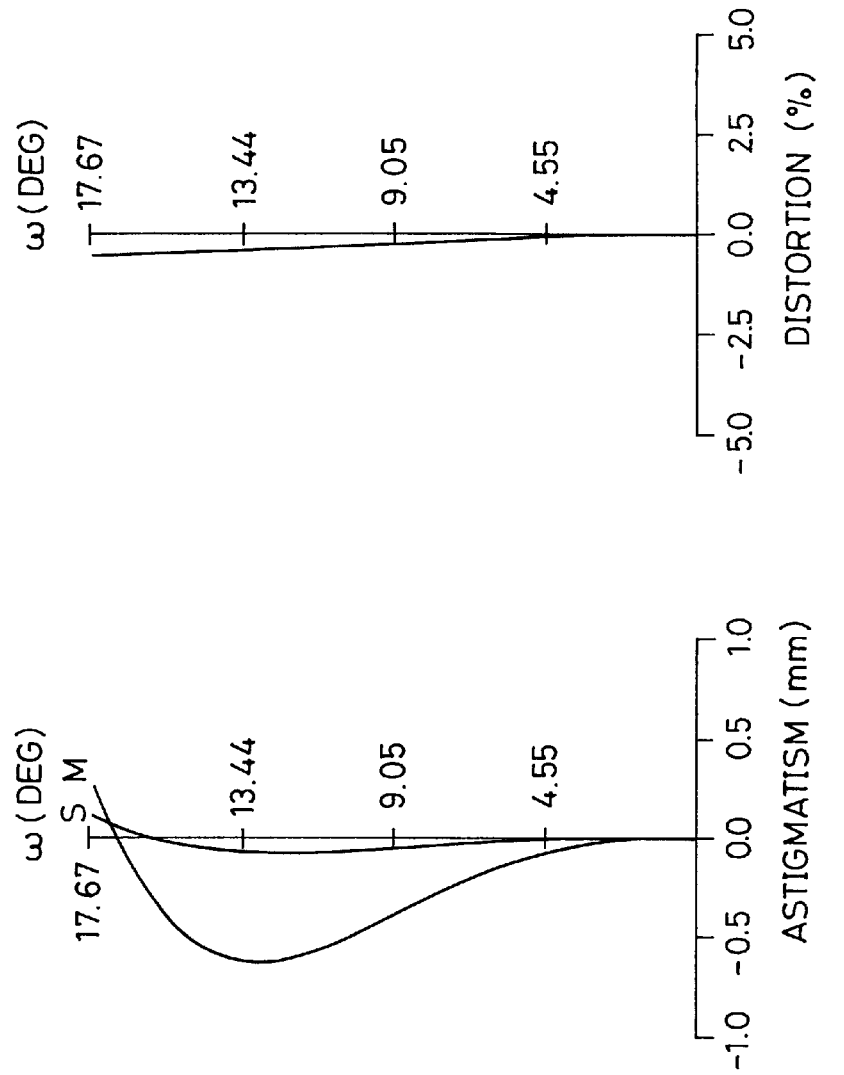
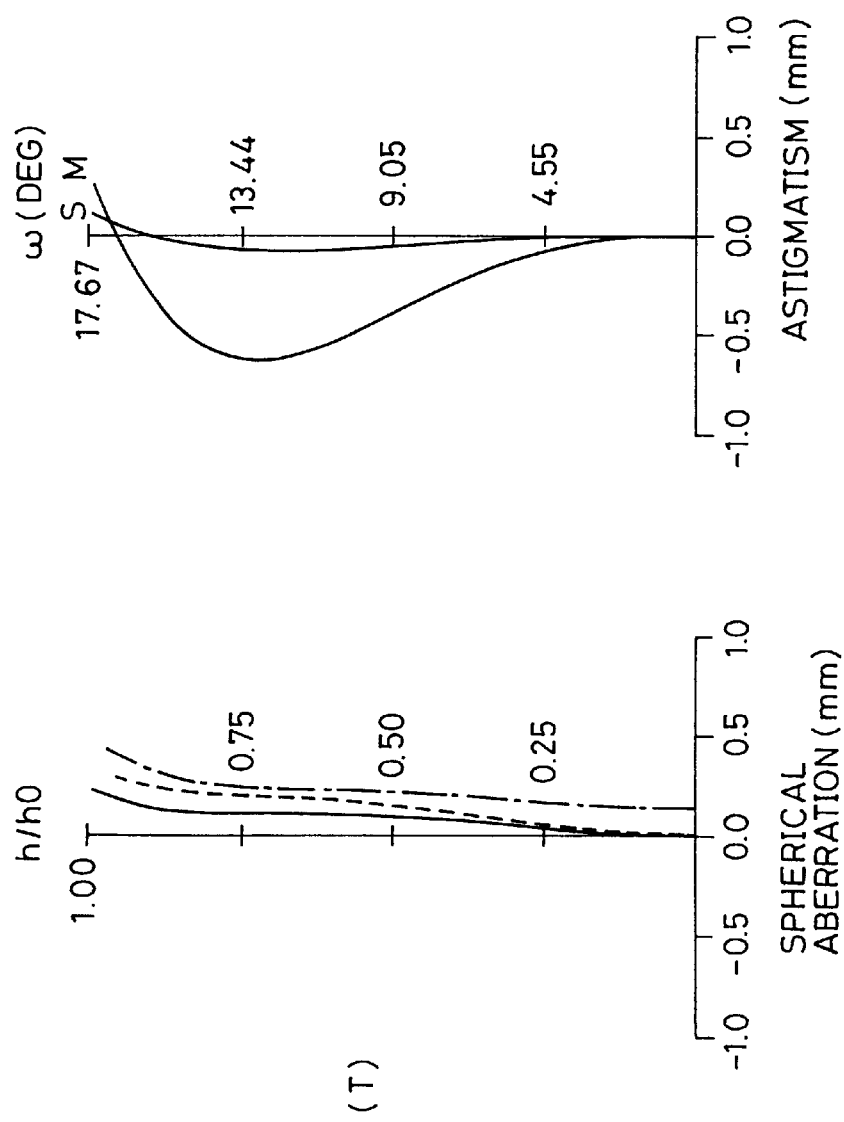

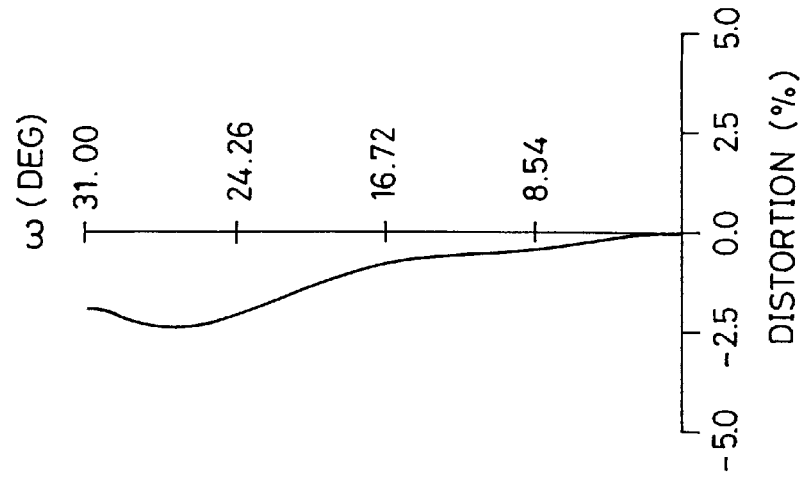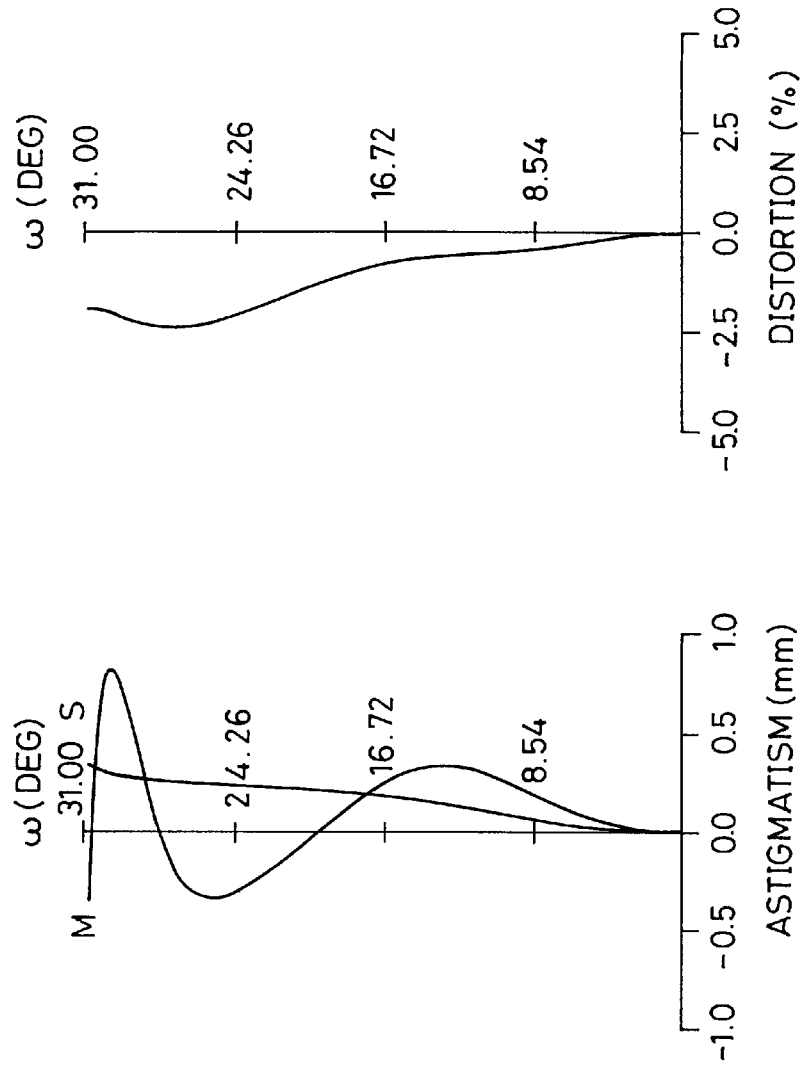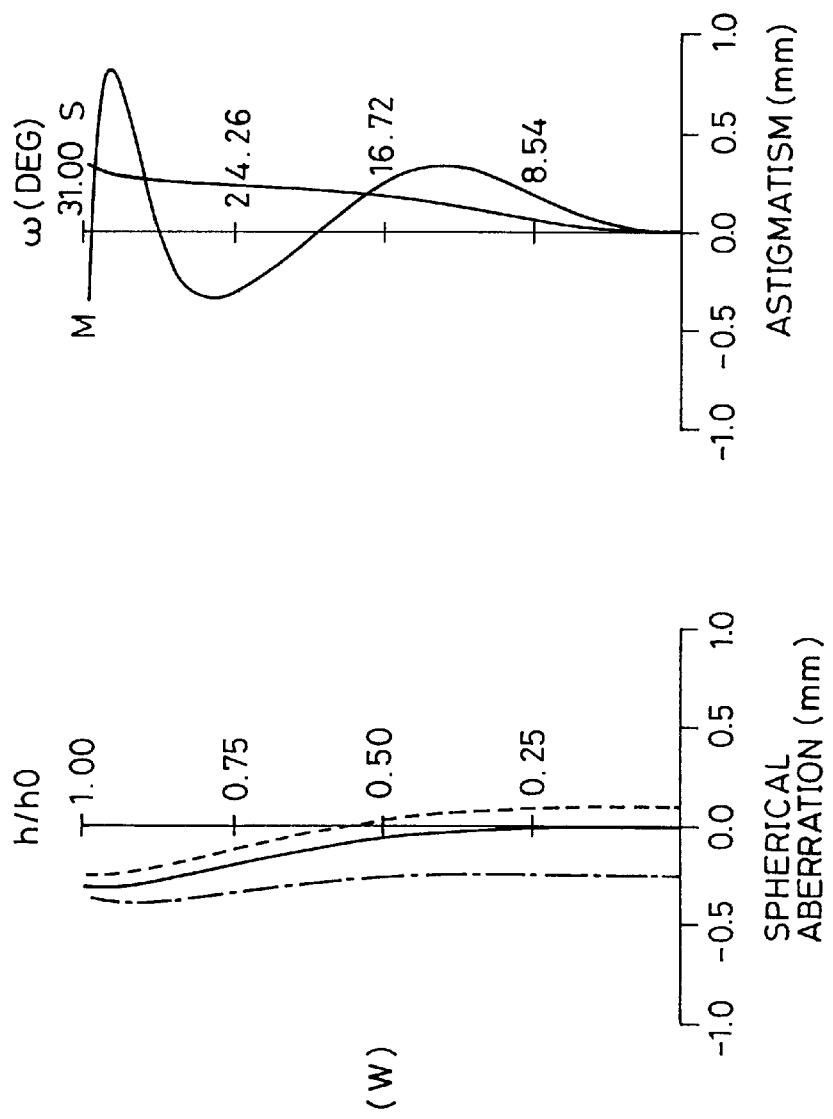

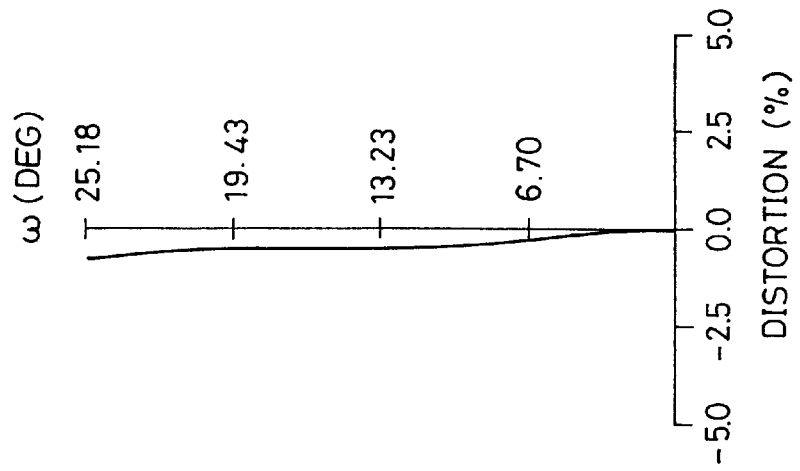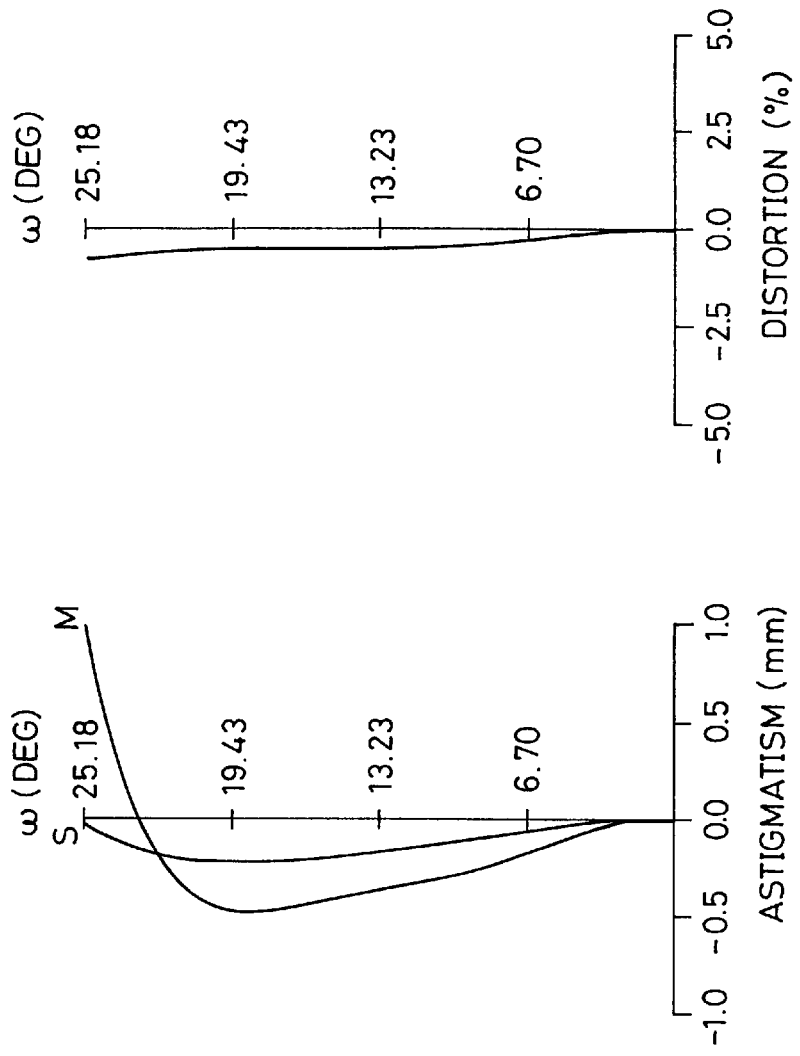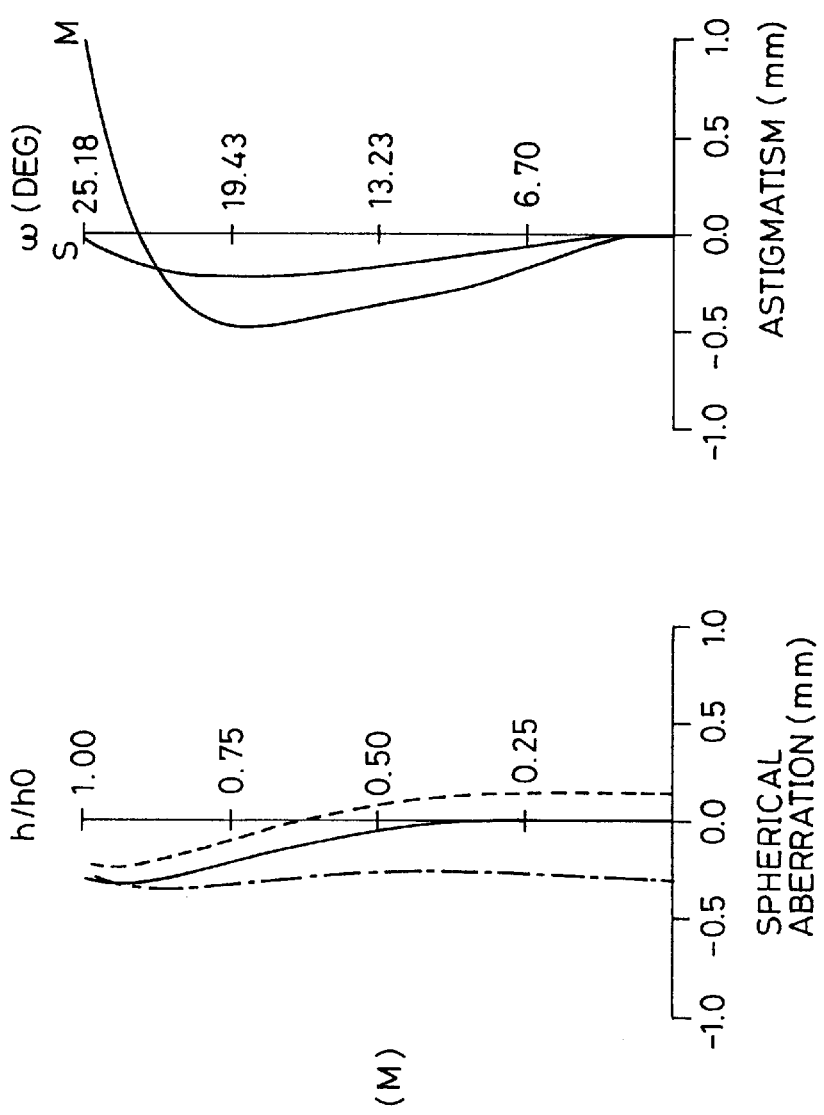

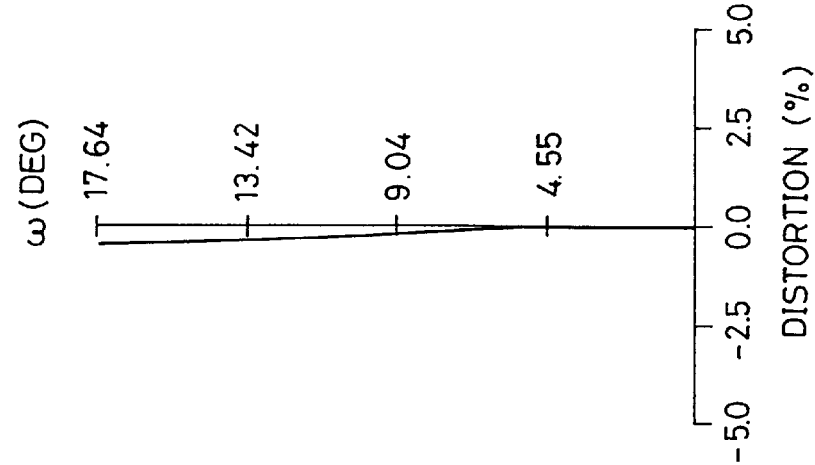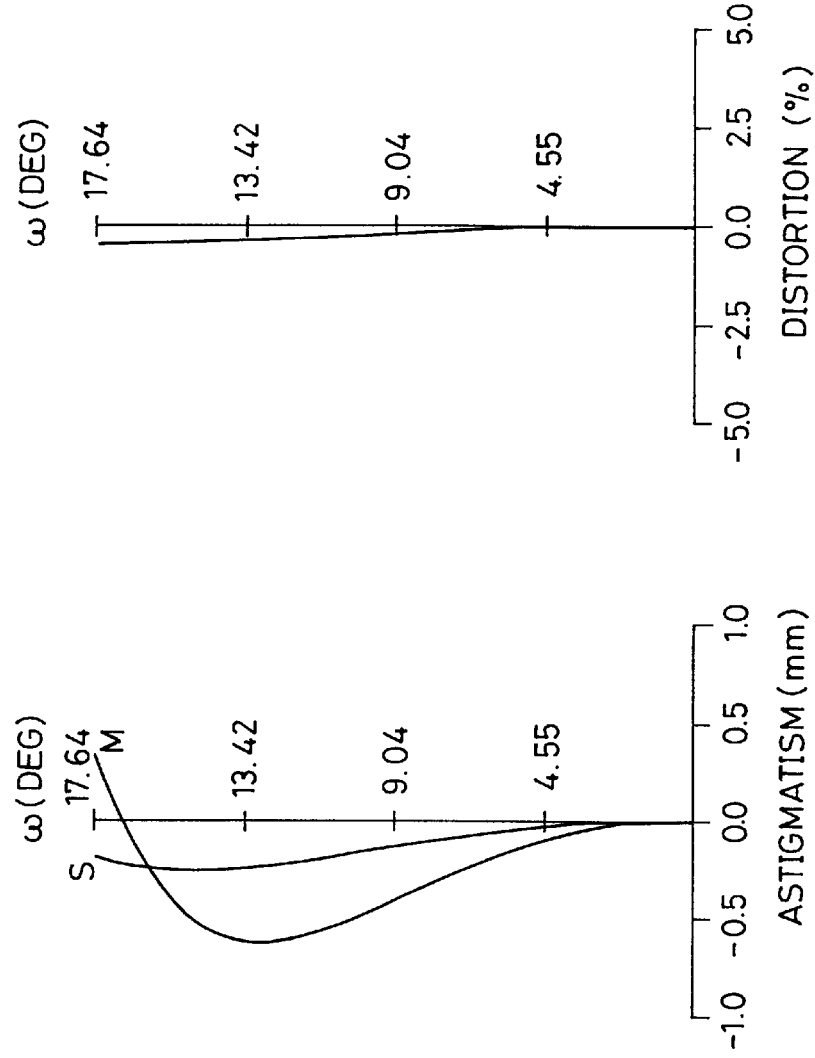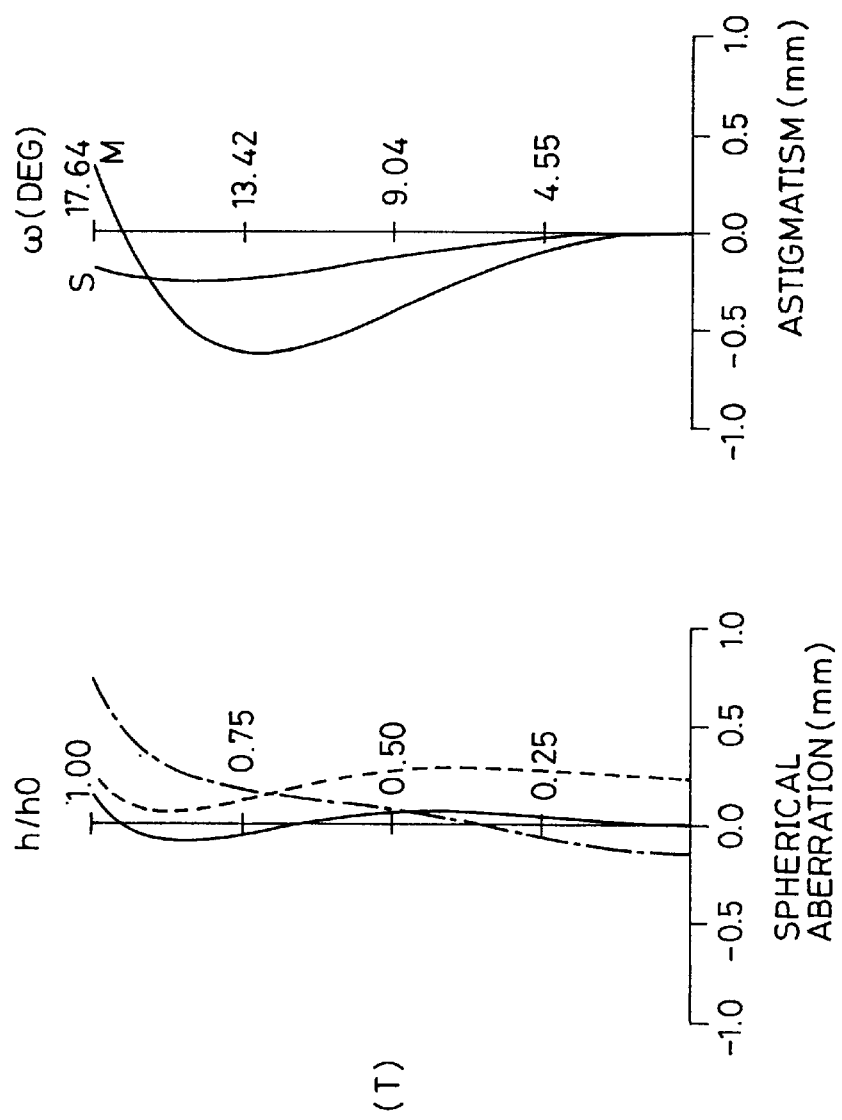

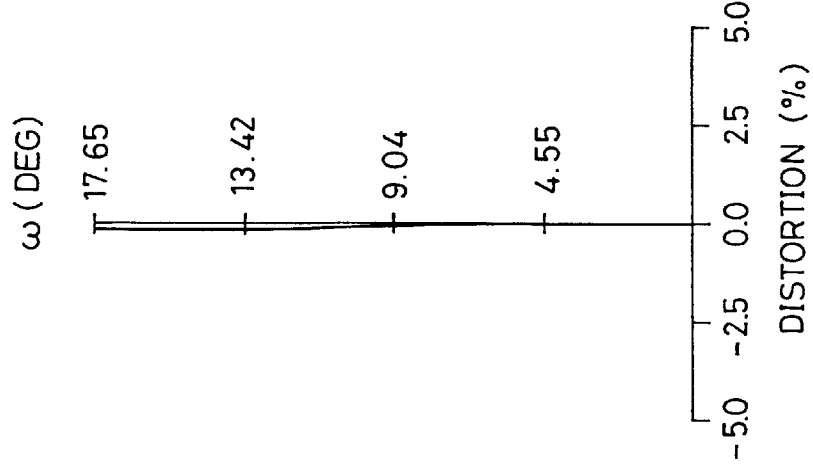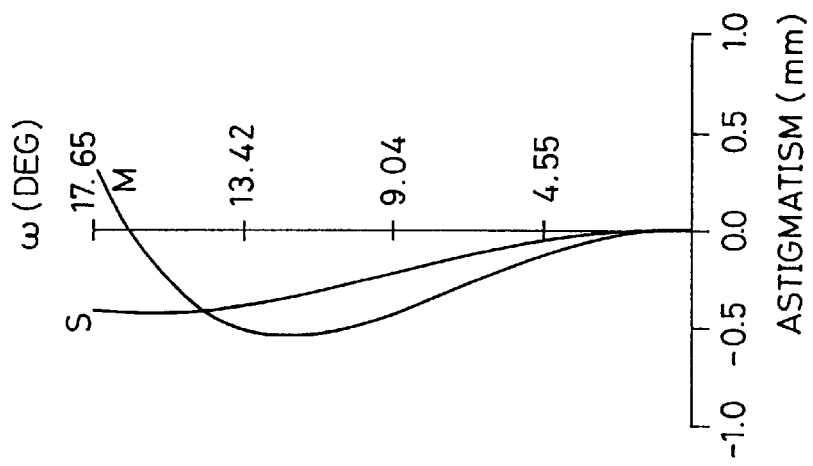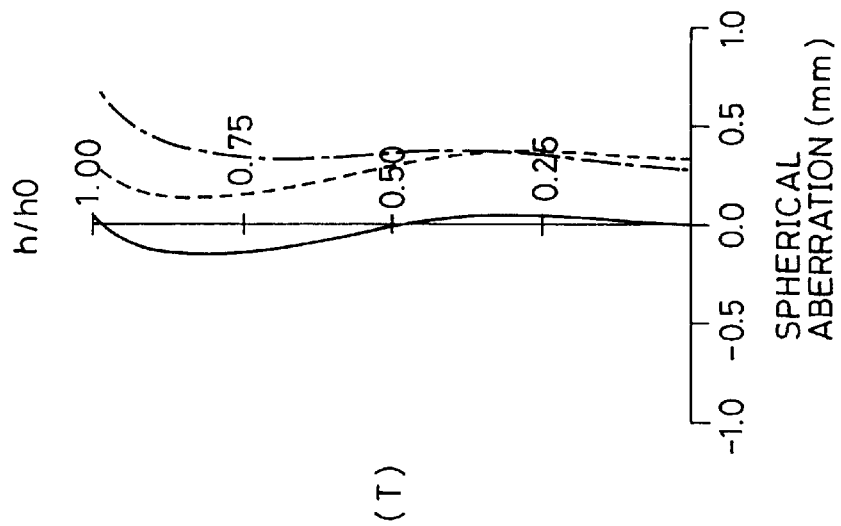

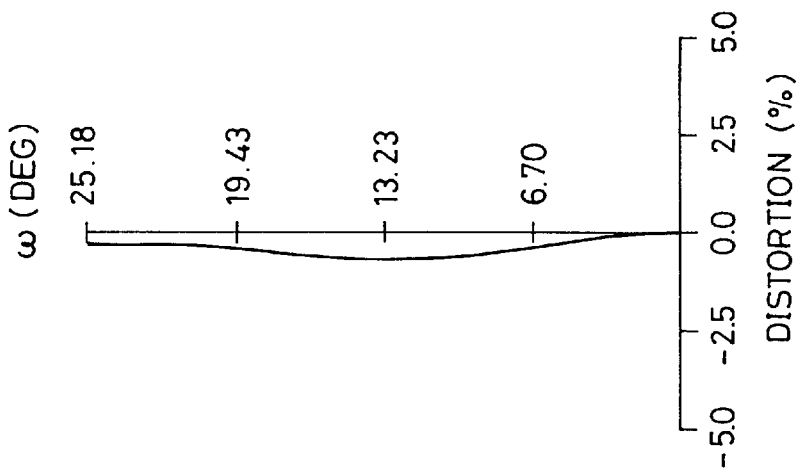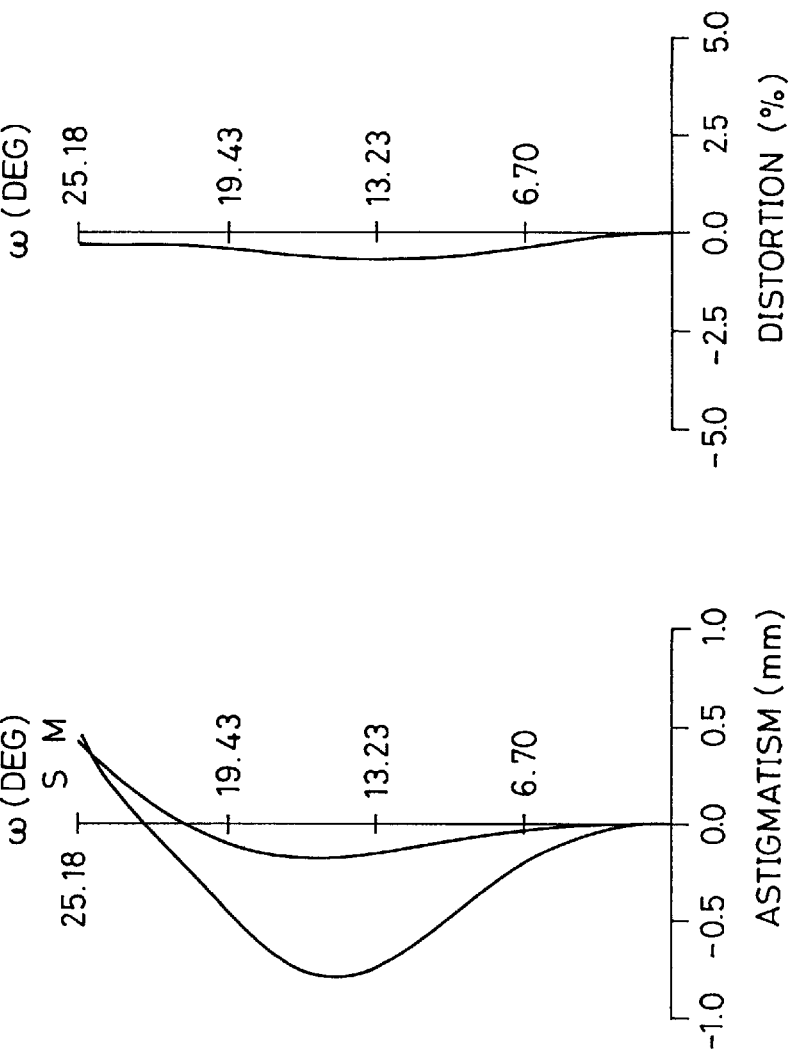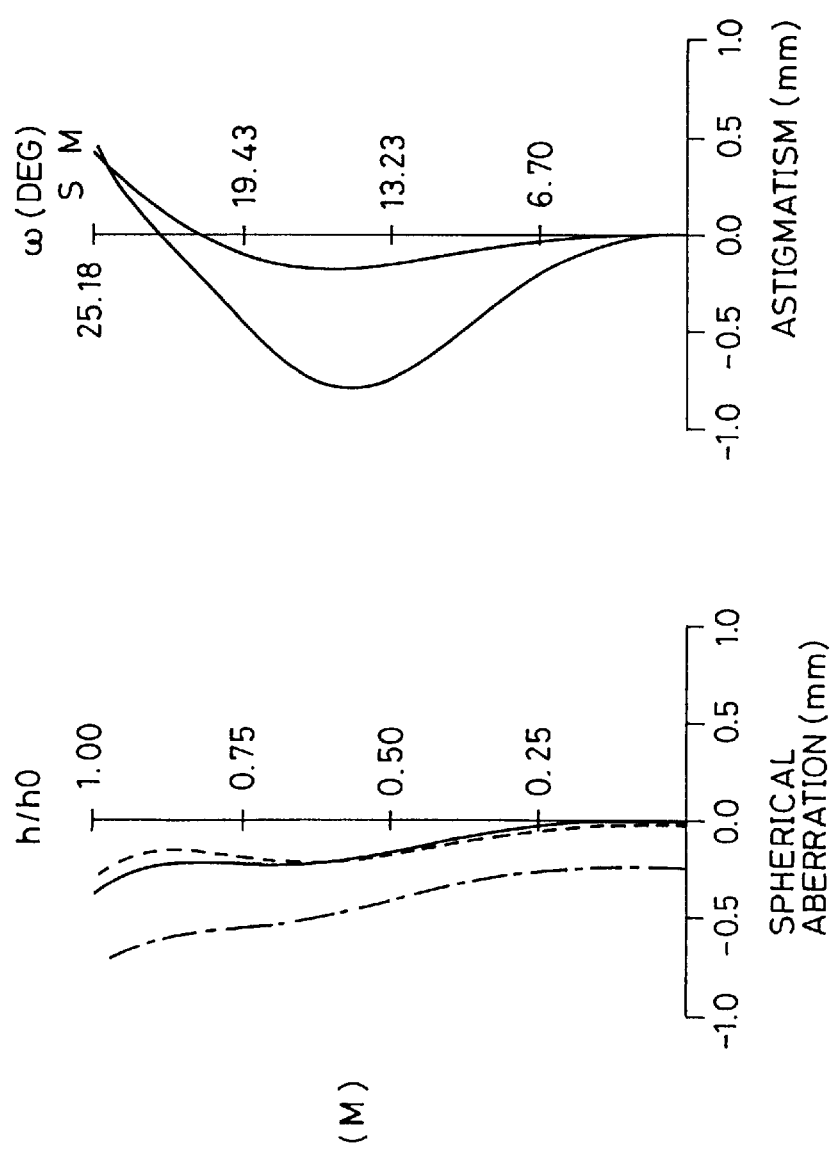

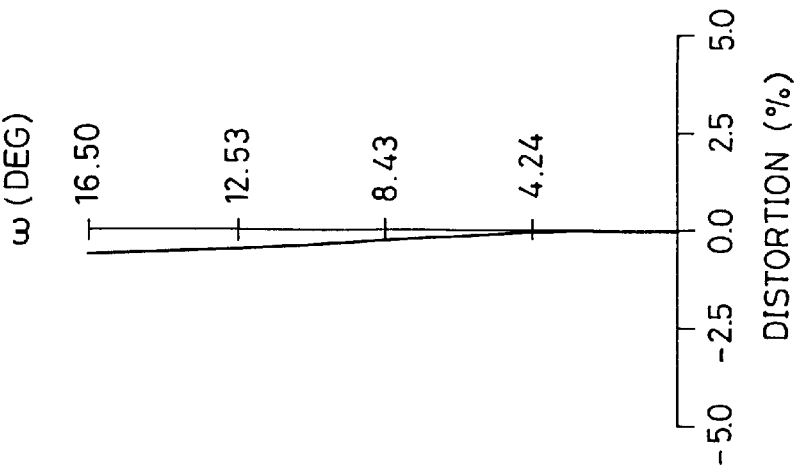
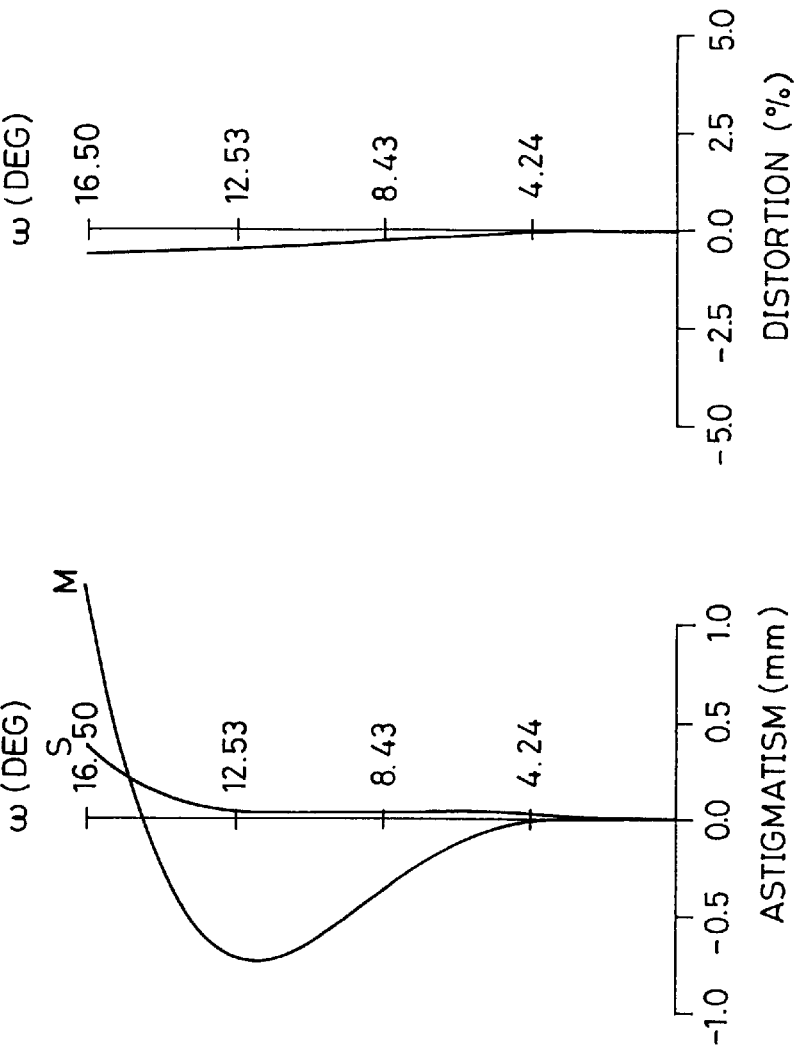
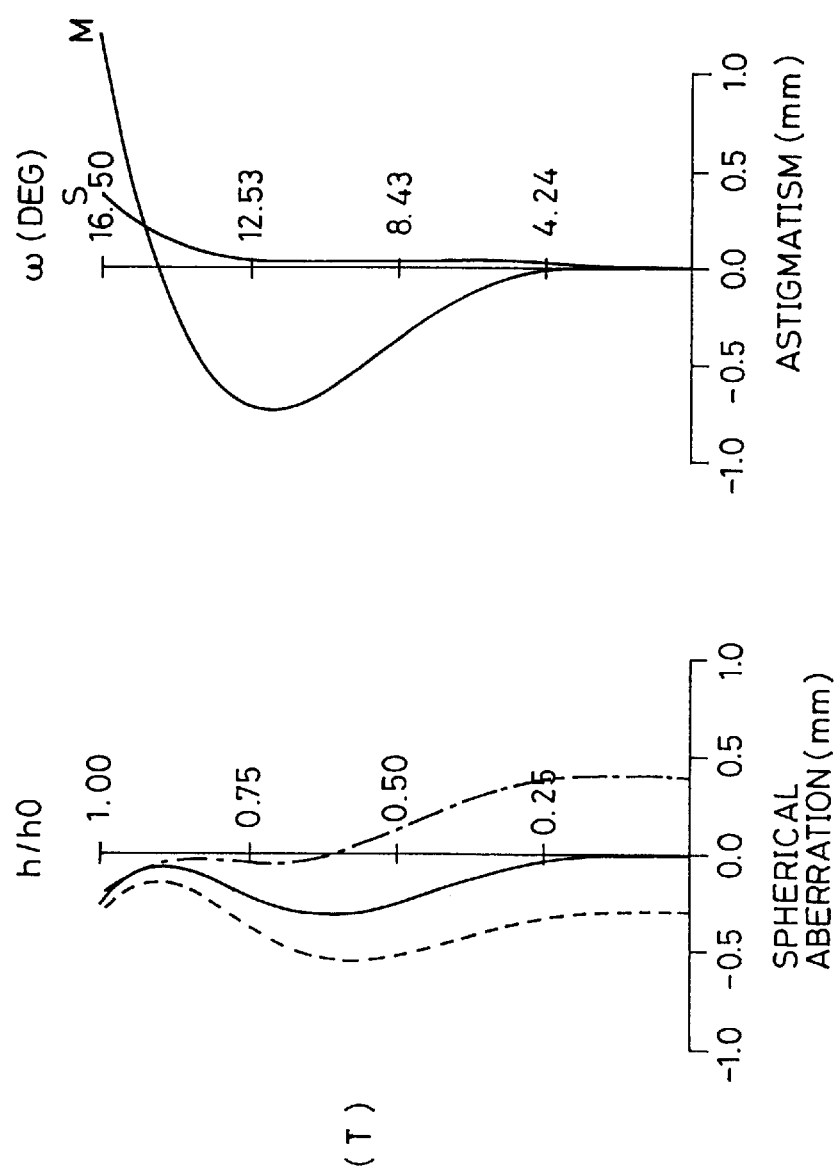

(W)

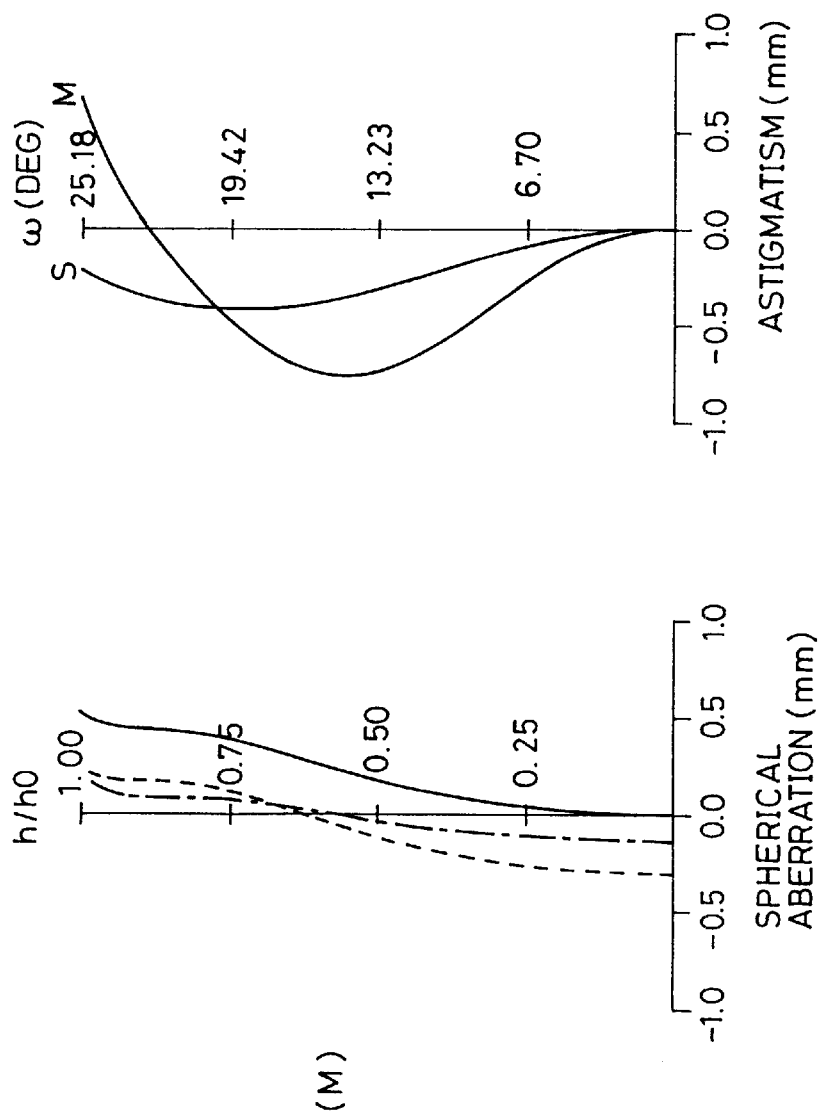
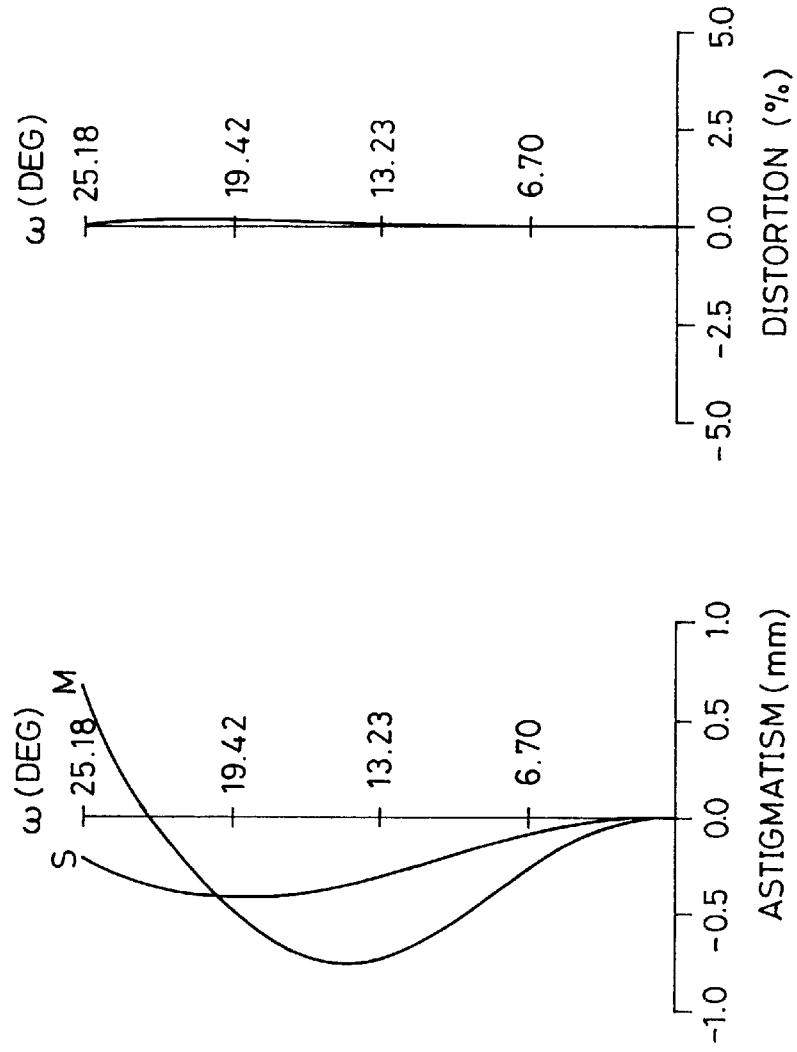
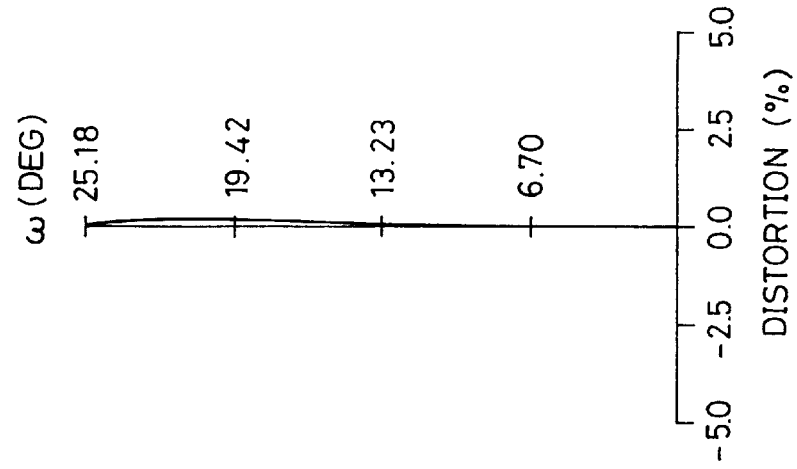

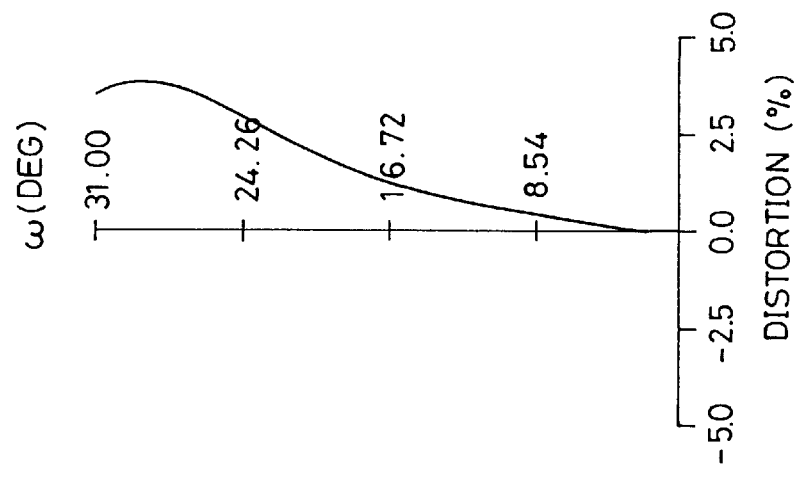
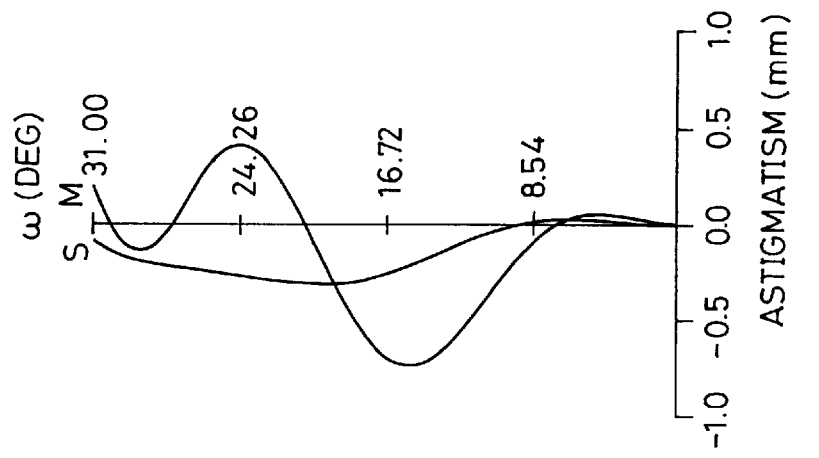
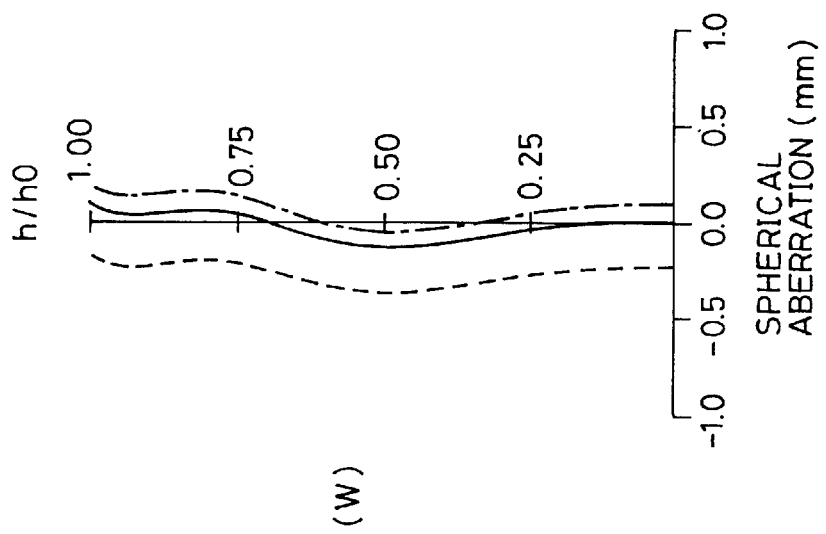

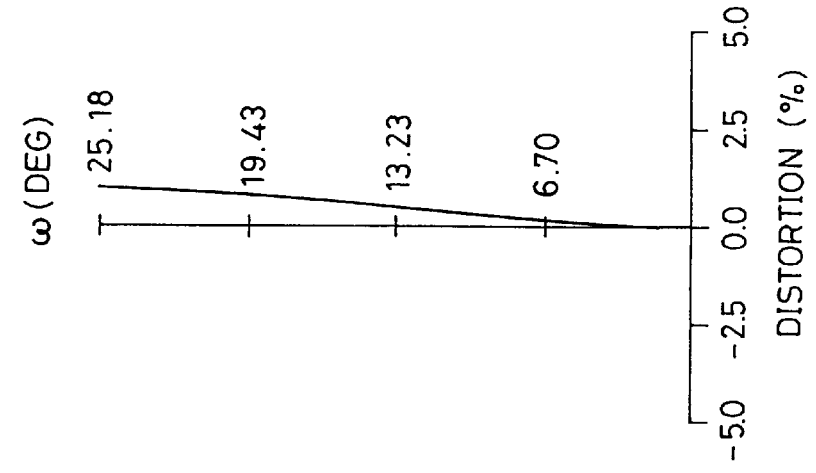
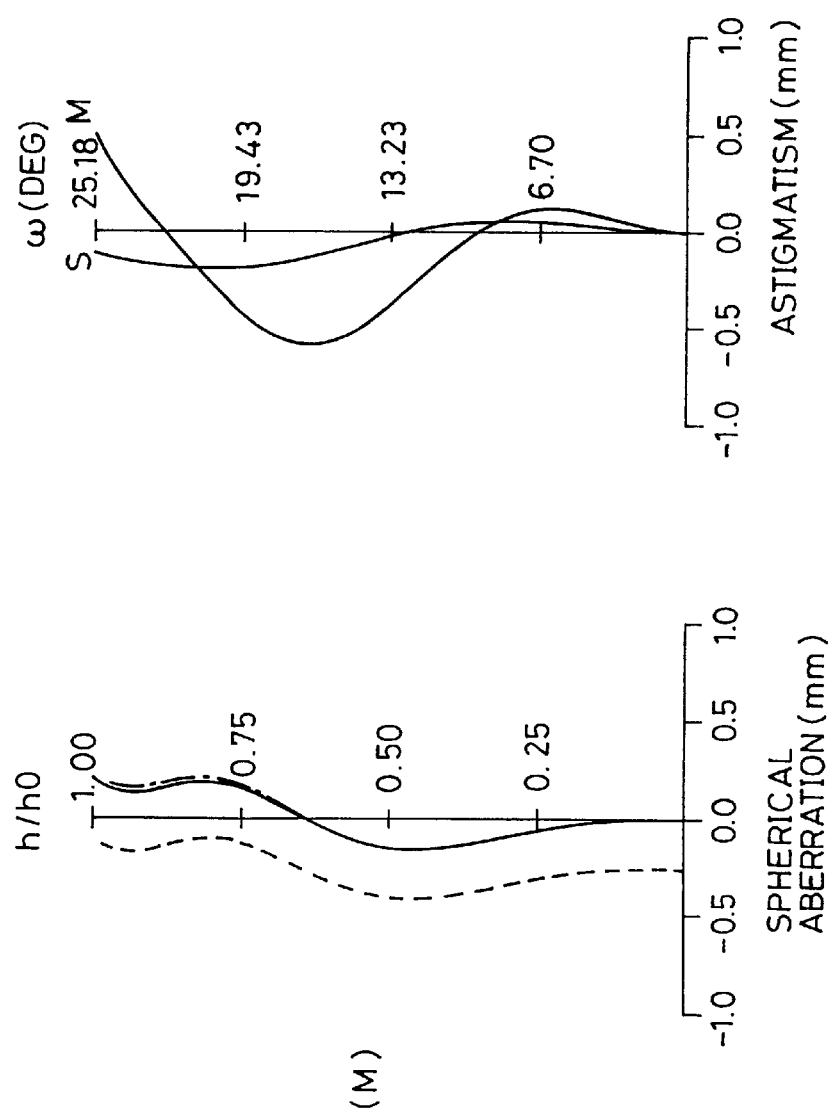

ZOOM LENS SYSTEM

BACKGROUND OF THE INVENTION

1. Field of the Invention

The present invention relates to a zoom lens system, and particularly to a compact zoom lens system suitable as a taking lens, for example, in a lens-shutter camera.

2. Description of the Prior Art

Conventionally, most zoom lens systems for lens-shutter cameras consist of lens units that are each composed of two or more lens elements. In order to reduce the size and the cost of such cameras, it is essential to compose their lens units of as few lens elements as possible.

To achieve the above purpose, U.S. Pat. No. 5,327,290 proposes a zoom lens system consisting of, from the object side, a first lens unit having a positive refractive power and a second lens unit having a negative refractive power. In this zoom lens system, each lens unit is composed of two lens elements. Moreover, Japanese Laid-open Patent Application No. H3-15881 proposes a zoom lens system consisting of two lens units, one having a positive refractive power and the other having a negative refractive power. In this zoom lens system, the number of lens elements composing each lens unit is reduced by the use of the aspherical surfaces; specifically, the first lens unit is composed of two lens elements, and the second lens unit is composed of as few as one lens element.

However, the zoom lens system proposed in these Japanese Laid-open Patent Applications have a defect in that it cannot satisfactorily correct the chromatic aberration over the whole system, because the chromatic aberration within each lens unit cannot be corrected sufficiently at high zooming ratios.

SUMMARY OF THE INVENTION

An object of the present invention is to provide a zoom lens system that, despite being compactly constructed of as few lens elements as possible, is capable of correcting chromatic aberration properly.

To achieve the above object, according to the present invention, in a zoom lens system that includes a lens unit having a negative refractive power disposed at an image-side end and that performs zooming by varying distances between a plurality of lens units, said plurality of lens units include a surface having a power to diffract light.

Specifically, according to one aspect of the present invention, in a zoom lens system that comprises, from an object side, a first lens unit having a positive refractive power and a second lens unit having a negative refractive power and that performs zooming from a wide-angle end to a telephoto end by moving the first and second lens units in such a way that a distance between the first and second lens units decreases, said zoom lens system includes at least one surface having a power to diffract light.

Alternatively, according to another aspect of the present invention, in the above described zoom lens system, said first lens unit is composed of at least two lens elements, and said zoom lens system includes at least one surface having a power to diffract light.

Alternatively, according to still another aspect of the present invention, said second lens unit is composed of one lens element.

Alternatively, according to a further aspect of the present invention, said first lens unit is composed of one lens element, said second lens unit is composed of at least two lens elements, and said zoom lens system includes at least one surface having a power to diffract light.

BRIEF DESCRIPTION OF THE DRAWINGS

This and other objects and features of this invention will become clear from the following description, taken in conjunction with the preferred embodiments with reference to the accompanied drawings in which:

FIGS. 9A, 9B, and 9C are diagrams showing the aberration at the middle focal length in the first embodiment;

FIGS. 10A, 10B, and 10C are diagrams showing the aberration at the telephoto end in the first embodiment;

FIGS. 11A, 11B, and 11C are diagrams showing the aberration at the wide-angle end in the second embodiment;

FIGS. 14A, 14B, and 14C are diagrams showing the aberration at the wide-angle end in the third embodiment;

FIGS. 15A, 15B, and 15C are diagrams showing the aberration at the middle focal length in the third embodiment;

FIGS. 16A, 16B, and 16C are diagrams showing the aberration at the telephoto end in the third embodiment;

FIGS. 17A, 17B, and 17C are diagrams showing the aberration at the wide-angle end in the fourth embodiment;

FIGS. 18A, 18B, and 18C are diagrams showing the aberration at the middle focal length in the fourth embodiment;

FIGS. 20A, 20B, and 20C are diagrams showing the aberration at the wide-angle end in the fifth embodiment;

FIGS. 21A, 21B, and 21C are diagrams showing the aberration at the middle focal length in the fifth embodiment;

FIGS. 22A, 22B, and 22C are diagrams showing the aberration at the telephoto end in the fifth embodiment;

FIGS. 23A, 23B, and 23C are diagrams showing the aberration at the wide-angle end in the sixth embodiment;

FIGS. 24A, 24B, and 24C are diagrams showing the aberration at the middle focal length in the sixth embodiment;

FIGS. 25A, 25B, and 25C are diagrams showing the aberration at the telephoto end in the sixth embodiment;

FIGS. 26A, 26B, and 26C are diagrams showing the aberration at the wide-angle end in the seventh embodiment;

FIGS. 27A, 27B, and 27C are diagrams showing the aberration at the middle focal length in the seventh embodiment;

FIGS. 28A, 28B, and 28C are diagrams showing the aberration at the telephoto end in the seventh embodiment;

FIGS. 34A, 34B, and 34C are diagrams showing the aberration at the wide-angle end in the eighth embodiment;

FIGS. 35A, 35B, and 35C are diagrams showing the aberration at the middle focal length in the eighth embodiment;

FIGS. 36A, 36B, and 36C are diagrams showing the aberration at the telephoto end in the eighth embodiment;

FIGS. 38A, 38B, and 38C are diagrams showing the aberration at the middle focal length in the ninth embodiment;

FIGS. 39A, 39B, and 39C are diagrams showing the aberration at the telephoto end in the ninth embodiment;

FIGS. 40A, 40B, and 40C are diagrams showing the aberration at the wide-angle end in the tenth embodiment;

FIGS. 42A, 42B, and 42C are diagrams showing the aberration at the telephoto end in the tenth embodiment;

FIGS. 46A, 46B, and 46C are diagrams showing the aberration at the wide-angle end in the twelfth embodiment;

FIGS. 47A, 47B, and 47C are diagrams showing the aberration at the middle focal length in the twelfth embodiment;

FIG. 54 is a diagram showing the lens construction of the zoom lens system of the eighteenth embodiment of the present invention;

FIGS. 57A, 57B, and 57C are diagrams showing the aberration at the telephoto end in the thirteenth embodiment;

FIGS. 60A, 60B, and 60C are diagrams showing the aberration at the telephoto end in the fourteenth embodiment;

FIGS. 61A, 61B, and 61C are diagrams showing the aberration at the wide-angle end in the fifteenth embodiment;

FIGS. 62A, 62B, and 62C are diagrams showing the aberration at the middle focal length in the fifteenth embodiment;

FIGS. 63A, 63B, and 63C are diagrams showing the aberration at the telephoto end in the fifteenth embodiment;

FIGS. 66A, 66B, and 66C are diagrams showing the aberration at the telephoto end in the sixteenth embodiment;

FIGS. 71A, 71B, and 71C are diagrams showing the aberration at the middle focal length in the eighteenth embodiment;

FIGS. 72A, 72B, and 72C are diagrams showing the aberration at the telephoto end in the eighteenth embodiment;

FIGS. 80A, 80B, and 80C are diagrams showing the aberration at the middle focal length in the twentieth embodiment;

FIGS. 82A, 82B, and 82C are diagrams showing the aberration at the wide-angle end in the twenty-first embodiment;

FIGS. 83A, 83B, and 83C are diagrams showing the aberration at the middle focal length in the twenty-first embodiment.

DESCRIPTION OF THE PREFERRED EMBODIMENTS

Figure 1:
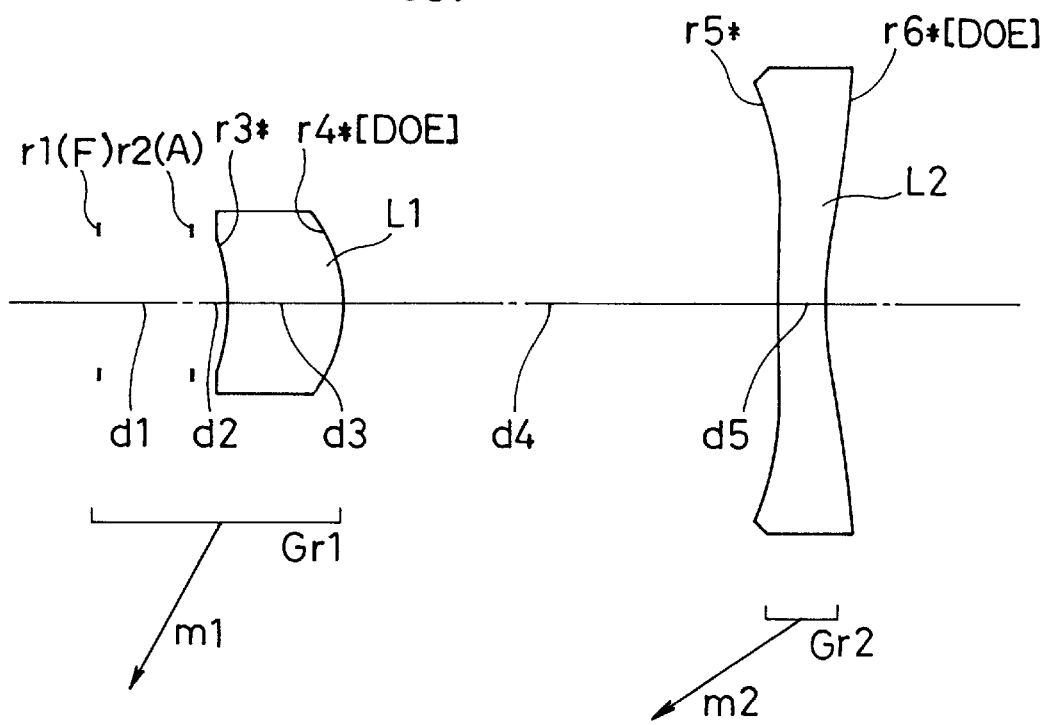
FIG. 1 is a diagram showing the lens construction of the zoom lens system of the first embodiment of the present invention.
Figure 2:
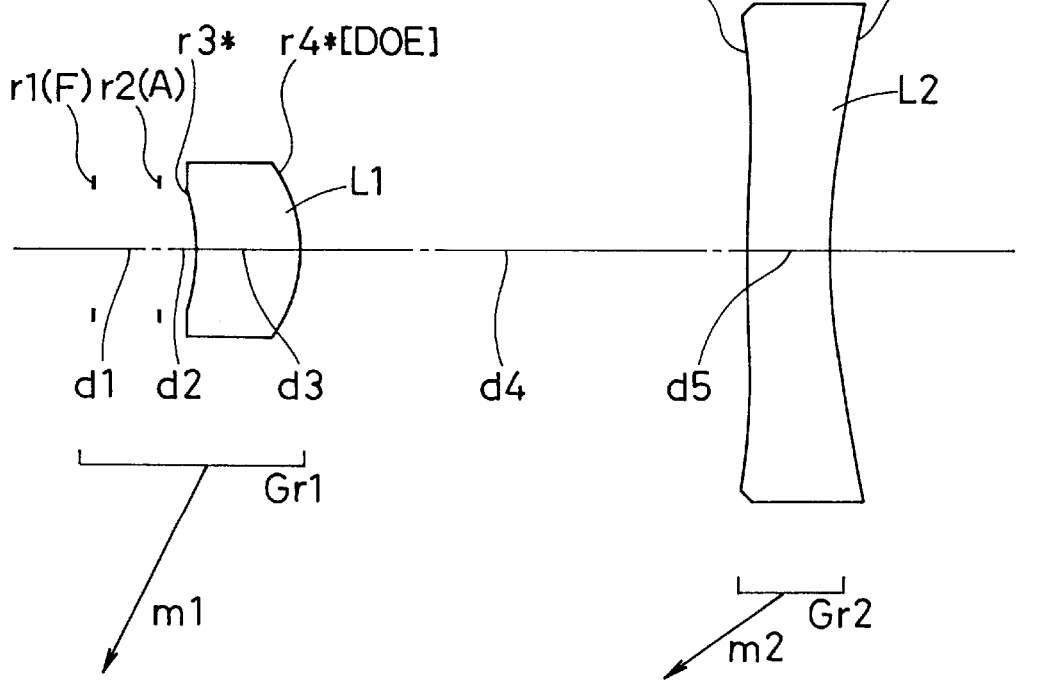
FIG. 2 is a diagram showing the lens construction of the zoom lens system of the second embodiment of the present invention.
Figure 3:
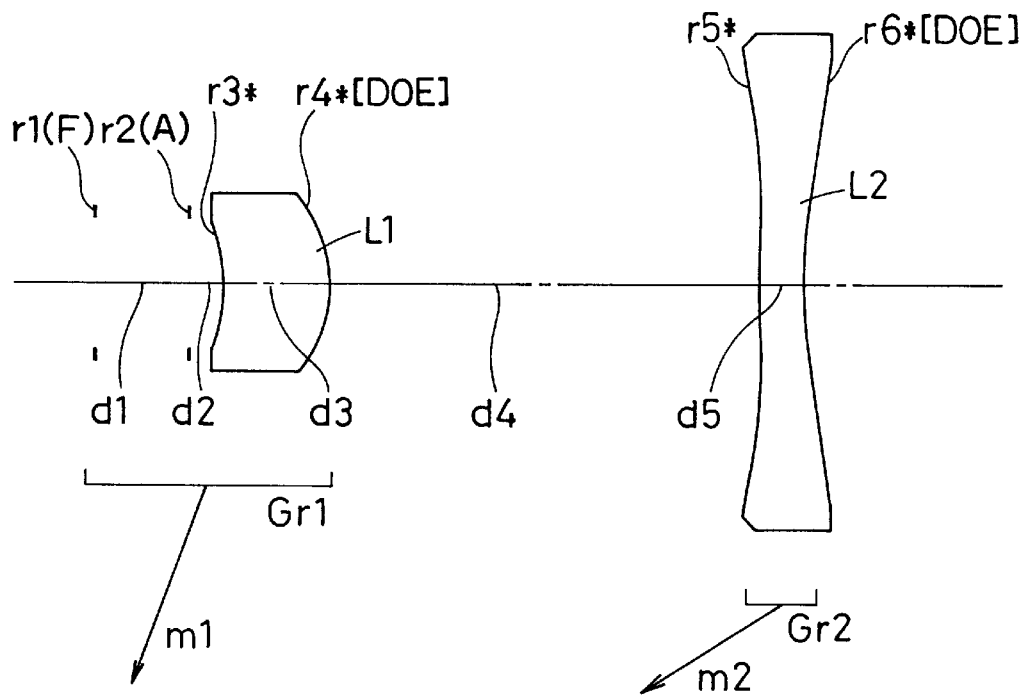
FIG. 3 is a diagram showing the lens construction of the zoom lens system of the third embodiment of the present invention.
Figure 4:
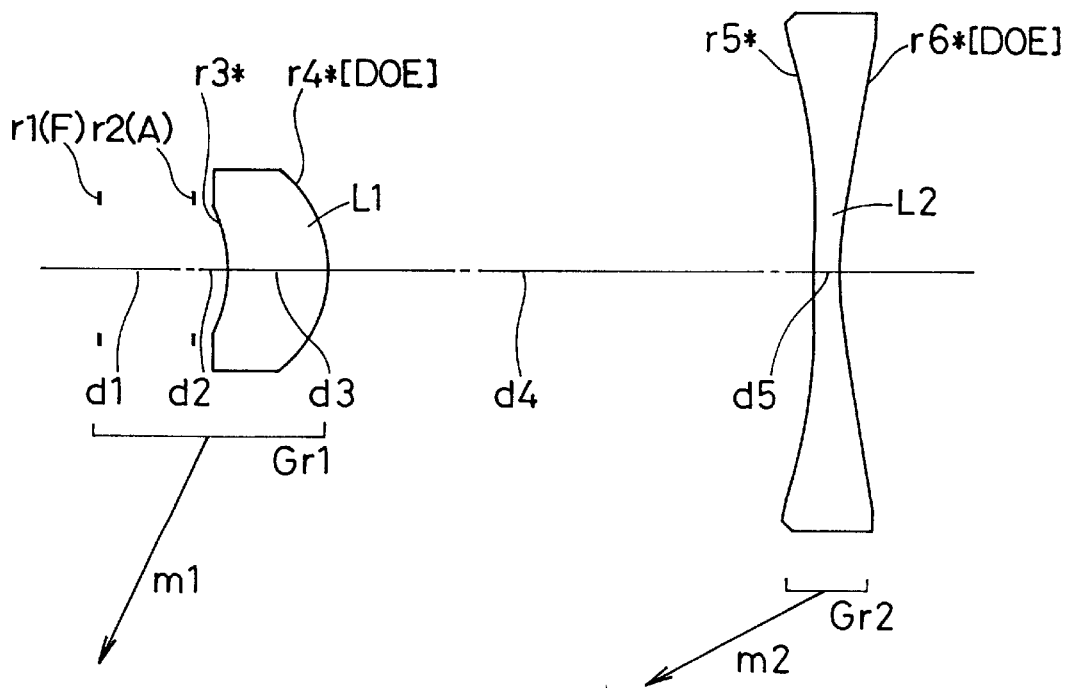
FIG. 4 is a diagram showing the lens construction of the zoom lens system of the fourth embodiment of the present invention.
Figure 5:
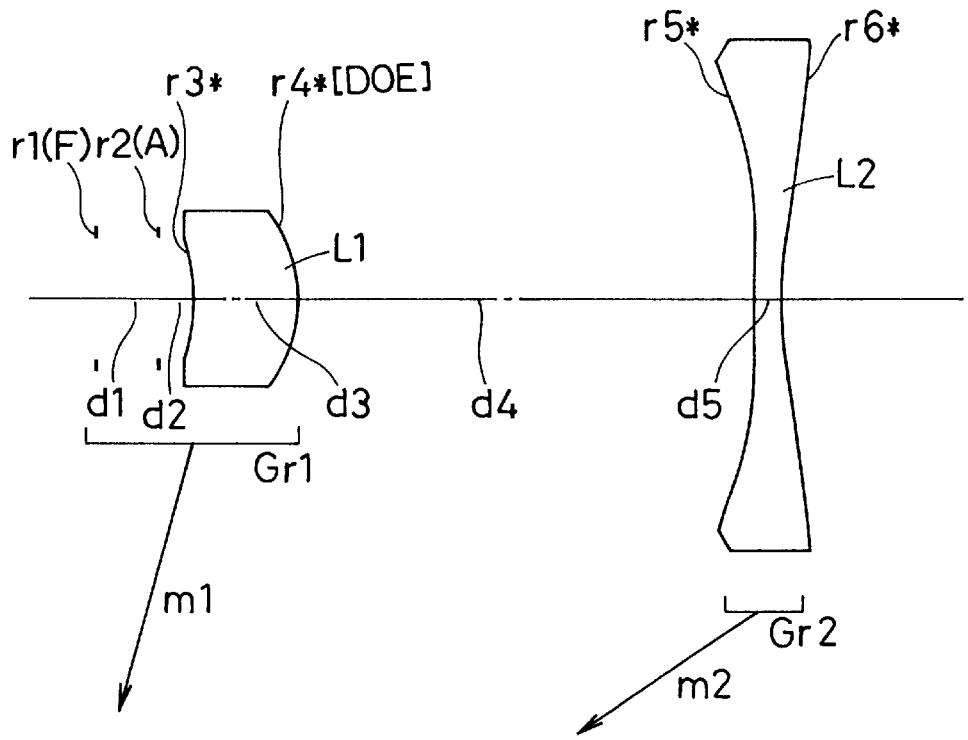
FIG. 5 is a diagram showing the lens construction of the zoom lens system of the fifth embodiment of the present invention.
Figure 6:
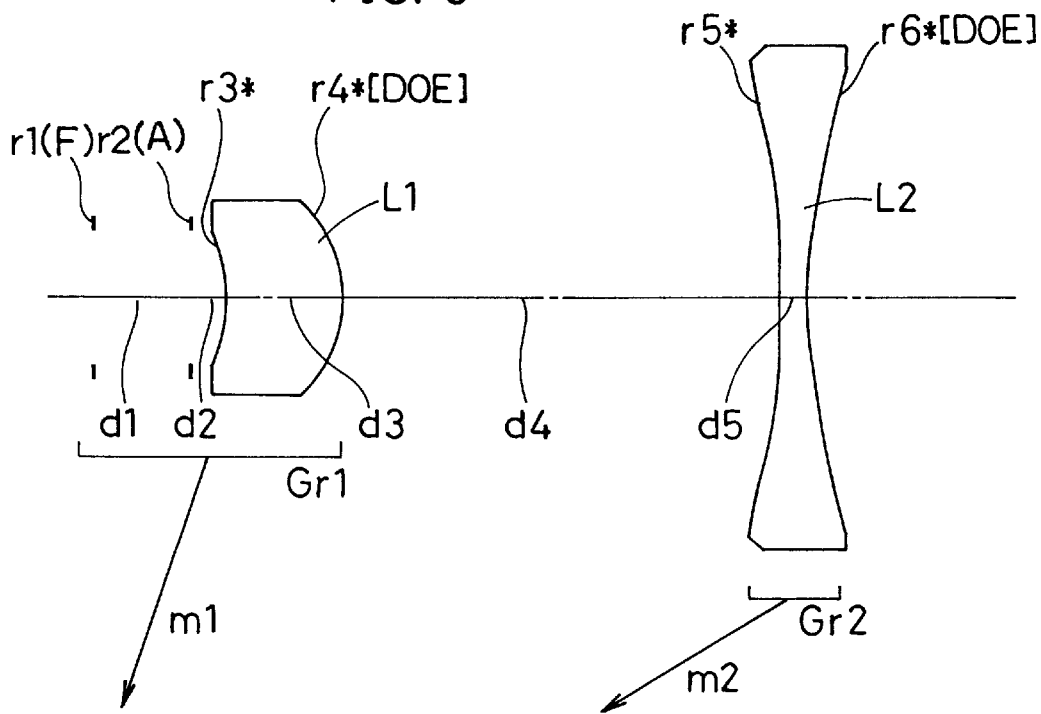
FIG. 6 is a diagram showing the lens construction of the zoom lens system of the sixth embodiment of the present invention.
Figure 7:
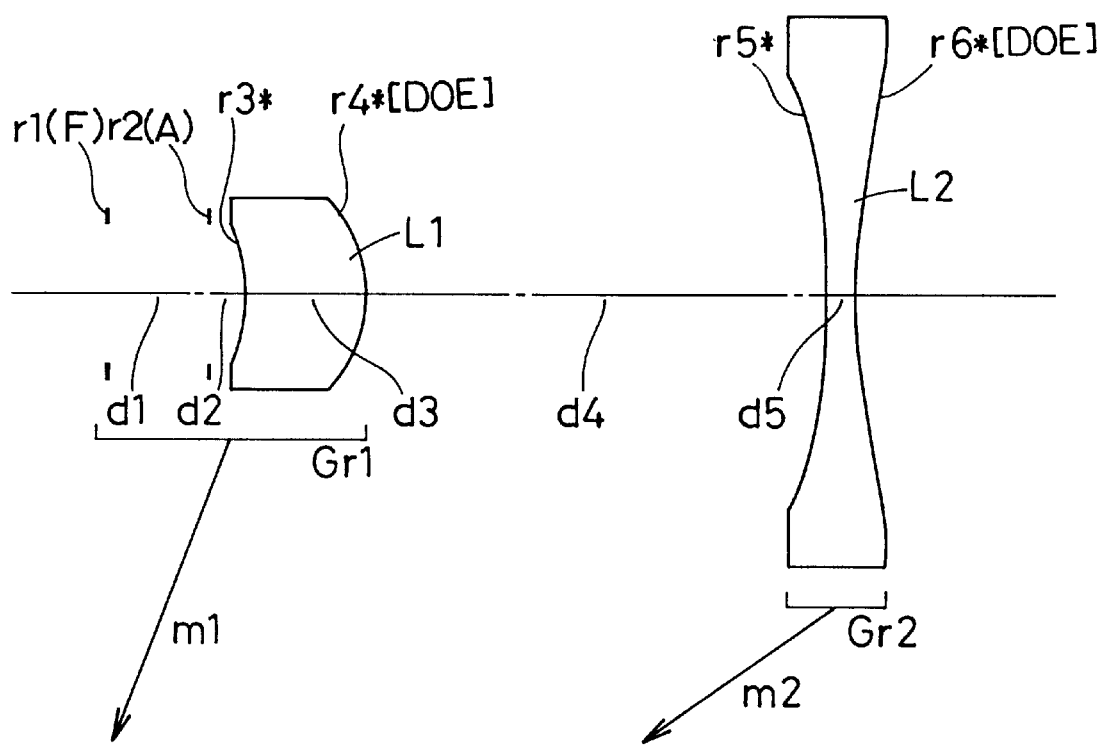
FIG. 7 is a diagram showing the lens construction of the zoom lens system of the seventh embodiment of the present invention.
Figure 8C:
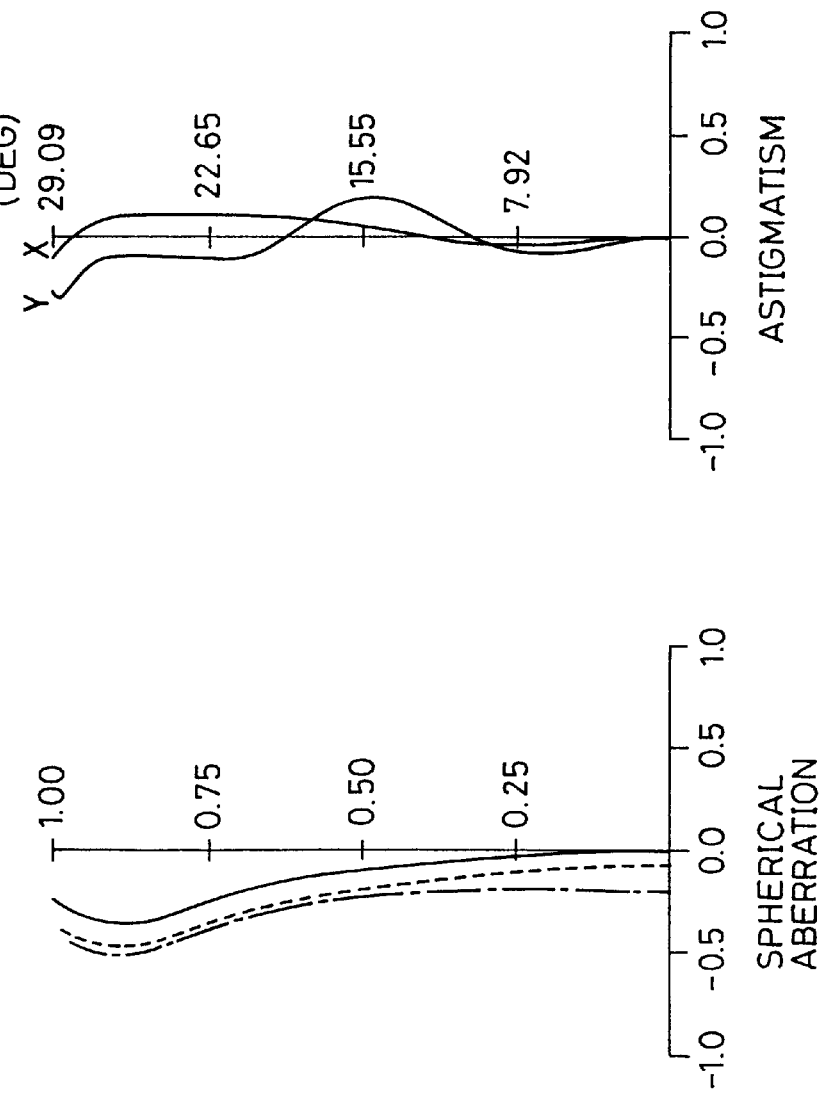
FIGS. 8A, 8B, and 8C are diagrams showing the aberration at the wide-angle end in the first embodiment.
Figure 8B:
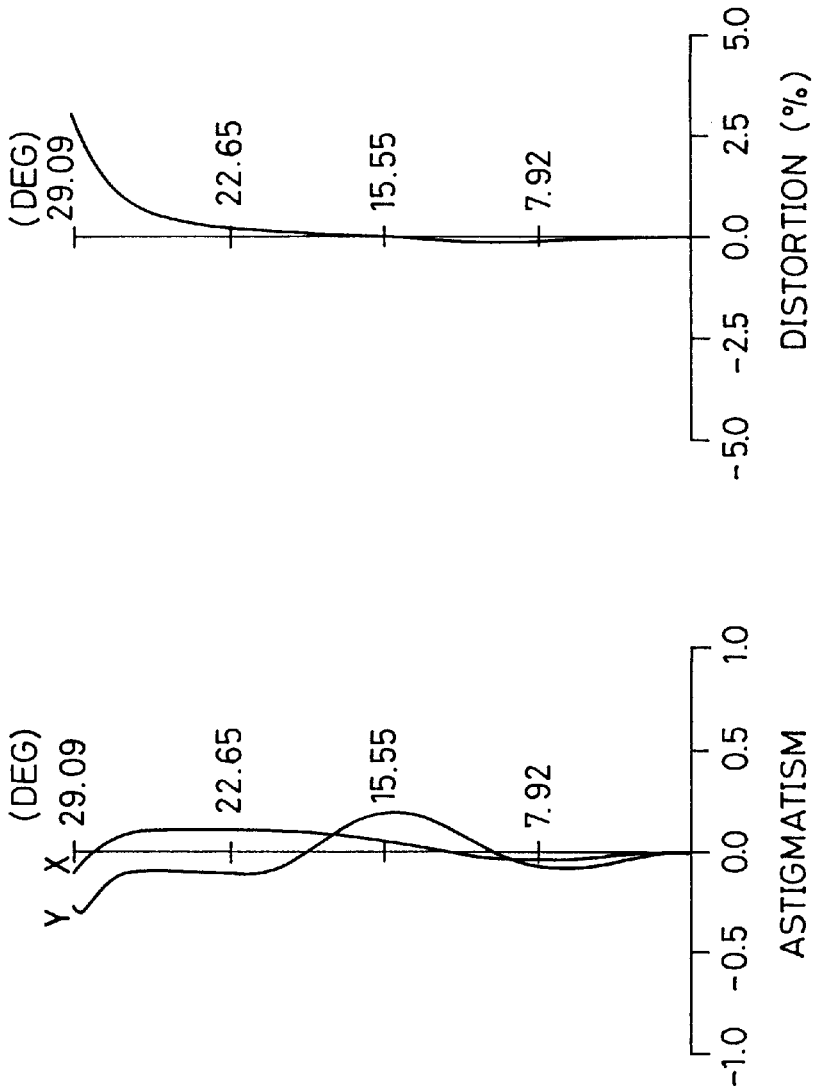
Figure 8A:
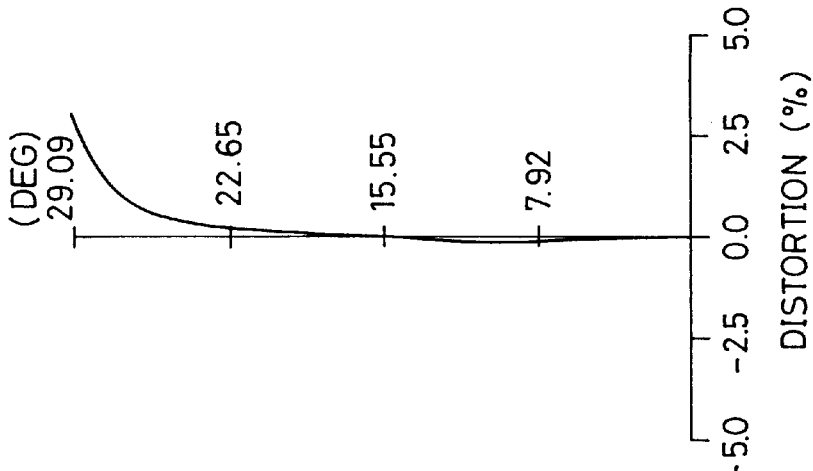
Figure 12A:
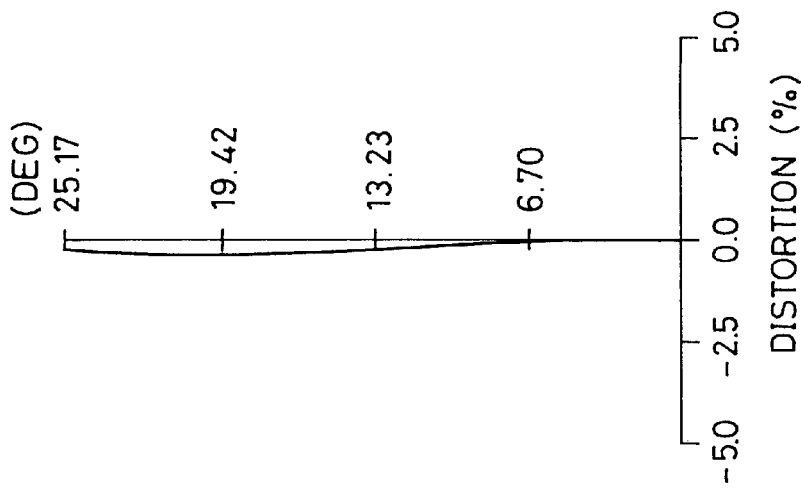
FIGS. 12A, 12B, and 12C are diagrams showing the aberration at the middle focal length in the second embodiment.
Figure 12B:
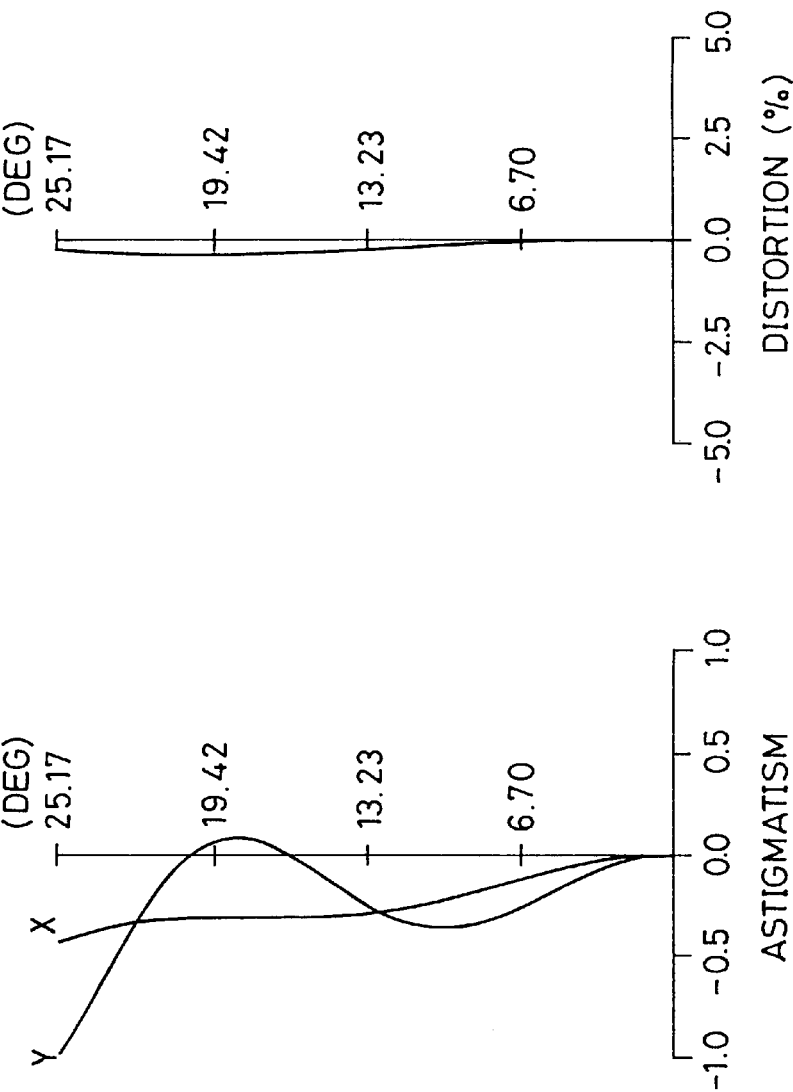
Figure 12C:
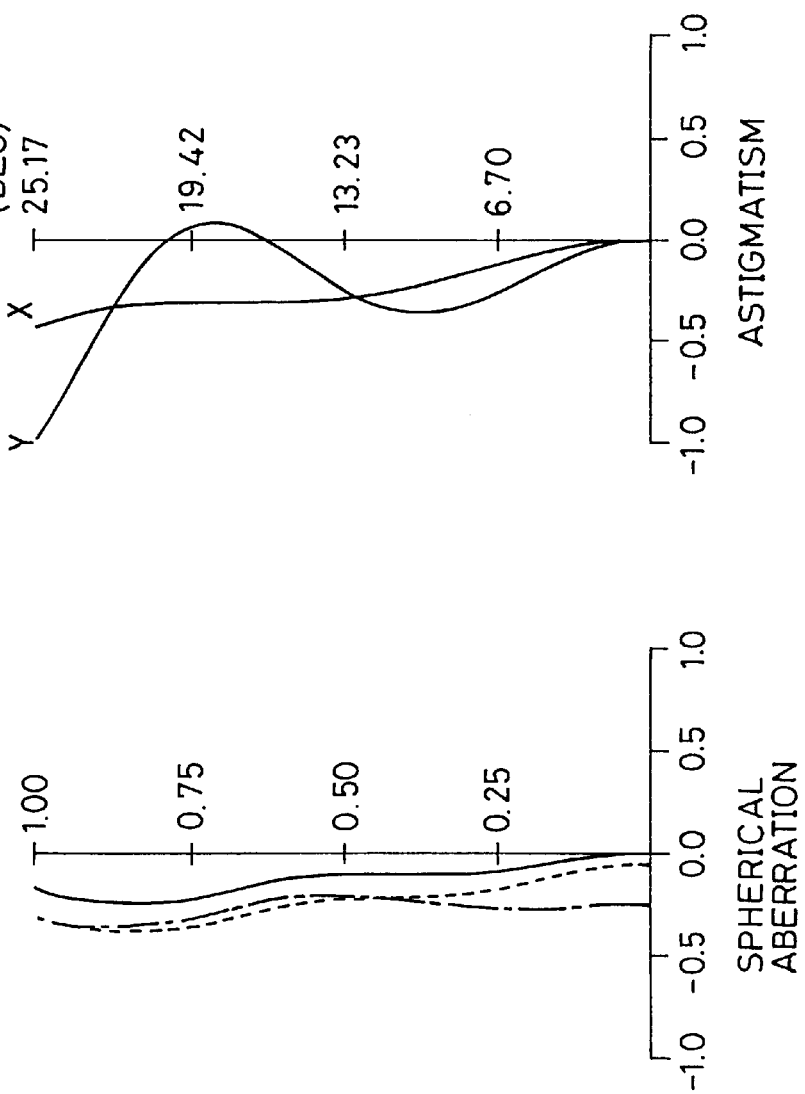
Figure 13A:
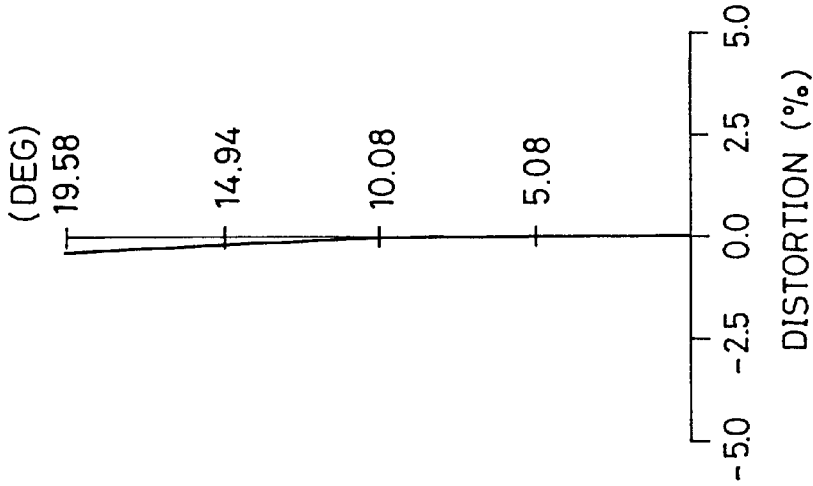
FIGS. 13A, 13B, and 13C are diagrams showing the aberration at the telephoto end in the second embodiment.
Figure 13B:
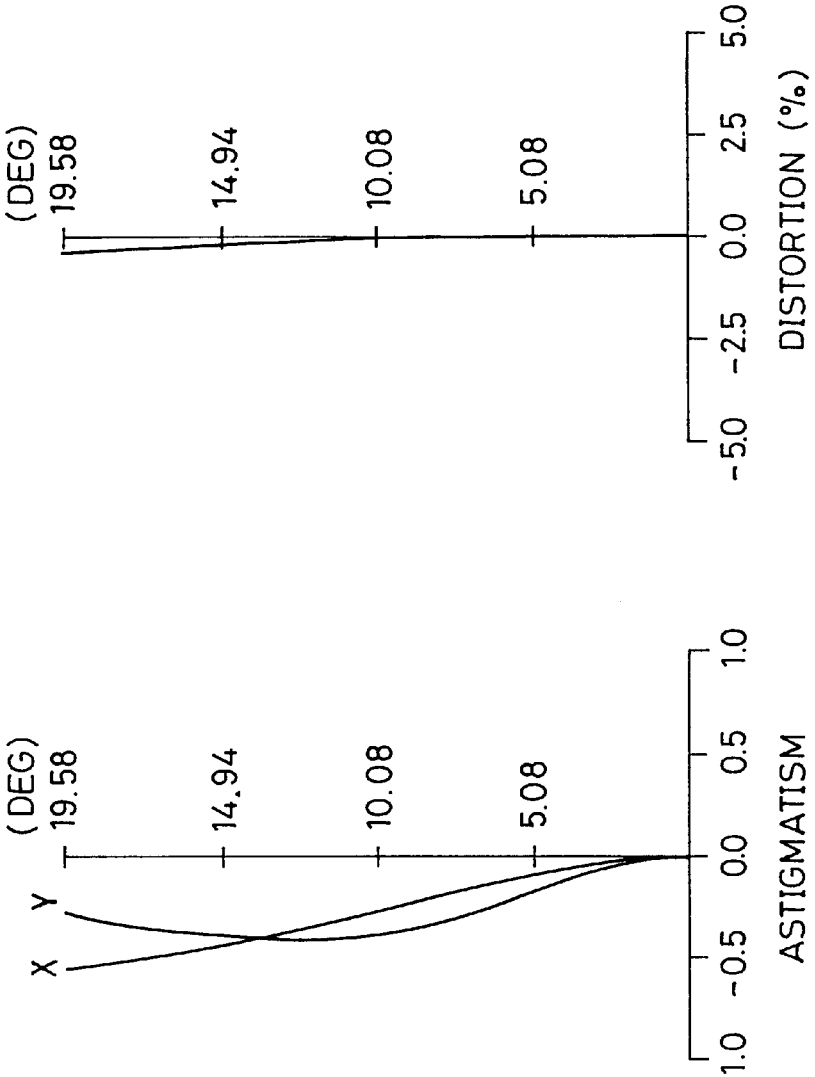
Figure 13C:
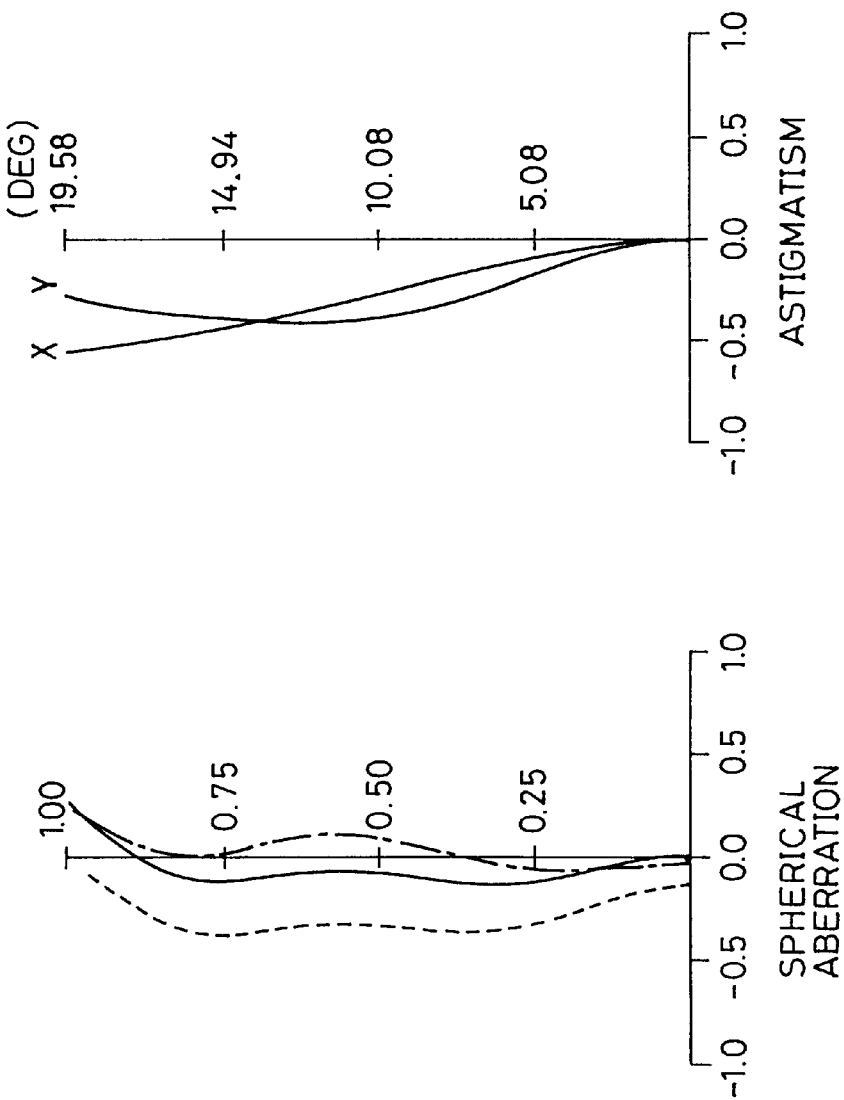
Figure 19C:
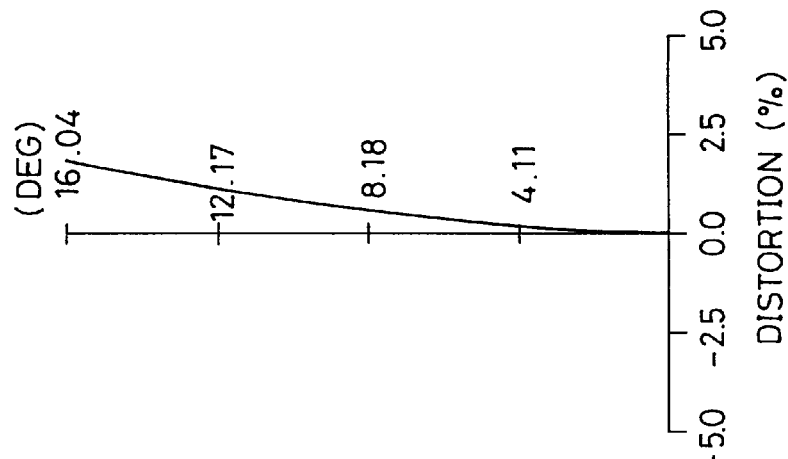
FIGS. 19A, 19B, and 19C are diagrams showing the aberration at the telephoto end in the fourth embodiment.
Figure 19B:
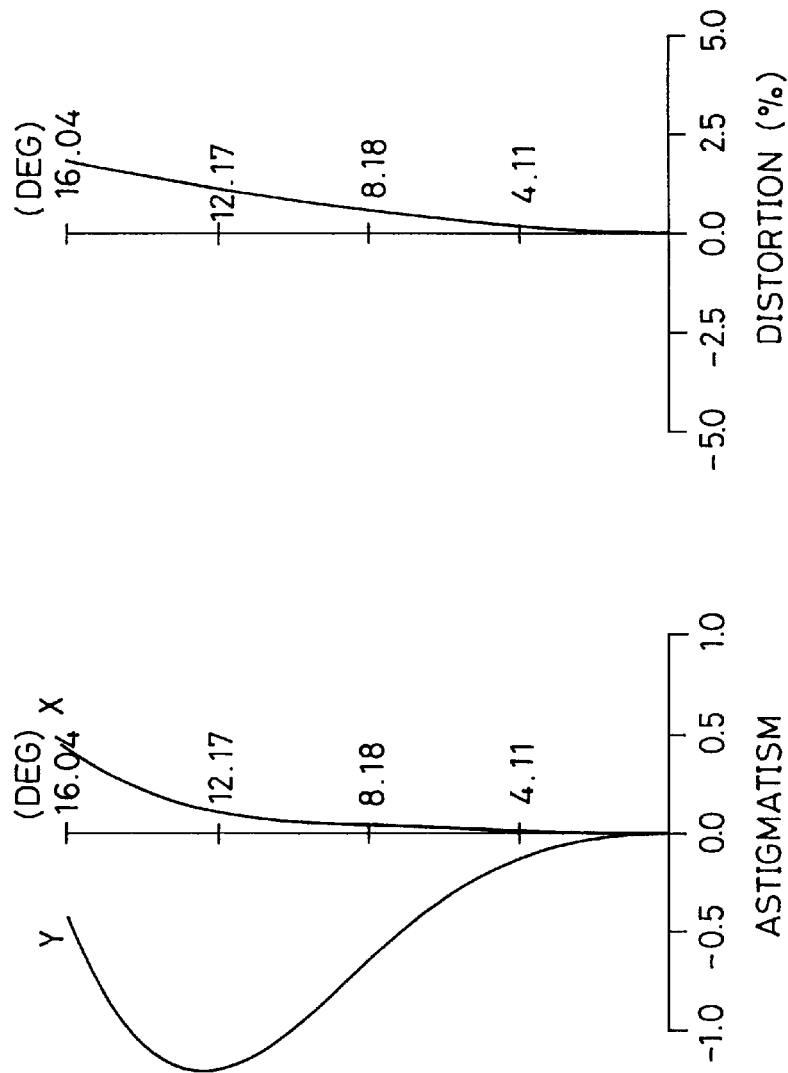
Figure 19A:
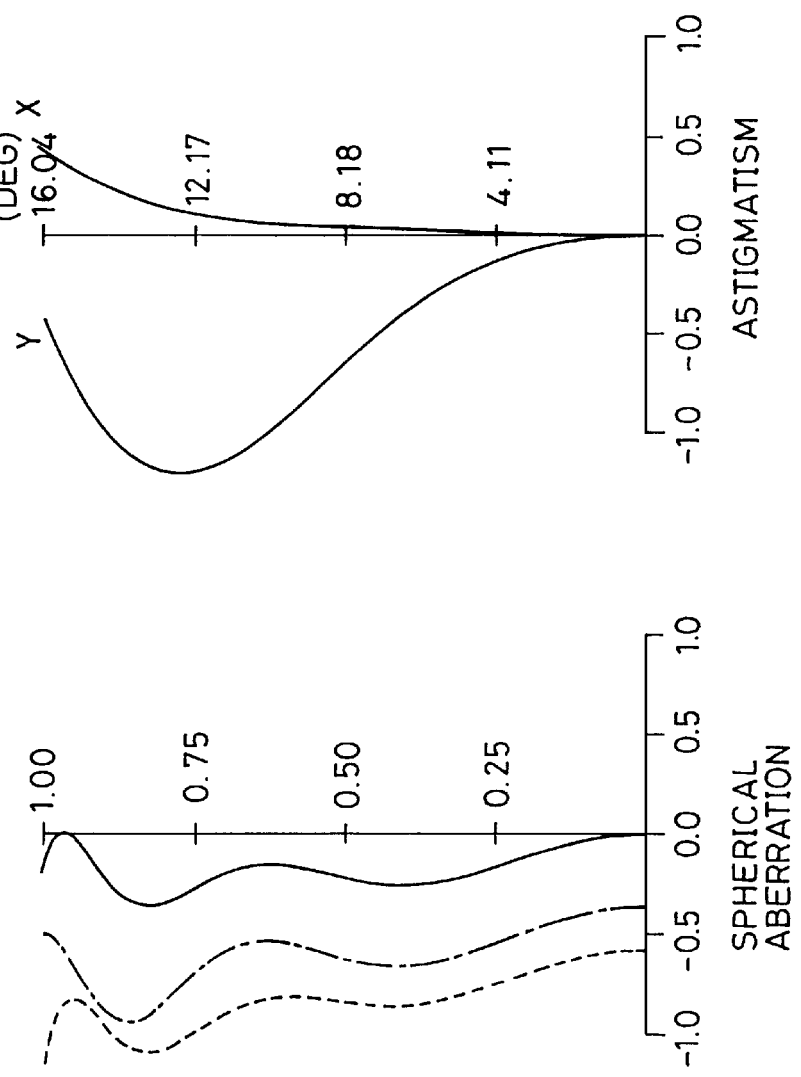
Figure 29:
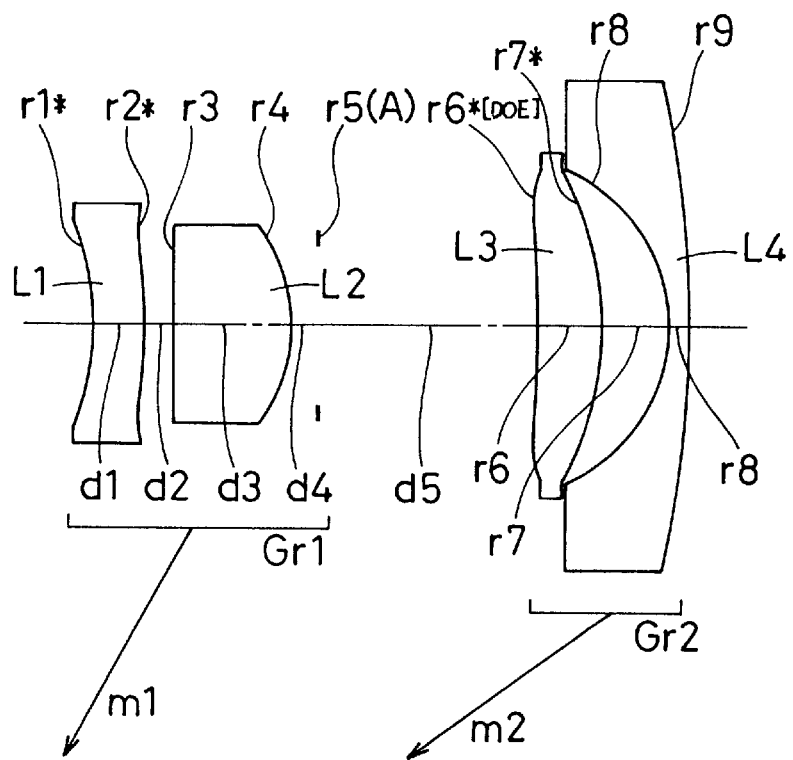
FIG. 29 is a diagram showing the lens construction of the zoom lens system of the eighth embodiment of the present invention.
Figure 30:
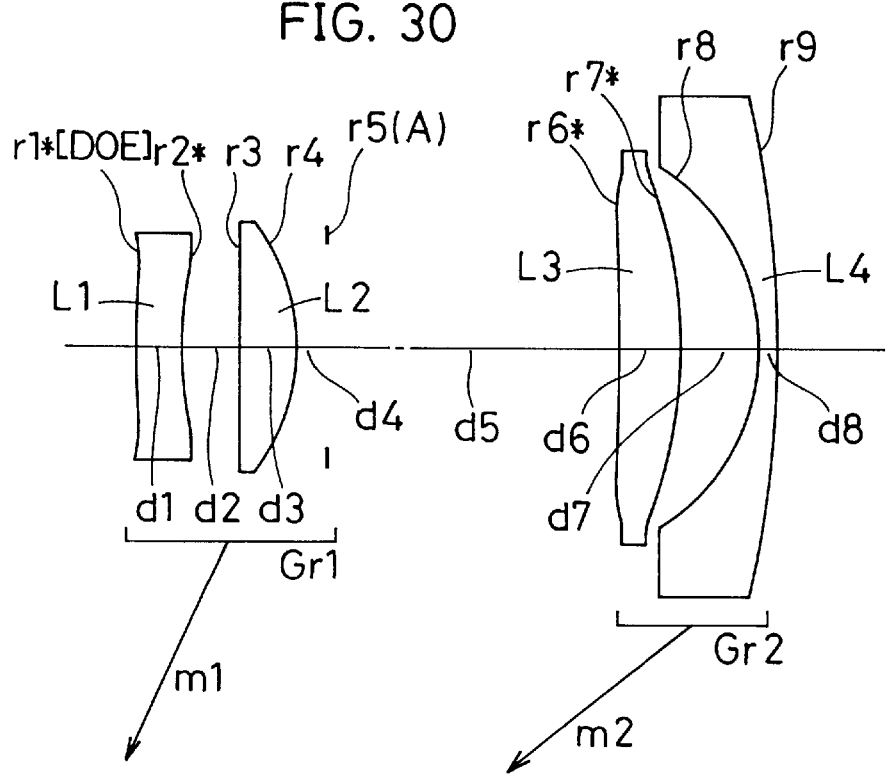
FIG. 30 is a diagram showing the lens construction of the zoom lens system of the ninth embodiment of the present invention.
Figure 31:
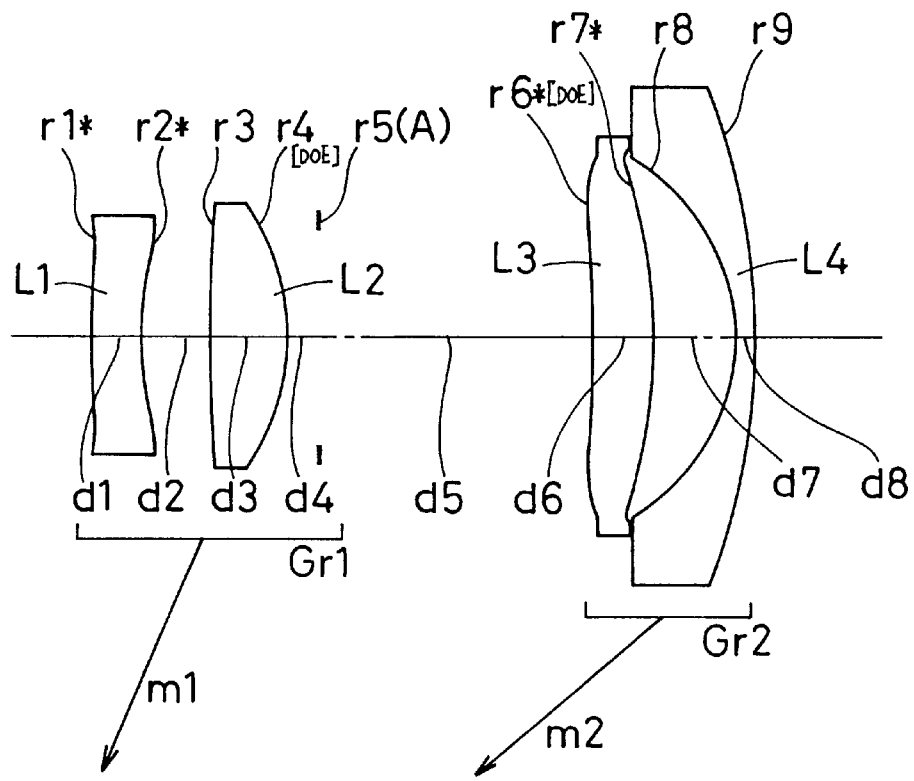
FIG. 31 is a diagram showing the lens construction of the zoom lens system of the tenth embodiment of the present invention.
Figure 32:
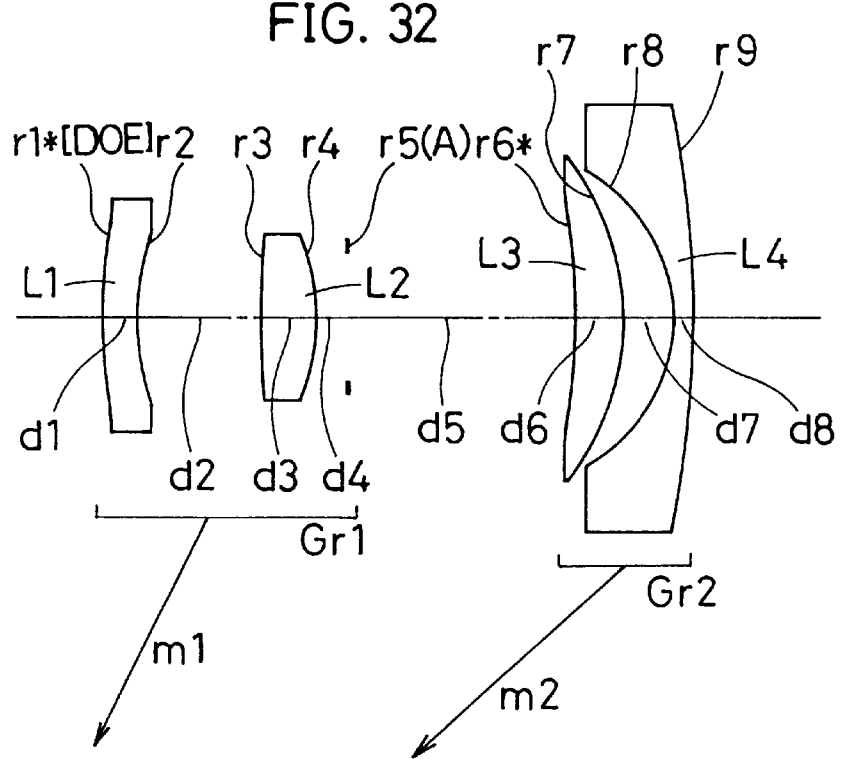
FIG. 32 is a diagram showing the lens construction of the zoom lens system of the eleventh embodiment of the present invention.
Figure 33:
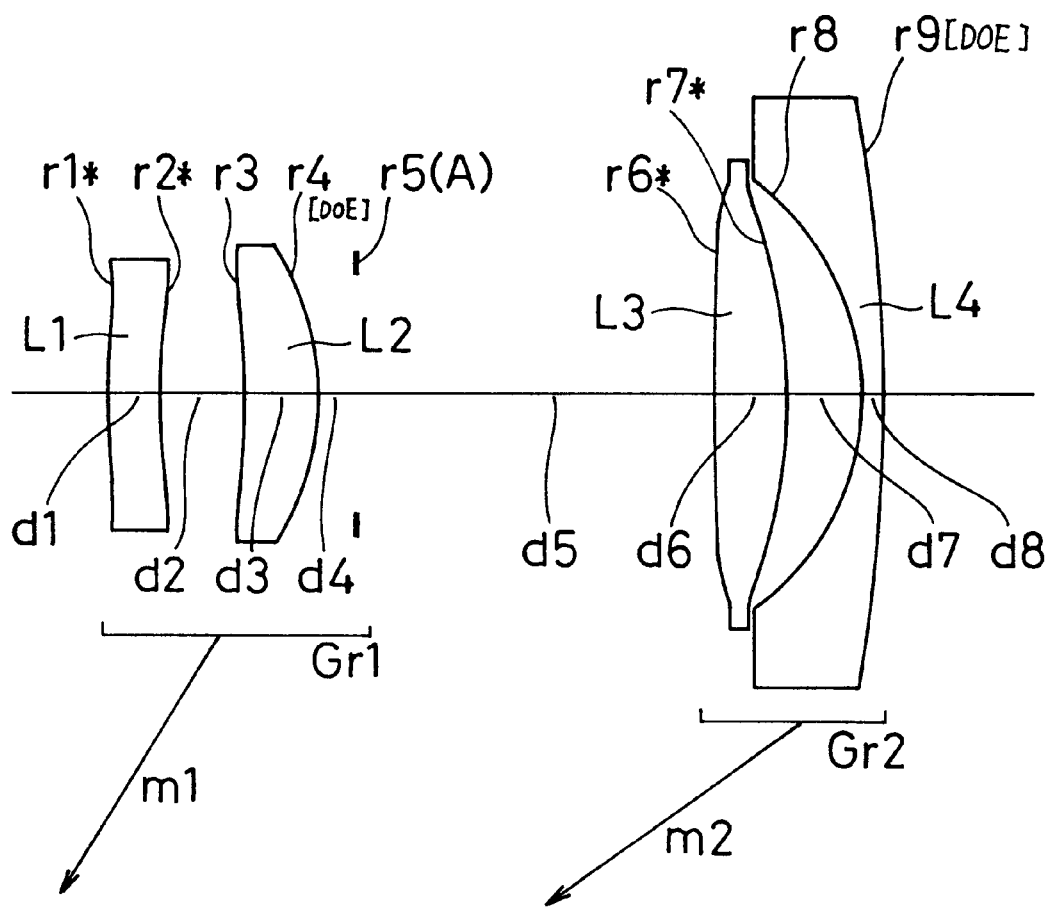
FIG. 33 is a diagram showing the lens construction of the zoom lens system of the twelfth embodiment of the present invention.
Figure 37C:
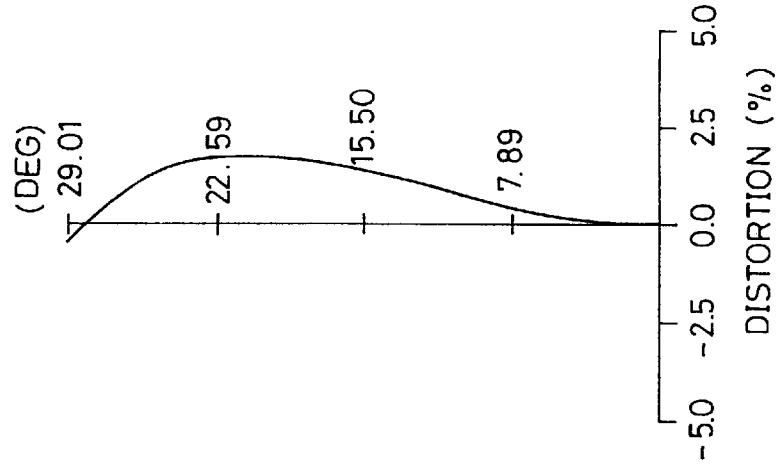
FIGS. 37A, 37B, and 37C are diagrams showing the aberration at the wide-angle end in the ninth embodiment.
Figure 37B:
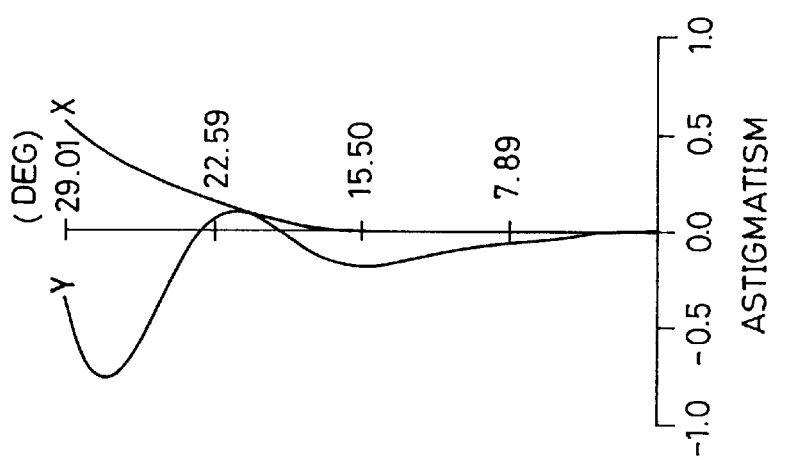
Figure 37A:
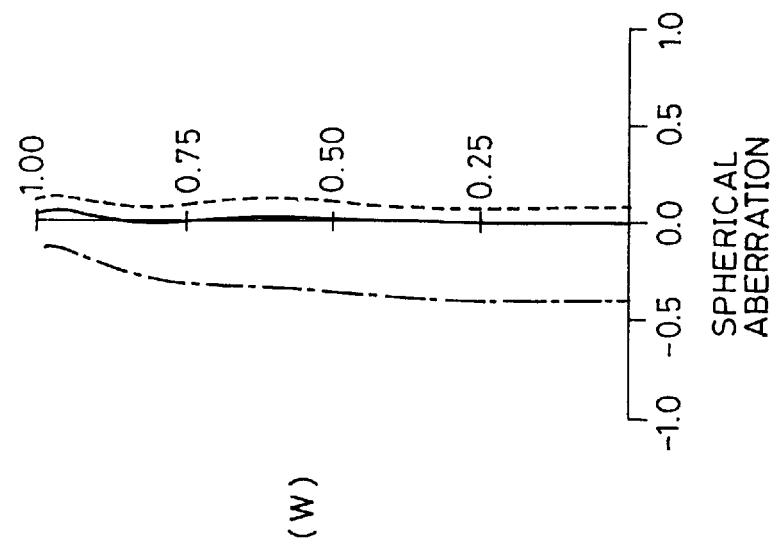
Figure 41C:
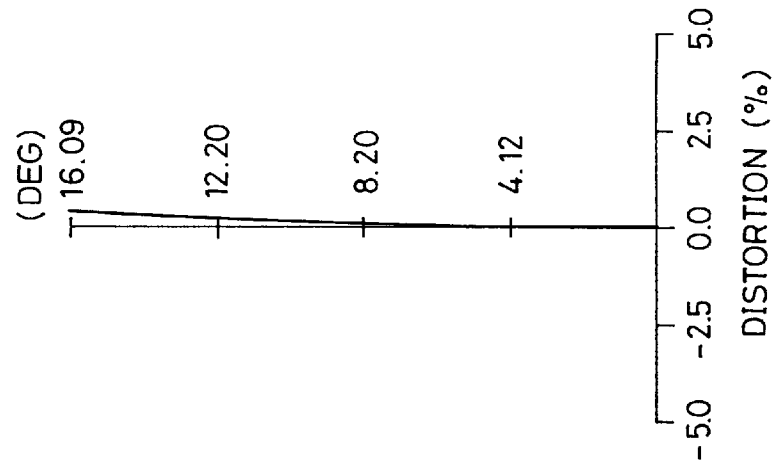
FIGS. 41A, 41B, and 41C are diagrams showing the aberration at the middle focal length in the tenth embodiment.
Figure 41B:
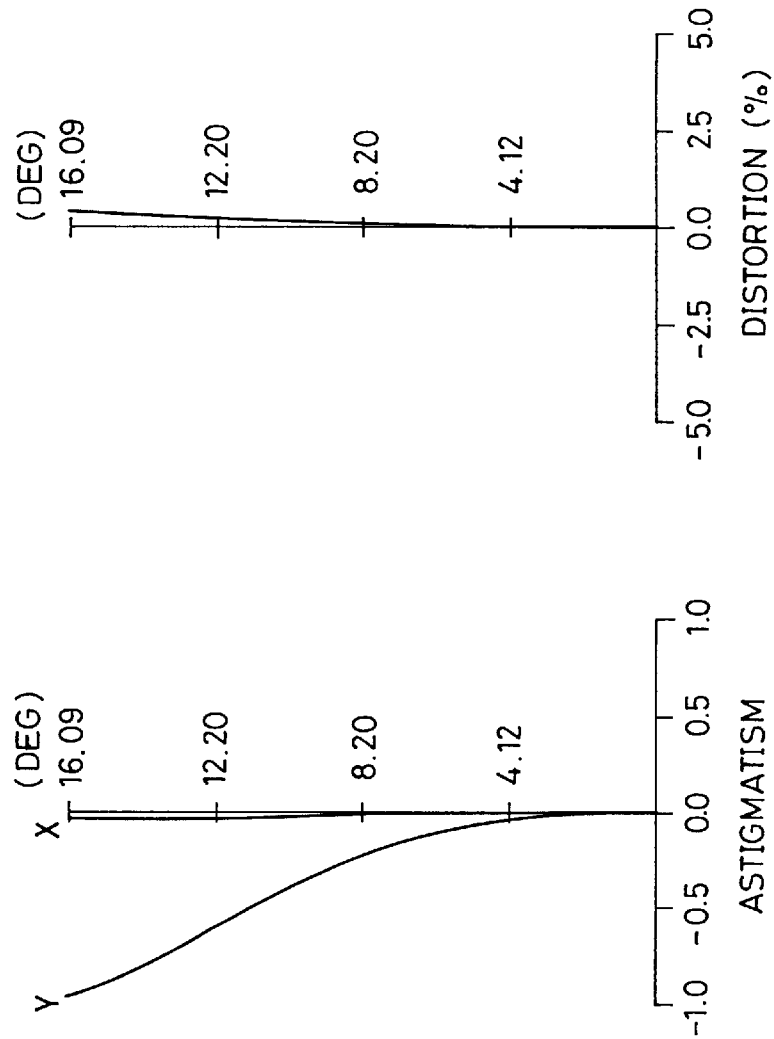
Figure 41A:
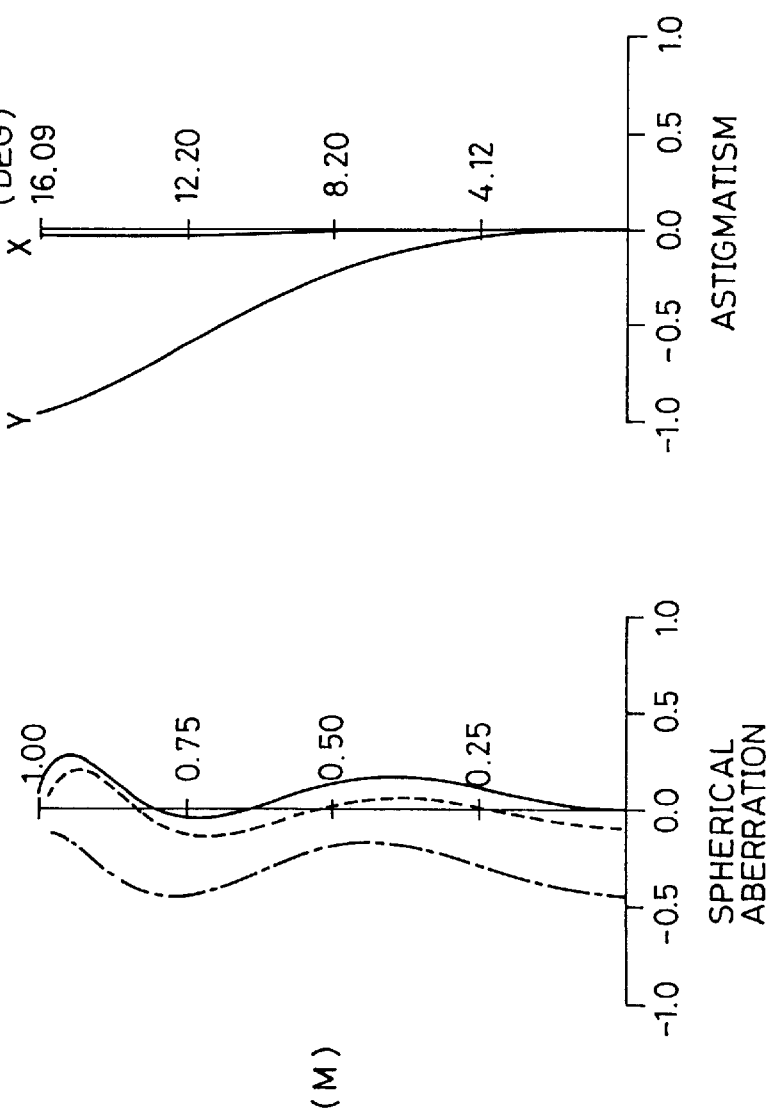
Figure 43A:
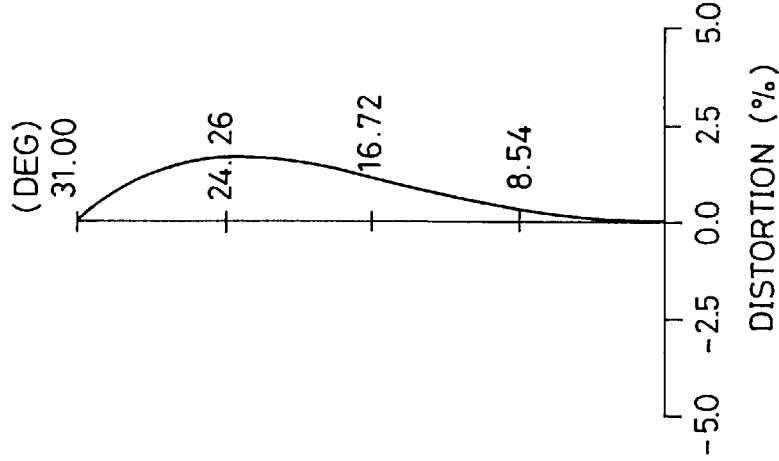
FIGS. 43A, 43B, and 43C are diagrams showing the aberration at the wide-angle end in the eleventh embodiment.
Figure 43B:
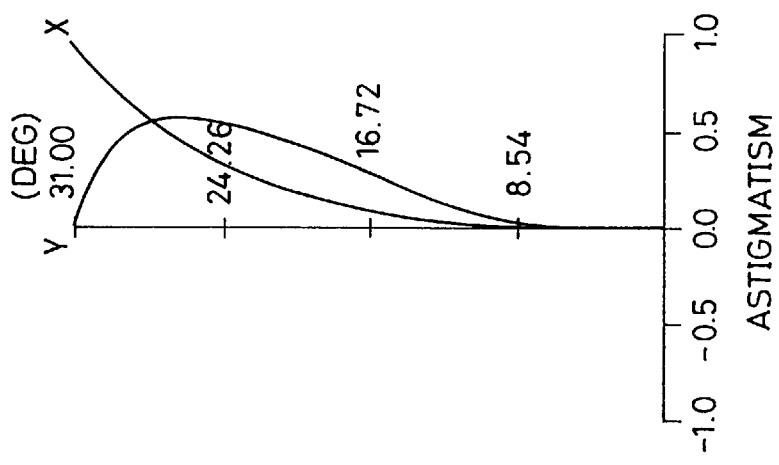
Figure 43C:
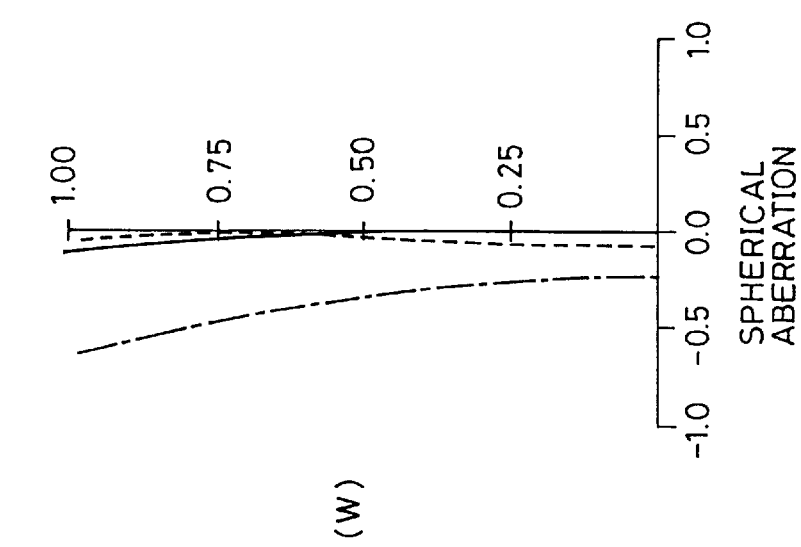
Figures 44A, 44B, 44C:
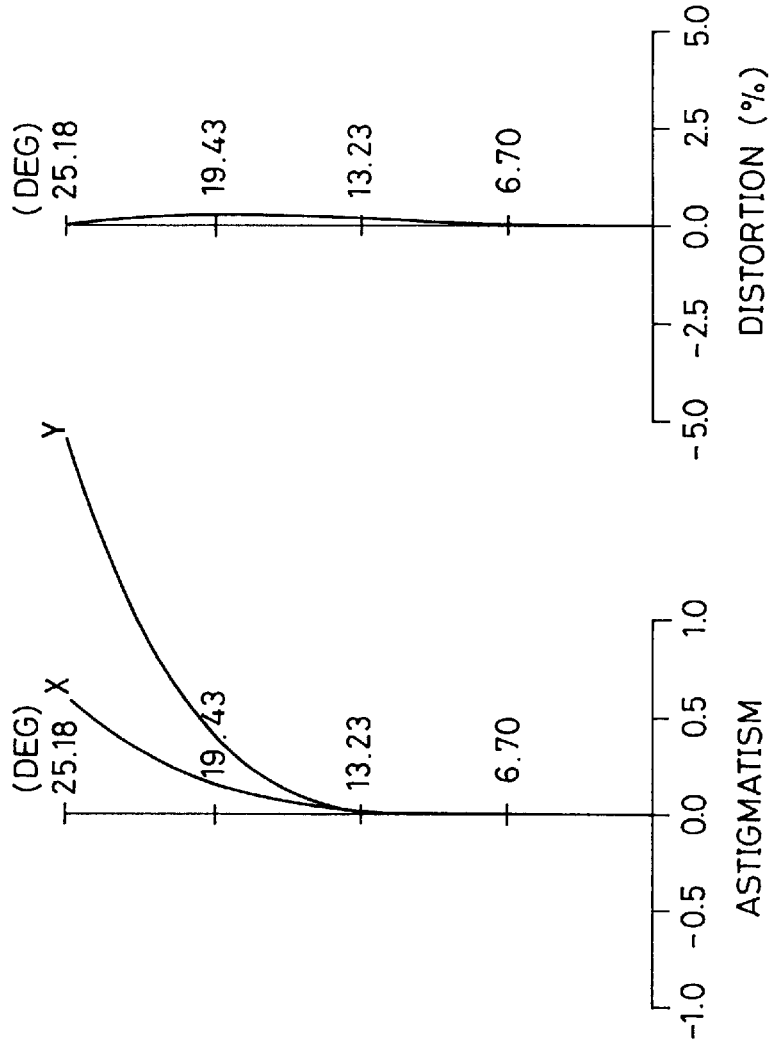
FIGS. 44A, 44B, and 44C are diagrams showing the aberration at the middle focal length in the eleventh embodiment.
Figure 45C:
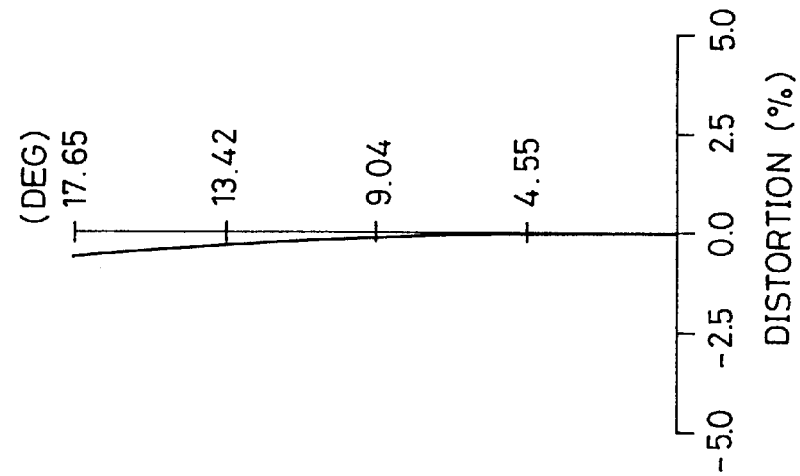
FIGS. 45A, 45B, and 45C are diagrams showing the aberration at the telephoto end in the eleventh embodiment.
Figure 45B:
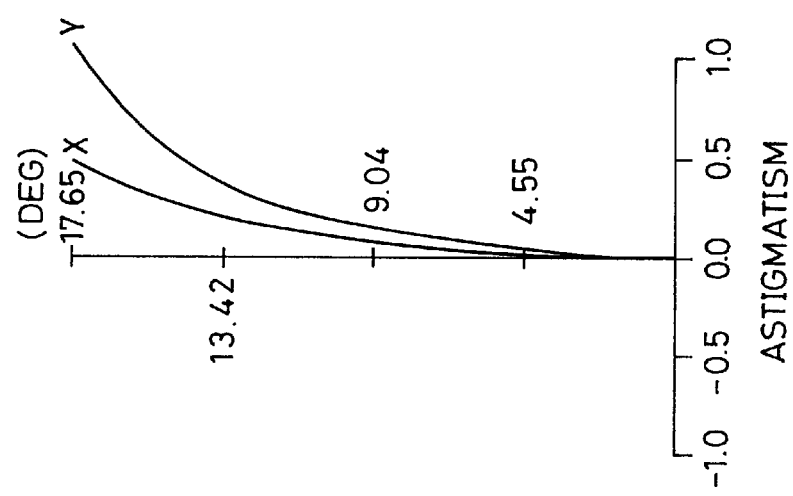
Figure 45A:
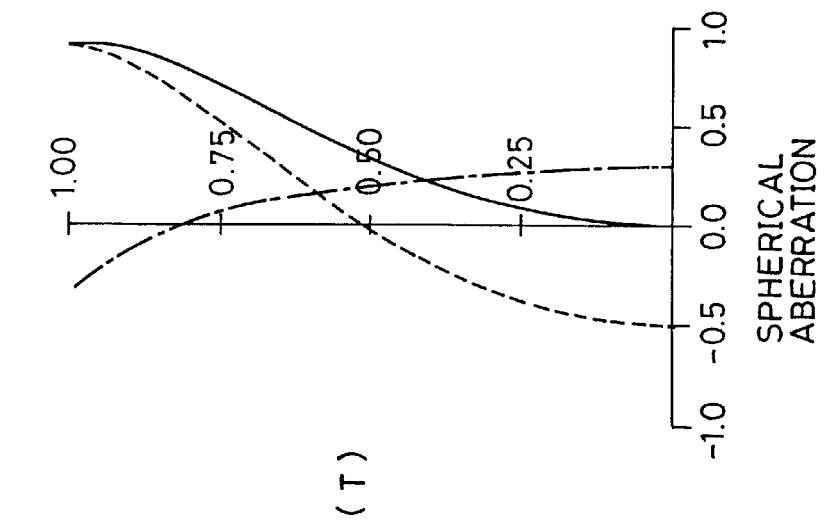
Figure 48C:
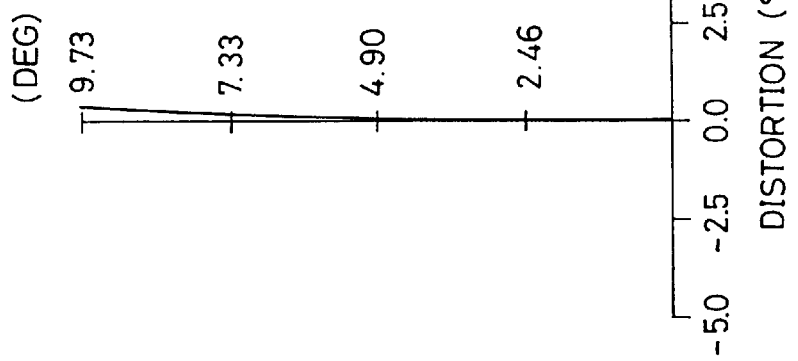
FIGS. 48A, 48B, and 48C are diagrams showing the aberration at the telephoto end in the twelfth embodiment.
Figure 48B:
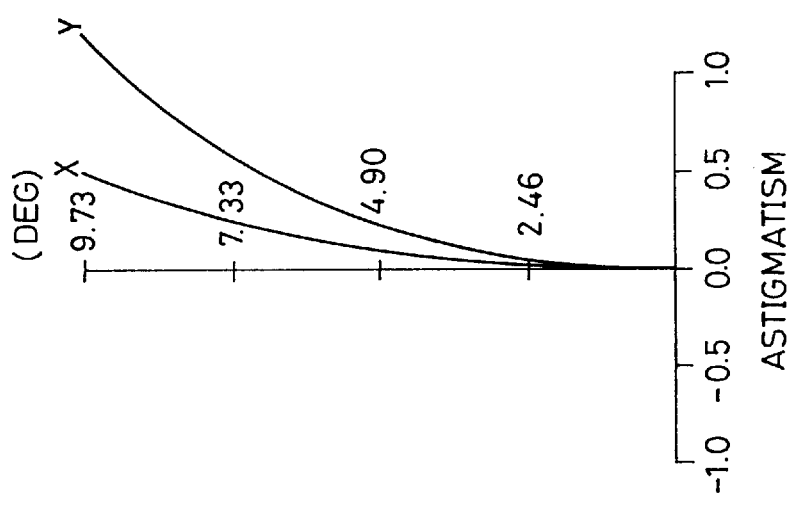
Figure 48A:
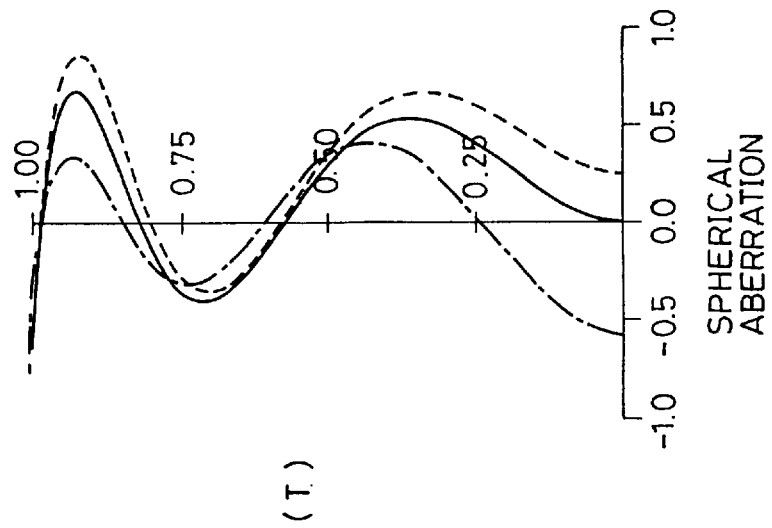
Figure 49:
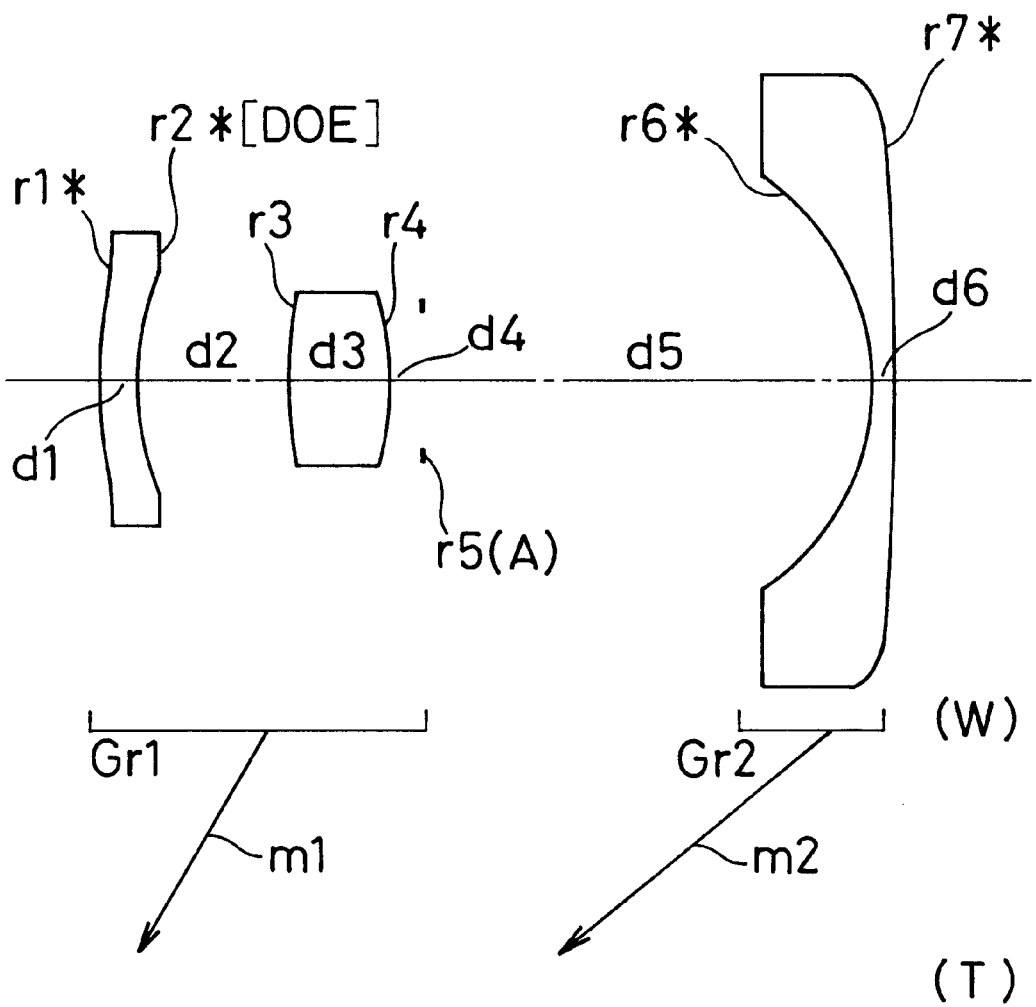
FIG. 49 is a diagram showing the lens construction of the zoom lens system of the thirteenth embodiment of the present invention.
Figure 50:
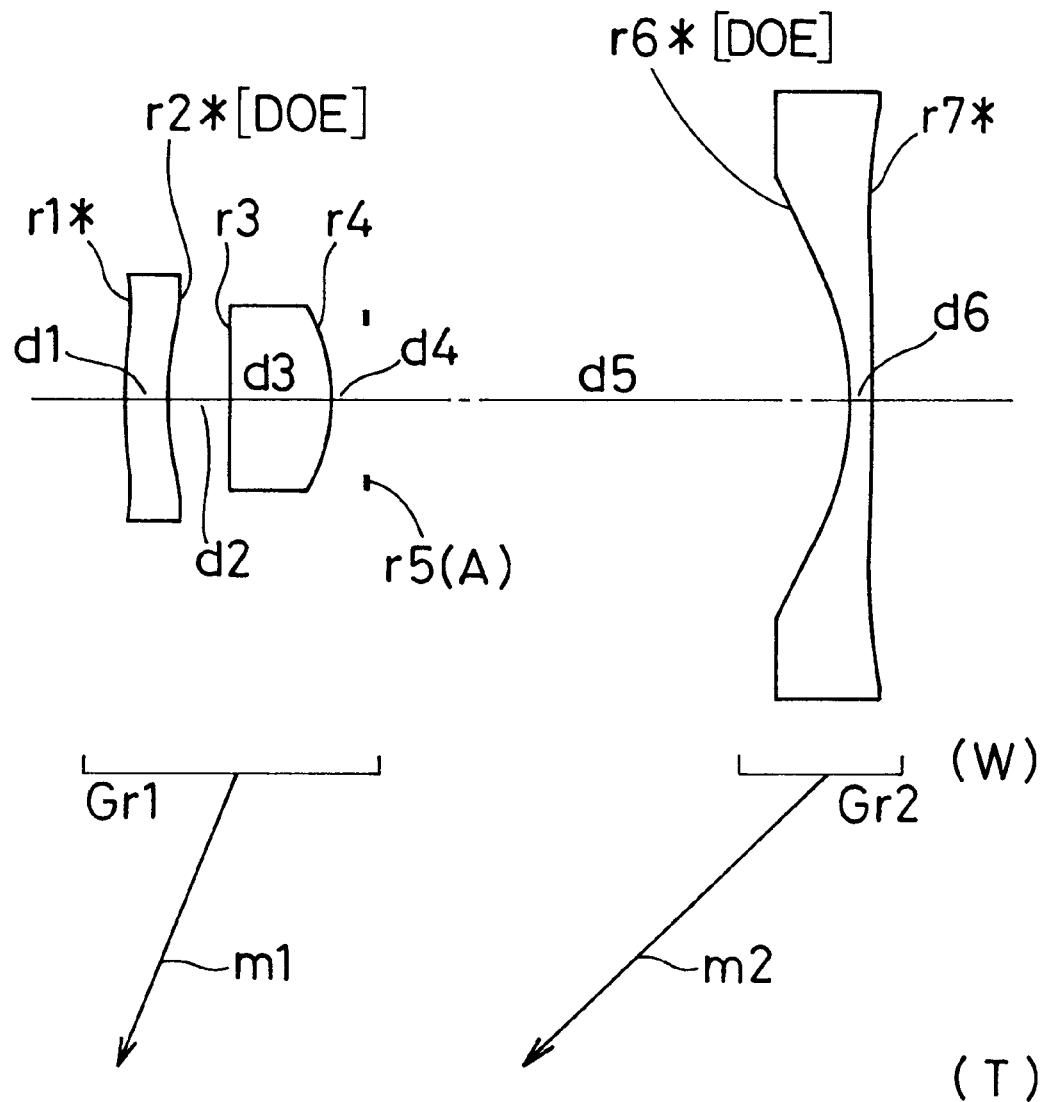
FIG. 50 is a diagram showing the lens construction of the zoom lens system of the fourteenth embodiment of the present invention.
Figure 51:
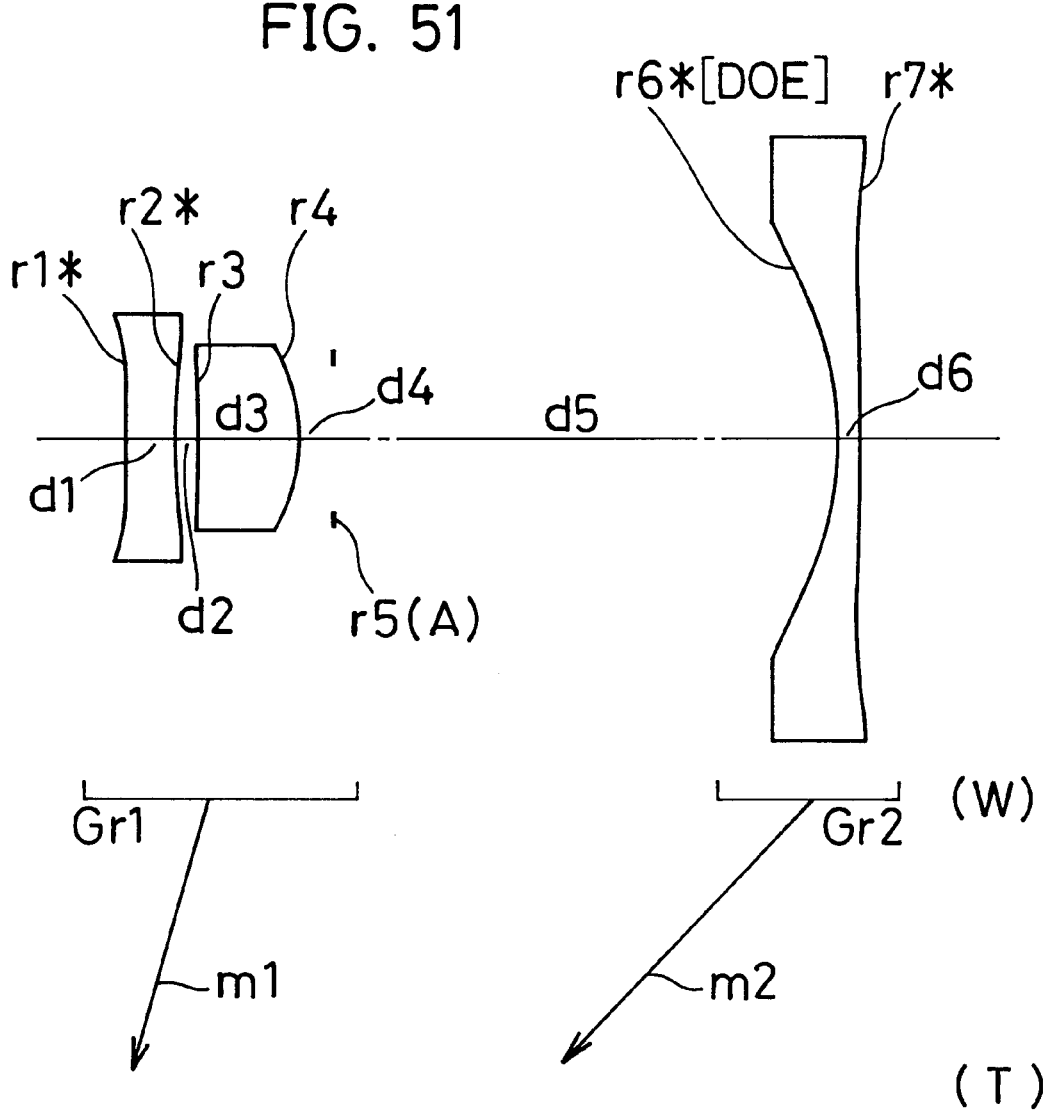
FIG. 51 is a diagram showing the lens construction of the zoom lens system of the fifteenth embodiment of the present invention.
Figure 52:
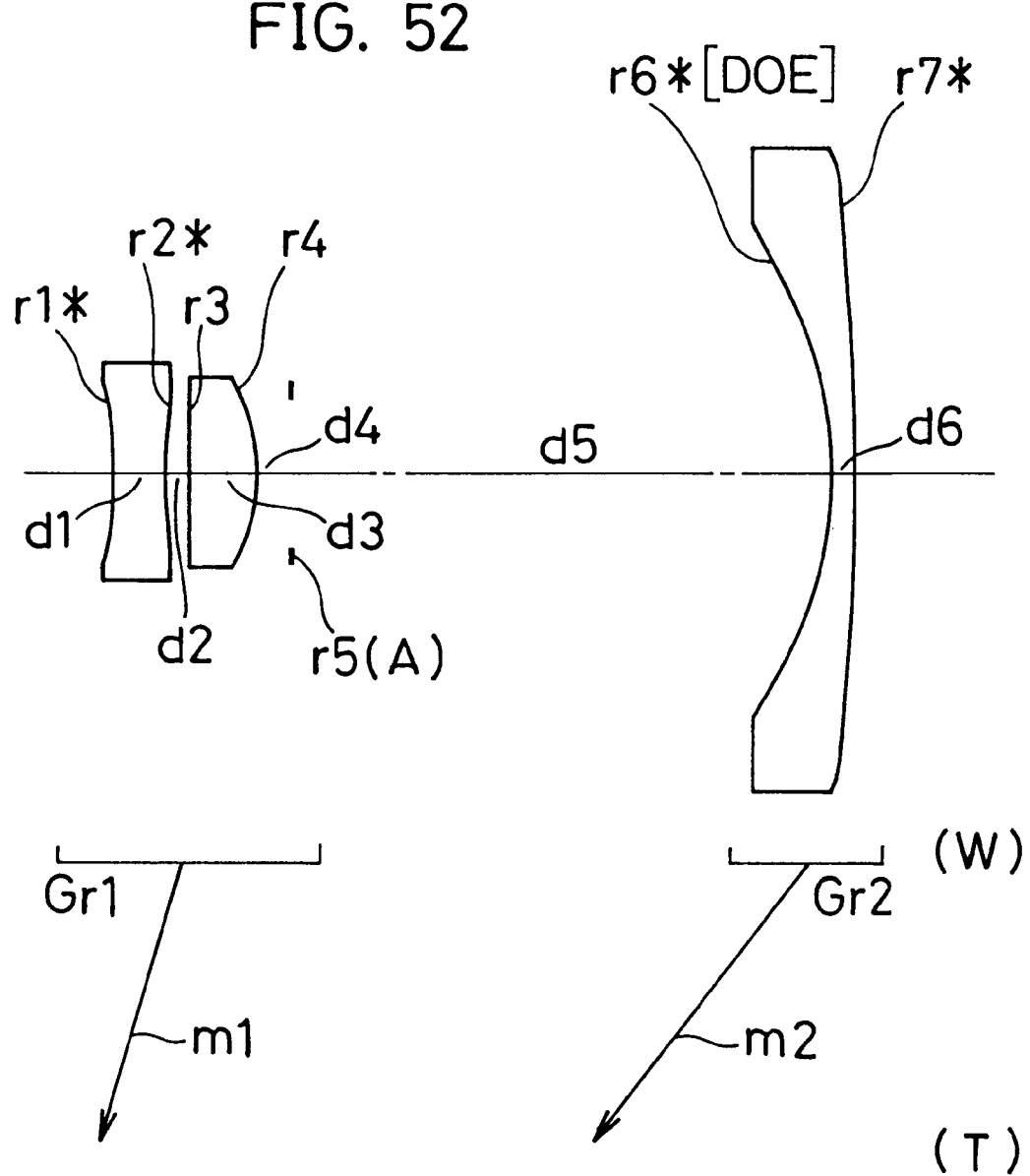
FIG. 52 is a diagram showing the lens construction of the zoom lens system of the sixteenth embodiment of the present invention.
Figure 53:
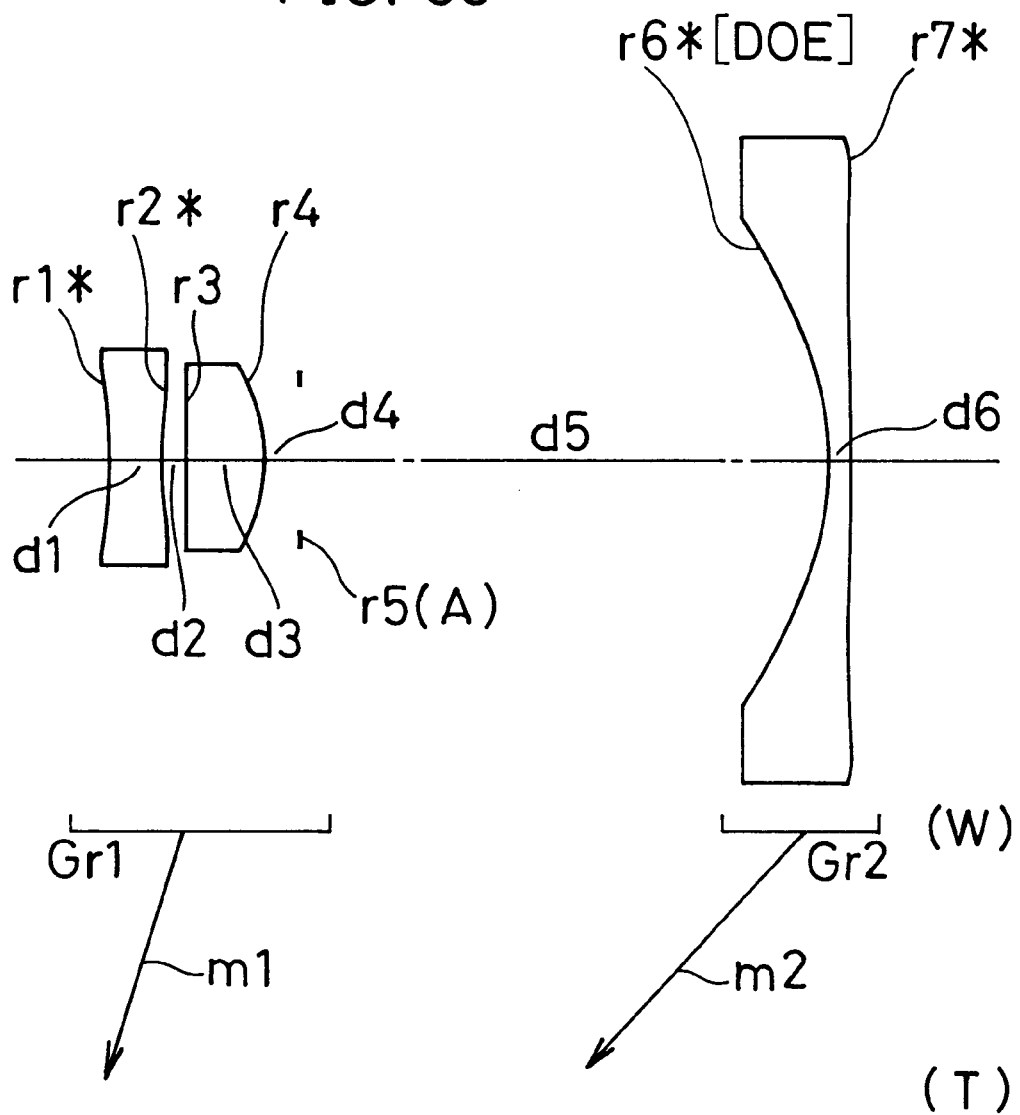
FIG. 53 is a diagram showing the lens construction of the zoom lens system of the seventeenth embodiment of the present invention.
Figure 55C:
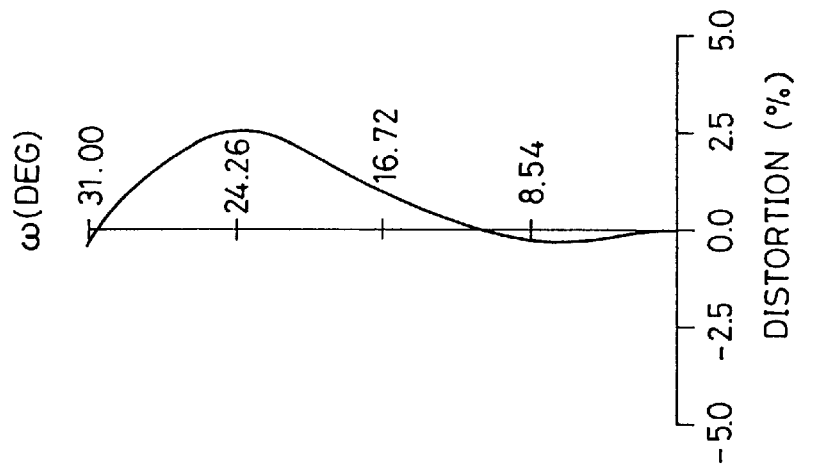
FIGS. 55A, 55B, and 55C are diagrams showing the aberration at the wide-angle end in the thirteenth embodiment.
Figure 55B:
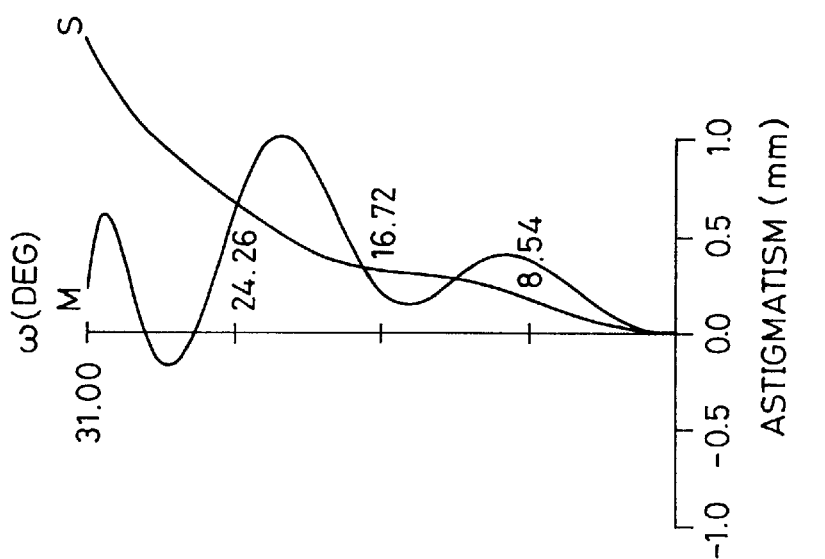
Figure 55A:
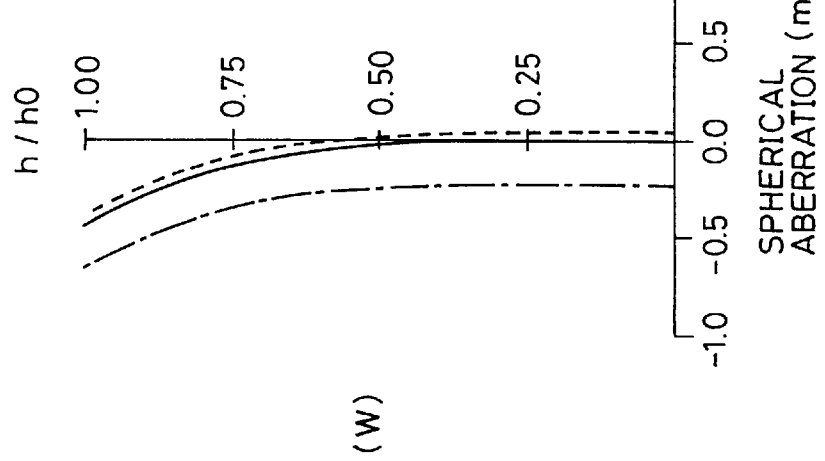
Figure 56C:
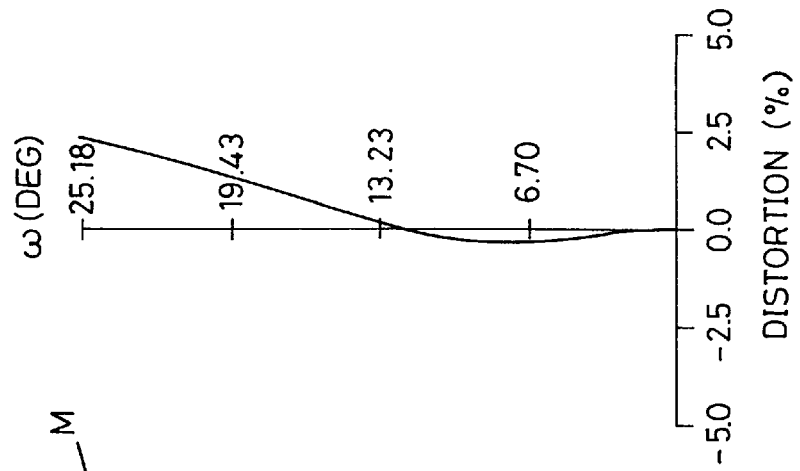
FIGS. 56A, 56B, and 56C are diagrams showing the aberration at the middle focal length in the thirteenth embodiment.
Figure 56B:
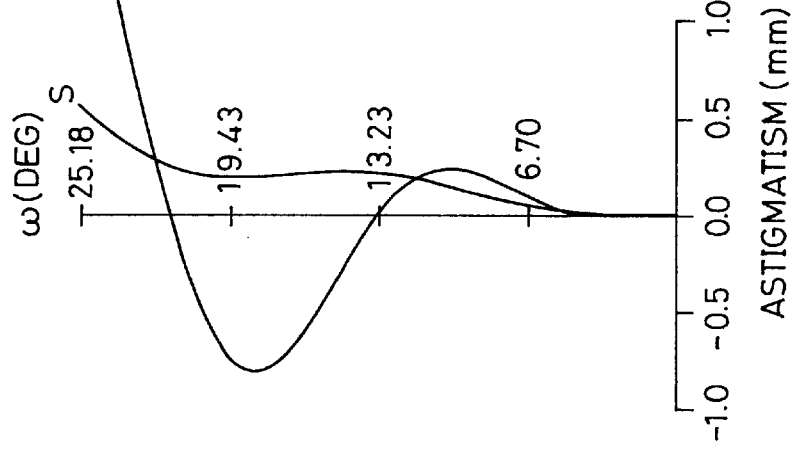
Figure 56A:
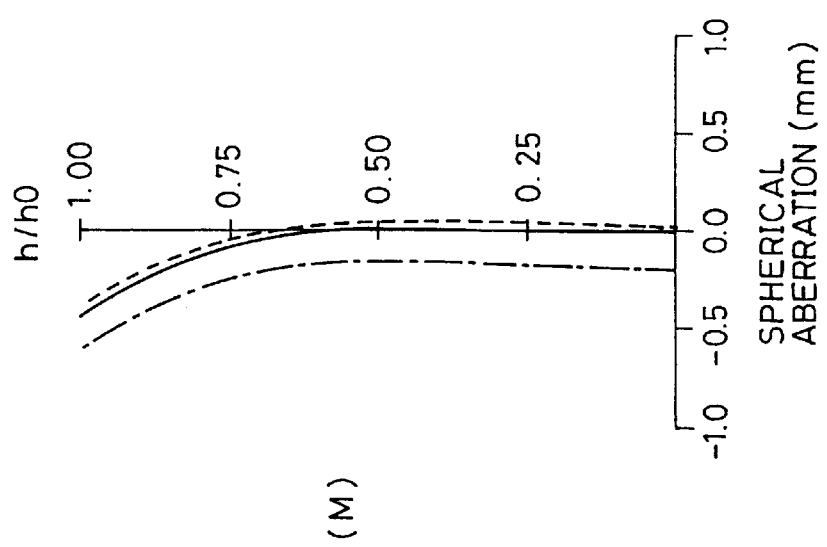
Figure 58C:
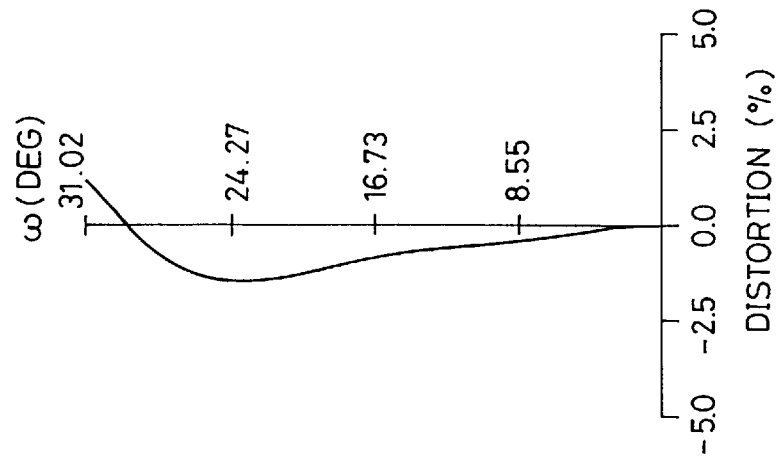
FIGS. 58A, 58B, and 58C are diagrams showing the aberration at the wide-angle end in the fourteenth embodiment.
Figure 58B:
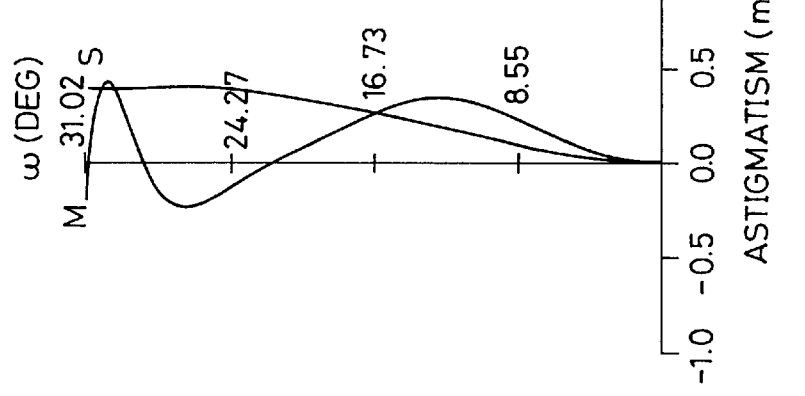
Figure 58A:
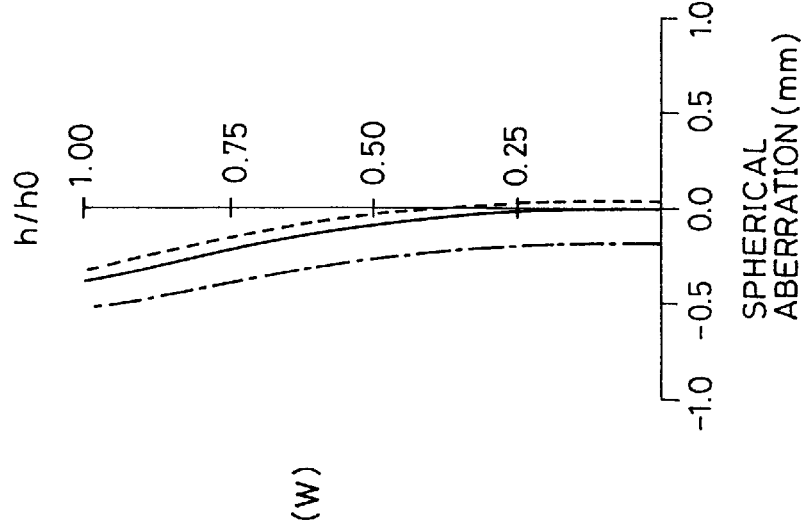
Figure 59C:
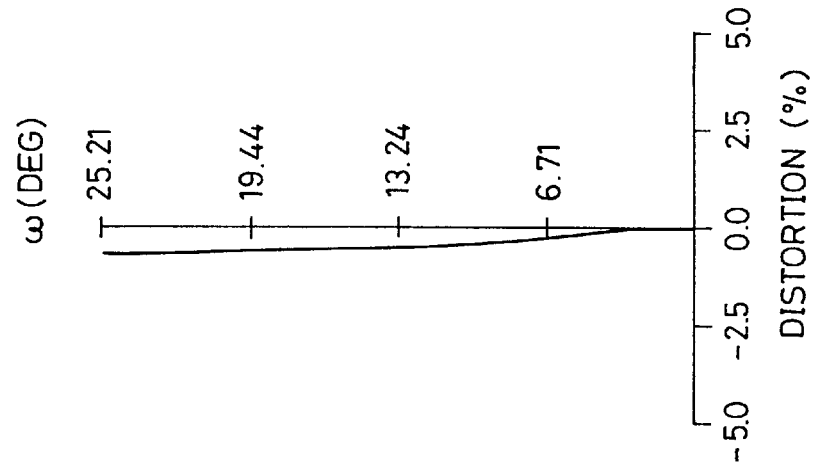
FIGS. 59A, 59B, and 59C are diagrams showing the aberration at the middle focal length in the fourteenth embodiment.
Figure 59B:
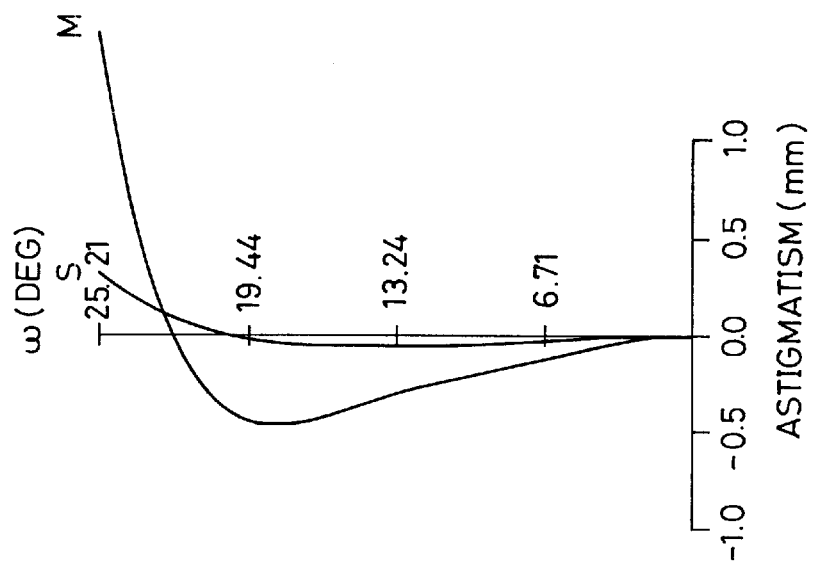
Figure 59A:
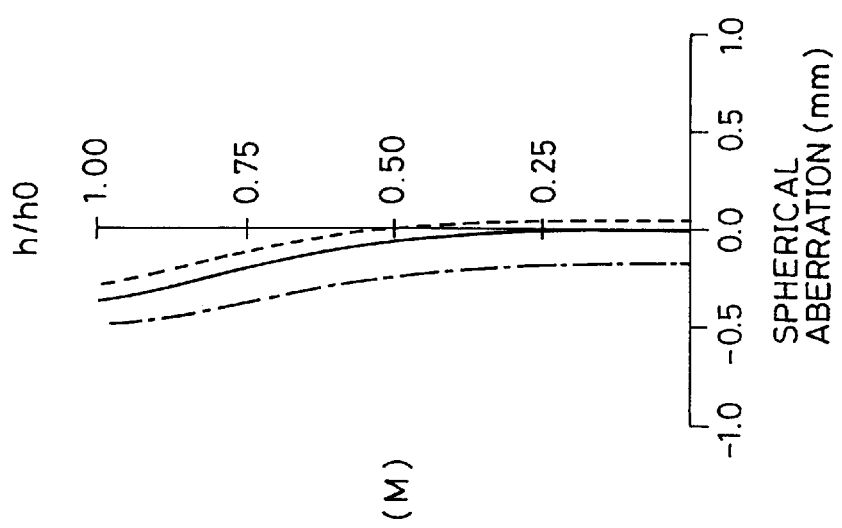
Figure 64C:
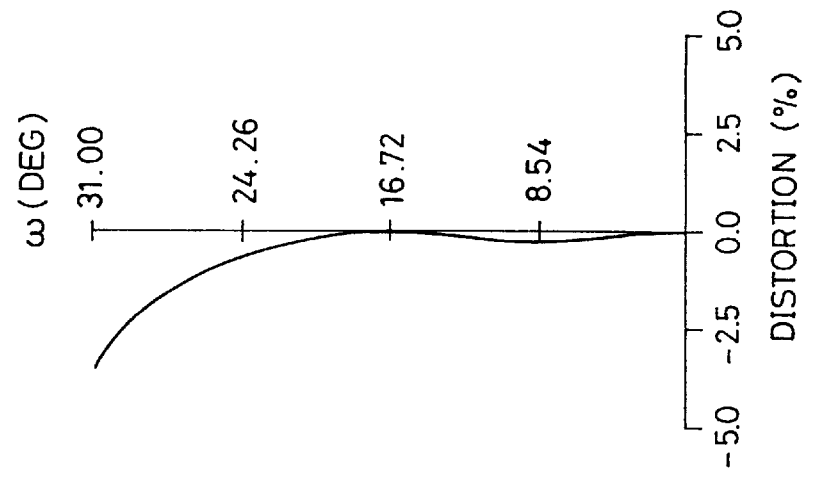
FIGS. 64A, 64B, and 64C are diagrams showing the aberration at the wide-angle end in the sixteenth embodiment.
Figure 64B:
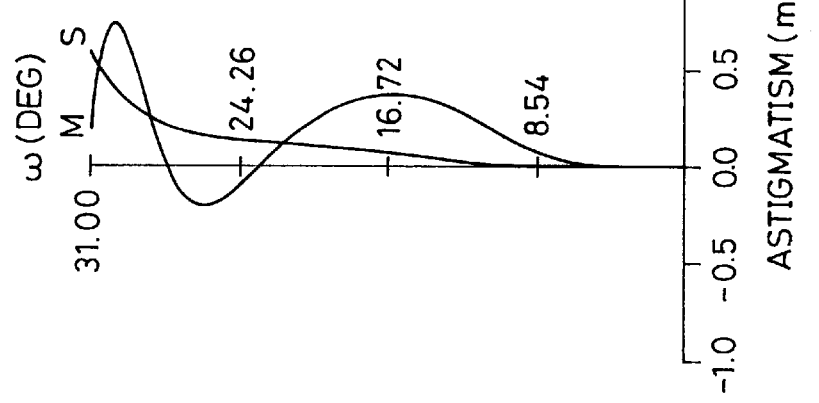
Figure 64A:
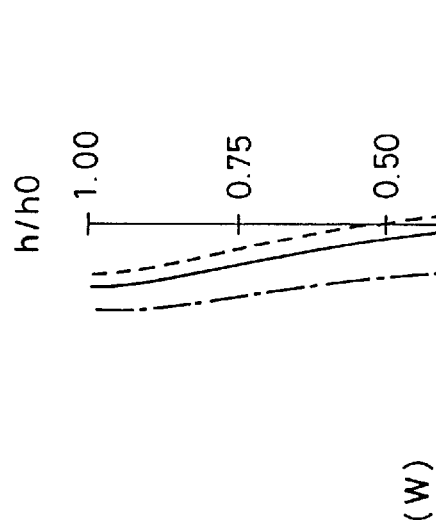
Figure 65C:
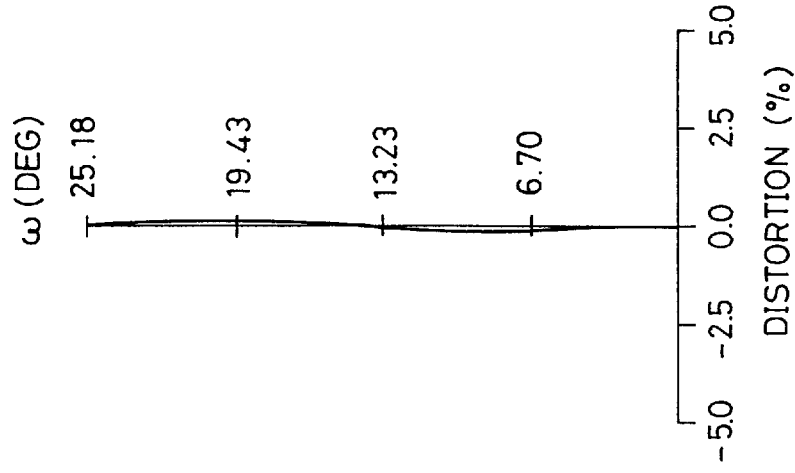
FIGS. 65A, 65B, and 65C are diagrams showing the aberration at the middle focal length in the sixteenth embodiment.
Figure 65B:
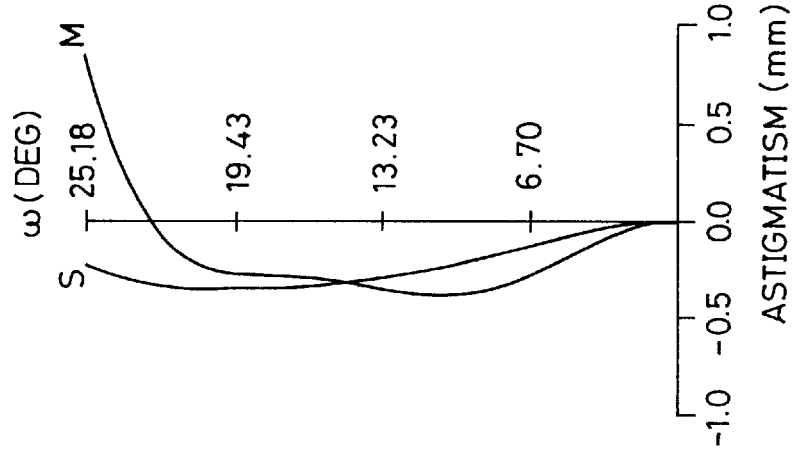
Figure 65A:
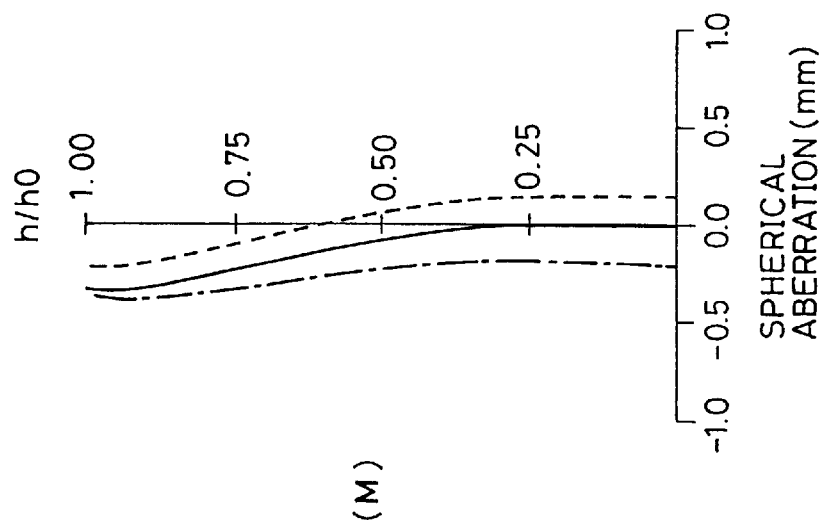
Figure 67C:
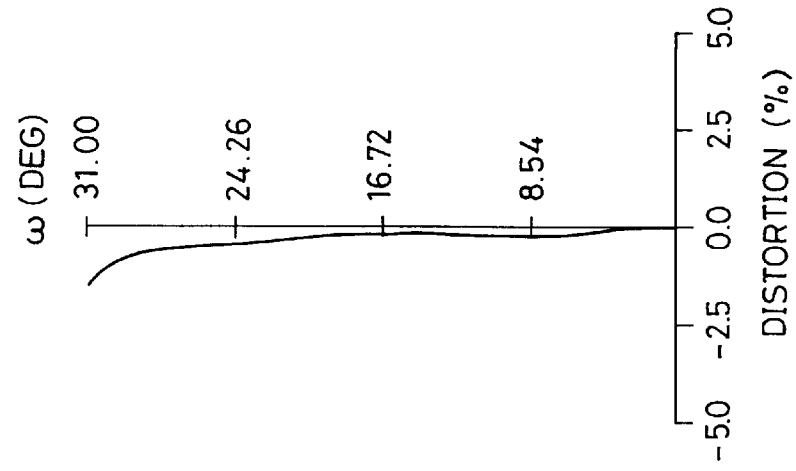
FIGS. 67A, 67B, and 67C are diagrams showing the aberration at the wide-angle end in the seventeenth embodiment.
Figure 67B:
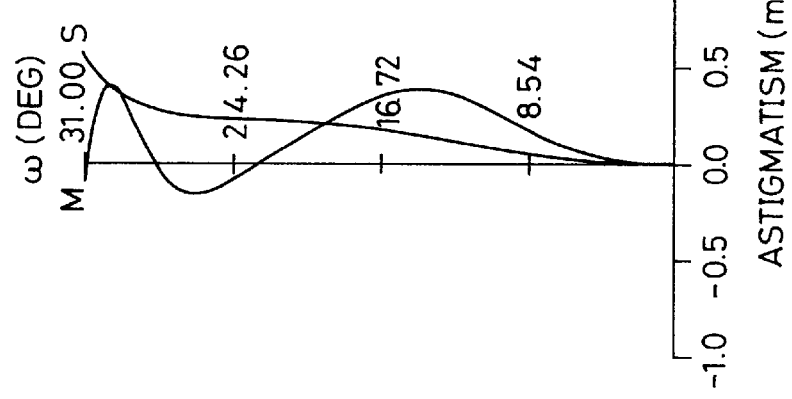
Figure 67A:
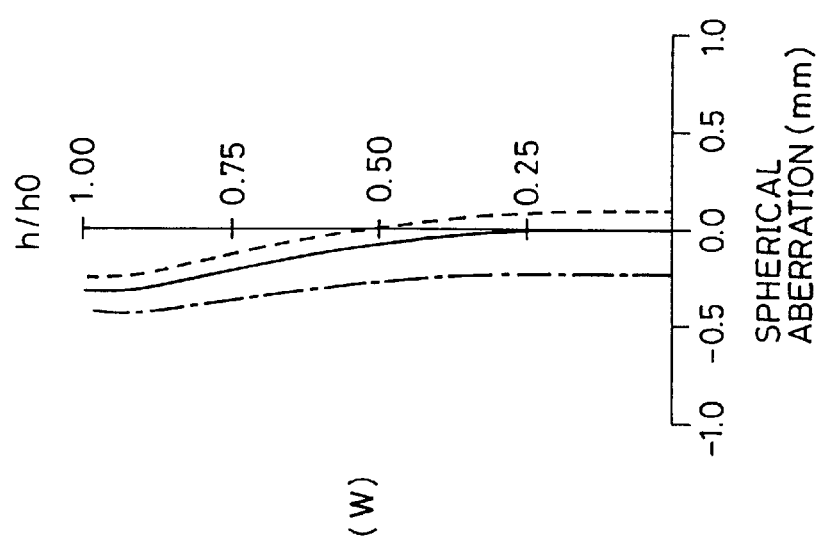
Figure 68A:
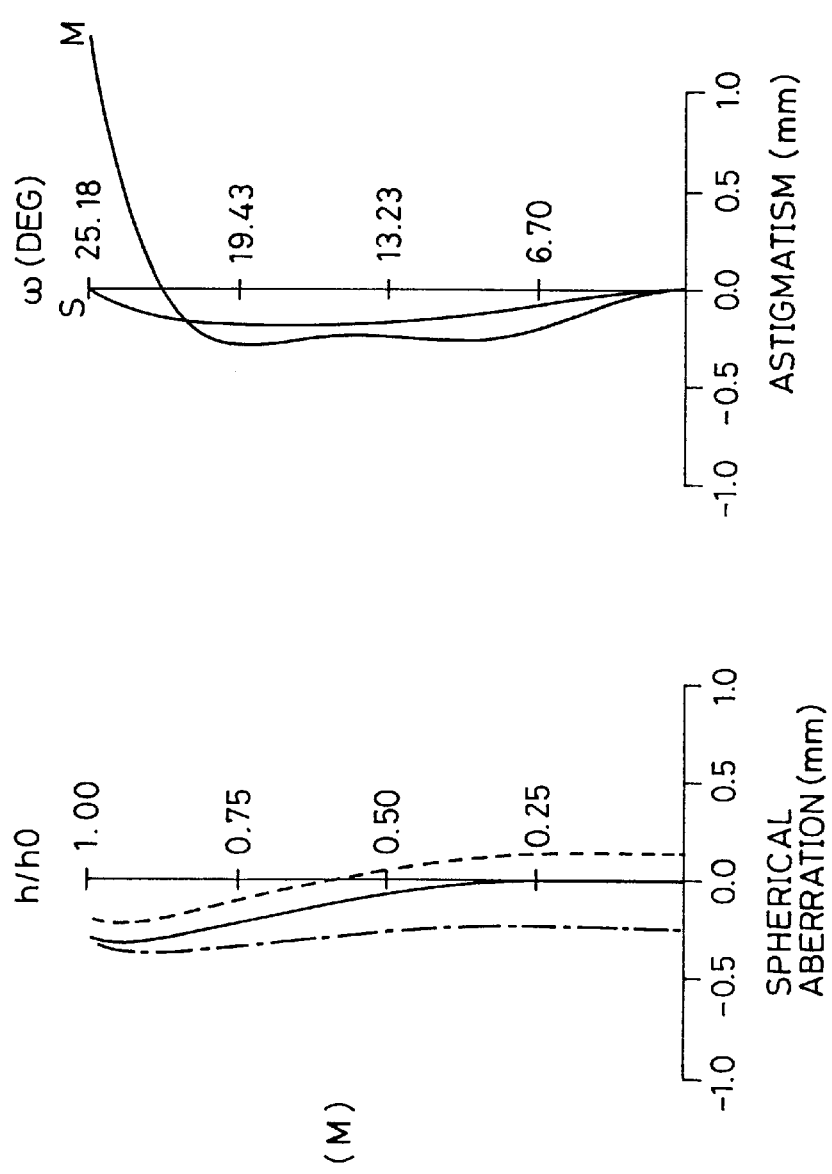
FIGS. 68A, 68B, and 68C are diagrams showing the aberration at the middle focal length in the seventeenth embodiment.
Figure 68B:
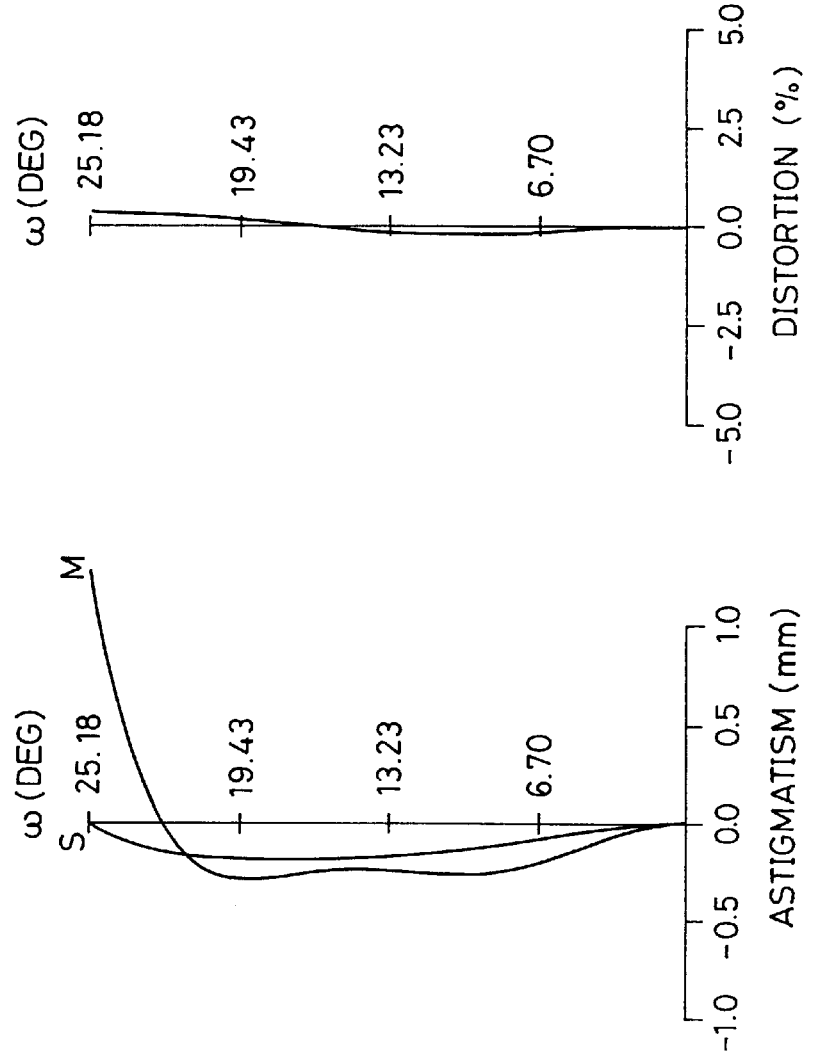
Figure 68C:
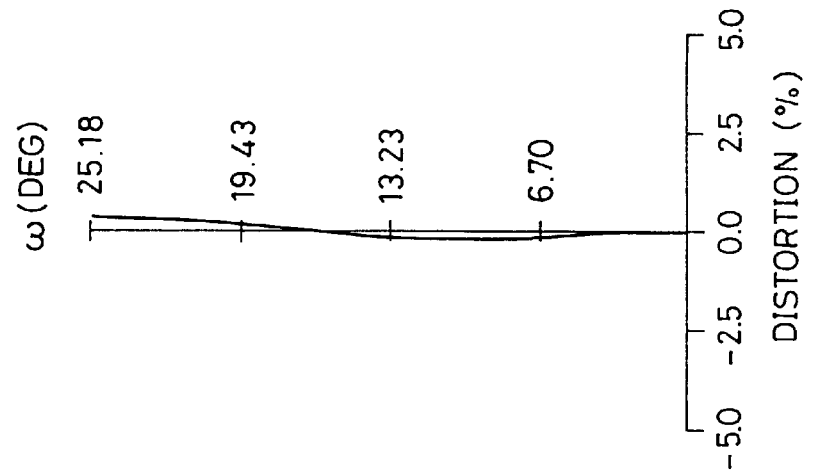
Figure 69C:
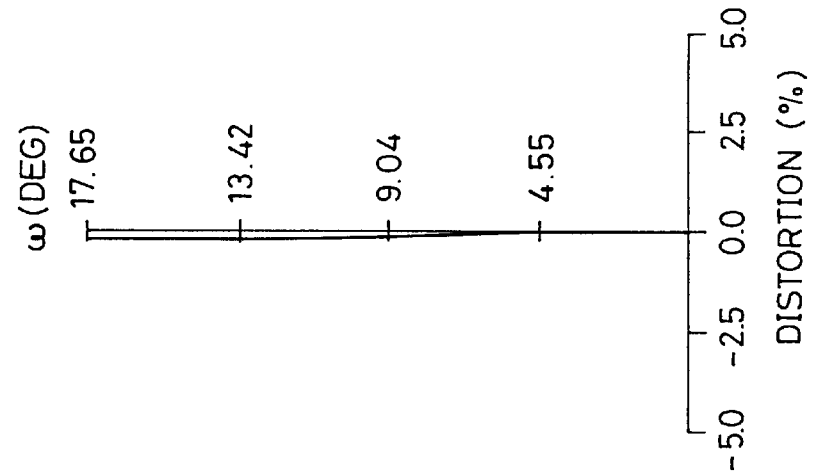
FIGS. 69A, 69B, and 69C are diagrams showing the aberration at the telephoto end in the seventeenth embodiment.
Figure 69B:
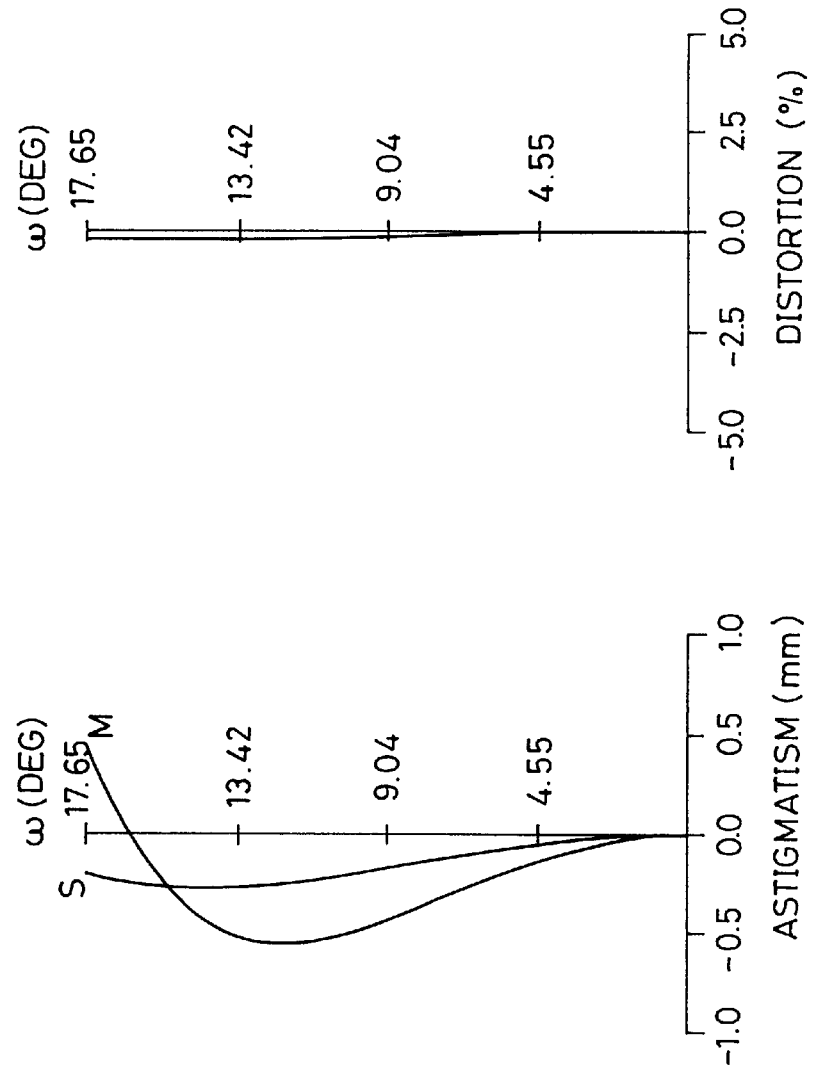
Figure 69A:
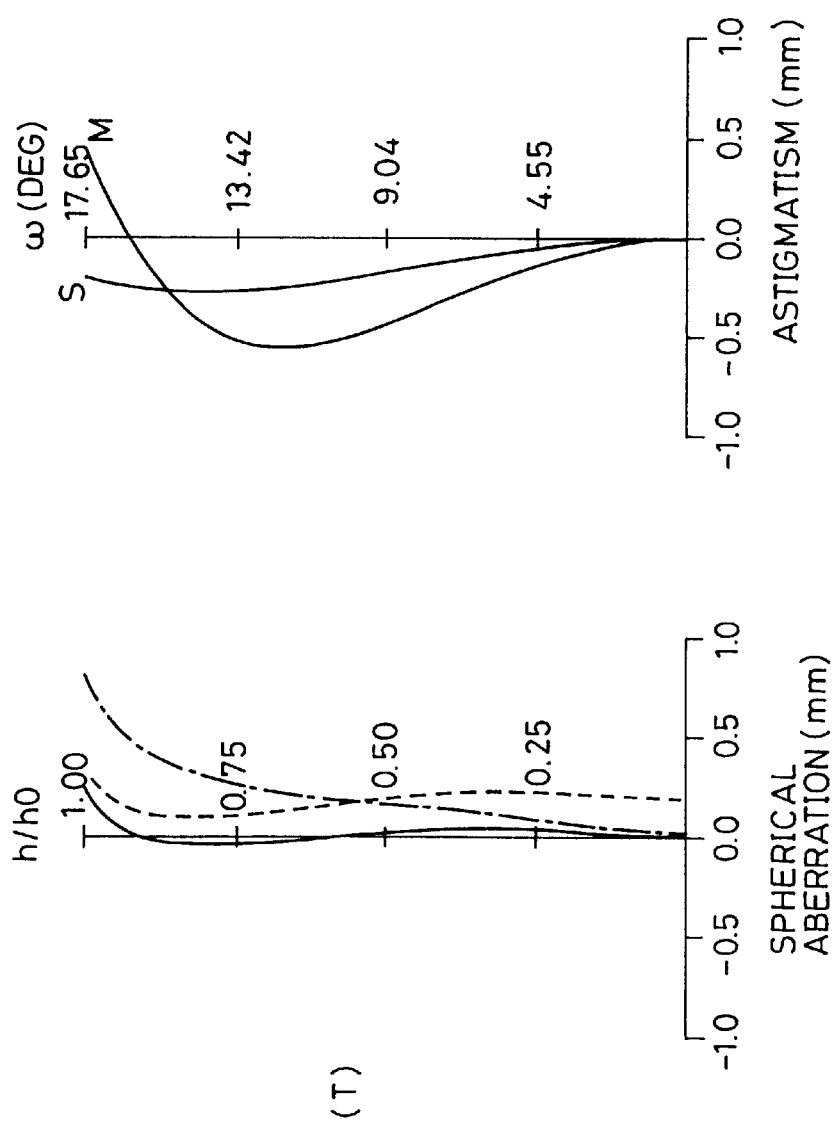
Figure 70C:
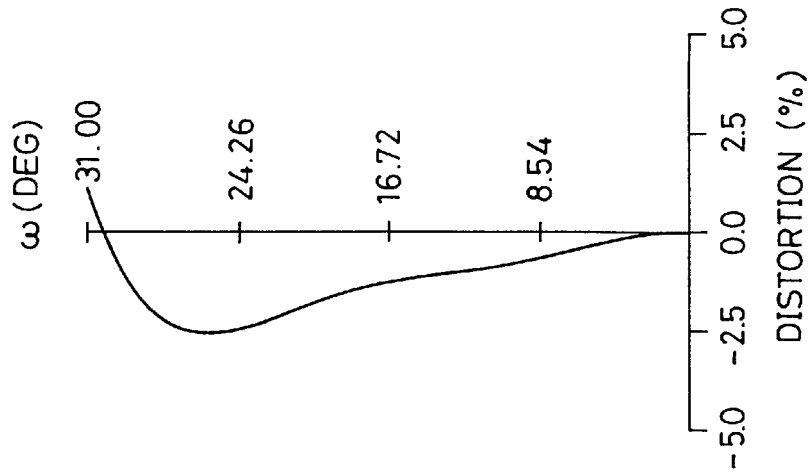
FIGS. 70A, 70B, and 70C are diagrams showing the aberration at the wide-angle end in the eighteenth embodiment.
Figure 70B:
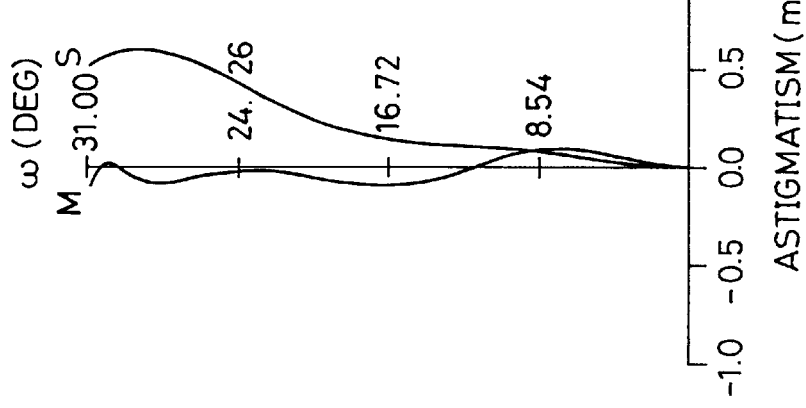
Figure 70A:
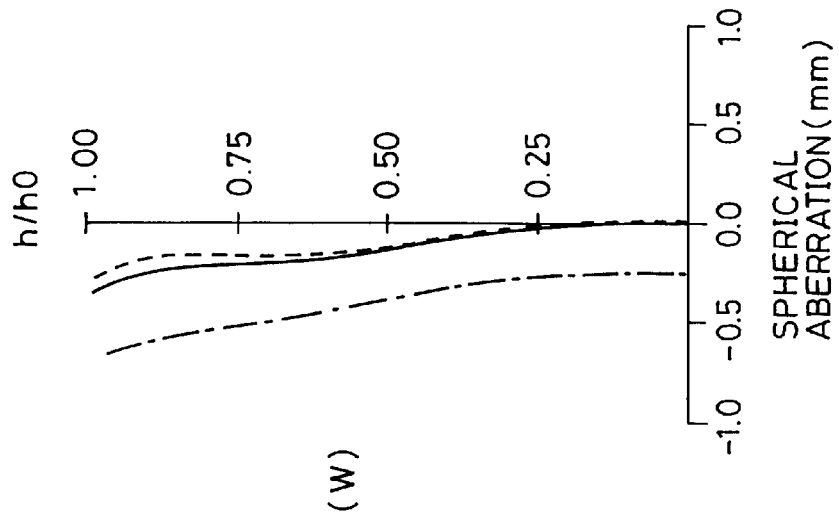

Hereinafter, the zoom lens system of the present invention will be described with reference to the drawings. Note that, in the following descriptions, the power with which a diffractive optical element diffracts light is referred to as the power of the diffractive optical element, and the composition of the power with which a diffractive optical element diffracts light and the refractive powers of individual refractive optical surfaces is referred to as the composite power of the diffractive optical element and the refractive optical surfaces.

The zoom lens systems of the first to twenty-first embodiments of the present invention will be described below. The zoom lens system of each embodiment is constituted of, from the object side, a first lens unit Gr1 having a positive refractive power and a second lens unit Gr2 having a negative refractive power. During zooming from the wide-angle end to the telephoto end, the first and second lens units Gr1 and Gr2 are moved in such a way that the distance between them decreases. In each figure showing the lens construction, the arrows m1 and m2 schematically show the directions in which the first and second lens units Gr1 and Gr2 are respectively moved during zooming from the wide-angle end (W) to the telephoto end (T).

FIGS. 1 to 7 show the lens constructions of the zoom lens systems of the first to seventh embodiments. Each figure shows the lens construction at the wide-angle end (W). In FIGS. 1 to 7, ri (i=1, 2, 3, . . . ) represents the i-th surface from the object side, and di (i=1, 2, 3, . . . ) represents the i-th axial distance from the object side. A surface ri marked with an asterisk (*) is an aspherical surface, and a surface ri marked with [DOE] is a diffractive optical surface.

The zoom lens system of the first embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a negative meniscus lens element L2 (having aspherical surfaces on both sides and a diffractive optical element on the image-surface side) with its convex surface facing toward the object side.

The zoom lens system of the second embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a negative meniscus lens element L2 (having aspherical surfaces on both sides and a diffractive optical element on the image-surface side) with its convex surface facing toward the object side.

The zoom lens system of the third embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a negative meniscus lens element L2 (having aspherical surfaces on both sides and a diffractive optical element on the image-surface side) with its convex surface facing toward the object side.

The zoom lens system of the fourth embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a negative meniscus lens element L2 (having aspherical surfaces on both sides and a diffractive optical element on the image-surface side) with its convex surface facing toward the object side.

The zoom lens system of the fifth embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a negative meniscus lens element L2 (having aspherical surfaces on both sides) with its convex surface facing toward the object side.

The zoom lens system of the sixth embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) made of plastics with its concave surface facing toward the object side, and a second lens unit Gr2 composed only of a negative meniscus lens element L2 (having aspherical surfaces on both sides and a diffractive optical element on the image-surface side) made of plastics with its convex surface facing toward the object side.

The zoom lens system of the seventh embodiment is constituted of, from the object side, a first lens unit Gr1 composed of a light-shielding member F, an aperture diaphragm A, and a positive meniscus lens element L1 (having aspherical surfaces on both sides and a diffractive optical element on the image-surface side) with its concave surface facing toward the object side, and a second lens unit Gr2 composed only of a biconcave lens element L2 (having aspherical surfaces on both sides and a diffractive optical element on the image-surface side) made of plastics.

To make a zoom lens system compact, it is necessary to shorten its total length at the telephoto end. The zoom lens systems of the first to seventh embodiments are designed to be a telephoto-oriented zoom lens system by arranging a negative lens unit at the image-surface-side end. As a result, it is possible to realize a compact zoom lens system with a relatively short total length at the telephoto end.

Moreover, the zoom lens systems of the first to seventh embodiments are provided with a diffractive optical element. The use of at least one diffractive optical element in a zoom lens system makes it possible to properly correct chromatic aberration, which is difficult to correct in a conventional zoom lens system composed solely of refractive optical elements when the number of optical elements is reduced to a minimum.

Next, FIGS. 29 to 33 show the lens constructions of the zoom lens systems of the eighth to twelfth embodiments. Each figure shows the lens construction at the wide-angle end (W). In FIGS. 29 to 33, ri (i=1, 2, 3, . . . ) represents the i-th surface from the object side, and di (i=1, 2, 3, . . . ) represents the i-th axial distance from the object side. A surface ri marked with an asterisk (*) is an aspherical surface, and a surface ri marked with [DOE] is a diffractive optical surface.

The zoom lens system of the eighth embodiment is constituted of, from the object side, a first lens unit Gr1 composed of a first lens element L1 (having aspherical surfaces on both sides) that is a negative meniscus lens with its concave surface facing toward the object side, a second lens element L2 that is a biconvex lens, and an aperture diaphragm A, and a second lens unit Gr2 composed of a third lens element L3 (having aspherical surfaces on both sides and a diffractive optical element on the object side, and made of plastics) that is a positive meniscus lens with its convex surface facing toward the image side, and a fourth lens element L4 that is a negative meniscus lens with its concave surface facing toward the object side.

The zoom lens system of the ninth embodiment is constituted of, from the object side, a first lens unit Gr1 composed of a first lens element L1 (having aspherical surfaces on both sides and a diffractive optical element on the object side) that is a negative meniscus lens with its convex surface facing toward the object side, a second lens element L2 that is a positive meniscus lens with its convex surface facing toward the image side, and an aperture diaphragm A, and a second lens unit Gr2 composed of a third lens element L3 (having aspherical surfaces on both sides) that is a positive meniscus lens with its convex surface facing toward the image side, and a fourth lens element L4 that is a negative meniscus lens with its concave surface facing toward the object side.

The zoom lens system of the tenth embodiment is constituted of, from the object side, a first lens unit Gr1 composed of a first lens element L1 (having aspherical surfaces on both sides) that is a negative meniscus lens with its convex surface facing toward the object side, a second lens element L2 (having a diffractive optical element on the image-surface side, and made of plastics) that is a biconvex lens, and an aperture diaphragm A, and a second lens unit Gr2 composed of a third lens element L3 (having aspherical surfaces on both sides and a diffractive optical element on the object side) that is a positive meniscus lens with its convex surface facing toward the image side, and a fourth lens element L4 that is a negative meniscus lens with its concave surface facing toward the object side.

The zoom lens system of the eleventh embodiment is constituted of, from the object side, a first lens unit Gr1 composed of a first lens element L1 (having an aspherical surface on the object side and a diffractive optical element on the object side) that is a negative meniscus lens with its convex surface facing toward the object side, a second lens element L2 that is a biconvex lens, and an aperture diaphragm A, and a second lens unit Gr2 composed of a third lens element L3 (having an aspherical surface on the image side) that is a positive meniscus lens with its convex surface facing toward the image side, and a fourth lens element L4 that is a negative meniscus lens with its concave surface facing toward the object side.

The zoom lens system of the twelfth embodiment is constituted of, from the object side, a first lens unit Gr1 composed of a first lens element L1 (having aspherical surfaces on both sides) that is a negative meniscus lens with its convex surface facing toward the object side, a second lens element L2 (having a diffractive optical element on the image side) that is a biconvex lens, and an aperture diaphragm, and a second lens unit Gr2 composed of a third lens element L3 (having aspherical surfaces on both sides) that is a positive meniscus lens with its convex surface facing toward the image side, and a fourth lens element L4 (having a diffractive optical element on the image side) that is a negative meniscus lens with its concave surface facing toward the object side.

In the zoom lens systems of the eighth to twelfth embodiments, the first lens unit Gr1 is composed of two lens elements. When the first lens unit Gr1 is composed of at least two lens elements, it is possible to properly correct off-axial coma aberration, which occurs in the first lens unit Gr1 when the whole system is adapted to high magnifications.

Moreover, the zoom lens systems of the eighth to twelfth embodiments are each provided with a diffractive optical element. The use of at least one diffractive optical element in a zoom lens system makes it possible to properly correct chromatic aberration, which is difficult to correct in a conventional zoom lens system composed solely of refractive optical surfaces.

FIGS. 49 to 54 show the lens constructions of the zoom lens systems of the thirteenth to eighteenth embodiments. Each figure shows the lens construction at the wide-angle end (W). In FIGS. 49 to 54, ri (i=1, 2, 3, . . . ) represents the i-th surface from the object side, and di (i=1, 2, 3, . . . ) represents the i-th axial distance from the object side. A surface ri marked with an asterisk (*) is an aspherical surface, and a surface ri marked with [DOE] is a diffractive optical surface.

In the thirteenth embodiment, the first lens unit Gr1 is composed of, from the object side, a negative meniscus lens element (having aspherical surfaces on both sides and a diffractive optical element on the image side) with its convex surface facing toward the object side, a biconvex positive lens element, and an aperture diaphragm A. The second lens unit Gr2 is composed of a negative meniscus lens element (having aspherical surfaces on both sides) with its convex surface facing toward the image side.

In the fourteenth embodiment, the first lens unit Gr1 is composed of, from the object side, a negative meniscus lens element (having aspherical surfaces on both sides and a diffractive optical element on the image side) with its convex surface facing toward the object side, a positive meniscus lens element with its concave surface facing toward the object side, and an aperture diaphragm A. The second lens unit Gr2 is composed of a negative meniscus lens element (having aspherical surfaces on both sides and a diffractive optical element on the object side) with its convex surface facing toward the image side.

In the fifteenth embodiment, the first lens unit Gr1 is composed of, from the object side, a negative meniscus lens element (having aspherical surfaces on both sides) with its convex surface facing toward the object side, a positive meniscus lens element with its concave surface facing toward the object side, and an aperture diaphragm A. The second lens unit Gr2 is composed of a negative meniscus lens element (having aspherical surfaces on both sides and a diffractive optical element on the object side) with its convex surface facing toward the image side.

In the sixteenth embodiment, the first lens unit Gr1 is composed of, from the object side, a negative meniscus lens element (having aspherical surfaces on both sides) with its concave surface facing toward the object side, a biconvex positive lens element, and an aperture diaphragm A. The second lens unit Gr2 is composed of a negative meniscus lens element (having aspherical surfaces on both sides and a diffractive optical element on the object side) with its convex surface facing toward the image side.

In the seventeenth embodiment, the first lens unit Gr1 is composed of, from the object side, a negative meniscus lens element (having aspherical surfaces on both sides) with its concave surface facing toward the object side, a biconvex positive lens element, and an aperture diaphragm A. The second lens unit Gr2 is composed of a negative meniscus lens element (having aspherical surfaces on both sides and a diffractive optical element on the object side) with its convex surface facing toward the image side.

In the eighteenth embodiment, the first lens unit Gr1 is composed of, from the object side, a negative meniscus lens element (having aspherical surfaces on both sides) with its concave surface facing toward the object side, a positive meniscus lens element (having a diffractive optical element on the image side) with its concave surface facing toward the object side, and an aperture diaphragm A. The second lens unit Gr2 is composed of a negative meniscus lens element (having aspherical surfaces on both sides) with its convex surface facing toward the image side.

As described above, in the zoom lens systems of the thirteenth to eighteenth embodiments, the first lens unit Gr1 is composed of two lens elements. When the first lens unit Gr1 is composed of at least two lens elements, it is possible to properly correct the off-axial coma aberration occurring in the first lens unit Gr1. Although the second lens unit Gr2 is composed of one lens element, such reduction in the number of lens elements does not result here in undercorrection of chromatic aberration as experienced in a conventional zoom lens system composed solely of refractive optical surfaces. This is because the use of at least one diffractive optical element within the whole zoom lens system makes it possible to properly correct chromatic aberration. Note that the only lens composing the second lens unit Gr2 may be either a single lens or doublet lens.

Figure 73:
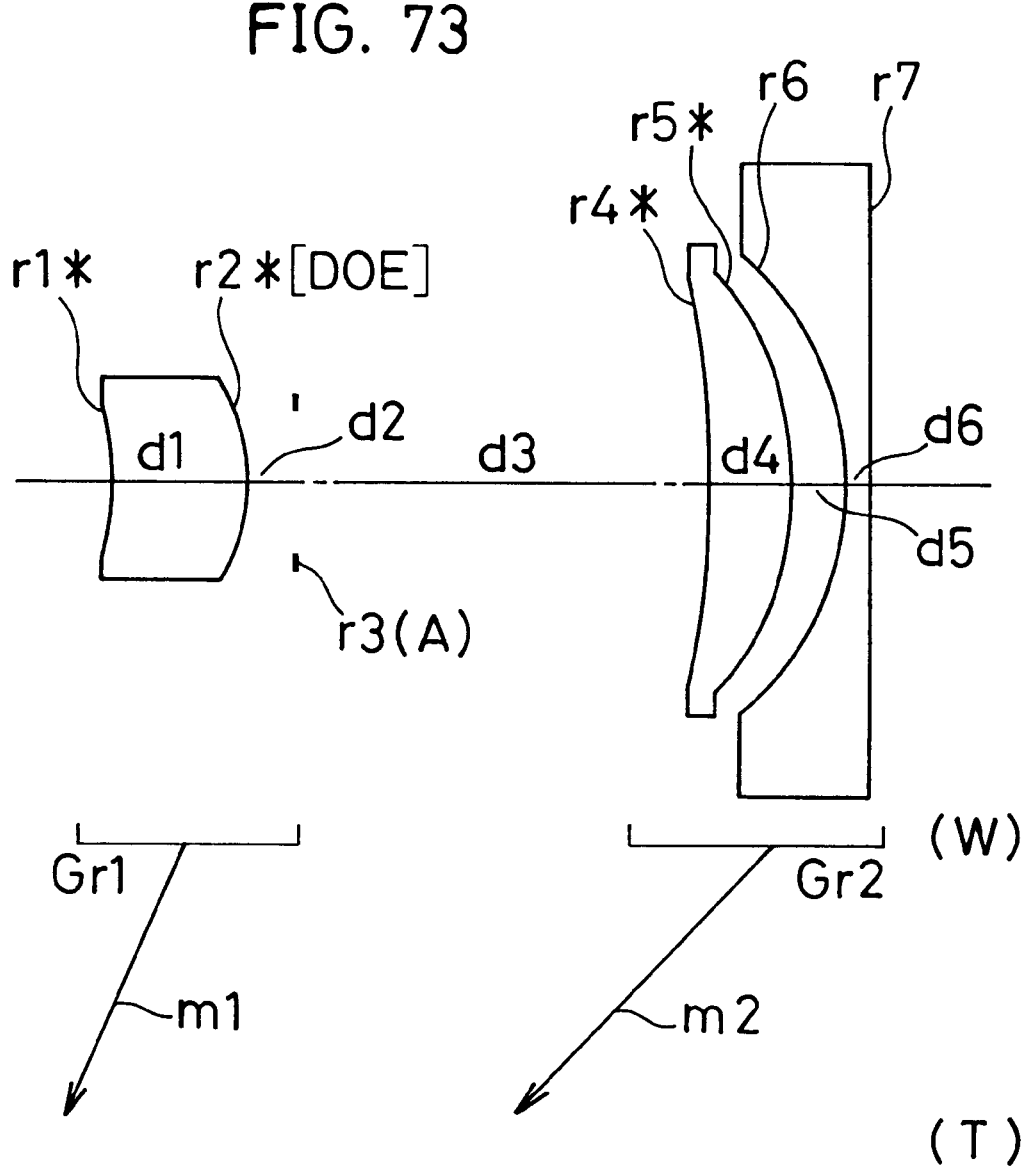
FIG. 73 is a diagram showing the lens construction of the zoom lens system of the nineteenth embodiment of the present invention.
Figure 74:
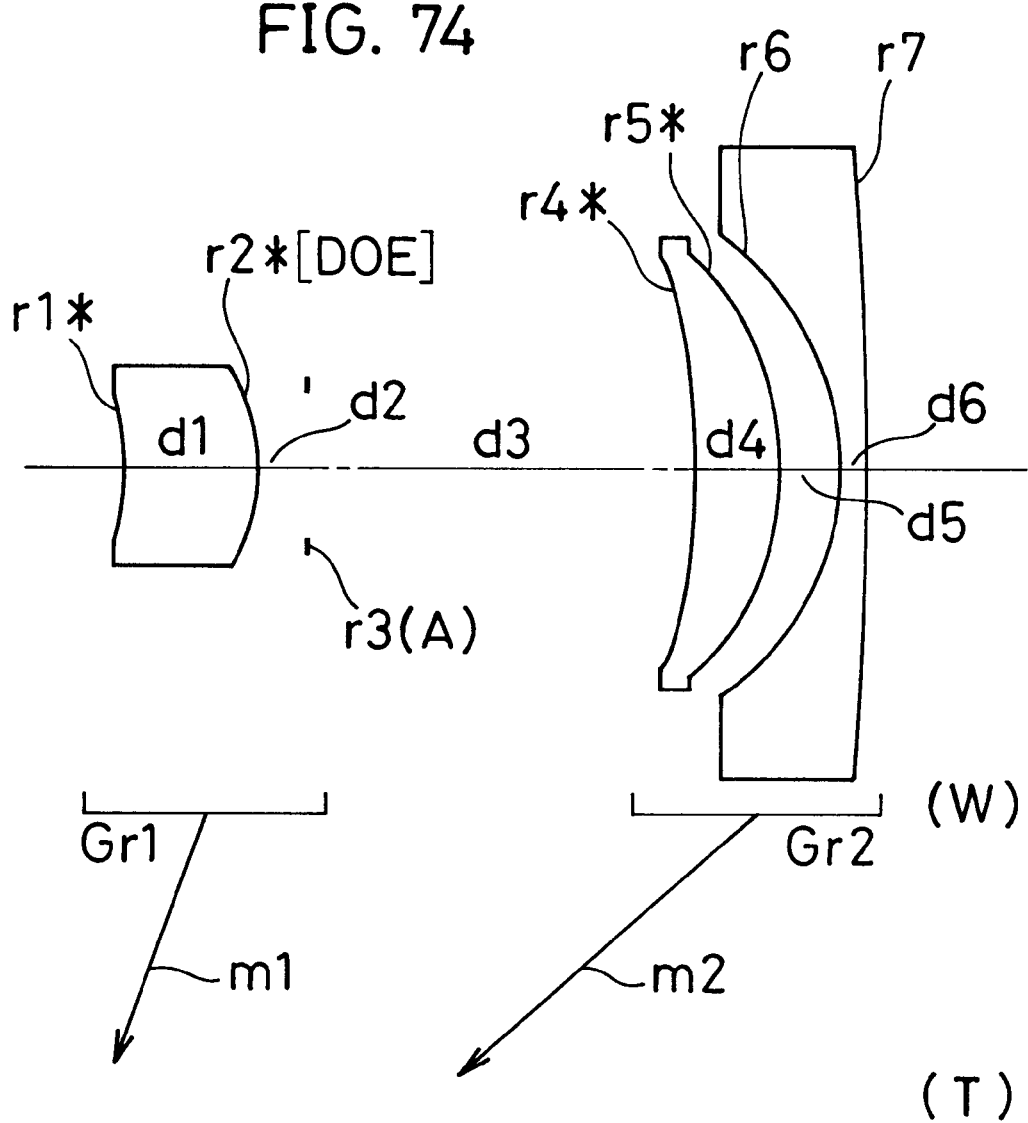
FIG. 74 is a diagram showing the lens construction of the zoom lens system of the twentieth embodiment of the present invention.
Figure 75:
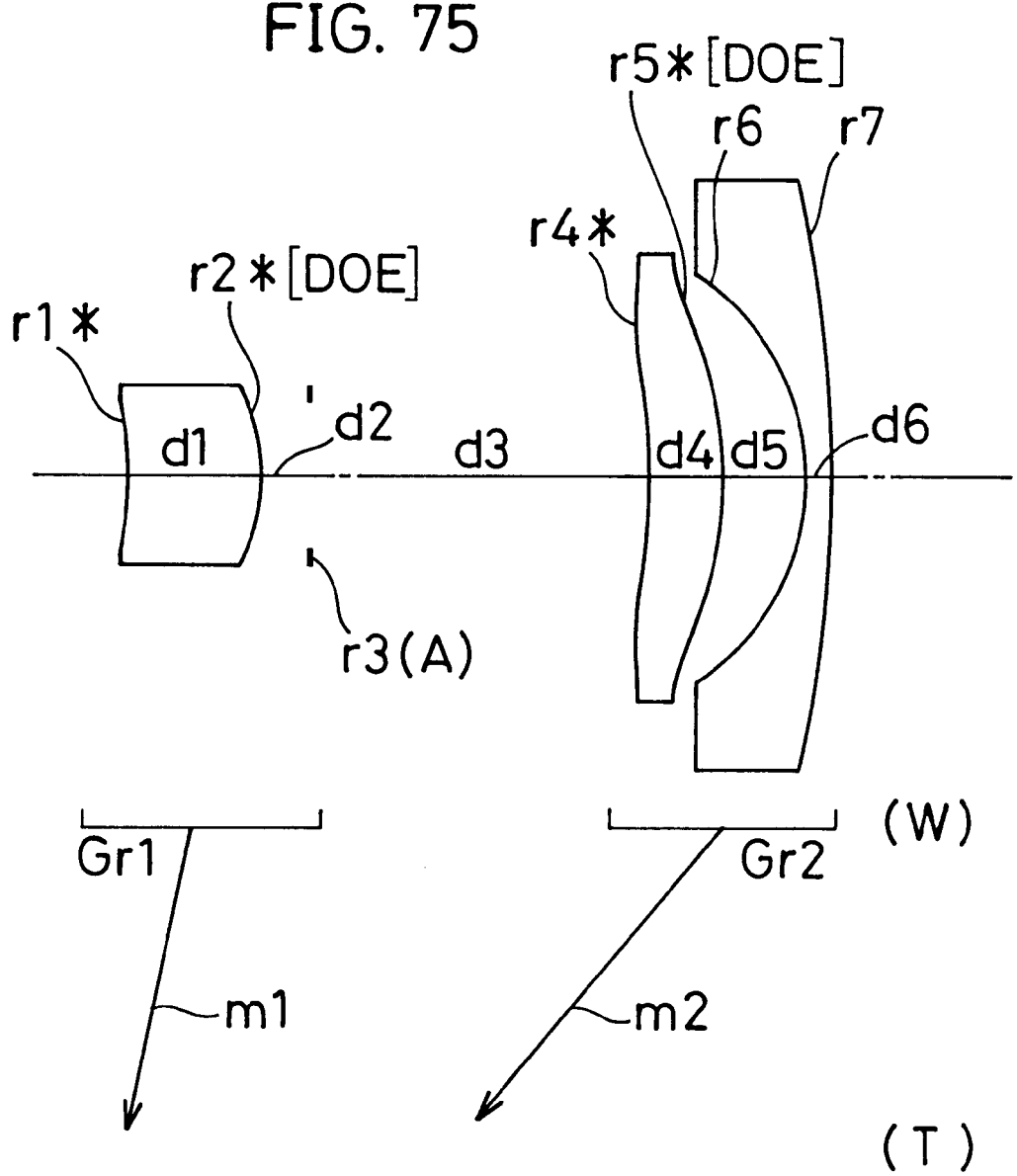
FIG. 75 is a diagram showing the lens construction of the zoom lens system of the twenty-first embodiment of the present invention.
Figure 76C:
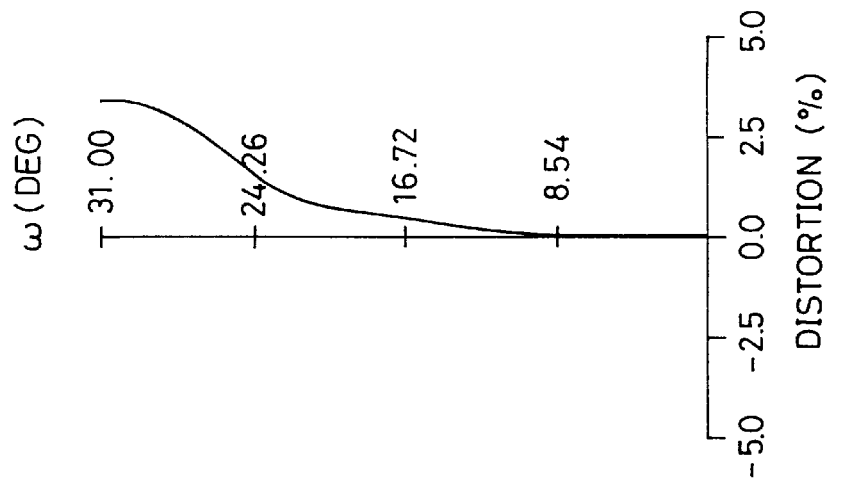
FIGS. 76A, 76B, and 76C are diagrams showing the aberration at the wide-angle end in the nineteenth embodiment.
Figure 76B:
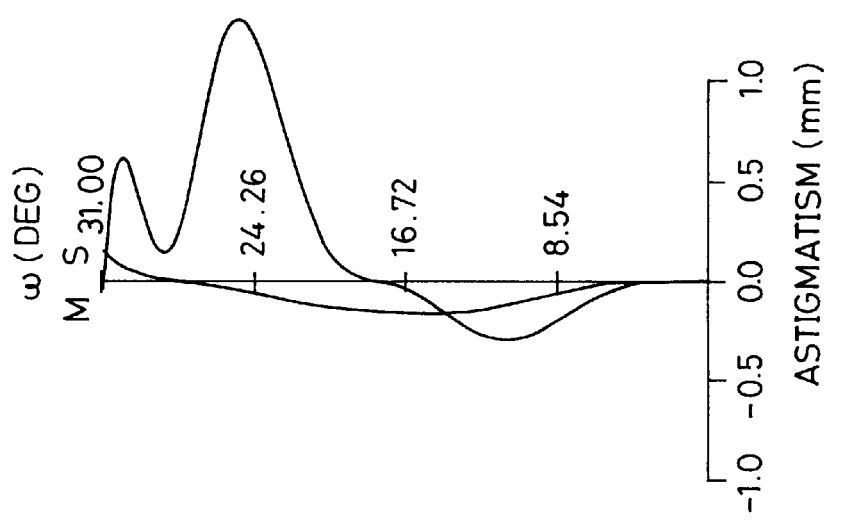
Figure 76A:
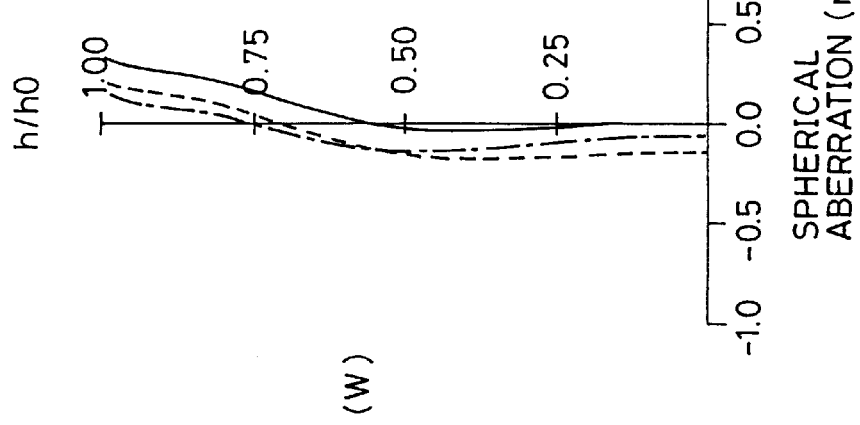
Figure 77C:
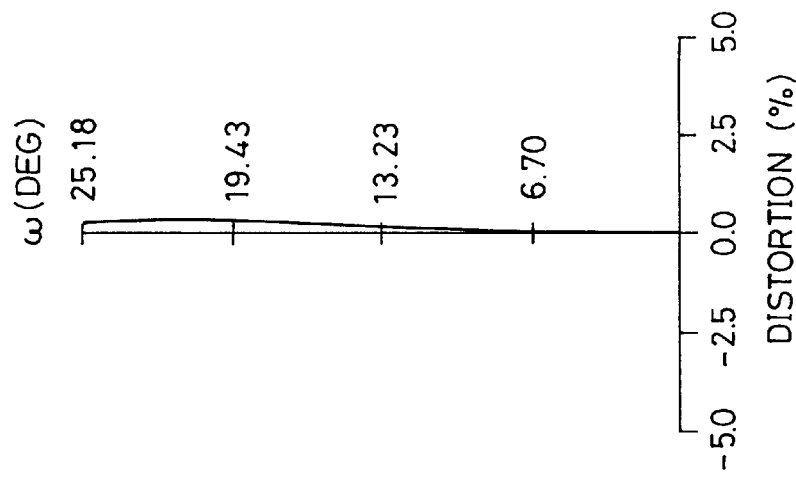
FIGS. 77A, 77B, and 77C are diagrams showing the aberration at the middle focal length in the nineteenth embodiment.
Figure 77B:
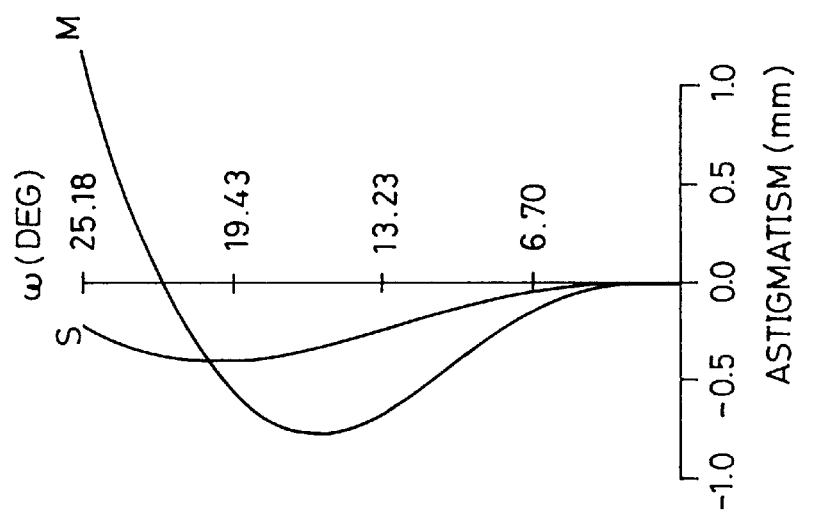
Figure 77A:
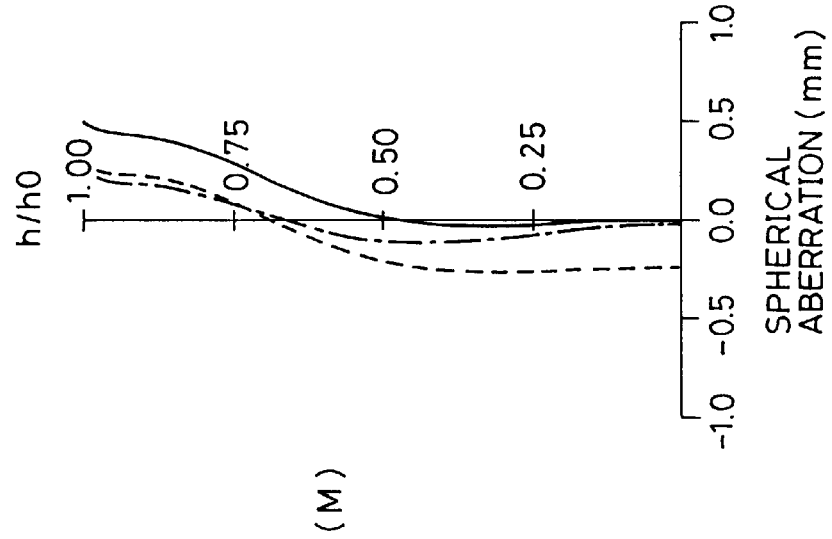
Figure 78C:
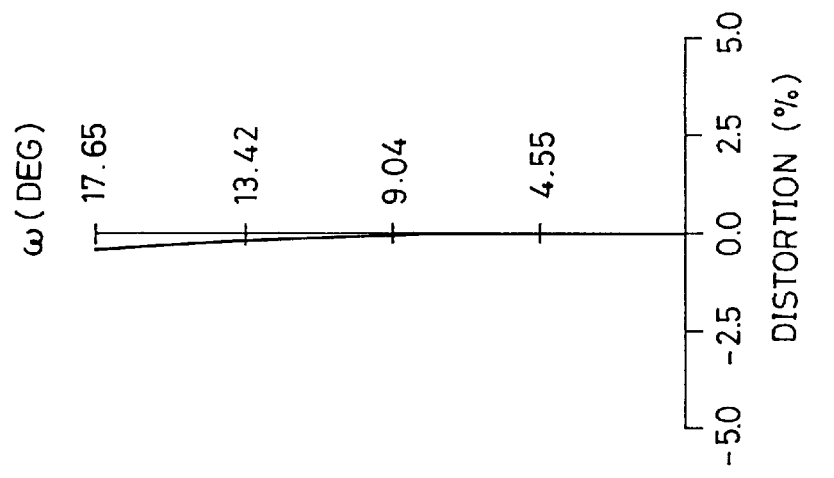
FIGS. 78A, 78B, and 78C are diagrams showing the aberration at the telephoto end in the nineteenth embodiment.
Figure 78B:
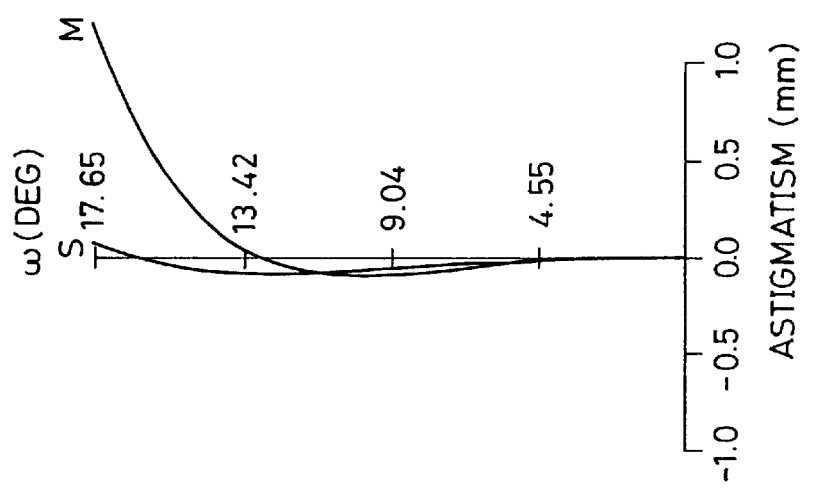
Figure 78A:
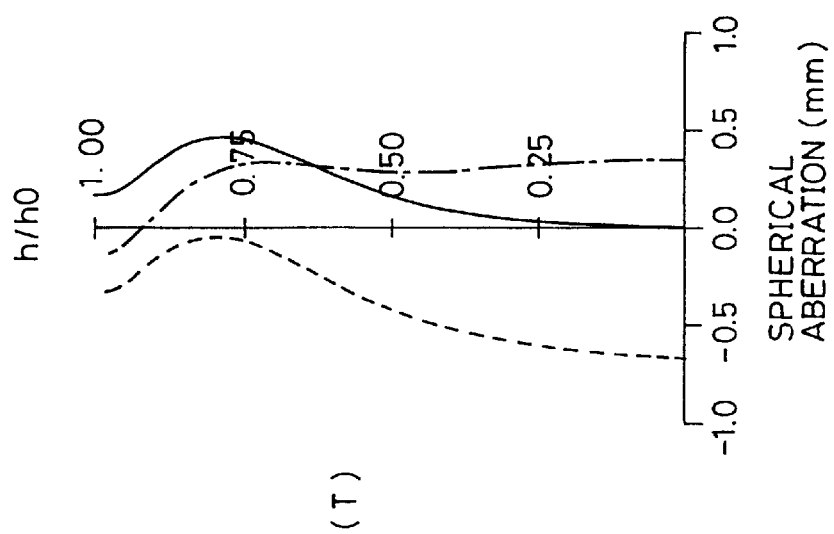
Figure 79C:
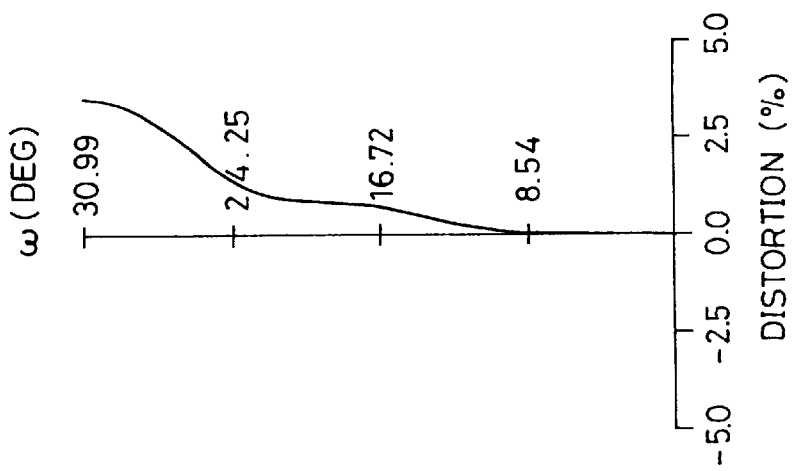
FIGS. 79A, 79B, and 79C are diagrams showing the aberration at the wide-angle end in the twentieth embodiment.
Figure 79B:
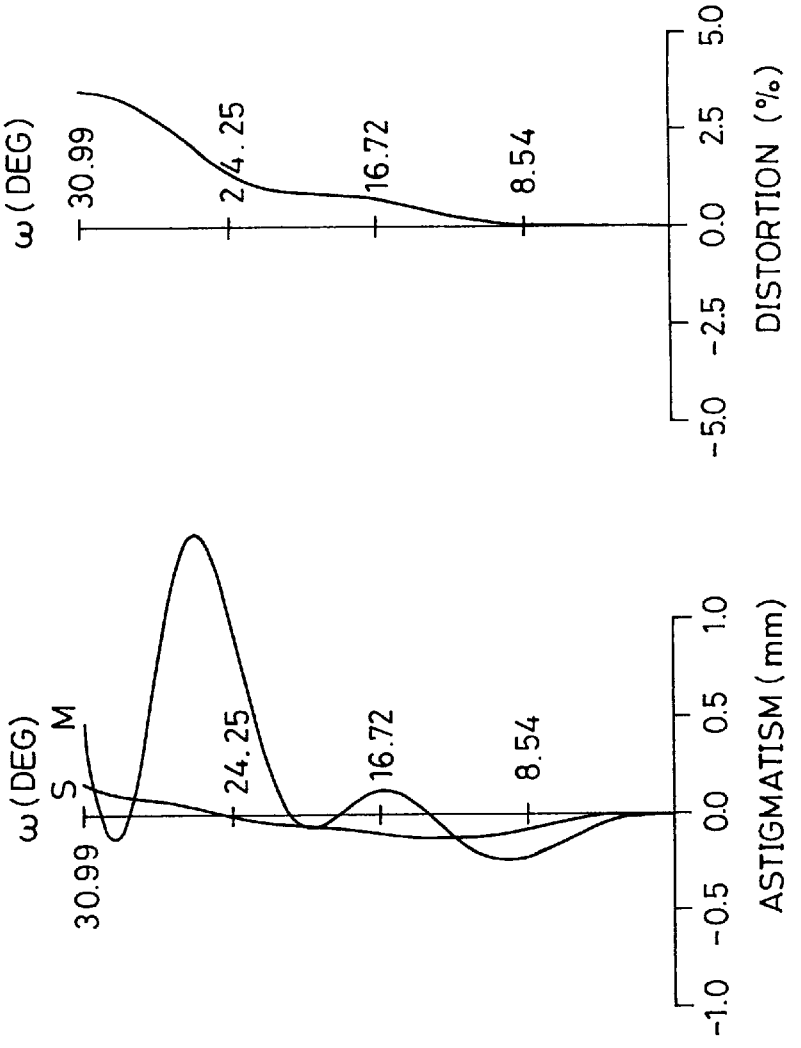
Figure 79A:
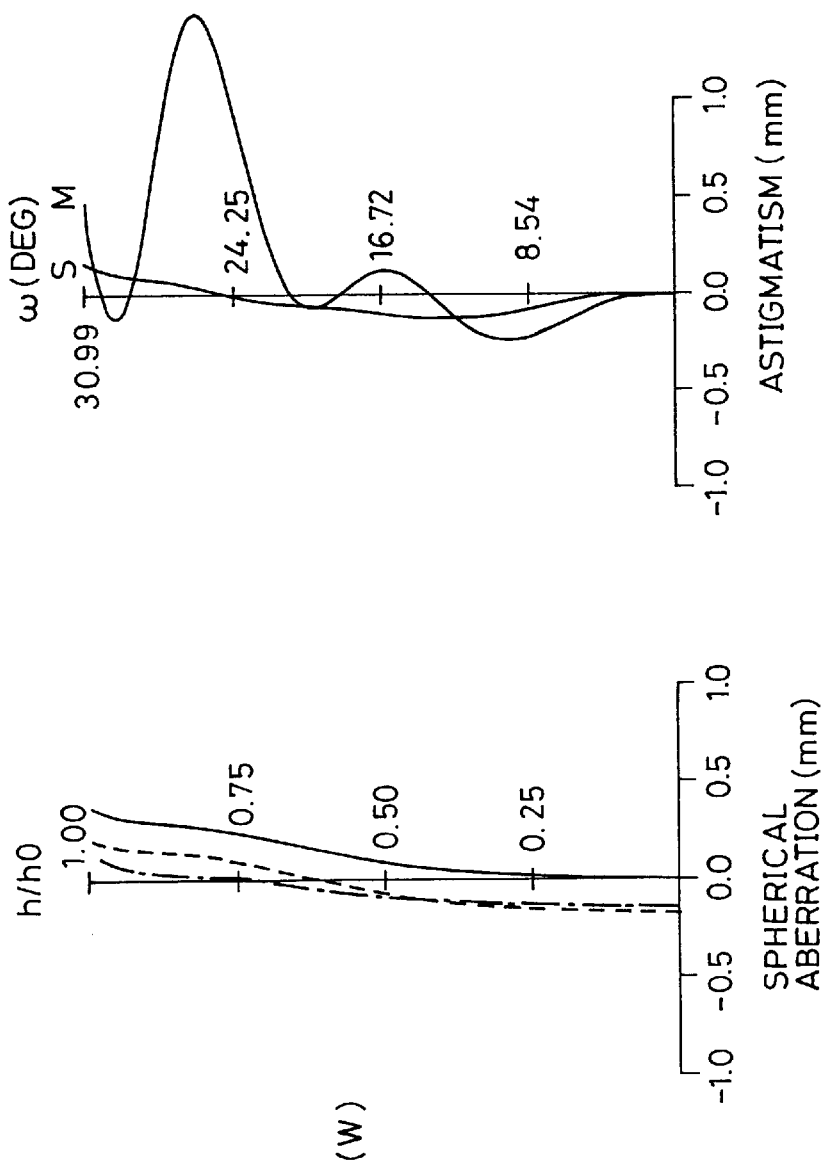
Figure 81C:
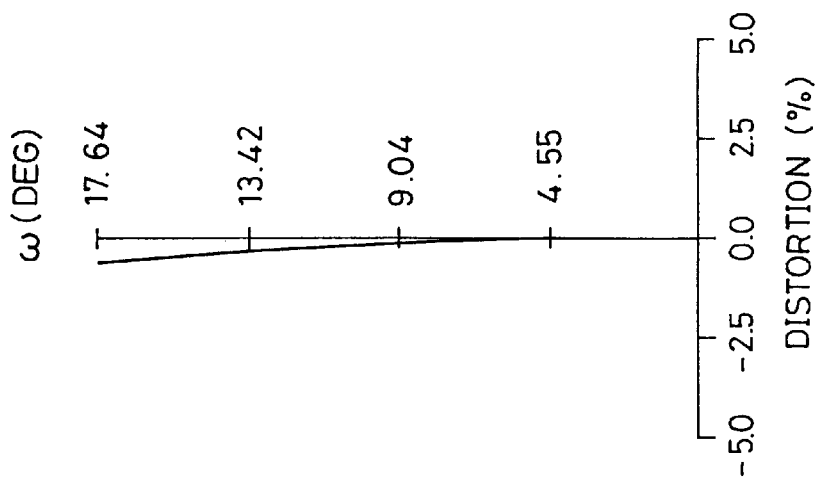
FIGS. 81A, 81B, and 81C are diagrams showing the aberration at the telephoto end in the twentieth embodiment.
Figure 81B:
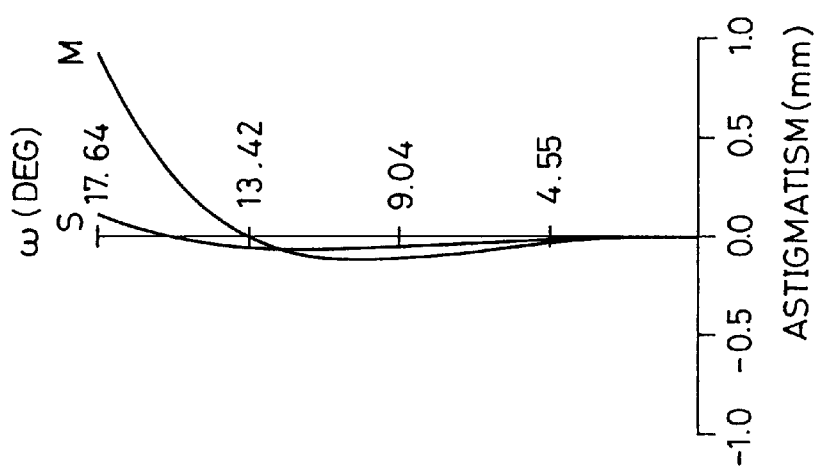
Figure 81A:
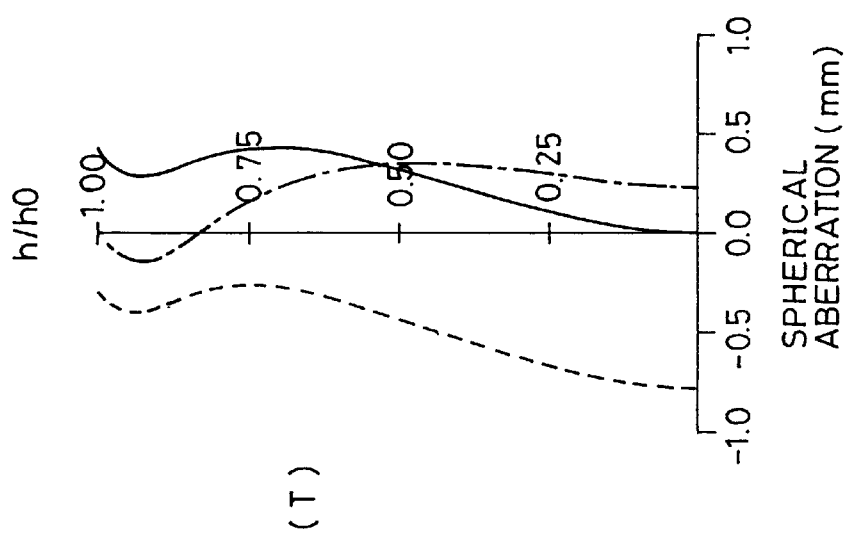
Figure 84C:
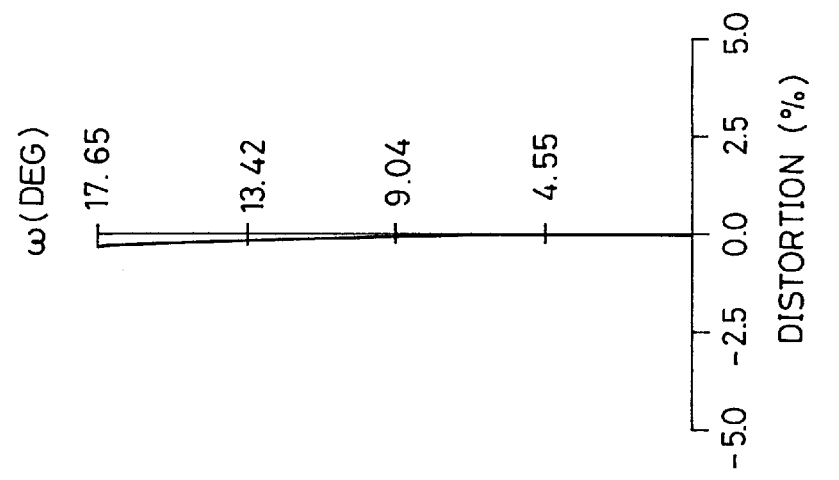
FIGS. 84A, 84B, and 84C are diagrams showing the aberration at the telephoto end in the twenty-first embodiment.
Figure 84B:
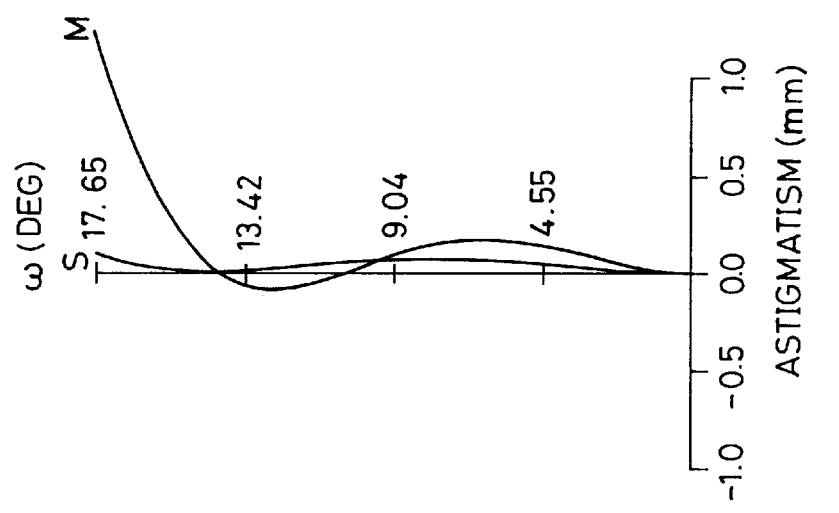
Figure 84A:
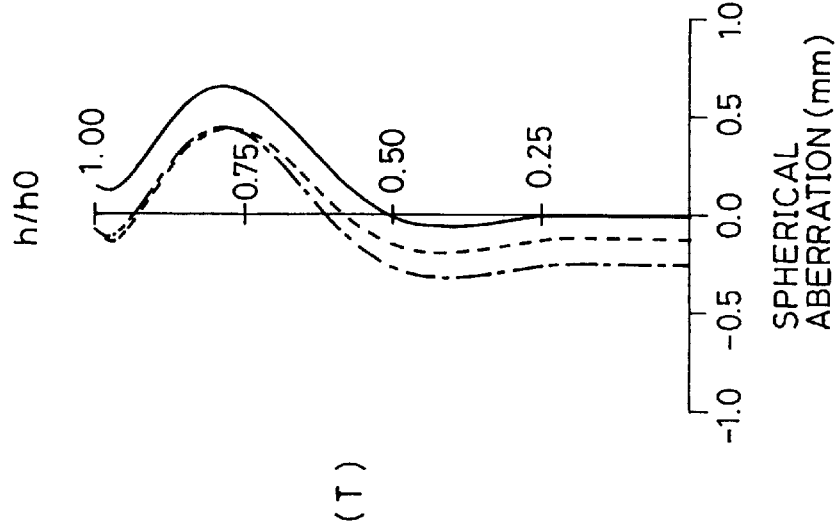

FIGS. 73 to 75 show the lens constructions of the zoom lens systems of the nineteenth to twenty-first embodiments. Each figure shows the lens construction at the wide-angle end (W). In FIGS. 73 to 75, ri (i=1, 2, 3, . . . ) represents the i-th surface from the object side, and di (i=1, 2, 3, . . . ) represents the i-th axial distance from the object side. A surface ri marked with an asterisk (*) is an aspherical surface, and a surface ri marked with [DOE] is a diffractive optical surface.

In the nineteenth embodiment, the first lens unit Gr1 is composed of, from the object side, a positive meniscus lens element (having aspherical surfaces on both sides and a diffractive optical element on the image side) with its concave surface facing toward the object side, and an aperture diaphragm A. The second lens unit Gr2 is composed of, from the object side, a positive meniscus lens element (having aspherical surfaces on both sides) with its convex surface facing toward the image side, and a negative meniscus lens element with its concave surface facing toward the object side.

In the twentieth embodiment, the first lens unit Gr1 is composed of, from the object side, a positive meniscus lens element (having aspherical surfaces on both sides and a diffractive optical element on the image side) with its concave surface facing toward the object side, and an aperture diaphragm A. The second lens unit Gr2 is composed of, from the object side, a positive meniscus lens element (having aspherical surfaces on both sides) with its convex surface facing toward the image side, and a negative meniscus lens element with its concave surface facing toward the object side.

In the twenty-first embodiment, the first lens unit Gr1 is composed of, from the object side, a positive meniscus lens element (having aspherical surfaces on both sides and a diffractive optical element on the image side) with its concave surface facing toward the object side, and an aperture diaphragm A. The second lens unit Gr2 is composed of, from the object side, a positive meniscus lens element (having aspherical surfaces on both sides and a diffractive optical element on the image side) with its convex surface facing toward the image side, and a negative meniscus lens element with its concave surface facing toward the object side.

As described above, in the zoom lens systems of the nineteenth to twenty-first embodiments, the first lens unit Gr1 is composed of one lens element, and the second lens unit Gr2 is composed of two lens elements. Composing the first lens unit Gr1 of one lens element makes it possible to simplify the construction of the lens barrel, and also to reduce the size and cost of the zoom lens system. Composing the second lens unit Gr2 of at least two lens elements makes it possible to properly correct off-axial coma aberration. Although the first lens unit Gr1 is composed of one lens element, such reduction in the number of lens elements does not result here in undercorrection of chromatic aberration as experienced in a conventional zoom lens system composed solely of refractive optical surfaces. This is because the use of at least one diffractive optical element within the whole zoom lens system makes it possible to properly correct chromatic aberration. Note that the only lens composing the first lens unit Gr1 may be either a single lens or doublet lens.

In general, axial chromatic aberration, as dealt with in a thin-lens system, is defined by the following formula:

$$L = \phi r / \nu r + \phi doe / \nu doe \quad (A)$$

where

L: axial chromatic aberration;

φr: refractive power of the refractive optical surface;

νr: dispersion of the refractive optical surface (i.e. Abbe number);

φdoe: power of the diffractive optical element;

νdoe: dispersion of the diffractive optical element (i.e. the value corresponding to the Abbe number).

Furthermore, νr and νdoe above are defined by the following formulae:

$$\nu r = (Nd-1)/(Nf-Nc) \quad (B)$$

$$\nu doe = \lambda d/(\lambda f - \lambda c) = -3.45 \quad (C)$$

where

Nd: refractive index of the refractive optical surface on the lens optical axis, with d-lines;

Nf: refractive index of the refractive optical surface on the lens optical axis, with f-lines;

Nc: refractive index of the refractive optical surface on the lens optical axis, with c-lines;

λd: wavelength of d-lines;

λf: wavelength of f-lines;

λc: wavelength of c-lines.

Formula (C) above shows that a diffractive optical element has a large negative value of dispersion (−3.45). By use of a diffractive optical element in combination with a refractive optical surface, the positive φr/νr is canceled out by the negative φdoe/νdoe, and thus the chromatic aberration occurring in the refractive optical surface is corrected by the diffractive optical element. The zoom lens systems of the first to twenty-first embodiments take advantage of this property of a diffractive optical element to correct chromatic aberration, by correcting the chromatic aberration occurring in a refractive optical element having a refractive optical surface by means of a diffractive optical element having a diffractive optical surface.

Furthermore, in the zoom lens systems of the first to twenty-first embodiments, a diffractive optical element is provided on a refractive optical surface (as a hybrid diffractive-refractive lens element). Accordingly, the chromatic aberration occurring on the refractive optical surface can be properly corrected by the diffractive optical element. Moreover, the zoom lens systems of the first to twenty-first embodiments can be made compact, since they need no additional lens element for correcting chromatic aberration.

It is desirable, as in the first to twenty-first embodiments, that a diffractive optical element be provided on a refractive optical surface having an aspherical shape. The use of an aspherical surface as a base surface on which a diffractive optical element is provided allows the aspherical surface and the diffractive optical element to be shaped simultaneously when, for example, the diffractive optical element is formed by machining. This not only leads to reduction of production time, but also permits high-precision machining. Therefore, providing a diffractive optical element on a refractive optical surface is highly effective in terms of production. Moreover, in a zoom lens system with a reduced number of lens elements, it is necessary to correct spherical aberration and coma aberration by use of an aspherical surface, and these types of aberration can better be corrected with an aspherical base surface for the diffractive optical element than with a spherical one.

The phase shape of a diffractive optical element can be freely designed, and therefore it is possible to design a diffractive optical element that is optically equivalent to an aspherical surface on a refractive optical surface. Accordingly, not only chromatic aberration but also spherical aberration can be corrected with a diffractive optical element. However, when spherical aberration is corrected solely with the phase shape of a diffractive optical element, the spherical aberration for light having a design wavelength is corrected, but, since light having wavelengths different from the design value is diffracted differently, spherical aberration of color becomes rather greater. For this reason, it is preferable to correct spherical aberration with a refractive optical surface. In the first to twenty-first embodiments, spherical aberration and off-axial coma aberration are corrected properly with an aspherical surface of a refractive optical surface, whereas axial chromatic aberration and chromatic aberration of magnification are corrected with a diffractive optical element provided on a refractive optical surface, so that satisfactory optical performance is obtained.

It is desirable that the diffractive optical element be blazed (saw-toothed). With a blazed diffractive optical element, it is possible to obtain better diffraction efficiency. A blazed diffractive optical element can be produced by approximating the saw-toothed shape as a stepped shape in a manner similar to a semiconductor production technique (binary optics), or by molding glass or a plastic material with a mold produced through precision machining, or by molding a resin layer formed on the surface of a glass lens into a diffractive optical element.

In the zoom lens systems of the first to fourth, sixth, and seventh embodiments, a diffractive optical element is arranged in the second lens unit. The use of at least one diffractive optical element in the negative lens unit that is disposed at the image-surface-side end makes it possible to properly correct the chromatic aberration of magnification occurring in the object-side lens unit.

Moreover, in the zoom lens systems of the first to seventh embodiments, a diffractive optical element is arranged in the first lens unit having a positive refractive power. The use of at least one diffractive optical element in the lens unit that is disposed at the object-side end makes it possible to properly correct the axial chromatic aberration occurring in the object-side lens unit having a positive refractive power as a whole.

Of the first to seventh embodiments, the zoom lens systems of the sixth and seventh embodiments have a diffractive optical element provided on a plastic lens element, and therefore these zoom lens systems can be produced with especially reduced cost.

Moreover, the zoom lens systems of the first to seventh embodiments is constituted of, from the object side, a first lens unit having a positive refractive power and a second lens unit having a negative refractive power, and, during zooming from the wide-angle end to the telephoto end, the first and second lens units are moved in such a way that the distance between them decreases. Generally, in a zoom lens system for a lens shutter camera having a magnification around 2×, adoption of a two-lens-unit construction constituted of the positive and negative lens units helps produce a compact zoom lens system with satisfactory optical performance.

In the zoom lens systems of the first to seventh embodiments, the use of a diffractive optical element in a zoom lens system constituted of two positive and negative lens units makes it possible to properly correct chromatic aberration, which cannot be corrected satisfactorily with refractive optical surfaces alone, and also to reduce the number of lens elements needed.

It is preferable that the zoom lens systems of the first to seventh embodiments satisfy the following conditional expression (1):

$$0.01<|\phi doe/\phi r|<0.12 \tag{1}$$

where

φdoe: power of the diffractive optical element;

φr: composite power of the diffractive optical element and the refractive optical surface.

If the upper limit of conditional expression (1) is exceeded, the power of the diffractive optical element within the lens unit is too strong, with the result that chromatic aberration is overcorrected by the diffractive optical element. By contrast, if the lower limit of conditional expression (1) is exceeded, the power of the diffractive optical element within the lens unit is too weak, with the result that chromatic aberration is undercorrected by the diffractive optical element.

Moreover, in the zoom lens systems of the first to seventh embodiments, it is preferable that the following conditional expression (2) be satisfied:

$$2<|R_2 \times H_{max}/\lambda_0|<50 \tag{2}$$

where $R_2$: secondary phase coefficient of the diffractive optical element;

$H_{max}$: effective diameter of the diffractive optical element;

$\lambda_0$: design wavelength.

If the lower limit of conditional expression (2) is exceeded, the correction of chromatic aberration by the diffractive optical element is insufficient, and accordingly it is difficult to correct chromatic aberration properly. By contrast, if the upper limit of conditional expression (2) is exceeded, not only the correction of chromatic aberration is excessive, but also the pitch of the diffractive optical element at its periphery becomes too small to obtain sufficient diffraction effects. In addition, if the upper limit of conditional expression (2) is exceeded, and accordingly the pitch of the diffractive optical element becomes smaller, the diffractive optical element becomes more difficult to produce.

Furthermore, it is preferable that the zoom lens systems of the first to seventh embodiments satisfy the following conditional expression (3):

$$0.9<|\phi Gr1/\phi Gr2|<1.7 \tag{3}$$

where

φGr1: composite power of the first lens unit;

φGr2: composite power of the second lens unit.

If the upper limit of conditional expression (3) is exceeded, the refractive power of the second lens unit relative to that of the first lens unit is too weak, with the result that the moving amount of the second lens unit during zooming from the wide-angle end to the telephoto end becomes larger. This is not effective in making the zoom lens system compact. By contrast, if the lower limit of conditional expression (3) is exceeded, the refractive power of the second lens unit relative to that of the first lens unit is too strong, with the result that the Petzval sum becomes too great to a minus side to correct.

Incidentally, it is well-known that, in a zoom lens system constituted of two positive and negative lens units, the effective diameter of the second lens unit is generally greater than that of the first lens unit. Accordingly, in attempting to reduce the cost of the zoom lens system constituted of two positive and negative lens units by providing it with a diffractive optical element, it is more effective to provide the diffractive optical element only in the first lens unit, which has the smaller effective diameter. In the zoom lens system of the fifth embodiment, a diffractive optical element is provided only in the first lens unit. This further reduces the production cost.

Moreover, in cases where the second lens unit is composed of one lens element having only refractive optical surfaces as in the fifth embodiment, it is preferable that the following conditional expression (4) be satisfied:

$$v21>44 \tag{4}$$

where v21: dispersion of the refractive optical surface of the second lens unit.

When the second lens unit is composed of one lens element having only refractive optical surfaces, it is nearly impossible to correct chromatic aberration within the lens unit. However, as long as conditional expression (4) is satisfied, chromatic aberration can be corrected properly over the whole lens system. If the dispersion is so great that the lower limit of conditional expression (4) is exceeded, the chromatic aberration of magnification occurring in the second lens unit is too great to correct properly.

In the zoom lens systems of the eighth and tenth embodiments, a diffractive optical element is provided in the second lens unit Gr2. The use of at least one diffractive optical element in the negative lens unit that is disposed at the image-surface-side end makes it possible to properly correct the chromatic aberration of magnification occurring in the object-side lens unit. In addition, the use of at least one diffractive optical element in a negative lens unit makes it possible to properly correct axial chromatic aberration.

Moreover, in the zoom lens systems of the ninth and eleventh embodiments, a diffractive optical element is provided on the object-side surface of the first lens element L1. The use of a diffractive optical element at the object-side end, where light paths vary greatly with the angle of view, makes it possible to properly correct axial chromatic aberration and off-axial chromatic aberration of magnification.

Moreover, in the zoom lens systems of the eighth and tenth embodiments, a diffractive optical element is arranged on the object-side surface of the third lens element L3. The use of a diffractive optical element at the object-side end of the second lens unit, where light paths vary greatly with the angle of view, makes it possible to properly correct off-axial chromatic aberration of magnification.

Of the eighth to twelfth embodiments, the zoom lens systems of the eighth and tenth embodiments have a diffractive optical element formed on their third, plastic, lens element L3, and therefore these zoom lens systems can be produced with especially reduced cost.

On the other hand, the use of a blazed diffractive optical element causes degradation of diffraction efficiency because, as the angle of incidence becomes greater, the apparent pitch of the diffractive optical element as seen from the direction of incidence becomes smaller. However, this problem can be alleviated by disposing the diffractive optical element at the image-side end of a lens unit. For example, when a diffracting optical element is provided at the image-surface-side end of the first lens unit Gr1 as in the tenth and twelfth embodiments, the angle of incidence of light rays striking the diffractive optical element becomes smaller than at the object-side surface of the same lens, and thus degradation of diffraction efficiency is suppressed. For the same reason, it is also possible to provide a diffractive optical element at the image-surface-side end of the second lens unit Gr2 as in the twelfth embodiment.

The conditions that need to be satisfied by the zoom lens systems of the eighth to twelfth embodiments will be described below.

It is preferable that the zoom lens systems of the eighth to twelfth embodiments satisfy the following conditional expression (5):

$$0.005 < |\phi doe/\phi r| < 0.12 \quad (5)$$

where $\phi$doe: power of the diffractive optical element;

$\phi$r: composite power of the diffractive optical element and the refractive optical surface.

If the upper limit of conditional expression (5) is exceeded, the power of the diffractive optical element within the lens unit is too strong, with the result that chromatic aberration is overcorrected by the diffractive optical element. By contrast, if the lower limit of conditional expression (5) is exceeded, the power of the diffractive optical element within the lens unit is too weak, with the result that chromatic aberration is undercorrected by the diffractive optical element.

Moreover, in the zoom lens systems of the eighth to twelfth embodiments, it is preferable that the following conditional expression (6) be satisfied:

$$2 < |R_2 \times H_{max}/\nu_0| < 57 \quad (6)$$

where $R_2$: secondary phase coefficient of the diffractive optical element;

$H_{max}$ effective diameter of the diffractive optical element;

$\nu_0$: design wavelength.

If the lower limit of conditional expression (6) is exceeded, the correction of chromatic aberration by the diffractive optical element is insufficient, and accordingly it is difficult to correct chromatic aberration properly. By contrast, if the upper limit of conditional expression (6) is exceeded, not only the correction of chromatic aberration is excessive, but also the pitch of the diffractive optical element at its periphery becomes too small to obtain sufficient diffraction effects. In addition, as the pitch of the diffractive optical element becomes smaller, the diffractive optical element becomes more difficult to produce.

It is desirable, as in the fourteenth to seventeenth embodiments, to provide the second lens unit Gr2 with at least one diffractive optical element. The use of at least one diffractive optical element in the second lens unit Gr2 makes it possible, even if the second lens unit Gr2 is composed of one lens element, to properly correct the chromatic aberration occurring in the second lens unit Gr2 and thus to reduce the chromatic aberration occurring during zooming.

Moreover, it is desirable, as in the thirteenth, fourteenth, and eighteenth embodiments, to provide the first lens unit Gr1 with at least one diffractive optical element. The use of at least one diffractive optical element in the first lens unit Gr1 makes it possible to properly correct axial chromatic aberration.

In a zoom lens system consisting of two, positive and negative, lens units, such as the thirteenth to eighteenth embodiments described above, in which at least one diffractive optical element is provided within the whole system and in which, during zooming from the wide-angle end (W) to the telephoto end (T), a first lens unit Gr1 composed of at least two lens elements and a second lens unit Gr2 composed of one lens element are moved in such a way that the distance (d5) between them decreases, it is desirable that each lens unit that is provided with a diffractive optical element satisfy the following conditional expression (7):

$$0.01 < |\phi doe/\phi r| < 0.09 \quad (7)$$

where $\phi$doe: power of the diffractive optical element;

$\phi$r: composite power of the diffractive optical element and the refractive optical surface.

If the upper limit of conditional expression (7) is exceeded, the power of the diffractive optical element within the lens unit is too strong, with the result that chromatic aberration is overcorrected by the diffractive optical element. By contrast, if the lower limit of conditional expression (7) is exceeded, the power of the diffractive optical element within the lens unit is too weak, with the result that chromatic aberration is undercorrected by the diffractive optical element.

Furthermore, it is desirable that the following conditional expression (8), which is the same as the above-described conditional expression (2), be satisfied:

$$2 < |R_2 \times H_{max}/\lambda_0| < 50 \quad (8)$$

Conditional expression (8) defines the range of conditions to be preferably satisfied in the production of the diffractive optical element. If the lower limit of conditional expression (8) is exceeded, the correction of chromatic aberration by the diffractive optical element is insufficient, and accordingly it is difficult to correct chromatic aberration properly. By contrast, if the upper limit of conditional expression (8) is exceeded, not only the correction of chromatic aberration is excessive, but also the pitch of the diffractive optical element at its periphery becomes too small to obtain sufficient diffraction effects. In addition, as the pitch of the diffractive optical element becomes smaller, the diffractive optical element becomes more difficult to produce.

In a zoom lens system consisting of two, positive and negative, lens units, such as the thirteenth, fourteenth, and eighteenth embodiments described above, in which at least one diffractive optical element is provided in the first lens unit Gr1 and in which, during zooming from the wide-angle end (W) to the telephoto end (T), a first lens unit Gr1 composed of at least two lens elements and a second lens unit Gr2 composed of one lens are moved in such a way that the distance (d5) between them decreases, it is desirable that the following expression (9) be satisfied:

$$0.01 < |\phi doe1/\phi r1| < 0.05 \quad (9)$$

where $\phi$doe1: power of the diffractive optical element provided in the first lens unit Gr1;

$\phi$r1: composite power of the first lens element Gr1.

Conditional expression (9) defines, for the cases where a diffractive optical element is provided in the first lens unit Gr1, the desirable range of the power of the diffractive optical element. If the upper limit of conditional expression (9) is exceeded, the power of the diffractive optical element within the first lens unit Gr1 is too strong, with the result that chromatic aberration is overcorrected by the diffractive optical element. In addition, the pitch of the diffractive optical element becomes too small, which makes the diffractive optical element more difficult to produce. By contrast, if the lower limit of conditional expression (9) is exceeded, the power of the diffractive optical element within the first lens unit Gr1 is too weak, with the result that chromatic aberration is undercorrected by the diffractive optical element. This leads to undercorrection of the chromatic aberration in the zoom lens system as a whole.

In a zoom lens system consisting of two, positive and negative, lens units, such as the fourteenth to seventeenth embodiments described above, in which at least one diffractive optical element is provided in the second lens unit Gr2 and in which, during zooming from the wide-angle end (W) to the telephoto end (T), a first lens unit Gr1 composed of at least two lens elements and a second lens unit Gr2 composed of one lens are moved in such a way that the distance (d5) between them decreases, it is desirable that the following expression (10) be satisfied:

$$0.01 < |\phi doe2/\phi r2| < 0.05 \qquad (10)$$

where $\phi doe2$: power of the diffractive optical element provided in the second lens unit Gr2;

$\phi r2$: composite power of the second lens element Gr2.

Conditional expression (10) defines, for the cases where a diffractive optical element is provided in the second lens unit Gr2, the desirable range of the power of the diffractive optical element. If the upper limit of conditional expression (10) is exceeded, the power of the diffractive optical element within the second lens unit Gr2 is too strong, with the result that chromatic aberration is overcorrected by the diffractive optical element. In addition, the pitch of the diffractive optical element becomes too small, which makes the diffractive optical element more difficult to produce. By contrast, if the lower limit of conditional expression (10) is exceeded, the power of the diffractive optical element within the second lens unit Gr2 is too weak, with the result that chromatic aberration is undercorrected by the diffractive optical element. This leads to undercorrection of the chromatic aberration in the zoom lens system as a whole.

It is desirable, as in the thirteenth to eighteenth embodiments, that a diffractive optical element be provided on the surface of a refractive optical element made of plastics (i.e. plastic lens element). Preferably, the first and second lens units Gr1 and Gr2 are composed solely of plastic lens elements. A diffractive optical element can be formed on the surface of a plastic lens element, for example, by injection-molding the two elements simultaneously. Accordingly, it is more effective, in terms of cost reduction, to form a diffractive optical element on the surface of a plastic lens element, than on the surface of a glass lens element.

It is desirable, as in the eighteenth embodiment, to provide a diffractive optical element at the image-side end of the first lens unit Gr1. In general, in a construction where the aperture diaphragm A is disposed between the first and second lens units Gr1 and Gr2, it is to be noted, in considering the effectiveness of the surface on which a diffractive optical element is provided, that, within the first lens unit Gr1, a lens element closer to the object has a larger effective diameter. Accordingly, by providing a diffractive optical element at the image-side end of the first lens unit Gr1, it is possible to reduce the effective diameter of the diffractive optical element. This is quite effective in the production of the diffractive optical element.

It is desirable, as in the fourteenth to seventeenth embodiments, to provide a diffractive optical element at the object-side end of the second lens element Gr2. In cases where a blazed diffractive optical element is used, as the angle of incidence of rays striking the diffractive optical element becomes greater, the apparent pitch of the diffractive optical element as seen from the direction of incidence becomes smaller, thereby causing degradation of diffraction efficiency. By providing a diffractive optical element at the object-side end of the second lens element Gr2, it is possible to reduce the angle of incidence of rays striking the diffractive optical element, as well as to reduce the variation of the angle of incidence during zooming. Thus, degradation of diffraction efficiency can be suppressed.

It is desirable, as in the nineteenth to twenty-first embodiments, to provide at least one diffractive optical element in the first lens unit Gr1. The use of at least one diffractive optical element in the first lens unit Gr1 makes it possible, even if the first lens unit Gr1 is composed of one lens element, to properly correct the chromatic aberration occurring in the first lens unit Gr1.

Moreover, it is desirable, as in the twenty-first embodiment, to provide at least one diffractive optical element in the second lens unit Gr2. The use of at least one diffractive optical element in the second lens unit Gr2 makes it possible to properly correct chromatic aberration of magnification, and to reduce the chromatic aberration during zooming.

In a zoom lens system consisting of two, positive and negative, lens units, such as the nineteenth to twenty-first embodiments described above, in which at least one diffractive optical element is provided within the whole system and in which, during zooming from the wide-angle end (W) to the telephoto end (T), a first lens unit Gr1 composed of one lens element and a second lens unit Gr2 composed of at least two lens elements are moved in such a way that the distance (d3) between them decreases, it is desirable that each lens unit that is provided with a diffractive optical element satisfy the following conditional expression (11):

$$0.03 < |\phi doe/\phi r| < 0.15 \qquad (11)$$

where $\phi doe$: power of the diffractive optical element;

$\phi r$: composite power of the diffractive optical element and the refractive optical surface.

If the upper limit of conditional expression (11) is exceeded, the power of the diffractive optical element within the lens unit is too strong, with the result that chromatic aberration is overcorrected by the diffractive optical element. By contrast, if the lower limit of conditional expression (11) is exceeded, the power of the diffractive optical element within the lens unit is too weak, with the result that chromatic aberration is undercorrected by the diffractive optical element.

Furthermore, it is desirable that the following conditional expression (12) be satisfied:

$$2 < |R_2 \times H_{max}/\lambda_0| < 25 \qquad (12)$$

where $R_2$: secondary phase-function coefficient of the diffractive optical element;

$H_{max}$: effective diameter of the diffractive optical element;

$\lambda_0$: design wavelength.

Conditional expression (12) defines the range of conditions to be preferably satisfied in the production of the diffractive optical element. If the lower limit of conditional expression (12) is exceeded, the correction of chromatic aberration by the diffractive optical element is insufficient, and accordingly it is difficult to correct chromatic aberration properly. By contrast, if the upper limit of conditional expression (12) is exceeded, not only the correction of chromatic aberration is excessive, but also the pitch of the diffractive optical element at its periphery becomes too small to obtain sufficient diffraction effects. In addition, as the pitch of the diffractive optical element becomes smaller, the diffractive optical element becomes more difficult to produce.

In a zoom lens system consisting of two, positive and negative, lens units, such as the nineteenth to twenty-first embodiments described above, in which at least one diffractive optical element is provided in the first lens unit Gr1 and in which, during zooming from the wide-angle end (W) to the telephoto end (T), a first lens unit Gr1 composed of one lens element and a second lens unit Gr2 composed of at least two lens elements are moved in such a way that the distance (d3) between them decreases, it is desirable that the following conditional expression (13) be satisfied:

$$0.03 < |\phi doe1/\phi r1| < 0.10 \quad (13)$$

where $\phi doe1$: power of the diffractive optical element provided in the first lens unit Gr1;

$\phi r1$: composite power of the first lens element Gr1.

Conditional expression (13) defines, for the cases where a diffractive optical element is provided in the first lens unit Gr1, the desirable range of the power of the diffractive optical element. If the upper limit of conditional expression (13) is exceeded, the power of the diffractive optical element within the first lens unit Gr1 is too strong, with the result that chromatic aberration is overcorrected by the diffractive optical element. In addition, the pitch of the diffractive optical element becomes too small, which makes the diffractive optical element more difficult to produce. By contrast, if the lower limit of conditional expression (13) is exceeded, the power of the diffractive optical element within the first lens unit Gr1 is too weak, with the result that chromatic aberration is undercorrected by the diffractive optical element. This leads to undercorrection of the chromatic aberration in the zoom lens system as a whole.

In a zoom lens system consisting of two, positive and negative, lens units, such as the twenty-first embodiment described above, in which at least one diffractive optical element is provided in the second lens unit Gr2 and in which, during zooming from the wide-angle end (W) to the telephoto end (T), a first lens unit Gr1 composed of one lens element and a second lens unit Gr2 composed of at least two lens elements are moved in such a way that the distance (d3) between them decreases, it is desirable that the following conditional expression (14) be satisfied:

$$0.06 < |\phi doe2/\phi r2| < 0.15 \quad (14)$$

where $\phi doe2$: power of the diffractive optical element provided in the second lens unit Gr2;

$\phi r2$: composite power of the second lens element Gr2.

Conditional expression (14) defines, for the cases where a diffractive optical element is provided in the second lens unit Gr2, the desirable range of the power of the diffractive optical element. If the upper limit of conditional expression (14) is exceeded, the power of the diffractive optical element within the second lens unit Gr2 is too strong, with the result that chromatic aberration is overcorrected by the diffractive optical element. In addition, the pitch of the diffractive optical element becomes too small, which makes the diffractive optical element more difficult to produce. By contrast, if the lower limit of conditional expression (14) is exceeded, the power of the diffractive optical element within the second lens unit Gr2 is too weak, with the result that chromatic aberration is undercorrected by the diffractive optical element. This leads to undercorrection of the chromatic aberration in the zoom lens system as a whole.

It is desirable, as in the nineteenth to twenty-first embodiments, to provide a diffractive optical element at the image-side end of the first lens unit Gr1. In general, in a construction where the aperture diaphragm A is disposed between the first and second lens units Gr1 and Gr2, it is to be noted, in considering the effectiveness of the surface on which a diffractive optical element is provided, that, within the first lens unit Gr1, a lens element closer to the object has a larger effective diameter. Accordingly, by providing a diffractive optical element at the image-side end of the first lens unit Gr1, it is possible to reduce the effective diameter of the diffractive optical element. This is quite effective in the production of the diffractive optical element.

Table 1 to 7 below show the construction data of the zoom lens systems of the first to seventh embodiments, respectively.

Table 9 to 13 below show the construction data of the zoom lens systems of the eighth to twelfth embodiments, respectively.

Table 15 to 20 below show the construction data of the zoom lens systems of the thirteenth to eighteenth embodiments, respectively.

Table 22 to 24 below show the construction data of the zoom lens systems of the nineteenth to twenty-first embodiments, respectively.

In the construction data of each embodiment, ri (i=1, 2, 3, ...) represents the curvature radius of the i-th surface from the object side, di (i=1, 2, 3, ...) represents the i-th axial distance from the object side, and Ni (i=1, 2, 3, ...) and vi (i=1, 2, 3, ...) respectively represent the d-lines refractive coefficient and the Abbe number of the i-th lens from the object side. Note that the letter E found in numerical values listed on the tables indicates that the figures following it represents an exponent. For example, 1.0E2 represents 1.0×$10^2$.

Moreover, three values listed for the focal length f and the f-number FNO of the whole system and for the distance between the first and second lens units (axial distance d5) are the values at, from left, the wide-angle end (W), the middle focal length (M), and the telephoto end (T).

In the construction data of each embodiment, a surface marked with an asterisk (*) in the curvature radius column is an aspherical surface. The surface shape of an aspherical surface is defined by the following formula:

$$Y = \frac{C \cdot X^2}{1 + (1 - \epsilon \cdot X^2 \cdot C^2)^{1/2}} + \sum_i A i X^i \quad (D)$$

where

X: height in the direction perpendicular to the optical axis;

Y: displacement from the reference surface of the optical axis direction;

C: paraxial curvature;

∈: quadric surface parameter;

Ai: aspherical coefficient of the i-th order.

Moreover, in the construction data of each embodiment, a surface marked with [DOE] in the curvature radius column is a surface where a diffractive optical element is provided on the surface of a refractive optical element. The phase shape of a diffractive optical element, which determines the pitch of the diffractive optical element, is defined by the following formula:

$$\phi(X) = 2\pi \cdot \left(\sum_i \cdot Ri \cdot X^i\right) / \lambda_0 \quad (E)$$

where $\phi(X)$: phase function;

Ri: phase coefficient of the i-th order;

X: height in the direction perpendicular to the optical axis;

$\lambda_0$: design wavelength.

Moreover, the first to seventh embodiments satisfy conditional expressions (1) to (3) described above. In addition, the fifth embodiment also satisfies conditional expression (4). Table 8 lists the values corresponding to conditional expressions (1) to (3) in the first to seventh embodiments, and the value of v21 in the fifth embodiment.

Moreover, the eighth to twelfth embodiments satisfy conditional expressions (5) and (6) described above. Table 14 lists the values corresponding to conditional expressions (5) and (6) in the eighth to twelfth embodiments.

Moreover, the thirteenth to eighteenth embodiments satisfy conditional expressions (7) to (10) described above. Table 21 lists the values corresponding to conditional expressions (7) to (10) in the thirteenth to eighteenth embodiments.

Moreover, the nineteenth to twenty-first embodiments satisfy conditional expressions (11) to (14) described above. Table 25 lists the values corresponding to conditional expressions (11) to (14) in the nineteenth to twenty-first embodiments.

FIGS. 8A to 8C, 11A to 11C, 14A to 14C, 17A to 17C, 20A to 20C, 23A to 23C, and 26A to 26C show the aberration at the wide-angle end in the first to seventh embodiments, respectively. FIGS. 9A to 9C, 12A to 12C, 15A to 15C, 18A to 18C, 21A to 21C, 24A to 24C, and 27A to 27C show the aberration at the middle focal length in the first to seventh embodiments, respectively. FIGS. 10A to 10C, 13A to 13C, 16A to 16C, 19A to 19C, 22A to 22C, 25A to 25C, and 28A to 28C show the aberration at the telephoto end in the first to seventh embodiments, respectively. FIGS. 8A to 28A illustrate spherical aberration, FIGS. 8B to 28B illustrate astigmatism, and FIGS. 8C to 28C illustrate distortion.

FIGS. 34A to 34C, 37A to 37C, 40A to 40C, 43A to 43C, and 46A to 46C show the aberration at the wide-angle end in the eighth to twelfth embodiments, respectively. FIGS. 35A to 35C, 38A to 38C, 41A to 41C, 44A to 44C, and 47A to 47C show the aberration at the middle focal length in the eighth to twelfth embodiments, respectively. FIGS. 36A to 36C, 39A to 39C, 42A to 42C, 45A to 45C, and 48A to 48C show the aberration at the telephoto end in the eighth to twelfth embodiments, respectively. FIGS. 34A to 48A illustrate spherical aberration, FIGS. 34B to 48B illustrate astigmatism, and FIGS. 34C to 48C illustrate distortion.

FIGS. 55A to 55C, 58A to 58C, 61A to 61C, 64A to 64C, 67A 67C, and 70A to 70C show the aberration at the wide-angle end in the thirteenth to eighteenth embodiments, respectively. FIGS. 56A to 56C, 59A to 59C, 62A to 62C, 65A to 65C, 68A to 68C, and 71A to 71C show the aberration at the middle focal length in the thirteenth to eighteenth embodiments, respectively. FIGS. 57A to 57C, 60A to 60C, 63A to 63C, 66A to 66C, 69A 69C, and 72A to 72C show the aberration at the telephoto end in the thirteenth to eighteenth embodiments, respectively. FIGS. 55A to 72A illustrate spherical aberration, FIGS. 55B to 72B illustrate astigmatism, and FIGS. 55C to 72C illustrate distortion.

FIGS. 76A to 76C, 79A to 79C, and 82A to 82C show the aberration at the wide-angle end in the nineteenth to twenty-first embodiments, respectively. FIGS. 77A to 77C, 80A to 80C, and 83A to 83C show the aberration at the middle focal length in the nineteenth to twenty-first embodiments, respectively. FIGS. 78A to 78C, 81A to 81C, and 84A to 84C show the aberration at the telephoto end in the nineteenth to twenty-first embodiments, respectively. FIGS. 76A to 84A illustrate spherical aberration, FIGS. 76B to 84B illustrate astigmatism, and FIGS. 76C to 84C illustrate distortion.

In the spherical aberration diagrams, the solid line (d), broken line (c), and dash-dot line (g) show the aberration for d-lines (wavelength: $\lambda d=587.6$ nm), c-lines (wavelength: $\lambda c=656.3$ nm), and g-lines (wavelength: $\lambda g=435.8$ nm), respectively. In the spherical aberration diagrams (horizontal axis: mm), the vertical axis represents $h/h_0$, which is the height of incidence h standardized by its maximum height $h_0$. In the astigmatism diagrams (horizontal axis: mm) and the distortion diagrams (horizontal axis: %), the vertical axis represents half the angle of view $\omega(°)$. Furthermore, in the astigmatism diagrams, the solid line M and the solid line S show astigmatism on the meridional surface and on the sagittal surface, respectively.

TABLE 1

<< Embodiment 1 >>
f = 31.0~42.0~58.0    FNO = 5.37~7.27~10.04

| | Curvature Radius | Axial Distance | Refractive Coefficient | Abbe Number |
|---|---|---|---|---|
| r1 | ∞ | | | |
| | | d1  4.000 | | |
| r2 | ∞ (aperture diaphragm) | | | |
| | | d2  1.500 | | |
| r3* | −11.393 | | | |
| | | d3  5.000 | N1  1.51728 | v1  69.43 |
| r4*[DOE] | −6.967 | | | |
| | | d4  18.996~13.372~9.000 | | |
| r5* | 46.296 | | | |
| | | d5  2.067 | N2  1.74400 | v2  44.93 |
| r6*[DOE] | 14.738 | | | |

[Aspherical Coefficient]

| r3: | | r4: | |
|---|---|---|---|
| ∈ = | 0.10000 × 10 | ∈ = | 0.10000 × 10 |
| A4 = | −8.71771E-04 | A4 = | −0.229803E-04 |
| A6 = | 3.52903E-05 | A6 = | −0.120535E-04 |
| A8 = | −1.96982E-05 | A8 = | 0.548957E-06 |
| A10 = | 2.81438E-06 | A10 = | −0.144025E-07 |
| A12 = | −1.31353E-07 | | |
| A14 = | −7.51889E-09 | | |
| A16 = | 6.32184E-10 | | |
| r5: | | r6: | |
| ∈ = | 0.10000 × 10 | ∈ = | 0.10000 × 10 |
| A4 = | −4.46217E-04 | A4 = | −0.574988E-03 |

TABLE 1-continued

| | | | |
|---|---|---|---|
| A6 = | 2.03439E-06 | A6 = | 0.607506E-05 |
| A8 = | 2.44377E-08 | A8 = | -0.425041E-07 |
| A10 = | 3.96291E-10 | A10 = | 0.122232E-09 |
| A12 = | -2.24579E-11 | | |
| A14 = | 2.53395E-13 | | |
| A16 = | -8.99427E-16 | | |

[Phase Coefficient]

r4: | | r6: | |
|---|---|---|---|
| R2 = | -0.935212E-03 | R2 = | 0.113616E-02 |
| R4 = | -0.529903E-04 | R4 = | 0.977033E-05 |
| R6 = | 0.153323E-04 | R6 = | -0.724598E-06 |
| R8 = | -0.286829E-05 | R8 = | 0.207677E-07 |
| R10 = | 0.304137E-06 | R10 = | -0.294173E-09 |
| R12 = | -0.166644E-07 | R12 = | 0.201337E-11 |
| R14 = | 0.363853E-09 | R14 = | -0.531185E-14 |

TABLE 2

<< Embodiment 2 >>
$f = 31.0 \sim 36.7 \sim 48.5$  $FNO = 5.90 \sim 6.99 \sim 9.23$

| | Curvature Radius | Axial Distance | Refractive Coefficient | | Abbe Number |
|---|---|---|---|---|---|
| r1 | ∞ | | | | |
| | | d1  2.800 | | | |
| r2 | ∞ (aperture diaphragm) | | | | |
| | | d2  1.500 | | | |
| r3* | -10.834 | | | | |
| | | d3  4.500 | N1  1.51728 | v1 | 69.43 |
| r4*[DOE] | -6.979 | | | | |
| | | d4  19.513~13.912~6.500 | | | |
| r5* | 65.929 | | | | |
| | | d5  3.580 | N2  1.74400 | v2 | 44.93 |
| r6*[DOE] | 21.449 | | | | |

[Aspherical Coefficient]

| r3: | | r4: | |
|---|---|---|---|
| ε = | 0.10000 × 10 | ε = | 0.10000 × 10 |
| A4 = | -7.98322E-04 | A4 = | -0.130032E-04 |
| A6 = | -2.51344E-05 | A6 = | -0.190665E-04 |
| A8 = | 1.45871E-06 | A8 = | 0.857751E-06 |
| A10 = | -3.54094E-07 | A10 = | -0.217195E-07 |
| A12 = | -1.76570E-0 | | |
| A14 = | 7.97744E-09 | | |
| A16 = | -5.22065E-10 | | |

| r5: | | r6: | |
|---|---|---|---|
| ε = | 0.10000 × 10 | ε = | 0.10000 × 10 |
| A4 = | -1.01270E-04 | A4 = | -0.177819E-03 |
| A6 = | -1.66409E-06 | A6 = | 0.882777E-06 |
| A8 = | 3.06812E-08 | A8 = | -0.192044E-08 |
| A10 = | 3.37143E-10 | A10 = | -0.154742E-11 |
| A12 = | -1.26677E-11 | | |
| A14 = | 1.15143E-13 | | |
| A16 = | -3.52772E-16 | | |

[Phase Coefficient]

| r4: | | r6: | |
|---|---|---|---|
| R2 = | -0.723770E-03 | R2 = | 0.318064E-03 |
| R4 = | -0.883523E-04 | R4 = | 0.330954E-04 |
| R6 = | 0.254016E-04 | R6 = | -0.160631E-05 |
| R8 = | -0.505225E-05 | R8 = | 0.352324E-07 |
| R10 = | 0.603699E-06 | R10 = | -0.384339E-09 |
| R12 = | -0.378775E-07 | R12 = | 0.203238E-11 |
| R14 = | 0.947243E-09 | R14 = | -0.415012E-14 |

TABLE 3

<< Embodiment 3 >>
$f = 31.0 \sim 42.0 \sim 58.0$  $FNO = 5.37 \sim 7.27 \sim 10.04$

| | Curvature Radius | Axial Distance | Refractive Coefficient | | Abbe Number |
|---|---|---|---|---|---|
| r1 | ∞ | | | | |
| | | d1  4.200 | | | |
| r2 | ∞ (aperture diaphragm) | | | | |
| | | d2  1.500 | | | |
| r3* | -9.793 | | | | |
| | | d3  4.786 | N1  1.51728 | v1 | 69.43 |
| r4*[DOE] | -6.435 | | | | |
| | | d4  19.400~13.777~9.405 | | | |
| r5* | 88.588 | | | | |
| | | d5  2.000 | N2  1.74950 | v2 | 35.27 |
| r6*[DOE] | 17.942 | | | | |

[Aspherical Coefficient]

| r3: | | r4: | |
|---|---|---|---|
| ε = | 0.10000 × 10 | ε = | 0.10000 × 10 |
| A4 = | -9.58060E-04 | A4 = | 0.202436E-03 |
| A6 = | 1.85399E-05 | A6 = | -0.325545E-04 |
| A8 = | -1.66241E-05 | A8 = | 0.148472E-05 |
| A10 = | 2.47977E-06 | A10 = | -0.199811E-07 |
| A12 = | -1.20124E-07 | | |
| A14 = | -7.51889E-09 | | |
| A16 = | 6.32184E-10 | | |

| r5: | | r6: | |
|---|---|---|---|
| ε = | 0.10000 × 10 | ε = | 0.10000 × 10 |
| A4 = | -3.27162E-04 | A4 = | -0.430316E-03 |
| A6 = | 2.73193E-06 | A6 = | 0.523536E-05 |
| A8 = | -1.43226E-08 | A8 = | -0.405296E-0 |
| A10 = | 9.13095E-10 | A10 = | 0.130782E-09 |
| A12 = | -2.43145E-11 | | |
| A14 = | 2.38663E-13 | | |
| A16 = | -7.99510E-16 | | |

[Phase Coefficient]

| r4: | | r6: | |
|---|---|---|---|
| R2 = | -0.600000E-03 | R2 = | 0.130799E-02 |
| R4 = | -0.158540E-03 | R4 = | 0.245930E-04 |
| R6 = | 0.283839E-04 | R6 = | -0.127089E-05 |
| R8 = | -0.328294E-05 | R8 = | 0.296381E-07 |
| R10 = | 0.256001E-06 | R10 = | -0.363719E-09 |
| R12 = | -0.110943E-07 | R12 = | 0.225526E-11 |
| R14 = | 0.169945E-09 | R14 = | -0.557561E-14 |

TABLE 4

<< Embodiment 4 >>
$f = 31.0 \sim 42.0 \sim 60.0$  $FNO = 5.52 \sim 7.47 \sim 10.67$

| | Curvature Radius | Axial Distance | Refractive Coefficient | | Abbe Number |
|---|---|---|---|---|---|
| r1 | ∞ | | | | |
| | | d1  4.200 | | | |
| r2 | ∞ (aperture diaphragm) | | | | |
| | | d2  1.500 | | | |
| r3* | -8.195 | | | | |
| | | d3  4.378 | N1  1.53172 | v1 | 48.84 |
| r4*[DOE] | -6.138 | | | | |
| | | d4  22.090~17.436~13.500 | | | |
| r5* | 66.544 | | | | |
| | | d5  1.200 | N2  1.74400 | v2 | 44.93 |
| r6*[DOE] | 14.731 | | | | |

[Aspherical Coefficient]

| r3: | | r4: | |
|---|---|---|---|
| ε = | 0.10000 × 10 | ε = | 0.10000 × 10 |
| A4 = | -1.11056E-03 | A4 = | -0.123419E-03 |
| A6 = | 1.53367E-05 | A6 = | 0.143980E-04 |
| A8 = | -1.68530E-05 | A8 = | -0.195791E-05 |

TABLE 4-continued

| | | | |
|---|---|---|---|
| A10 = | 2.11303E-06 | A10 = | 0.673502E-07 |
| A12 = | -9.25267E-08 | | |
| A14 = | -7.51860E-09 | | |
| A16 = | 6.32422E-10 | | |
| r5: | | r6: | |
| $\epsilon$ = | 0.10000 × 10 | $\epsilon$ = | 0.10000 × 10 |
| A4 = | -6.03854E-04 | A4 = | -0.641492E-03 |
| A6 = | 8.81688E-06 | A6 = | 0.797796E-05 |
| A8 = | -1.07481E-07 | A8 = | -0.539403E-07 |
| A10 = | 1.98229E-09 | A10 = | 0.135213E-09 |
| A12 = | -2.81430E-11 | | |
| A14 = | 1.93397E-13 | | |
| A16 = | -4.89754E-16 | | |

[Phase Coefficient]

| r4: | | r6: | |
|---|---|---|---|
| R2 = | -0.173581E-02 | R2 = | 0.220000E-02 |
| R4 = | -0.389151E-05 | R4 = | -0.502200E-04 |
| R6 = | 0.309476E-05 | R6 = | 0.135581E-05 |
| R8 = | -0.117102E-05 | R8 = | -0.190929E-07 |
| R10 = | 0.150674E-06 | R10 = | 0.129229E-09 |
| R12 = | -0.802067E-08 | R12 = | -0.340571E-12 |
| R14 = | 0.144664E-09 | R14 = | 0.552881E-16 |

TABLE 5

<< Embodiment 5 >>
f = 31.0~42.0~52.0    FNO = 5.87~7.95~9.18

| | Curvature Radius | Axial Distance | Refractive Coefficient | | Abbe Number |
|---|---|---|---|---|---|
| r1 | ∞ | | | | |
| | | d1  2.800 | | | |
| r2 | ∞ (aperture diaphragm) | | | | |
| | | d2  1.500 | | | |
| r3* | -10.097 | | | | |
| | | d3  4.505 | N1  1.51680 | v1 | 64.20 |
| r4*[DOE] | -6.510 | | | | |
| | | d4  19.747~13.555~10.200 | | | |
| r5* | 214.183 | | | | |
| | | d5  1.200 | N2  1.58913 | v2 | 61.25 |
| r6* | 16.610 | | | | |

[Aspherical Coefficient]

| r3: | | r4: | |
|---|---|---|---|
| $\epsilon$ = | 0.10000 × 10 | $\epsilon$ = | 0.10000 × 10 |
| A4 = | -8.69665E-04 | A4 = | -0.274223E-04 |
| A6 = | -4.94222E-05 | A6 = | -0.286911E-04 |
| A8 = | 2.28572E-06 | A8 = | 0.317969E-05 |
| A10 = | -1.85887E-07 | A10 = | -0.121917E-06 |
| A12 = | -3.86667E-08 | | |
| A14 = | 8.89596E-09 | | |
| A16 = | -5.22065E-10 | | |
| r5: | | r6: | |
| $\epsilon$ = | 0.10000 × 10 | $\epsilon$ = | 0.10000 × 10 |
| A4 = | -4.36338E-04 | A4 = | -5.10807E-04 |
| A6 = | 3.50451E-06 | A6 = | 6.19894E-06 |
| A8 = | 3.02069E-08 | A8 = | -4.22271E-08 |
| A10 = | -5.60341E-11 | A10 = | 5.38636E-11 |
| A12 = | -9.24346E-12 | A12 = | -2.99200E-13 |
| A14 = | 1.97730E-13 | A14 = | 1.26679E-14 |
| A16 = | -8.82516E-16 | A16 = | -5.50742E-17 |

[Phase Coefficient]

| | r4: | |
|---|---|---|
| | R2 = | -0.663605E-03 |
| | R4 = | -0.428927E-04 |
| | R6 = | 0.198301E-04 |
| | R8 = | -0.374353E-05 |
| | R10 = | 0.327172E-06 |
| | R12 = | -0.153582E-07 |
| | R14 = | 0.333884E-09 |

TABLE 6

<< Embodiment 6 >>
f = 31.0~42.0~60.0    FNO = 5.34~7.24~10.00

| | Curvature Radius | Axial Distance | Refractive Coefficient | | Abbe Number |
|---|---|---|---|---|---|
| r1 | ∞ | | | | |
| | | d1  4.200 | | | |
| r2 | ∞ (aperture diaphragm) | | | | |
| | | d2  1.500 | | | |
| r3* | -8.826 | | | | |
| | | d3  5.000 | N1  1.49140 | v1 | 57.82 |
| r4*[DOE] | -5.937 | | | | |
| | | d4  18.984~14.774~11.500 | | | |
| r5* | 3231.825 | | | | |
| | | d5  1.200 | N2  1.58340 | v2 | 30.23 |
| r6*[DOE] | 14.647 | | | | |

[Aspherical Coefficient]

| r3: | | r4: | |
|---|---|---|---|
| $\epsilon$ = | 0.10000 × 10 | $\epsilon$ = | 0.10000 × 10 |
| A4 = | -1.11337E-03 | A4 = | -0.505578E-04 |
| A6 = | -2.89599E-06 | A6 = | 0.161063E-04 |
| A8 = | -1.02951E-05 | A8 = | -0.134308E-05 |
| A10 = | 1.35800E-06 | A10 = | 0.383076E-07 |
| A12 = | -6.39427E-08 | | |
| A14 = | -7.51889E-09 | | |
| A16 = | 6.32184E-10 | | |
| r5: | | r6: | |
| $\epsilon$ = | 0.10000 × 10 | $\epsilon$ = | 0.10000 × 10 |
| A4 = | -5.79337E-04 | A4 = | -0.676717E-03 |
| A6 = | 1.02326E-05 | A6 = | 0.100777E-04 |
| A8 = | -1.45037E-07 | A8 = | -0.810167E-07 |
| A10 = | 3.34314E-09 | A10 = | 0.250979E-09 |
| A12 = | -5.91355E-11 | | |
| A14 = | 5.02990E-13 | | |
| A16 = | -1.57381E-15 | | |

[Phase Coefficient]

| r4: | | r6: | |
|---|---|---|---|
| R2 = | -0.139457E-02 | R2 = | 0.234512E-02 |
| R4 = | 0.106953E-04 | R4 = | -0.129545E-04 |
| R6 = | -0.107920E-06 | R6 = | 0.495720E-06 |
| R8 = | -0.446277E-06 | R8 = | -0.124741E-07 |
| R10 = | 0.459083E-07 | R10 = | 0.141972E-09 |
| R12 = | -0.132545E-08 | R12 = | -0.672320E-12 |
| R14 = | -0.286015E-11 | R14 = | 0.880946E-15 |

TABLE 7

<< Embodiment 7 >>
f = 31.0~42.0~58.0    FNO = 5.58~7.56~10.44

| | Curvature Radius | Axial Distance | Refractive Coefficient | | Abbe Number |
|---|---|---|---|---|---|
| r1 | ∞ | | | | |
| | | d1  4.200 | | | |
| r2 | ∞ (aperture diaphragm) | | | | |
| | | d2  1.500 | | | |
| r3* | -9.033 | | | | |
| | | d3  5.000 | N1  1.51728 | v1 | 69.43 |
| r4*[DOE] | -6.128 | | | | |
| | | d4  19.058~14.806~11.500 | | | |
| r5* | -120.239 | | | | |
| | | d5  1.200 | N2  1.58340 | v2 | 30.23 |
| r6*[DOE] | 16.890 | | | | |

[Aspherical Coefficient]

| r3: | | r4: | |
|---|---|---|---|
| $\epsilon$ = | 0.10000 × 10 | $\epsilon$ = | 0.10000 × 10 |
| A4 = | -1.07185E-03 | A4 = | 0.161534E-03 |
| A6 = | 6.49986E-06 | A6 = | -0.303655E-04 |
| A8 = | -1.26452E-05 | A8 = | 0.241673E-05 |

TABLE 7-continued

| | | | |
|---|---|---|---|
| A10 = | 1.62801E-06 | A10 = | −0.704289E-07 |
| A12 = | −7.18545E-08 | | |
| A14 = | −7.51889E-09 | | |
| A16 = | 6.32184E-10 | | | r5:                                r6:
| | | | |
|---|---|---|---|
| $\epsilon$ = | 0.10000 × 10 | $\epsilon$ = | 0.10000 × 10 |
| A4 = | −5.00028E-04 | A4 = | −0.614114E-03 |
| A6 = | 7.45918E-06 | A6 = | 0.100553E-04 |
| A8 = | −6.30032E-08 | A8 = | −0.840580E-07 |
| A10 = | 1.73389E-09 | A10 = | 0.248961E-09 |
| A12 = | −3.52896E-11 | | |
| A14 = | 2.43570E-13 | | |
| A16 = | −3.86919E-16 | | |

[Phase Coefficient]

r4:                                r6:
| | | | |
|---|---|---|---|
| R2 = | −0.918716E-03 | R2 = | 0.218586E-02 |
| R4 = | −0.110740E-03 | R4 = | 0.175186E-04 |
| R6 = | 0.269297E-04 | R6 = | −0.116067E-05 |
| R8 = | −0.346183E-05 | R8 = | 0.293036E-07 |
| R10 = | 0.249079E-06 | R10 = | −0.371407E-09 |
| R12 = | −0.105591E-07 | R12 = | 0.232601E-11 |
| R14 = | 0.215386E-09 | R14 = | −0.574710E-14 |

TABLE 8

| | Conditional Expression (1) $|\phi doe/\phi r|$ | | Conditional Expression (2) $|R_2 \times H_{max}/\lambda_0|$ | | Cond. | |
|---|---|---|---|---|---|---|
| | 1st Lens unit | 2nd Lens Unit | 1st Lens Unit | 2nd Lens Unit | Exp. (3) $|\phi Gr1/\phi Gr2|$ | Cond. Exp. (4) $\nu 21$ |
| Emb. 1 | 0.047 | 0.068 | 5.51 | 20.69 | 1.18 | — |
| Emb. 2 | 0.039 | 0.028 | 4.07 | 6.12 | 1.66 | — |
| Emb. 3 | 0.029 | 0.080 | 3.53 | 23.82 | 1.19 | — |
| Emb. 4 | 0.092 | 0.113 | 11.82 | 43.54 | 0.97 | — |
| Emb. 5 | 0.033 | — | 3.73 | — | 1.28 | 61.25 |
| Emb. 6 | 0.067 | 0.118 | 8.78 | 42.30 | 1.02 | — |
| Emb. 7 | 0.043 | 0.111 | 5.41 | 39.43 | 1.03 | — |

N.B.: $\lambda 0 = 585.75 \times 10E-6$ mm

TABLE 9

<< Embodiment 8 >>
f = 25.8~44.3~73.1    FNO = 3.41~5.86~9.67

| | Curvature Radius | | Axial Distance | Refractive Coefficient | | Abbe Number |
|---|---|---|---|---|---|---|
| r1* | −13.819 | | | | | |
| | | d1 | 2.800 | N1 | 1.84506 | $\nu 1$ 23.66 |
| r2* | −20.233 | | | | | |
| | | d2 | 1.500 | | | |
| r3 | 237.389 | | | | | |
| | | d3 | 6.440 | N2 | 1.48749 | $\nu 2$ 70.44 |
| r4 | −9.191 | | | | | |
| | | d4 | 1.400 | | | |
| r5 | ∞ (aperture diaphragm) | | | | | |
| | | d5 | 12.077~5.896~2.500 | | | |
| r6*[DOE] | 64.240 | | | | | |
| | | d6 | 3.350 | N3 | 1.52510 | $\nu 3$ 56.38 |
| r7* | −22.091 | | | | | |
| | | d7 | 3.678 | | | |
| r8 | −9.335 | | | | | |
| | | d8 | 1.000 | N4 | 1.78831 | $\nu 4$ 47.32 |
| r9 | −65.677 | | | | | |

[Aspherical Coefficient]

r1:                                r2:
| | | | |
|---|---|---|---|
| $\epsilon$ = | −5.400813 | $\epsilon$ = | −7.887327 |
| A4 = | −1.78107E-04 | A4 = | 1.60475E-04 |

TABLE 9-continued

| | | | |
|---|---|---|---|
| A6 = | 5.50759E-06 | A6 = | 3.66891E-06 |
| A8 = | 2.93538E-08 | A8 = | 1.05499E-07 |
| A10 = | −2.40715E-09 | A10 = | −1.42789E-09 |
| A12 = | 2.23807E-11 | A12 = | 3.50091E-11 | r6:                                r7:
| | | | |
|---|---|---|---|
| $\epsilon$ = | −734.249329 | $\epsilon$ = | 0.206632 |
| A4 = | −0.111754E-03 | A4 = | −4.17901E-05 |
| A6 = | 0.390159E-05 | A6 = | −8.29285E-07 |
| A8 = | −0.518108E-07 | A8 = | 2.07422E-08 |
| A10 = | 0.507383E-09 | A10 = | 4.38087E-10 |
| | | A12 = | −2.12745E-11 |
| | | A14 = | 1.89823E-13 |

[Phase Coefficient]

r6:
| | |
|---|---|
| R2 = | 0.153161E-03 |
| R4 = | 0.528220E-04 |
| R6 = | −0.297302E-05 |
| R8 = | 0.572159E-07 |
| R10 = | −0.394571E-09 |
| R12 = | 0.467051E-12 |

TABLE 10

<< Embodiment 9 >>
f = 39.0~75.0~126.1    FNO = 3.65~7.03~11.81

| | Curvature Radius | | Axial Distance | Refractive Coefficient | | Abbe Number |
|---|---|---|---|---|---|---|
| r1*[DOE] | 32.688 | | | | | |
| | | d1 | 2.500 | N1 | 1.84506 | $\nu 1$ 23.66 |
| r2* | 17.790 | | | | | |
| | | d2 | 3.200 | | | |
| r3 | −443.624 | | | | | |
| | | d3 | 3.005 | N2 | 1.58267 | $\nu 2$ 46.43 |
| r4 | −11.385 | | | | | |
| | | d4 | 1.700 | | | |
| r5 | ∞ (aperture diaphragm) | | | | | |
| | | d5 | 15.990~6.407~2.200 | | | |
| r6* | −90.552 | | | | | |
| | | d6 | 3.200 | N3 | 1.58340 | $\nu 3$ 30.23 |
| r7* | −29.753 | | | | | |
| | | d7 | 4.205 | | | |
| r8 | −11.685 | | | | | |
| | | d8 | 1.000 | N4 | 1.78590 | $\nu 4$ 43.93 |
| r9 | −59.522 | | | | | |

[Aspherical Coefficient]

r1:                                r2:
| | | | |
|---|---|---|---|
| $\epsilon$ = | 1.0 | $\epsilon$ = | 1.0 |
| A4 = | −0.321594E-03 | A4 = | −2.76892E-04 |
| A6 = | −0.228864E-05 | A6 = | −1.57370E-06 |
| A8 = | 0.692809E-08 | A8 = | 3.12134E-08 |
| A10 = | −0.214450E-090 | A10 = | 2.37775E-11 |
| | | A12 = | −3.80414E-12 | r6:                                r7:
| | | | |
|---|---|---|---|
| $\epsilon$ = | 1.0 | $\epsilon$ = | 1.0 |
| A4 = | 5.84118E-05 | A4 = | −5.11476E-06 |
| A6 = | 1.03875E-06 | A6 = | 1.38172E-06 |
| A8 = | −6.21676E-0 | A8 = | −8.20593E-08 |
| A10 = | 1.40589E-09 | A10 = | 1.73412E-09 |
| A12 = | −1.40080E-11 | A12 = | −1.71530E-11 |
| A14 = | 5.49874E-14 | A14 = | 6.65304E-14 |

[Phase Coefficient]

r1:
| | |
|---|---|
| R2 = | −0.335464E-03 |
| R4 = | 0.384283E-05 |
| R6 = | 0.424168E-06 |
| R8 = | −0.240853E-07 |
| R10 = | 0.632445E-10 |
| R12 = | 0.185578E-10 |
| R14 = | −0.309215E-12 |

TABLE 11

<< Embodiment 10 >>
f = 39.1~75.0~112.5     FNO = 3.64~6.98~10.48

| | Curvature Radius | | Axial Distance | Refractive Coefficient | | Abbe Number |
|---|---|---|---|---|---|---|
| r1* | 31.740 | | | | | |
| | | d1 | 2.500 | N1 1.58340 | v1 | 30.23 |
| r2* | 15.915 | | | | | |
| | | d2 | 3.497 | | | |
| r3 | 76.274 | | | | | |
| | | d3 | 4.000 | N2 1.52510 | v2 | 56.38 |
| r4[DOE] | -12.535 | | | | | |
| | | d4 | 1.700 | | | |
| r5 | ∞ (aperture diaphragm) | | | | | |
| | | d5 | 14.192~5.471~2.305 | | | |
| r6*[DOE] | -60.954 | | | | | |
| | | d6 | 3.200 | N3 1.58340 | v3 | 30.23 |
| r7* | -28.401 | | | | | |
| | | d7 | 4.290 | | | |
| r8 | -10.833 | | | | | |
| | | d8 | 1.000 | N4 1.78590 | v4 | 43.93 |
| r9 | -36.491 | | | | | |

[Aspherical Coefficient]

| r1: | | r2: | |
|---|---|---|---|
| $\epsilon$ = | 1.0 | $\epsilon$ = | 1.0 |
| A4 = | -3.55029E-04 | A4 = | -2.87678E-04 |
| A6 = | -7.31556E-07 | A6 = | -6.53773E-07 |
| A8 = | -9.04215E-09 | A8 = | 3.04236E-08 |
| A10 = | 2.82648E-11 | A10 = | -9.95792E-11 |
| A12 = | 5.26596E-12 | A12 = | 3.35588E-12 |

| r6: | | r7: | |
|---|---|---|---|
| $\epsilon$ = | 1.0 | $\epsilon$ = | 1.0 |
| A4 = | 0.642592E-04 | A4 = | 9.87099E-06 |
| A6 = | 0.512484E-06 | A6 = | 7.51184E-07 |
| A8 = | -0.138462E-07 | A8 = | -4.45170E-08 |
| A10 = | 0.170728E-09 | A10 = | 1.07241E-09 |
| | | A12 = | -1.29625E-11 |
| | | A14 = | 6.45127E-14 |

[Phase Coefficient]

| r4: | | r6: | |
|---|---|---|---|
| R2 = | -0.725685E-03 | R2 = | 0.741273E-03 |
| R4 = | 0.650060E-05 | R4 = | -0.180446E-04 |
| R6 = | -0.683676E-07 | R6 = | 0.661725E-06 |
| R8 = | 0.982012E-09 | R8 = | -0.189750E-07 |
| R10 = | 0.302538E-10 | R10 = | 0.240798E-09 |
| R12 = | -0.110810E-11 | R12 = | -0.108042E-11 |

TABLE 12

<< Embodiment 11 >>
f = 36.0~46.0~68.0     FNO = 5.29~6.77~10.0

| | Curvature Radius | | Axial Distance | Refractive Coefficient | | Abbe Number |
|---|---|---|---|---|---|---|
| r1*[DOE] | 27.576 | | | | | |
| | | d1 | 1.800 | N1 1.58913 | v1 | 61.11 |
| r2 | 14.970 | | | | | |
| | | d2 | 6.457 | | | |
| r3 | 46.570 | | | | | |
| | | d3 | 2.800 | N2 1.48794 | v2 | 70.44 |
| r4 | -11.850 | | | | | |
| | | d4 | 1.600 | | | |
| r5 | ∞ (aperture diaphragm) | | | | | |
| | | d5 | 11.855~7.857~3.200 | | | |

TABLE 12-continued

| | | | | | | |
|---|---|---|---|---|---|---|
| r6* | -30.608 | | | | | |
| | | d6 | 2.500 | N3 1.58340 | v3 | 30.23 |
| r7 | -14.439 | | | | | |
| | | d7 | 2.666 | | | |
| r8 | -8.978 | | | | | |
| | | d8 | 1.000 | N4 1.66755 | v4 | 41.98 |
| r9 | -54.603 | | | | | |

[Aspherical Coefficient]

| r1: | | r6: | |
|---|---|---|---|
| $\epsilon$ = | 14.478606 | $\epsilon$ = | 5.947800 |
| A4 = | -0.187833E-03 | A4 = | 9.86210E-05 |
| A6 = | -0.230469E-05 | A6 = | -5.45510E-07 |
| A8 = | -0.254578E-07 | A8 = | 4.95370E-08 |
| A10 = | -0.139817E-09 | A10 = | -6.87010E-10 |
| | | A12 = | 4.97500E-12 |

[Phase Coefficient]

| r1: | |
|---|---|
| R2 = | -0.900000E-03 |
| R4 = | 0.200481E-04 |
| R6 = | -0.477910E-06 |
| R8 = | 0.220685E-08 |
| R10 = | -0.251251E-09 |
| R12 = | 0.600675E-11 |

TABLE 13

<< Embodiment 12 >>
f = 39.0~75.00~126.1     FNO = 3.64~7.00~11.77

| | Curvature Radius | | Axial Distance | Refractive Coefficient | | Abbe Number |
|---|---|---|---|---|---|---|
| r1* | 33.614 | | | | | |
| | | d1 | 2.348 | N1 1.84506 | v1 | 23.66 |
| r2* | 24.735 | | | | | |
| | | d2 | 3.894 | | | |
| r3 | -64.015 | | | | | |
| | | d3 | 3.300 | N2 1.58144 | v2 | 40.83 |
| r4[DOE] | -12.660 | | | | | |
| | | d4 | 1.700 | | | |
| r5 | ∞ (aperture diaphragm) | | | | | |
| | | d5 | 16.257~6.488~2.200 | | | |
| r6* | -384.511 | | | | | |
| | | d6 | 3.200 | N3 1.58340 | v3 | 30.23 |
| r7* | -27.851 | | | | | |
| | | d7 | 3.550 | | | |
| r8 | -11.978 | | | | | |
| | | d8 | 1.000 | N4 1.80518 | v4 | 25.43 |
| r9[DOE] | -75.583 | | | | | |

[Aspherical Coefficient]

| r1: | | r2: | |
|---|---|---|---|
| $\epsilon$ = | 1.0 | $\epsilon$ = | 1.0 |
| A4 = | -2.21481E-04 | A4 = | -1.64351E-04 |
| A6 = | -1.82011E-06 | A6 = | -2.15286E-06 |
| A8 = | -2.30964E-09 | A8 = | 1.38950E-08 |
| A10 = | -5.55286E-10 | A10 = | -1.13309E-10 |
| A12 = | 1.37000E-11 | A12 = | 7.87022E-12 |

| r6: | | r7: | |
|---|---|---|---|
| $\epsilon$ = | 1.0 | $\epsilon$ = | 1.0 |
| A4 = | 4.88983E-05 | A4 = | -6.39356E-06 |
| A6 = | 2.21301E-06 | A6 = | 2.37182E-06 |
| A8 = | -1.00499E-07 | A8 = | -1.05632E-07 |
| A10 = | 1.85369E-09 | A10 = | 1.73575E-09 |
| A12 = | -1.53753E-11 | A12 = | -1.38838E-11 |
| A14 = | 5.30171E-14 | A14 = | 4.96907E-14 |

[Phase Coefficient]

| r4: | | r9: | |
|---|---|---|---|
| R2 = | -0.120000E-02 | R2 = | 0.267414E-02 |
| R4 = | 0.267114E-05 | R4 = | -0.151264E-04 |
| R6 = | 0.572067E-07 | R6 = | 0.195100E-06 |

TABLE 13-continued

| | | | |
|---|---|---|---|
| R8 = | 0.650686E-09 | R8 = | -0.186834E-08 |
| R10 = | 0.339992E-10 | R10 = | 0.768360E-11 |
| R12 = | -0.175055E-11 | R12 = | -0.618651E-14 |

TABLE 14

| | Conditional Expression (5) $\|\phi doe/\phi r\|$ | | Conditional Expression (6) $\|R_2 \times H_{max}/\lambda_0\|$ | |
|---|---|---|---|---|
| | 1st Lens unit | 2nd Lens Unit | 1st Lens Unit | 2nd Lens Unit |
| Emb. 8 | — | -0.006 | — | 2.20 |
| Emb. 9 | 0.021 | — | 3.10 | — |
| Emb. 10 | 0.041 | 0.038 | 7.56 | 11.73 |
| Emb. 11 | 0.044 | — | 8.42 | — |
| Emb. 12 | 0.073 | 0.140 | 12.32 | 56.16 |

N.B.: $\lambda 0 = 585.75 \times 10E\text{-}6$ mm

TABLE 15

<< Embodiment 13 >>
f = 36.0~46.0~68.0    FNO = 5.85~7.47~11.04

| | Curvature Radius | Axial Distance | Refractive Coefficient | | Abbe Number |
|---|---|---|---|---|---|
| <First Lens Unit, positive> | | | | | |
| r1* | 16.654 | | | | |
| | | d1  1.700 | N1  1.58340 | v1 | 30.23 |
| r2*[DOE] | 11.158 | | | | |
| | | d2  6.800 | | | |
| r3 | 27.642 | | | | |
| | | d3  4.500 | N2  1.48749 | v2 | 70.44 |
| r4 | -15.451 | | | | |
| | | d4  1.530 | | | |
| r5 | ∞ (aperture diaphragm) | | | | |
| | | d5  20.246~15.972~11.000 | | | |
| <Second Lens Unit, negative> | | | | | |
| r6* | -11.119 | | | | |
| | | d6  1.000 | N3  1.49300 | v3 | 58.34 |
| r7* | -80.645 | | | | |

[Aspherical Coefficient]

r1:
- $\epsilon$ = 1.0000
- A4 = -5.07167E-04
- A6 = 5.94882E-06
- A8 = -1.77015E-07
- A10 = 1.47358E-09
- A12 = 2.42637E-11
- A14 = -3.34003E-13 r2:
- $\epsilon$ = 1.0000
- A4 = -0.537417E-03
- A6 = 0.637132E-05
- A8 = -0.231016E-06
- A10 = 0.340251E-08 r6:
- $\epsilon$ = 1.0000
- A4 = 3.57900E-04
- A6 = -1.46737E-05
- A8 = 4.93788E-07
- A10 = -1.07105E-08
- A12 = 1.18188E-10
- A14 = -4.95732E-13 r7:
- $\epsilon$ = 1.0000
- A4 = 1.88550E-4
- A6 = -3.71495E-6
- A8 = 3.53529E-8
- A10 = -1.95050E-10
- A12 = 6.55611E-13
- A14 = -1.15257E-15

[Phase Coefficient]

r2:
- R2 = -0.275811E-3
- R4 = -0.338384E-6
- R6 = 0.364960E-6
- R8 = -0.119618E-7

TABLE 16

<< Embodiment 14 >>
f = 36.0~46.0~67.9    FNO = 5.58~7.13~10.54

| | Curvature Radius | Axial Distance | Refractive Coefficient | | Abbe Number |
|---|---|---|---|---|---|
| <First Lens Unit, positive> | | | | | |
| r1* | 23.745 | | | | |
| | | d1  1.900 | N1  1.58340 | v1 | 30.23 |
| r2*[DOE] | 13.793 | | | | |
| | | d2  2.770 | | | |
| r3 | -132.219 | | | | |
| | | d3  4.500 | N2  1.48749 | v2 | 70.44 |
| r4 | -9.350 | | | | |
| | | d4  1.530 | | | |
| r5 | ∞ (aperture diaphragm) | | | | |
| | | d5  21.400~16.596~11.000 | | | |
| <Second Lens Unit, negative> | | | | | |
| r6*[DOE] | -12.282 | | | | |
| | | d6  1.000 | N3  1.49300 | v3 | 58.34 |
| r7* | -80.645 | | | | |

[Aspherical Coefficient]

r1:
- $\epsilon$ = 1.0000
- A4 = -5.38458E-4
- A6 = 3.83305E-6
- A8 = -3.10785E-7
- A10 = 4.02904E-9
- A12 = 1.71740E-10
- A14 = -4.60595E-12 r2:
- $\epsilon$ = 1.0000
- A4 = -0.413958E-3
- A6 = 0.669438E-5
- A8 = -0.323274E-6
- A10 = 0.838167E-8 r6:
- $\epsilon$ = 1.0000
- A4 = 0.265508E-3
- A6 = -0.506093E-5
- A8 = 0.702829E-7
- A10 = -0.276735E-9 r7:
- $\epsilon$ = 1.0000
- A4 = 1.51743E-4
- A6 = -3.03061E-6
- A8 = 3.64965E-8
- A10 = -2.14382E-10
- A12 = 6.20757E-13
- A14 = -7.75422E-16

[Phase Coefficient]

r2:
- R2 = -0.268363E-3
- R4 = 0.137123E-4
- R6 = -0.282505E-6
- R8 = -0.259606E-8 r6:
- R2 = 0.376259E-3
- R4 = 0.188764E-5
- R6 = -0.710741E-7
- R8 = 0.506955E-9

TABLE 17

<< Embodiment 15 >>
f = 36.0~46.0~68.0    FNO = 5.69~7.27~10.74

| | Curvature Radius | Axial Distance | Refractive Coefficient | | Abbe Number |
|---|---|---|---|---|---|
| <First Lens Unit, positive> | | | | | |
| r1* | 149.320 | | | | |
| | | d1  2.249 | N1  1.58340 | v1 | 30.23 |
| r2* | 25.291 | | | | |
| | | d2  1.039 | | | |
| r3 | -60.177 | | | | |
| | | d3  4.500 | N2  1.48749 | v2 | 70.44 |
| r4 | -8.508 | | | | |
| | | d4  1.530 | | | |
| r5 | ∞ (aperture diaphragm) | | | | |
| | | d5  22.486~17.1296~10.889 | | | |
| <Second Lens Unit, negative> | | | | | |
| r6*[DOE] | -13.278 | | | | |
| | | d6  1.000 | N3  1.49300 | v3 | 58.34 |
| r7* | -80.645 | | | | |

TABLE 17-continued

[Aspherical Coefficient]

| r1: | | r2: | |
|---|---|---|---|
| $\epsilon =$ | 1.0000 | $\epsilon =$ | 1.0000 |
| A4 = | −6.55457E−4 | A4 = | −3.77904E−4 |
| A6 = | 1.11500E−5 | A6 = | 1.33495E−5 |
| A8 = | −9.86513E−7 | A8 = | −8.22387E−7 |
| A10 = | 2.90576E−8 | A10 = | 2.43242E−8 |
| A12 = | −1.32184E−10 | | |
| A14 = | −6.50647E−12 | | |
| r6: | | r7: | |
| $\epsilon =$ | 1.0000 | $\epsilon =$ | 1.0000 |
| A4 = | 0.274942E−3 | A4 = | 1.66120E−4 |
| A6 = | −0.531916E−5 | A6 = | −3.27185E−6 |
| A8 = | 0.628429E−7 | A8 = | 3.65853E−8 |
| A10 = | −0.221283E−9 | A10 = | −2.15009E−10 |
| | | A12 = | 6.99825E−13 |
| | | A14 = | −1.07237E−15 |

[Phase Coefficient]

r6:
R2 = 0.406319E−3
R4 = 0.222987E−5
R6 = −0.598544E−7
R8 = 0.345163E−9

TABLE 18

<< Embodiment 16 >>
f = 36.0~46.0~68.0   FNO = 5.81~7.42~10.97

| | Curvature Radius | Axial Distance | Refractive Coefficient | Abbe Number |
|---|---|---|---|---|
| <First Lens Unit, positive> | | | | |
| r1* | −51.746 | | | |
| | | d1  2.324 | N1  1.58340 | v1  30.23 |
| r2* | 25.200 | | | |
| | | d2  1.000 | | |
| r3 | 198.839 | | | |
| | | d3  3.000 | N2  1.52510 | v2  56.38 |
| r4 | −8.701 | | | |
| | | d4  1.530 | | |
| r5 | ∞ (aperture diaphragm A) | | | |
| | | d5  23.273~17.604~11.000 | | |
| <Second Lens Unit, negative> | | | | |
| r6*[DOE] | −16.522 | | | |
| | | d6  1.000 | N3  1.58340 | v3  30.23 |
| r7* | −80.645 | | | |

[Aspherical Coefficient]

| r1: | | r2: | |
|---|---|---|---|
| $\epsilon =$ | 1.0000 | $\epsilon =$ | 1.0000 |
| A4 = | −9.05597E−4 | A4 = | −5.86654E−4 |
| A6 = | 1.65762E−5 | A6 = | 1.79045E−5 |
| A8 = | −1.37845E−6 | A8 = | −8.09925E−7 |
| A10 = | 5.20321E−8 | A10 = | 2.20014E−8 |
| A12 = | −5.01423E−10 | | |
| A14 = | −1.20666E−11 | | |
| r6: | | r7: | |
| $\epsilon =$ | 1.0000 | $\epsilon =$ | 1.0000 |
| A4 = | 0.189916E−3 | A4 = | 1.23891E−4 |
| A6 = | −0.546697E−5 | A6 = | −3.42025E−6 |
| A8 = | 0.632287E−7 | A8 = | 4.11279E−8 |
| A10 = | −0.230735E−9 | A10 = | −2.38886E−10 |
| | | A12 = | 6.91989E−13 |
| | | A14 = | −8.69625E−16 |

TABLE 18-continued

[Phase Coefficient]

r6:
R2 = 0.116752E−2
R4 = 0.274912E−5
R6 = −0.595954E−7
R8 = 0.348817E−9

TABLE 19

<< Embodiment 17 >>
f = 36.0~46.0~68.0   FNO = 5.75~7.35~10.87

| | Curvature Radius | Axial Distance | Refractive Coefficient | Abbe Number |
|---|---|---|---|---|
| <First Lens Unit, positive> | | | | |
| r1* | −103.503 | | | |
| | | d1  2.365 | N1  1.58340 | v1  30.23 |
| r2* | 23.510 | | | |
| | | d2  1.000 | | |
| r3 | 240.314 | | | |
| | | d3  3.433 | N2  1.49300 | v2  58.34 |
| r4 | −8.507 | | | |
| | | d4  1.530 | | |
| r5 | ∞ (aperture diaphragm A) | | | |
| | | d5  22.777~17.336~11.000 | | |
| <Second Lens Unit, negative> | | | | |
| r6*[DOE] | −13.350 | | | |
| | | d6  1.000 | N3  1.49300 | v3  58.34 |
| r7* | −80.645 | | | |

[Aspherical Coefficient]

| r1: | | r2: | |
|---|---|---|---|
| $\epsilon =$ | 1.0000 | $\epsilon =$ | 1.0000 |
| A4 = | −8.52518E−4 | A4 = | −5.54868E−4 |
| A6 = | 1.79885E−5 | A6 = | 2.00155E−5 |
| A8 = | −1.55255E−6 | A8 = | −1.07505E−6 |
| A10 = | 6.28122E−8 | A10 = | 3.06323E−8 |
| A12 = | −1.03840E−9 | | |
| A14 = | 6.76065E−14 | | |
| r6: | | r7: | |
| $\epsilon =$ | 1.0000 | $\epsilon =$ | 1.0000 |
| A4 = | 0.274483E−3 | A4 = | 1.76926E−4 |
| A6 = | −0.600937E−5 | A6 = | −3.73239E−6 |
| A8 = | 0.712624E−7 | A8 = | 4.18494E−8 |
| A10 = | −0.263854E−9 | A10 = | −2.35231E−10 |
| | | A12 = | 6.52573E−13 |
| | | A14 = | −7.50393E−16 |

[Phase Coefficient]

r6:
R2 = 0.306284E−2
R4 = 0.296471E−5
R6 = −0.241019E−7
R8 = 0.216855E−9

TABLE 20

<< Embodiment 18 >>
f = 36.0~46.0~73.0   FNO = 5.38~6.87~10.91

| | Curvature Radius | Axial Distance | Refractive Coefficient | Abbe Number |
|---|---|---|---|---|
| <First Lens Unit, positive> | | | | |
| r1* | −136.152 | | | |
| | | d1  1.700 | N1  1.58340 | v1  30.23 |
| r2* | 43.255 | | | |
| | | d2  4.000 | | |

TABLE 20-continued

| | | | | | | |
|---|---|---|---|---|---|---|
| r3 | −71.569 | | | | | |
| | | d3 | 3.000 | N2 1.49300 | v2 | 58.34 |
| r4[DOE] | −9.196 | | | | | |
| | | d4 | 1.530 | | | |
| r5 | ∞ (aperture diaphragm A) | | | | | |
| | | d5 | 23.007~18.021~11.000 | | | |
| | <Second Lens Unit, negative> | | | | | |
| r6* | −12.366 | | | | | |
| | | d6 | 1.000 | N3 1.49300 | v3 | 58.34 |
| r7* | −80.645 | | | | | |

[Aspherical Coefficient]

| r1: | | r2: | |
|---|---|---|---|
| ε = | 1.0000 | ε = | 1.0000 |
| A4 = | −4.14596E-4 | A4 = | −1.43587E-4 |
| A6 = | 1.87797E-5 | A6 = | 1.34918E-5 |
| A8 = | −1.70605E-6 | A8 = | −6.17394E-7 |
| A10 = | 9.26432E-8 | A10 = | 1.68564E-8 |
| A12 = | −2.66885E-9 | | |
| A14 = | 3.10523E-11 | | |
| r6: | | r7: | |
| ε = | 1.0000 | ε = | 1.0000 |
| A4 = | 4.58029E-4 | A4 = | 3.17412E-4 |
| A6 = | −6.24285E-6 | A6 = | −4.79974E-6 |
| A8 = | 5.18647E-8 | A8 = | 4.08806E-8 |
| A10 = | −1.28833E-10 | A10 = | −1.96731E-10 |
| | | A12 = | 5.44119E-13 |
| | | A14 = | −7.18496E-16 |

[Phase Coefficient]

| r4: | |
|---|---|
| R2 = | −0.400000E-3 |
| R4 = | −0.690307E-6 |
| R6 = | 0.100244E-5 |
| R8 = | −0.357162E-7 |

TABLE 21

| | Conditional Expression (7) | | Conditional Expression (8) | | | |
|---|---|---|---|---|---|---|
| | 1st Lens unit | 2nd Lens Unit | 1st Lens Unit | 2nd Lens Unit | Cond. Exp. (9) | Cond. Exp. (10) |
| Emb. 13 | 0.015 | — | 1.60 | — | 0.015 | — |
| Emb. 14 | 0.015 | 0.022 | 1.92 | 6.40 | 0.015 | 0.022 |
| Emb. 15 | — | 0.026 | — | 6.91 | — | 0.026 |
| Emb. 16 | — | 0.077 | — | 21.47 | — | 0.077 |
| Emb. 17 | — | 0.020 | — | 5.63 | — | 0.020 |
| Emb. 18 | 0.022 | — | 2.66 | — | 0.022 | — |

TABLE 22

<< Embodiment 19 >>
f = 36.0~46.0~68.0    FNO = 6.04~7.72~11.42

| | Curvature Radius | Axial Distance | Refractive Coefficient | Abbe Number |
|---|---|---|---|---|

<First Lens Unit, positive>

| | | | | | | |
|---|---|---|---|---|---|---|
| r1* | −15.777 | | | | | |
| | | d1 | 5.736 | N1 1.51178 | v1 | 69.07 |
| r2*[DOE] | −8.974 | | | | | |
| | | d2 | 2.000 | | | |
| r3 | ∞ (aperture diaphragm A) | | | | | |
| | | d3 | 17.633~10.412~2.000 | | | |
| | <Second Lens Unit, negative> | | | | | |
| r4* | −63.020 | | | | | |
| | | d4 | 3.500 | N2 1.58340 | v2 | 30.23 |
| r5* | −16.846 | | | | | |
| | | d5 | 2.500 | | | |
| r6 | −13.072 | | | | | |
| | | d6 | 1.000 | N3 1.70154 | v3 | 41.15 |
| r7 | −1836.058 | | | | | |

[Aspherical Coefficient]

| r1: | | r2: | |
|---|---|---|---|
| ε = | 1.0000 | ε = | 1.0000 |
| A4 = | −5.06810E-04 | A4 = | −0.156896E-3 |
| A6 = | 7.89450E-06 | A6 = | 0.852515E-5 |
| A8 = | −1.51723E-06 | A8 = | −0.425178E-6 |
| A10 = | 1.16596E-07 | A10 = | 0.109571E-7 |
| A12 = | −7.06037E-10 | | |
| A14 = | −2.20494E-10 | | |
| r4: | | r5: | |
| ε = | 1.0000 | ε = | 1.0000 |
| A4 = | −6.93937E-05 | A4 = | −7.49983E-5 |
| A6 = | 5.45272E-06 | A6 = | 1.35208E-6 |
| A8 = | −2.19136E-07 | A8 = | 2.07437E-8 |
| A10 = | 2.58014E-09 | A10 = | −2.59620E-9 |
| A12 = | 4.45085E-12 | A12 = | 4.41162E-11 |
| A14 = | −2.14069E-13 | A14 = | −2.18639E-13 |
| A16 = | 7.47946E-16 | | |

[Phase Coefficient]

| r2: | |
|---|---|
| R2 = | −0.929904E-3 |
| R4 = | 0.944877E-5 |
| R6 = | −0.177246E-6 |
| R8 = | −0.104687E-7 |

TABLE 23

<< Embodiment 20 >>
f = 36.0~46.0~68.0    FNO = 6.04~7.72~11.40

| | Curvature Radius | Axial Distance | Refractive Coefficient | Abbe Number |
|---|---|---|---|---|

<First Lens Unit, positive>

| | | | | | | |
|---|---|---|---|---|---|---|
| r1* | −15.601 | | | | | |
| | | d1 | 5.603 | N1 1.52510 | v1 | 56.38 |
| r2*[DOE] | −8.929 | | | | | |
| | | d2 | 2.000 | | | |
| r3 | ∞ (aperture diaphragm A) | | | | | |
| | | d3 | 16.335~9.712~2.000 | | | |
| | <Second Lens Unit, negative> | | | | | |
| r4* | −43.567 | | | | | |
| | | d4 | 3.500 | N2 1.58340 | v2 | 30.23 |
| r5* | −15.754 | | | | | |
| | | d5 | 2.563 | | | |
| r6 | −12.487 | | | | | |
| | | d6 | 1.000 | N3 1.70154 | v3 | 41.15 |
| r7 | −200.13 | | | | | |

[Aspherical Coefficient]

| r1: | | r2: | |
|---|---|---|---|
| ε = | 1.0000 | ε = | 1.0000 |
| A4 = | −5.27500E-04 | A4 = | −0.135035E-3 |
| A6 = | 6.19560E-06 | A6 = | 0.502407E-5 |
| A8 = | −7.74378E-07 | A8 = | −0.250180E-6 |
| A10 = | 2.92740E-08 | A10 = | 0.835102E-8 |
| A12 = | 2.36962E-09 | | |
| A14 = | −2.20494E-10 | | |
| r4: | | r5: | |
| ε = | 1.0000 | ε = | 1.0000 |
| A4 = | −6.06687E-5 | A4 = | −8.04087E-5 |
| A6 = | 5.75569E-6 | A6 = | 2.22370E-6 |
| A8 = | −3.30651E-7 | A8 = | −1.82096E-8 |
| A10 = | 5.73424E-9 | A10 = | −2.71279E-9 |
| A12 = | −2.61719E-11 | A12 = | 5.83952E-11 |

TABLE 23-continued

| A14 = | −1.08150E-13 | A14 = | −3.29099E-13 |
|---|---|---|---|
| A16 = | 5.13656E-16 | | |

[Phase Coefficient]

r2:

| R2 = | −0.111435E-2 |
|---|---|
| R4 = | 0.356259E-5 |
| R6 = | 0.625222E-6 |
| R8 = | −0.467672E-7 |

TABLE 24

<< Embodiment 21 >>
f = 36.0~46.0~68.0    FNO = 6.15~7.85~11.61

| Curvature Radius | Axial Distance | Refractive Coefficient | Abbe Number |
|---|---|---|---|

<First Lens Unit, positive>

| r1* | −18.803 | | | | | |
|---|---|---|---|---|---|---|
| | | d1 | 5.725 | N1 1.49300 | ν1 | 58.34 |
| r2*[DOE] | −9.113 | | | | | |
| | | d2 | 2.000 | | | |
| r3 | ∞ (aperture diaphragm A) | | | | | |
| | | d3 | 14.208~8.568~2.000 | | | |

<Second Lens Unit, negative>

| r4* | −30.000 | | | | | |
|---|---|---|---|---|---|---|
| | | d4 | 3.152 | N2 1.58340 | ν2 | 30.23 |
| r5*[DOE] | −15.877 | | | | | |
| | | d5 | 3.500 | | | |
| r6 | −10.551 | | | | | |
| | | d6 | 1.000 | N3 1.58340 | ν3 | 30.23 |
| r7 | −59.237 | | | | | |

[Aspherical Coefficient]

r1:
- ε = 1.0000
- A4 = −5.95580E-4
- A6 = 4.06040E-5
- A8 = −1.25117E-5
- A10 = 1.92444E-6
- A12 = −1.40597E-7
- A14 = 3.85081E-9 r2:
- ε = 1.0000
- A4 = −0.218116E-3
- A6 = 0.165267E-4
- A8 = −0.104547E-5
- A10 = 0.261682E-7 r4:
- ε = 1.0000
- A4 = 9.41188E-6
- A6 = 4.18634E-6
- A8 = −1.04362E-7
- A10 = 2.42448E-9
- A12 = −3.08900E-11
- A14 = 1.94111E-13
- A16 = −4.70429E-16 r5:
- ε = 1.0000
- A4 = 0.147440E-4
- A6 = 0.735909E-7
- A8 = 0.265375E-7
- A10 = −0.153544E-9

[Phase Coefficient]

r2:

| R2 = | −0.154115E-2 |
|---|---|
| R4 = | 0.322548E-5 |
| R6 = | −0.640151E-6 |
| R8 = | 0.296073E-7 | r5:

| R2 = | 0.166105E-2 |
|---|---|
| R4 = | −0.814228E-5 |
| R6 = | −0.147822E-7 |
| R8 = | 0.874974E-9 |

TABLE 25

| | Conditional Expression (12) | | Conditional Expression (13) | | | |
|---|---|---|---|---|---|---|
| | 1st Lens unit | 2nd Lens Unit | 1st Lens Unit | 2nd Lens Unit | Cond. Exp. (14) | Cond. Exp. (15) |
| Emb. 19 | 0.055 | — | 5.94 | — | 0.055 | — |
| Emb. 20 | 0.064 | — | 7.11 | — | 0.064 | — |
| Emb. 21 | 0.084 | 0.113 | 8.66 | 24.26 | 0.084 | 0.113 |

What is claimed is:

1. A zoom lens system that comprises, from an object side to an image side:

a first lens unit having a positive refractive power; and a second lens unit having a negative refractive power and disposed at the image side end of the zoom lens system, wherein said zoom lens system performs zooming from a wide-angle end to a telephoto end by moving the first and second lens units forward to the object side so that a distance between the first and second lens units decreases, wherein said zoom lens system includes at least one surface having a power to diffract light.

2. A zoom lens system as claimed in claim 1, wherein said surface having a power to diffract light is provided in said second lens unit.

3. A zoom lens system as claimed in claim 2, wherein said first and second lens units are each composed of one lens element.

4. A zoom lens system as claimed in claim 1, wherein said surface having a power to diffract light is provided in said first lens unit.

5. A zoom lens system as claimed in claim 4, wherein said first and second lens units are each composed of one lens element.

6. A zoom lens system as claimed in claim 1, wherein the following conditional expression is satisfied:

$$0.01 < |\phi doe/\phi r| < 0.12$$

where $\phi doe$: diffractive power of the surface having a power to diffract light;

$\phi r$: composite power of diffractive and refractive powers of the lens unit that includes the surface having a power to diffract light.

7. A zoom lens system as claimed in claim 1, wherein the following conditional expression is satisfied:

$$2 < |R_2 \times H_{max}/\lambda_0| < 50$$

where $R_2$: secondary phase coefficient of the surface having a power to diffract light;

$H_{max}$: effective diameter of the surface having a power to diffract light;

$\lambda_0$: design wavelength.

8. A zoom lens system as claimed in claim 1, wherein the following conditional expression is satisfied:

$$0.9 < |\phi Gr1/\phi Gr2| < 1.7$$

where
- $\phi Gr1$: composite power of diffractive and refractive power of the first lens unit;
- $\phi Gr2$: composite power of diffractive and refractive power of the second lens unit.

9. A zoom lens system as claimed in claim 1, wherein said surface having a power to diffract light is provided in said first lens unit, and said second lens unit is composed solely of refractive optical surfaces.

10. A zoom lens system as claimed in claim 9, wherein the following conditional expression is satisfied:

$$\nu 21 > 44$$

where
- $\nu 21$: dispersion of the refractive optical surfaces of the second lens unit.

11. A zoom lens system as claimed in claim 1, wherein said surface having a power to diffract light is provided on a refractive optical surface having an aspherical shape.

12. A zoom lens system as claimed in claim 1, wherein said surface having a power to diffract light is made from plastic material.

13. A zoom lens system as claimed in claim 12, wherein said surface having a power to diffract light and made from plastic material is formed on a glass lens element.

14. A zoom lens system as claimed in claim 1, wherein said surface having a power to diffract light is made from plastic material by injection-molding together with a lens element.

15. A zoom lens system as claimed in claim 1, wherein said surface having a power to diffract light is disposed at an image-side end.

16. A zoom lens system as claimed in claim 1, wherein said surface having a power to diffract light is disposed on a positive lens element.

17. A zoom lens system as claimed in claim 1, wherein said surface having a power to diffract light is disposed on a negative lens element.

18. A zoom lens system that comprises, from an object side to an image side:
- a first lens unit having a positive power; and
- a second lens unit having a negative refractive power and disposed at the image-side end of the zoom lens system,
- wherein said zoom lens system performs zooming from a wide-angle end to a telephoto end by moving the first and second lens units forward to the object side so that a distance between the first and second lens unit decreases,
- wherein said first lens unit is composed of at least two lens elements, and said zoom lens system includes at least one surface having a power to diffract light.

19. A zoom lens system as claimed in claim 18, wherein said surface having a power to diffract light is provided in said second lens unit.

20. A zoom lens system as claimed in claim 18, wherein said surface having a power to diffract light is provided in said first lens unit.

21. A zoom lens system as claimed in claim 18, wherein the following conditional expression is satisfied:

$$0.005 < |\phi doe/\phi r| < 0.12$$

where
- $\phi doe$: diffractive power of the surface having a power to diffract light;
- $\phi r$: composite power of diffractive and refractive powers of the lens unit that includes the surface having a power to diffract light.

22. A zoom lens system as claimed in claim 18; wherein the following conditional expression is satisfied:

$$2 < |R_2 \times H_{max}/\lambda_0| < 57$$

where
- $R_2$: secondary phase coefficient of the surface having a power to diffract light;
- $H_{max}$: effective diameter of the surface having a power to diffract light;
- $\lambda_0$: design wavelength.

23. A zoom lens system as claimed in claim 18, wherein said surface having a power to diffract light is provided on a refractive optical surface having an aspherical shape.

24. A zoom lens system as claimed in claim 18, wherein said surface having a power to diffract light is made from plastic material.

25. A zoom lens system as claimed in claim 24, wherein said surface having a power to diffract light and made from plastic material is formed on a glass lens element.

26. A zoom lens system as claimed in claim 18, wherein said surface having a power to diffract light is made from plastic material by injection-molding together with a lens element.

27. A zoom lens system as claimed in claim 18, wherein said second lens unit is composed of one lens element.

28. A zoom lens system as claimed in claim 27, wherein said surface having a power to diffract light is provided in said second lens unit.

29. A zoom lens system as claimed in claim 28, wherein the following conditional expression is satisfied:

$$0.02 < |\phi doe2/\phi r2| < 0.09$$

where
- $\phi doe2$: diffractive power of the surface having a power to diffract light;
- $\phi r2$: composite power of diffractive and refractive powers of the second lens unit.

30. A zoom lens system as claimed in claim 27, wherein said surface having a power to diffract light is provided in said first lens unit.

31. A zoom lens system as claimed in claim 30, wherein the following conditional expression is satisfied:

$$0.01 < |\phi doe1/\phi r1| < 0.05$$

where
- $\phi doe1$: diffractive power of the surface having a power to diffract light;
- $\phi r1$: composite power of diffractive and refractive powers of the first lens unit.

32. A zoom lens system as claimed in claim 27,
wherein each lens unit that includes one of said surface having a power to diffract light satisfies the following conditional expression:

$$0.01 < |\phi doe/\phi r| < 0.09$$

where
- $\phi doe$: diffractive power of the surface having a power to diffract light;
- $\phi r$: composite power of diffractive and refractive powers of the lens unit that includes the surface having a power to diffract light.

33. A zoom lens system as claimed in claim 27,
wherein the following conditional expression is satisfied:

$$1.5 < |R_2 \times H_{max}/\lambda_0| < 25$$

where
- $R_2$: secondary phase coefficient of the surface having a power to diffract light;
- $H_{max}$: effective diameter of the surface having a power to diffract light;
- $\lambda_0$: design wavelength.

34. A zoom lens system as claimed in claim 27,
wherein said surface having a power to diffract light is provided on a refractive optical surface having an aspherical shape.

35. A zoom lens system as claimed in claim 27,
wherein said surface having a power to diffract light is made from plastic material.

36. A zoom lens system as claimed in claim 35,
wherein said surface having a power to diffract light and made from plastic material is formed on a glass lens element.

37. A zoom lens system as claimed in claim 27,
wherein said surface having a power to diffract light is made from plastic material by injection-molding together with a lens element.

38. A zoom lens system as claimed in claim 27,
wherein said surface having a power to diffract light is disposed at an image-side end of said first lens unit.

39. A zoom lens system as claimed in claim 27,
wherein said surface having a power to diffract light is disposed at an object-side end of said second lens unit.

40. A zoom lens system that comprises, from an object side to an image side:
- a first lens unit having a positive refractive power; and
- a second lens unit having a negative refractive power and disposed at the image side end of the zoom lens system,
- wherein said zoom lens system performs zooming from a wide-angle end to a telephoto end by moving the first and second lens units forward to the object side so that a distance between the first and second lens units decreases,
- wherein said first lens unit is composed of one lens element, said second lens unit is composed of at least two lens elements, and said zoom lens system includes at least one surface having a power to diffract light.

41. A zoom lens system as claimed in claim 40,
wherein said surface having a power to diffract light is provided in said first lens unit.

42. A zoom lens system as claimed in claim 41,
wherein the following conditional expression is satisfied:

$$0.03 < |\phi doe1/\phi r1| < 0.10$$

where
- $\phi doe1$: diffractive power of the surface having a power to diffract light;
- $\phi r1$: composite power of diffractive and refractive powers of the first lens unit.

43. A zoom lens system as claimed in claim 40,
wherein said surface having a power to diffract light is provided in said second lens unit.

44. A zoom lens system as claimed in claim 43,
wherein the following conditional expression is satisfied:

$$0.06 < |\phi doe2/\phi r2| < 0.15$$

where
- $\phi doe2$: diffractive power of the surface having a power to diffract light;
- $\phi r2$: composite power of diffractive and refractive powers of the second lens unit.

45. A zoom lens system as claimed in claim 40,
wherein each lens unit that includes one of said surface having a power to diffract light satisfies the following conditional expression:

$$0.03 < |\phi doe/\phi r| < 0.15$$

where
- $\phi doe$: diffractive power of the surface having a power to diffract light;
- $\phi r$: composite power of diffractive and refractive powers of the lens unit that includes the surface having a power to diffract light.

46. A zoom lens system as claimed in claim 40,
wherein the following conditional expression is satisfied:

$$2 < |R_2 \times H_{max}/\lambda_0| < 25$$

where
- $R_2$: secondary phase coefficient of the surface having a power to diffract light;
- $H_{max}$: effective diameter of the surface having a power to diffract light;
- $\lambda_0$: design wavelength.

47. A zoom lens system as claimed in claim 40,
wherein said surface having a power to diffract light is provided on a refractive optical surface having an aspherical shape.

48. A zoom lens system as claimed in claim 40,
wherein said surface having a power to diffract light is made from plastic material.

49. A zoom lens system as claimed in claim 48,
wherein said surface having a power to diffract light and made from plastic material is formed on a glass lens element.

50. A zoom lens system as claimed in claim 40,
wherein said surface having a power to diffract light is made from plastic material by injection-molding together with a lens element.

51. A zoom lens system for a lens-shutter camera consisting, from an object to image side of:
- a first lens element; and
- a second lens element, air spaced from the first lens element, wherein the air space decreases during a zooming mode of operation from a wide angle to a telephoto position as the first and second lens elements are moved, an image side surface of the first lens element includes a diffraction pattern to address aberrations across the zooming range.

52. A zoom lens system as claimed in claim 51, wherein the image side surface of the first lens element has an aspheric shape.

53. A zoom lens system as claimed in claim 52, wherein the first lens element has a positive refractive power.

54. A zoom lens system as claimed in claim 53, wherein the second lens element has a negative refractive power.

55. A zoom lens system as claimed in claim 54, wherein an image side surface of the second lens element has an aspheric shape.

56. A zoom lens system as claimed in claim 54, wherein an image side surface of the second lens element has a diffraction pattern to address aberrations across the zooming range.

57. A zoom lens system as claimed in claim 51, wherein the following conditional expression is satisfied:

$$0.01 |\phi doe/\phi r| < 0.12$$

where
$\phi$doe: diffractive power of the image side surface of the first lens element having a power to diffract light;
$\phi$r: composite diffractive and refractive power of the first lens element.

58. A zoom lens system as claimed in claim 51, wherein the first and second lens elements are formed of plastic material.

59. A zoom lens system consisting, from an object to an image side, of:
a first lens unit; and
a second lens unit, air spaced from the first lens unit, wherein the air space decreases during a zooming mode of operation from a wide angle to a telephoto position as the first and second lens units are moved, an image side surface in each of the first and second lens units includes an aspheric configuration with a diffraction pattern to address aberrations across the zooming range.

60. A zoom lens system as claimed in claim 51, wherein the first lens unit has a negative refractive power.

61. A zoom lens system as claimed in claim 59, wherein the following conditional expression is satisfied:

$$0.01 |doe/\phi r| < 0.12$$

where
$\phi$doe: diffractive power of the image side surface of the first lens unit having a power to diffract light;
$\phi$r: composite diffractive and refractive power of the first lens unit.

* * * * *